United States Patent
Kreinin et al.

(10) Patent No.: US 11,294,815 B2
(45) Date of Patent: Apr. 5, 2022

(54) MULTIPLE MULTITHREADED PROCESSORS WITH SHARED DATA CACHE

(71) Applicant: Mobileye Vision Technologies Ltd., Jerusalem (IL)

(72) Inventors: Yosef Kreinin, Jerusalem (IL); Yosi Arbeli, Jerusalem (IL); Gil Israel Dogon, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 15/178,399

(22) Filed: Jun. 9, 2016

(65) Prior Publication Data

US 2017/0103022 A1    Apr. 13, 2017

Related U.S. Application Data

(60) Provisional application No. 62/293,908, filed on Feb. 11, 2016, provisional application No. 62/293,145, (Continued)

(51) Int. Cl.
*G06F 9/38* (2018.01)
*G06F 12/0875* (2016.01)
(Continued)

(52) U.S. Cl.
CPC ............ *G06F 12/0875* (2013.01); *G06F 7/00* (2013.01); *G06F 9/3001* (2013.01);
(Continued)

(58) Field of Classification Search
CPC .................................................... G06F 9/3851
See application file for complete search history.

(56) References Cited

U.S. PATENT DOCUMENTS

| 5,323,489 A | 6/1994 | Bird et al. |
| 5,602,769 A | 2/1997 | Yu et al. |

(Continued)

FOREIGN PATENT DOCUMENTS

| CN | 101194245 | 6/2008 |
| CN | 101504618 | 8/2009 |

(Continued)

OTHER PUBLICATIONS

Agathos et al., "Deploying OpenMP on an Embedded Multicore Accelerator", IEEE, 2013, pp. 180-187.

(Continued)

*Primary Examiner* — Jacob Petranek
(74) *Attorney, Agent, or Firm* — Schwegman Lundberg & Woessner, P.A.

(57) ABSTRACT

A multi-core processor configured to improve processing performance in certain computing contexts is provided. The multi-core processor includes multiple processing cores that implement barrel threading to execute multiple instruction threads in parallel while ensuring that the effects of an idle instruction or thread upon the performance of the processor is minimized. The multiple cores can also share a common data cache, thereby minimizing the need for expensive and complex mechanisms to mitigate inter-cache coherency issues. The barrel-threading can minimize the latency impacts associated with a shared data cache. In some examples, the multi-core processor can also include a serial processor configured to execute single threaded programming code that may not yield satisfactory performance in a processing environment that employs barrel threading.

24 Claims, 67 Drawing Sheets

Related U.S. Application Data filed on Feb. 9, 2016, provisional application No. 62/293,147, filed on Feb. 9, 2016, provisional application No. 62/290,400, filed on Feb. 2, 2016, provisional application No. 62/290,389, filed on Feb. 2, 2016, provisional application No. 62/290,392, filed on Feb. 2, 2016, provisional application No. 62/290,395, filed on Feb. 2, 2016, provisional application No. 62/290,383, filed on Feb. 2, 2016, provisional application No. 62/173,392, filed on Jun. 10, 2015, provisional application No. 62/173,389, filed on Jun. 10, 2015.

(51) Int. Cl.

| | |
|---|---|
| G06F 7/00 | (2006.01) |
| G06F 9/30 | (2018.01) |
| G06F 9/345 | (2018.01) |
| G06F 9/52 | (2006.01) |
| G06F 11/10 | (2006.01) |
| G06T 1/20 | (2006.01) |
| G06F 12/084 | (2016.01) |
| G06F 12/0842 | (2016.01) |
| G06F 15/78 | (2006.01) |
| G06F 15/80 | (2006.01) |
| G06F 13/12 | (2006.01) |
| G06F 12/0811 | (2016.01) |

(52) U.S. Cl.
CPC .......... *G06F 9/3012* (2013.01); *G06F 9/3017* (2013.01); *G06F 9/30036* (2013.01); *G06F 9/30043* (2013.01); *G06F 9/30123* (2013.01); *G06F 9/30181* (2013.01); *G06F 9/345* (2013.01); *G06F 9/3824* (2013.01); *G06F 9/3826* (2013.01); *G06F 9/3834* (2013.01); *G06F 9/3851* (2013.01); *G06F 9/3865* (2013.01); *G06F 9/3891* (2013.01); *G06F 9/526* (2013.01); *G06F 11/1008* (2013.01); *G06F 12/084* (2013.01); *G06F 12/0842* (2013.01); *G06F 13/12* (2013.01); *G06F 15/7867* (2013.01); *G06F 15/80* (2013.01); *G06F 15/8023* (2013.01); *G06T 1/20* (2013.01); *G06F 12/0811* (2013.01); *G06F 2212/452* (2013.01); *G06F 2212/62* (2013.01)

(56) References Cited

U.S. PATENT DOCUMENTS

| | | | |
|---|---|---|---|
| 6,061,477 A | 5/2000 | Lohmeyer et al. | |
| 6,061,782 A | 5/2000 | Elliott | |
| 6,934,422 B2 | 8/2005 | Hamza | |
| 7,685,354 B1 | 3/2010 | Hetherington et al. | |
| 8,300,058 B2 | 10/2012 | Navon et al. | |
| 8,305,495 B2 | 11/2012 | Kegasawa | |
| 2002/0087955 A1 | 7/2002 | Ronen et al. | |
| 2003/0005012 A1 | 1/2003 | Steele, Jr. | |
| 2003/0118251 A1 | 6/2003 | Hamza | |
| 2004/0034759 A1* | 2/2004 | Katzman | G06F 9/3851 712/1 |
| 2004/0073779 A1* | 4/2004 | Hokenek | G06F 9/30123 712/225 |
| 2005/0240930 A1 | 10/2005 | Amamiya | |
| 2006/0136672 A1* | 6/2006 | Chaudhry | G06F 11/165 711/122 |
| 2006/0179194 A1* | 8/2006 | Jensen | G06F 7/5055 710/111 |
| 2006/0236136 A1* | 10/2006 | Jones | G06F 1/3203 713/300 |
| 2007/0094477 A1 | 4/2007 | Espasa | |
| 2008/0059758 A1 | 3/2008 | Sachs | |
| 2008/0209437 A1 | 8/2008 | Emma | |
| 2009/0083490 A1 | 3/2009 | Berger et al. | |
| 2009/0106495 A1* | 4/2009 | Chou | G06F 9/3004 711/130 |
| 2009/0187717 A1 | 7/2009 | Nasu | |
| 2010/0070741 A1 | 3/2010 | Col et al. | |
| 2010/0077177 A1 | 3/2010 | Luick | |
| 2010/0253849 A1 | 10/2010 | Kegasawa | |
| 2010/0299505 A1 | 11/2010 | Uesugi | |
| 2011/0265068 A1* | 10/2011 | Elnozahy | G06F 8/456 717/149 |
| 2011/0307684 A1 | 12/2011 | Kreinin et al. | |
| 2013/0108187 A1 | 5/2013 | Tsai et al. | |
| 2013/0346729 A1 | 12/2013 | Barowski et al. | |
| 2014/0025930 A1* | 1/2014 | Lee | G06F 12/084 712/205 |
| 2014/0047221 A1 | 2/2014 | Irwin et al. | |
| 2014/0149719 A1 | 5/2014 | Tabaru | |
| 2014/0189309 A1 | 7/2014 | Hughes et al. | |
| 2014/0331101 A1 | 11/2014 | Chung et al. | |
| 2014/0351825 A1 | 11/2014 | Xu et al. | |
| 2015/0261538 A1* | 9/2015 | Mansell | G06F 9/3012 712/225 |
| 2016/0062770 A1* | 3/2016 | Venkumahanti | G06F 9/3885 712/24 |

FOREIGN PATENT DOCUMENTS

| | | |
|---|---|---|
| CN | 101676865 | 3/2010 |
| CN | 101777007 | 7/2010 |
| CN | 101859241 | 10/2010 |
| CN | 103810739 | 5/2014 |
| CN | 103854252 | 6/2014 |
| CN | 107980118 A | 5/2018 |
| CN | 107980118 B | 9/2021 |
| EP | 0620533 A2 | 10/1994 |
| EP | 2187316 A1 | 5/2010 |
| EP | 2725497 A1 | 4/2014 |
| EP | 3308260 A1 | 4/2018 |
| EP | 3308349 A2 | 4/2018 |
| WO | 2000/68777 A2 | 11/2000 |
| WO | 2012/031177 A1 | 3/2012 |
| WO | 2012/138952 A1 | 10/2012 |
| WO | 2013/101010 A1 | 7/2013 |
| WO | 2014/025691 A1 | 2/2014 |
| WO | 2014/105126 A1 | 7/2014 |
| WO | WO-2014105126 A1 | 7/2014 |
| WO | 2014/205590 A1 | 12/2014 |
| WO | 2016/124242 A1 | 8/2016 |
| WO | 2016/199154 A1 | 12/2016 |
| WO | WO-2016199151 A2 | 12/2016 |

OTHER PUBLICATIONS

Berg, Thomas B., "Maintaining I/O Data Coherence in Embedded Multicore Systems", IEEE Micro, 2009, pp. 10-19.

Hayes et al., "VSR Sort: A Novel Vectorised Sorting Algorithm & Architecture Extensions for Future Microprocessors", IEEE, 2015, pp. 26-38.

Hu et al., "Using Dynamic Binary Translation to Fuse Dependent Instructions", IEEE, Proceedings of the International Symposium on Code Generation and Optimization (CCGO'04), 2004, pp. 1-12.

Huang et al., "Revisit of View-Oriented Parallel Programming", Seventh IEEE International Symposium on Cluster Computing and the Grid (CCGrid'07), 2007, 6 pages.

International Search Report and Written Opinion received for PCT Application No. PCT/IL2016/050614, dated Aug. 11, 2016, 39 pages.

Kakoee et al., "A Multi-banked Shared-L1 Cache Architecture for Tightly Coupled Processor Clusters", IEEE, 2012, 5 pages.

Lhuillier et al., "HARS: A Hardware-Assisted Runtime Software for Embedded Many-Core Architectures", ACM Transactions on Embedded Computing Systems, vol. 13, No. 3s, Article 102, Mar. 2014, pp. 102:01-102:25.

Rosten et al., "Fusing Points and Lines for High Performance Tracking", Proceedings of Tenth IEEE International Conference on Computer Vision, 2005, 8 pages.

(56) References Cited

OTHER PUBLICATIONS

Rosten et al., "Machine Learning for High-Speed Corner Detection", European Conference on Computer Vision, 2006, pp. 1-14.
International Preliminary Report on Patentability received for PCT Patent Application No. PCT/IL2016/050614, dated Dec. 21, 2017, 28 pages.
"European Application Serial No. 16738566.5, Response filed Sep. 19, 2018 to Communication Pursuant to Rules 161(1) and 161 EPC dated Mar. 9, 2018", 11 pgs.
"International Application Serial No. PCT/IL2016/050611, International Preliminary Report on Patentability dated Dec. 21, 2017", 10 pgs.
"International Application Serial No. PCT/IL2016/050611, International Search Report dated Jan. 2, 2017", 3 pgs.
"International Application Serial No. PCT/IL2016/050611, Witten Opinion dated Jan. 2, 2017", 8 pgs.
"International Application Serial No. PCT/IL2016/050614, International Preliminary Report on Patentability dated Dec. 21, 2017", 28 pgs.
Glasbey, C A, et al., "A review of image-warping methods", Journal of Applied Statistics, Carfax Publishing CO., Abingdon, GB, vol. 25, No. 2 XP002570074, (Apr. 1, 1998), 155-171.
"European Application Serial No. 16734467.0, Communication Pursuant to Article 94(3) EPC dated Dec. 16, 2019", 10 pgs.
"Barrel processor", Wikipedia, https: en.wikipedia.org w index.php?title=Barrel_processorandoldid=715071246, (Apr. 13, 2015).
"European Application Serial No. 16738566.5, Communication Pursuant to Article 94(3) EPC dated Oct. 14, 2019", 14 pgs.
Giachetti, A, "Real-Time Artifact-Free Image Upscaling", IEEE Transactions on Image Processing, IEEE Service Center, Piscataway, NJ, US, vol. 20, No. 10, (Oct. 1, 2011), 2760-2768.
Glasbey, C A, "A review of image-warping methods", Journal of Applied Statistics, Carfax Publishing CO., Abingdon, GB, vol. 25, No. 2 XP002570074, (Apr. 1, 1998), 18 pgs.
"European Application Serial No. 16738566.5, Response filed Feb. 16, 21 to Communication Pursuant to Article 94(3) EPC dated Aug. 6, 2020", 27 pgs.
"Chinese Application Serial No. 201680045334.8, Office Action dated Jan. 22, 21", w English Translation, 55 pgs.
"European Application Serial No. 16734467.0, Communication Pursuant to Article 94(3) EPC dated Dec. 2, 2020", 7 pgs.
"European Application Serial No. 16734467.0, Response filed Apr. 20, 20 to Communication Pursuant to Article 94(3) EPC dated Dec. 16, 2019", 292 pgs.
"European Application Serial No. 16738566.5, Communication Pursuant to Article 94(3) EPC dated Aug. 6, 2020", 17 pgs.
Gribbon, K T, et al., "A Real-time FPGA Implementation of a Barrel Distortion Correction Algorithm with Bilinear Interpolation", Proceedings of Image and Vision Computing New Zealand, (Nov. 1, 2003), 408-413.
Jose, Martinez, et al., "FPGA-based Pipeline Architecture to Transform Cartesian Images into Foveal Images by Using a new Foveation Approach", Wireless Communicationsand Networking Conference, IEEE, USA, (Sep. 1, 2006), 1-10.
Konstantis, Daloukas, et al., "Fisheye lens distortion correction on multicore and hardware accelerator platforms", Parallel & Distributed Processing, IEEE International Symposium On,IEEE, USA, (Apr. 19, 2010), 1-10.
Suhaib, A Fahmy, "Generalised Parallel Bilinear Interpolation Architecture for Vision Systems", Reconfigurable Computing and Fpgas, International Conference On, IEEE, USA, (Dec. 3, 2008), 331-336.
"Chinese Application Serial No. 201680045334.8, Office Action dated Aug. 31, 2021", w/English Translation, 10 pgs.
"Chinese Application Serial No. 201680045334.8, Response filed May 20, 2021 to Office Action dated Jan. 22, 21", w/ English claims, 41 pgs.
"Chinese Application Serial No. 201680046182 .3, Response filed Jul. 2, 2021 to Office Action dated Mar. 2, 2021", w/ English claims, 60 pgs.
"European Application Serial No. 16734467.0, Response filed Jun. 8, 21 to Communication Pursuant to Article 94(3) EPC dated Dec. 2, 2020", 7 pgs.
"European Application Serial No. 16734467.0, Supplementary Response filed Jun. 9, 2021 to Communication Pursuant to Article 94(3) dated Dec. 2, 2020", 5 pgs.
"European Application Serial No. 16738566.5, Communication Pursuant to Article 94(3) EPC dated May 20, 2021", 16 pgs.
"The IEEE Standard Dictionary of Electrical and Electronics Terms—Sixth Edition", Processing unit; processor, vol. 100, (Jan. 1, 1996), 822-823.
Smith, et al., "Bilinear interpolation of digital images", Ultramicroscopy, Elsevier, Amsterdam, NL, vol. 6, No. 2, (Jan. 1, 1981), 201-204.
"Chinese Application Serial No. 201680046182 .3, Office Action dated Mar. 2, 21", w English Translation, 16 pgs.
"Chinese Application Serial No. 201680045334.8, Response filed Nov. 1, 21 to Office Action dated Aug. 31, 2021", w English claims, 26 pgs.

\* cited by examiner

| DIRTY BIT STATE | DIRTY/CLEAN | MEANING |
|---|---|---|
| 0 | CLEAN | Data does not need to be written to external memory. |
| 1 | DIRTY | Data has been updated locally. The corresponding data in external memory needs to be rewritten/updated with the local changes. |

FIGURE 15

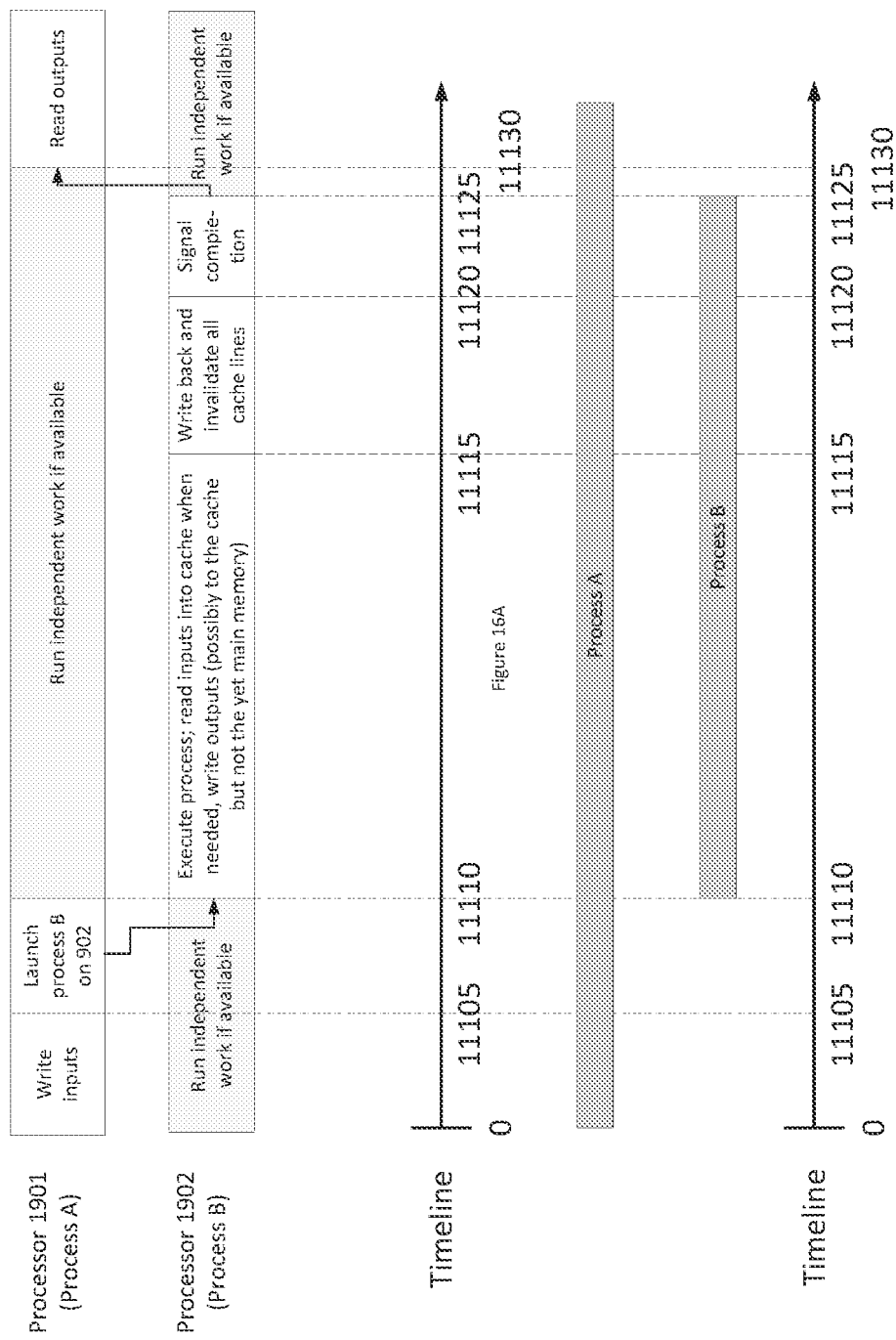

a[4][4]　　　　a[4][y]

| | A0 | A1 | A2 | A3 | A4 | A5 | A6 | A7 |
|---|---|---|---|---|---|---|---|---|
| 0 | 0 | 0 | 0 | 0 | 0 | 0 | 0 | 0 |

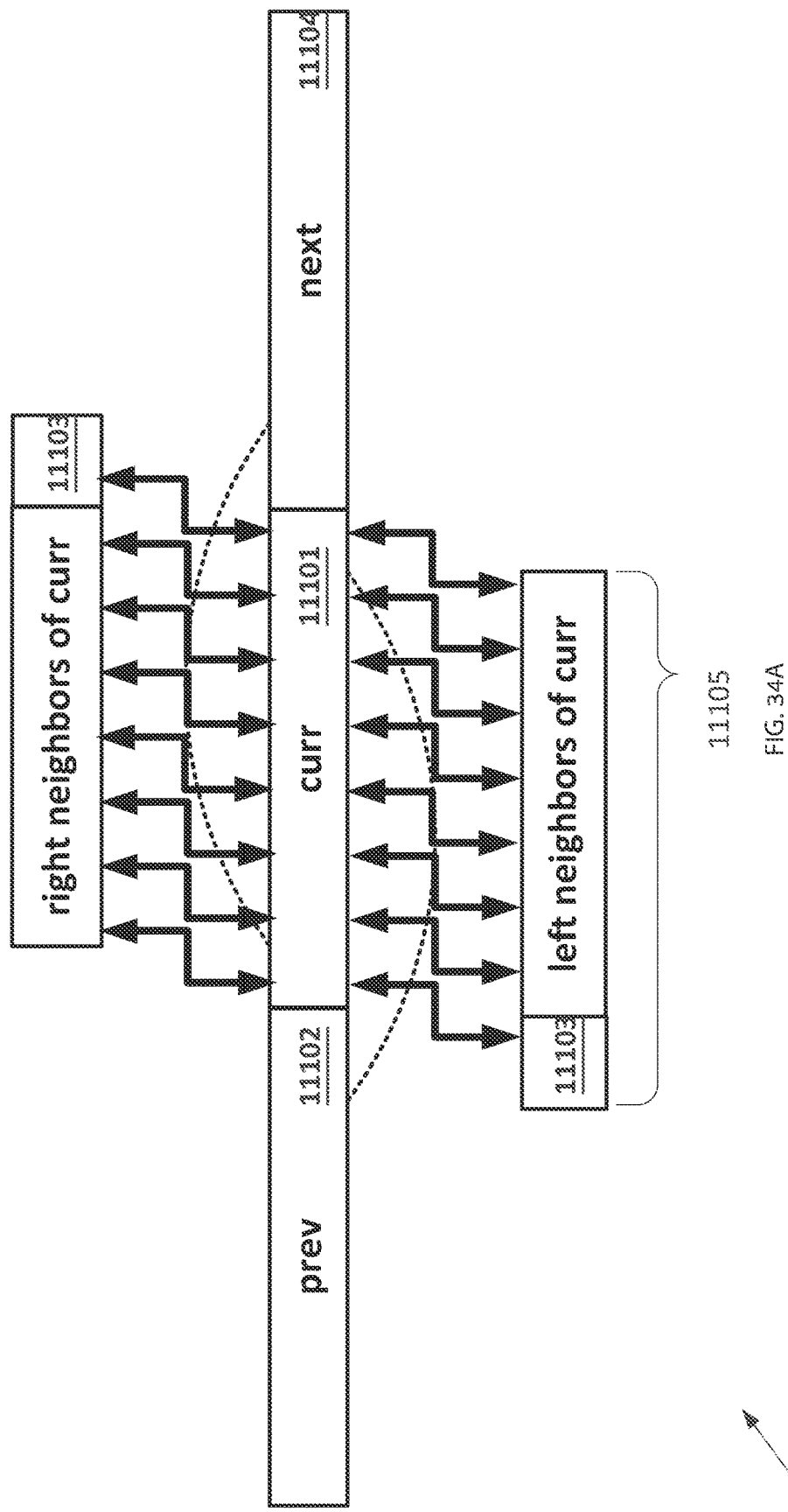

Executing by multiple processing cores, multiple threads of a software program using barrel thread processing. 6210

Synchronizing between the execution of threads by utilizing data locks and atomic counters of an inter thread communication module. 6220

Managing multiple data locks. Masking by a mask requests for locking the data lock, changing by a mask encoder the mask over time, selecting by a first priority encoder a selected masked request to lock the data lock and selecting by a second priority encoder a request to lock the data lock regardless of the mask. 6622

Executing, by each data lock requestor, a state machine for controlling a sending of requests to lock a data lock, of sending requests to unlock the data lock and for selectively preventing an execution of a thread. 6630

Storing at multiple entries of a memory module multiple atomic counter values, selecting, by an arbiter, up to a single request for updating a given atomic counter at a cycle and updating, by a processor, the given atomic counter. 6640

Adding or subtracting two input operands of a floating point format by an add and subtract unit. 6910

Generating an invalid number exception when at least one of the two input operands is a denormalized number; wherein the generating of the not a number exception may include outputting a default value and setting an exception flag. 6920

Converting an integer number to a floating point number using an exponent bias. 6930

Converting, by the format converter, a floating point number to an integer number without generating an exception when the floating point number is a denormalized number. 6940

MULTIPLE MULTITHREADED PROCESSORS WITH SHARED DATA CACHE

CROSS REFERENCE TO RELATED APPLICATIONS

This application claims priority from U.S. provisional patent Ser. No. 62/173,389 filing date Jun. 10, 2015; U.S. provisional patent Ser. No. 62/173,392 filing date Jun. 10, 2015; U.S. provisional patent Ser. No. 62/290,383 filing date Feb. 2, 2016; U.S. provisional patent Ser. No. 62/290,389 filing date Feb. 2, 2016; U.S. provisional patent Ser. No. 62/290,392 filing date Feb. 2, 2016; U.S. provisional patent Ser. No. 62/290,395 filing date Feb. 2, 2016; U.S. provisional patent Ser. No. 62/290,400 filing date Feb. 2, 2016; U.S. provisional patent Ser. No. 62/293,145 filing date Feb. 9, 2016; U.S. provisional patent Ser. No. 62/293,147 filing date Feb. 9, 2016; and U.S. provisional patent 62/293,908 filing date Feb. 11, 2016 all being incorporated herein by reference in their entirety.

BACKGROUND OF THE DISCLOSURE

Many types of computer architectures are available. Processor performance is generally assessed on its speed, efficiency, memory consumption, and power consumption. However, a processor's performance according to these factors is highly context-dependent. One processor may have superior performance in a computing environment where only one instruction thread is available to be processed at any given time. The same processor may exhibit subpar performance in a computing environment requiring multiple instruction threads to be processed simultaneously. Therefore, tailoring processor architecture for the computing environment in which it will operate can yield improved performance. This improved performance may include, for example, increased computation speed and more efficient use of memory and power.

The speed at which memory can be accessed is often inversely correlated with the memory's capacity. Therefore, it can be advantageous to use relatively fast, but limited capacity, memory (e.g., caches) to store local copies of shared data for processors in multiple processor systems. Doing so can allow the processors to perform operations more quickly than they would if they had to rely on accessing the data from a relatively large, slow central memory. However, when local copies of shared data are created, there is a significant risk that these copies will become out of sync with one another (or "incoherent"). This is because processors often run processes that modify the copies of data in their local caches, causing the original data stored in the slower, central memory to become out of date. In particular, the processes may not update the original copy of the data in the external or main memory with their changes before other processes access that data from main memory. This can result in lost work and inefficiency. Potentially worse, processes can perform operations on outdated or incorrect data, and then write the incorrect result to main or external memory. Other processes can then save the incorrect data to the local caches of their respective processors, operate on the incorrect data, and propagate errors in the system. This can create errors that are difficult or impossible to detect.

Hardware and software systems are available to address these cache coherence problems. While such systems may successfully deal with data coherence, they often introduce inefficiencies into multi-processor systems. For example, "full cache coherence" systems need additional hardware support to accommodate a wide variety of frequent sharing of data. Full cache coherence systems are typically designed to be flexible in their accommodation of different situations in which data sharing can occur. Additional flexibility requires additional, complex hardware. That additional hardware can, at times, decrease the speed of operations that do not rely intensively or frequently on data sharing between processes running on different processors.

In addition, processor performance is generally assessed on its speed, efficiency, memory consumption, and power consumption. However, a processor's performance according to these factors is highly context-dependent. One processor may have superior performance in a computing environment where only one instruction thread is available to be processed at any given time. The same processor may exhibit subpar performance in a computing environment requiring multiple instruction threads to be processed simultaneously. Therefore, tailoring processor architecture for the computing environment in which it will operate can yield improved performance. This improved performance may include, for example, increased computation speed and more efficient use of memory and power.

As electronic devices become smaller and more mobile, the need for a device to be power efficient (i.e., able to perform its function with the least amount of power consumption) has become increasingly important. One way in which an electronic device can be made more power efficient is to power-gate the device. Power gating can refer to the practice of either fully or partially powering down a device during time periods in which the device is idle. In electronic devices with embedded memory, power-gating a device can cause the memory to become corrupted every time the device is powered up after having been powered down. The power up process can cause memory errors, and can also cause slow operation of any software/firmware interfacing with memory, as the software may have to wait for the memory to re-initialize. Therefore, in order to allow for power-gating on a device that includes memory, the memory reading operation can be modified to minimize memory errors, while at the same time allowing for memory to be read quickly after the memory is powered up.

SUMMARY OF THE DISCLOSURE

Any combination of any subject matter of any claim may be provided.

Any combination of any method and/or method step disclosed in any figure and/or in the specification may be provided.

Any combination of any unit, device, and/or component disclosed in any figure and/or in the specification may be provided. Non-limiting examples of such units include a gather unit, an image processor and the like.

This disclosure relates to a multi-core computer processor that utilizes both barrel threading and a shared data cache to improve the performance of the processor. The system can be applied, for example, in a computing environment in which there are multiple software loops with largely independent iterations. The multi-core processor can realize performance gains over other multi-threading architectures, in part, because each core operates on threads using a barrel threading approach. Barrel threading can, in particular, serve to mask or hide memory latencies (i.e., minimize their effect on efficiency). Minimizing the impact of latency can allow use a shared data cache. The combination of barrel threading and shared data caches in a multi-core architecture can thus provide the improved computing environment.

This disclosure relates to a multi-core computer processor that may utilize instruction chain encoding in conjunction with, for example, barrel threading and a shared data cache. Reducing the number of clock cycles required to process multiple inter-dependent instructions via instruction chain encoding can lead to faster processing times. The system can be applied in a computing environment in which there are multiple software loops with independent iterations. The multi-core processor can realize performance gains over other multi-threading architectures, in part, because each core can operate on threads using a barrel threading approach. Barrel threading can also mask or hide memory latencies (i.e., minimize their effect on efficiency). Minimizing the impact of latency can allow use of more efficiently accessed memory, such as a shared data cache. The combination of barrel threading, shared data caches, and instruction chain encoding in a multi-core architecture can thus provide the improved computing environment.

This disclosure relates to systems, including hardware and/or software that can facilitate coherent sharing of data in multiple processor devices. The systems may include implementing restricted access to data for concurrently running processes. The systems may further include relatively limited or simplified hardware for running systems with such restrictive data access. In addition, the systems may include various hardware implementations that store indicators of the write status of copies of data saved to local memory. These systems may be implemented on a multi-core computer processor that may utilize barrel threading and a shared data cache. The system can be applied in a computing environment in which there are multiple software loops with independent iterations. The combination of cache coherence systems, barrel threading, and shared data caches in a multi-core architecture can thus provide the improved computing environment.

This disclosure relates to architectures and methods for retrieving data from memory. The disclosure can be used in conjunction with vector processors to perform gather-type memory retrieval which can, among other things, retrieve data stored at multiple memory locations. The system can be applied in conjunction with many other computing systems. For example, the system can be applied in conjunction with a computing system in which there are multiple software loops with independent iterations. The architectures and methods can realize performance gains over other architectures and methods, in part, by facilitating near-neighbor memory accesses that may result in increased throughput and/or efficiency.

This disclosure relates to a processor that may use a data processing subsystem with address generation capabilities. The processor may be a vector processor. The system can be applied, for example, in a computing environment in which there are multiple software loops with independent iterations. The processor can realize performance gains over other architectures, in part, because dedicated address generation units can provide addresses to the data processing subsystem for efficient evaluation of data in loops. The system may enable pipelined evaluation of instructions at greater efficiency and higher throughput in the data processing subsystem.

This disclosure relates to a multi-core computer processor that utilizes both barrel threading and a shared data cache to improve the performance of the processor. The system can be applied, for example, in a computing environment in which there are multiple software loops with independent iterations. The multi-core processor can realize performance gains over other multi-threading architectures, in part, because each core operates on threads using a barrel threading approach. Barrel threading can also serve to mask or hide memory latencies (i.e., minimize their effect on efficiency). Minimizing the impact of latency can allow use of more efficiently accessed memory, such as a shared data cache. The combination of barrel threading and shared data caches in a multi-core architecture can thus provide the improved computing environment.

This disclosure relates to a memory device that can utilize a read mask that can specify the particular byte within a word that is to be read from. In this way, when the byte of memory specified by the read mask is read, a parity bit that is associated with the particular byte in memory can be checked to determine if the byte has been corrupted due to a soft error. The read mask can minimize soft errors caused by memory not being initialized after a power down, thus allowing for memory re-initialization to not be required after a power down which can consume a substantial amount of time. Thus, the read mask can minimize memory soft errors, while at the same time allowing the memory to power-up more efficiently.

According to an embodiment of the invention there may be provided a memory device that may include a memory module, an error control circuitry, and a memory controller. The memory device can include a memory module that is volatile and is configured to operate in a reduced power mode and exit the reduced power mode and operate in to a normal power mode, an error control circuitry, and a memory controller, configured to: following the exit of the memory module from the reduced power mode write a data unit of a first size to the memory module, wherein the data unit is located within a memory segment of a second size, receive a read command to read the data unit from the memory module, read a memory segment content stored in the memory segment send the memory segment content to the error control circuitry; and transmit a read mask to the error control circuitry, wherein the read mask indicates one or more redundancy bits that are related to the data unit; wherein the error control circuitry is configured to: receive the memory segment content and the read mask; and check for one or more errors in the data unit based on the one or more redundancy bits that are related to the data unit, while ignoring redundancy bits related to one or more parts of the memory segment content that differ from the data unit. The exiting from the reduced power mode is not followed by initializing the entire memory module.

The read mask may also indicate the location of the data unit.

According to an embodiment of the invention there may be provided a memory device that may include a memory module, an error control circuit, and a memory controller, configured to: operate in a reduced power mode, return to a normal power mode, write a byte of data to the memory module, wherein the byte of data is located within a word of data stored on the memory module, receive a read command to read the byte of data from the memory module, read the word of data stored on the memory module, transmit a read mask to the error control circuitry, receive a soft error indication from the error control circuitry, wherein the soft error indication is based on one or more parity bits associated with the byte of data, and wherein the one or more parity bits associated with the byte of data is determined using one or more parity bits associated with the word of data and the transmitted read mask.

According to an embodiment of the invention there may be provided a method for implementing a memory device, the method may include operating a memory controller and memory module in a reduced power mode; returning the memory controller and the memory module to a normal power mode; writing a byte of data to the memory module, wherein the byte of data is located within a word of data stored on the memory module; receiving a read command to read the byte of data from the memory module; reading the word of data stored on the memory module; transmitting a read mask to an error control circuitry; receiving a soft error indication from the error control circuitry, wherein the soft error indication is based on one or more parity bits associated with the byte of data, and wherein the one or more parity bits associated with the byte of data is determined using one or more parity bits associated with the word of data and the transmitted read mask.

According to an embodiment of the invention there may be provided a non-transitory computer readable storage medium having stored thereon a set of instructions for processing multiple threads of a software program that when executed by a computing device, cause the computing device to: operate a memory controller and memory module in a reduced power mode, return the memory controller and the memory module to a normal power mode, write a byte of data to the memory module, wherein the byte of data is located within a word of data stored on the memory module, receive a read command to read the byte of data from the memory module, read the word of data stored on the memory module, transmit a read mask to an error control circuitry, receive a soft error indication from the error control circuitry, wherein the soft error indication is based on one or more parity bits associated with the byte of data, and wherein the one or more parity bits associated with the byte of data is determined using one or more parity bits associated with the word of data and the transmitted read mask.

There may be provided a device comprising: at least one input register at least one addressable register, and at least one processing unit, the processing unit configured to generate a histogram by: receiving a data vector via the input register, the data vector comprising multiple data points, matching the multiple data points to multiple bins of the histogram, searching for a contention that occurs when the multiple data points include data points that belong to a same bin, when detecting the contention then serially calculating addresses of given memory entries for storing the data points that belong to the same bin and storing data points that belong to the same bin at the given memory entries, and when not detecting a contention then parallely calculating addresses for certain memory entries for storing the multiple data points and storing the multiple data points at the certain memory entries.

There may be provided a method that includes generate a histogram by: receiving a data vector via the input register, the data vector comprising multiple data points, matching the multiple data points to multiple bins of the histogram, searching for a contention that occurs when the multiple data points include data points that belong to a same bin, when detecting the contention then serially calculating addresses of given memory entries for storing the data points that belong to the same bin and storing data points that belong to the same bin at the given memory entries, and when not detecting a contention then in parallely calculating addresses for certain memory entries for storing the multiple data points and storing the multiple data points at the certain memory entries.

There may be provided a non-transitory computer readable storage medium having stored thereon a set of instructions for processing instructions of a software program that when executed by a computing device, cause the computing device to generate a histogram by: receiving a data vector via the input register, the data vector comprising multiple data points, matching the multiple data points to multiple bins of the histogram, searching for a contention that occurs when the multiple data points include data points that belong to a same bin, when detecting the contention then serially calculating addresses of given memory entries for storing the data points that belong to the same bin and storing data points that belong to the same bin at the given memory entries, and when not detecting a contention then parallely calculating addresses for certain memory entries for storing the multiple data points and storing the multiple data points at the certain memory entries.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 15 illustrates an exemplary use of "dirty bits," according to examples of the disclosure;

FIG. 16A illustrates a multiple process implementation with restricted data sharing according to examples of the disclosure;

FIG. 16B is a timing schematic for the processes shown in FIG. 16A;

FIG. 21C illustrates a portion of an indicator array for one of a series of near-identical addresses according to examples of the disclosure;

FIG. 25A is an exemplary coding scheme for assigning values to elements of an indicator array according to examples of the disclosure;

FIG. 34A illustrates an exemplary combine feature according to examples of the disclosure;

FIG. 48 illustrates a method according to an embodiment of the invention; and

FIG. 49 illustrates a method according to an embodiment of the invention.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples. Furthermore, while example contexts in which the disclosure can be practiced are provided, they are not meant to limit the scope of the disclosure to those contexts.

Any reference in the specification to a method should be applied mutatis mutandis to a memory device capable of executing the method and should be applied mutatis mutandis to a non-transitory computer readable medium that stores instructions that once executed by a computer result in the execution of the method.

Any reference in the specification to a memory device should be applied mutatis mutandis to a method that may be executed by the memory device and should be applied mutatis mutandis to a non-transitory computer readable medium that stores instructions that may be executed by the memory device.

Any reference in the specification to a non-transitory computer readable medium should be applied mutatis mutandis to a memory device capable of executing the instructions stored in the non-transitory computer readable medium and should be applied mutatis mutandis to method that may be executed by a computer that reads the instructions stored in the non-transitory computer readable medium.

Some computer processors can utilize multiple cores to enable the processor to process multiple instruction threads at any given time, thereby increasing the speed at which a processor can execute an algorithm or program. However, the performance gain realized by a multi-core processor can be diminished in certain computing contexts. Accordingly, the disclosure relates to multi-core processors that can utilize barrel threading in conjunction with a data cache shared between the multiple cores of the processor, in order to improve the multi-core processor for computing environments in which an algorithm or program requires the procession of multiple software loops with independent iterations.

Figure 1:
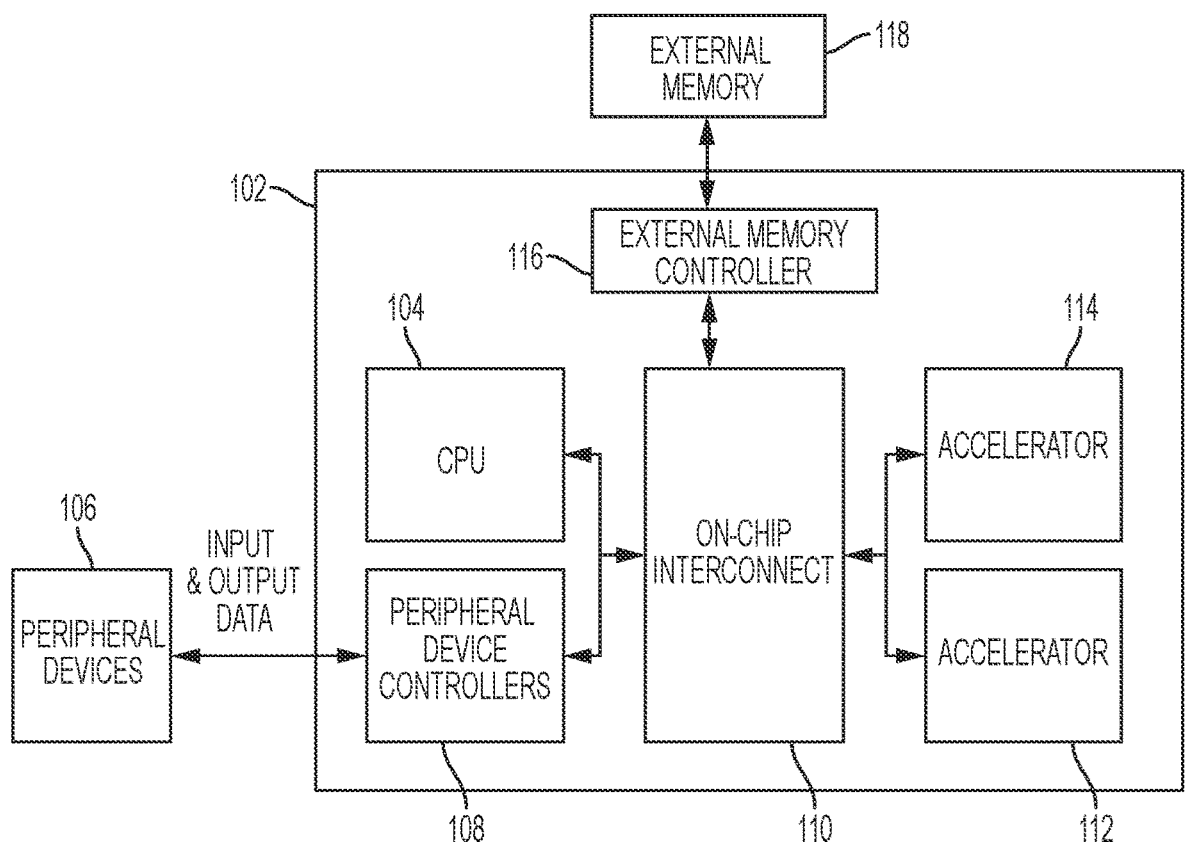
FIG. 1 illustrates an exemplary system-on-chip (SoC) according to examples of the disclosure.

FIG. 1 illustrates an exemplary system-on-chip (SoC) according to examples of the disclosure. The system illustrated in FIG. 1 can be utilized in many computing contexts. As a non-limiting example, the SoC 100 illustrated in FIG. 1 can be utilized in computer vision systems in which a peripheral camera or multiple cameras capture images which are then processed to reveal features embedded within each captured image. Referring to FIG. 1, peripheral device 106 can represent one or more devices external to the system that may, for example, capture some form of data. In the computer vision context such peripheral devices 106 can be cameras that capture images of the surrounding environment. The data captured by the peripheral devices 106 can be inputted into the SoC 102 via peripheral device controllers 108. The one or more peripheral device controllers 108 can receive data from the peripheral devices 106 and store that data in memory internal to the SoC 100. Additionally, the peripheral device controllers 108 can send output signals to the peripheral devices 106. Such output signals may include commands to the peripheral devices 106 to perform certain functions, or data provided to the peripheral device 106.

The peripheral device controller 108 can be connected to the other components of the SoC 102 via an on-chip interconnect 110. The on-chip interconnect can function as a switch that serves to connect components of the SoC 102 when necessary. As an example, a connection between the peripheral device controller 100 and the computer processing unit 104 can be facilitated by the on-chip interconnect 110. Similarly, a connection between the accelerators 114 and 116 with the CPU 104 can also be facilitated by the on-chip interconnects 104.

CPU 104 can serve as the central processor that coordinates the activities of all of the various components within SoC 102. CPU 104 can determine which components will be tasked with performing the various program tasks or can process the instructions that dictate which component of the SoC 102 will handle various tasks. Additionally, CPU 104 can also perform various tasks itself. As an example, in the computer vision context, CPU 104 can perform various image processing algorithms on its own without having to rely on other components to perform them.

However, the CPU 104 can also rely on accelerators 112 and 114 to perform processing tasks, for example, if and when such tasks are better suited to be performed on the accelerators rather than the CPU. Accelerators 112 and 114 can be specialized computer hardware that can perform functions faster than if the functions were performed by software running on a generalized computer processor. Accelerators 112 and 114 can, for example, be customized to handle computationally intensive algorithms that might otherwise operate slowly on a generalized CPU. Accelerators 112 and 114 can utilize various methods to speed up such processing, for instance utilizing concurrency (the ability to perform multiple tasks simultaneously) to speed up processing times.

The SoC 102 can also be connected to an external memory 118 via an external memory controller 116. The external memory 118 can store data necessary to execute functions and instructions on the SoC 102. The external memory can be a solid state memory, but conventionally is a random access memory (RAM) that can be read from and written to relatively quickly. The external memory 118 can be potentially accessed by other components in the SoC 102 (e.g., the CPU 104, peripheral device controller 108, and the accelerators 112 and 114).

Accelerators like those illustrated in in FIG. 1 at 112 and 114 can be customized to perform tasks that that are computationally intensive and/or require specialized processing that may not be available on a generalized CPU. An example of a hardware accelerator, in the form of multi-core processor according to examples of the disclosure, is presented on FIG. 2. A multi-core processor is a device with multiple independent processing units called "cores" that read and execute instructions contained within a software program in parallel with one another. By operating in parallel, the cores can perform independent tasks required by an algorithm simultaneously thereby reducing the amount of time necessary to implement an algorithm upon a given set of data.

Figure 2:
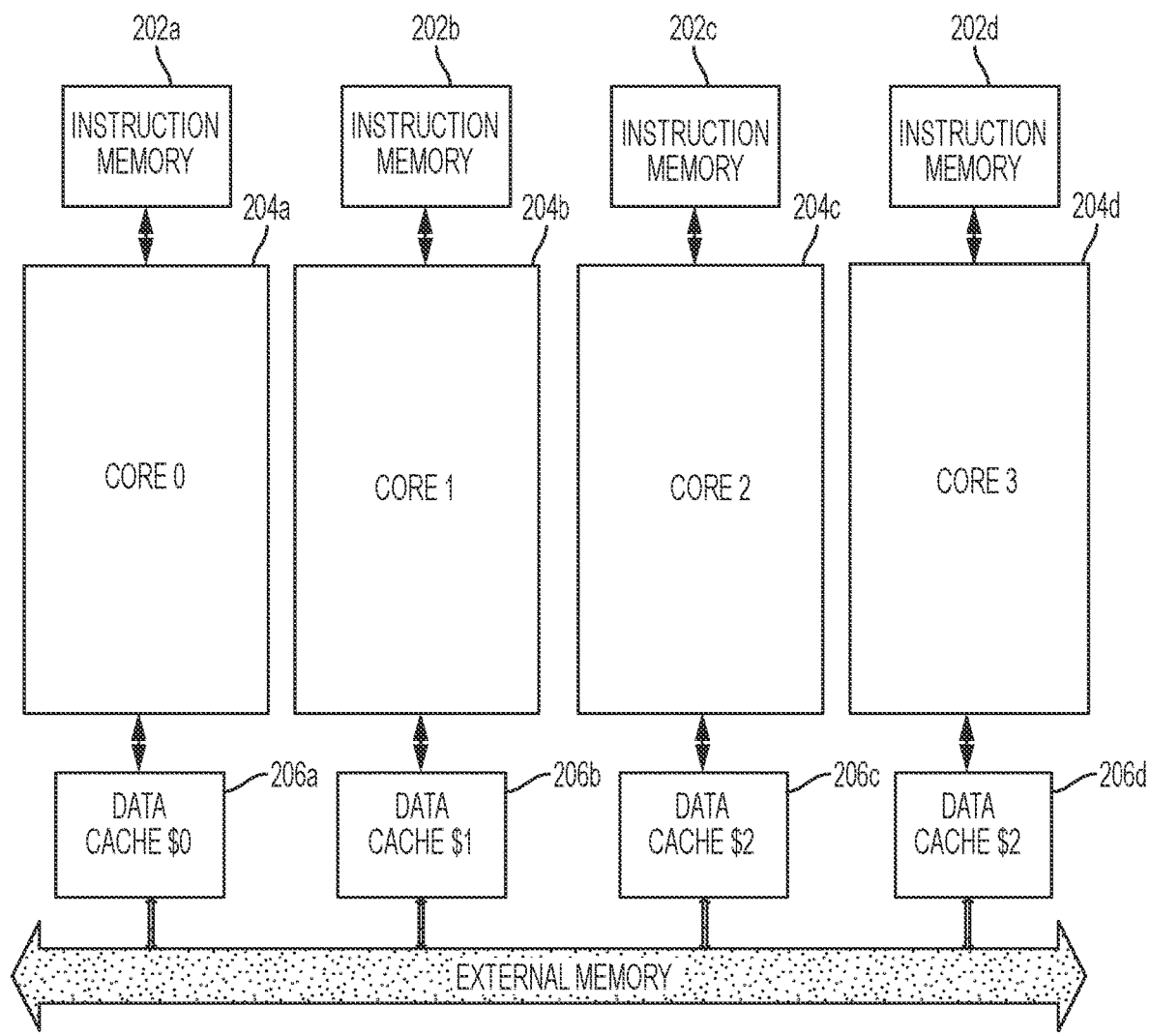
FIG. 2 illustrates an exemplary multi-core processor according to examples of the disclosure.

In the example illustrated in FIG. 2, the accelerator can include four cores 204a-d. Each core 204a-d can be connected to a private instruction memory 202a-d. Each instruction memory 202a-d is considered "private" to its corresponding core 204a-d since it can be dedicated to that corresponding core. In other examples, each core 204a-d can share a common instruction memory (see common instruction memory 6002 of FIG. 3B). The decision to employ a private or shared instruction memory can depend on, for example, the speed at which the memory needs to be accessed by the cores. The private instruction memories can be implemented as private instructions caches (i.e., a small area of fast memory) to further speed up the speed at which the memory can be accessed.

Each instruction memory 202a-d can correspond to one of the cores 204a-d. For instance, and as illustrated in FIG. 2, instruction memory 202a is coupled to core 204a, instruction memory 202b is coupled to core 204b, instruction memory 202c is coupled to core 204c, etc., etc. Each instruction memory 202a-d can store the instructions that are to be executed by its corresponding core 204a-d. When called upon by its corresponding core, the instruction memory can provide the next instruction in a sequence of instructions that is to be performed by the corresponding core.

Each core 204a-d can also be coupled to a data cache 206a-d. Similar to the instruction memories 202a-d, data caches 206a-206d can correspond to an individual core 204a-204d, thus making the data caches "private" (i.e., each core having its own corresponding data cache). The data caches can contain data to be manipulated by the core, and also can store the results of the processing by each individual core.

Focusing on a single core for the purposes of explanation, core 204a can receive an instruction from instruction memory 202a. Once the instruction from instruction memory 202a is loaded by core 204a, the core can access data cache 206a, to retrieve the data that is to be manipulated by the instruction. Once the instruction has been performed, results of the instruction can be written to data cache 206a. The process can then repeat with the next instruction being loaded by core 204a from instruction memory 202a. In some examples, the data cache 206a and the instruction memory 202a can exchange information during load and store instructions, wherein a load instruction can copy data from memory to registers and a store instruction can transmit data from a register to the memory.

The process described above with respect to core 204a can also be running in the other three cores 204b-d simultaneously. Since each core is running its own set of instructions simultaneously, the speed at which a program is executed can be accelerated in contrast to a CPU in which a single processing core is operating.

A sequence of instructions can be referred to as a "program," while a thread can be defined as a sequence of program instructions that can be managed independently by a scheduler. An accelerator can be customized to the characteristics of the programs processed by the accelerator. As an example, take the following example program pseudo-code from a vision processing algorithm, Example 1:

```
for (obj in array) {
    if (obj too small) {
        if (obj nearly square){
            .........
        }
    }
    else if (obj not red enough) {
        ........
    }
}
```

The above programming example illustrates program code that includes conditionals inside for loops. In the example, a conditional if/else statement(obj too small) is embedded in the first for loop ("objects in array"). An additional conditional if/else statement ("obj nearly square") is further embedded within the first conditional if/else statement. The above programming example is prevalent in the vision processing context where images with many pixels are analyzed to, for example, determine if certain features or characteristics are present. In the field of autonomous automobiles, such vision processing may help to distinguish lines in a road, or other objects nearby to the automobile. In a computing environment, such as vision processing, in which the programming code will contain conditional statements within program loops, the fact that such code can be executed in many parallel steps can be used to customize the hardware accelerator.

Figure 3A:
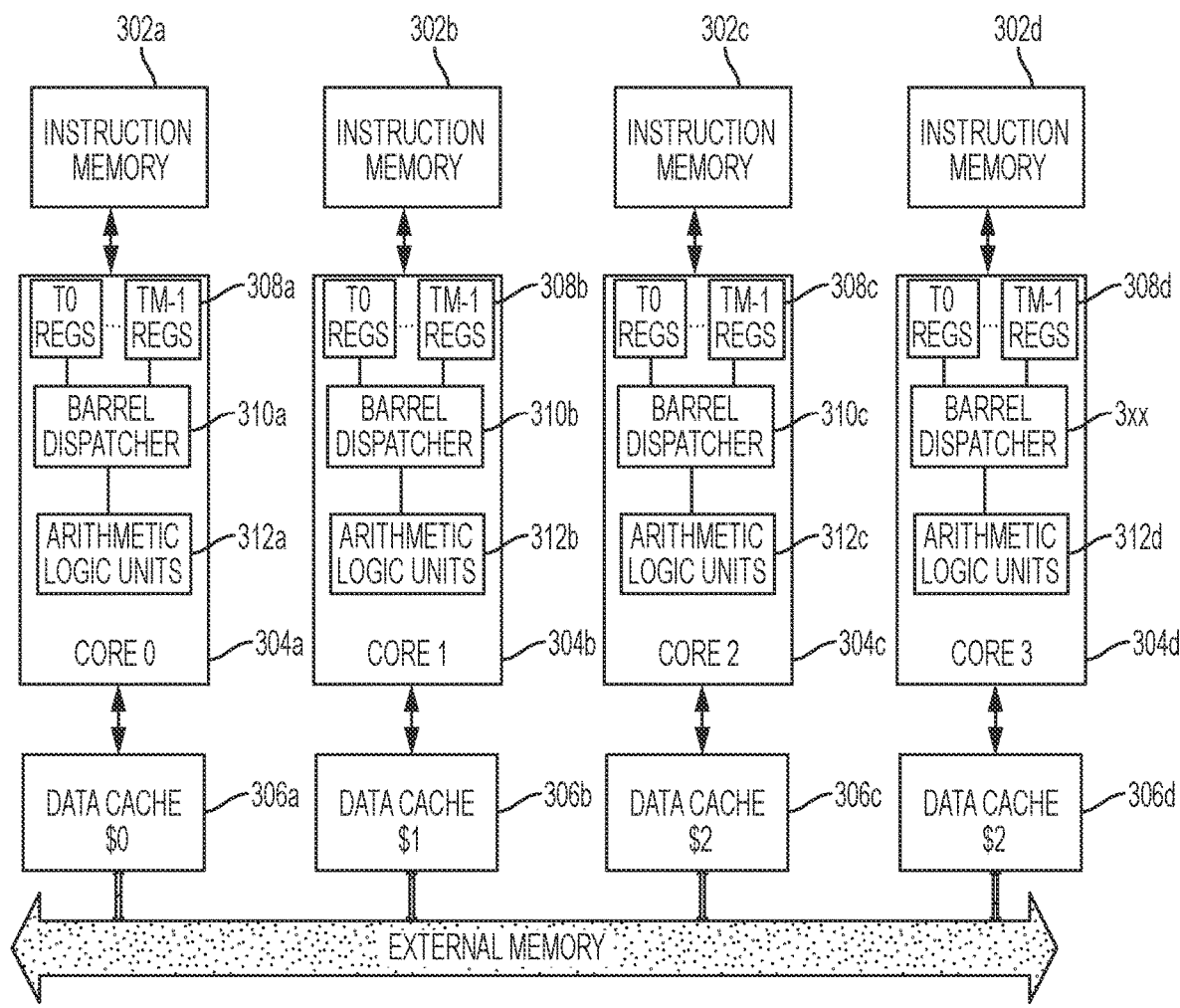
FIG. 3A illustrates an exemplary multi-core processor configured to perform barrel threading according to examples of the disclosure.
Figure 3B:
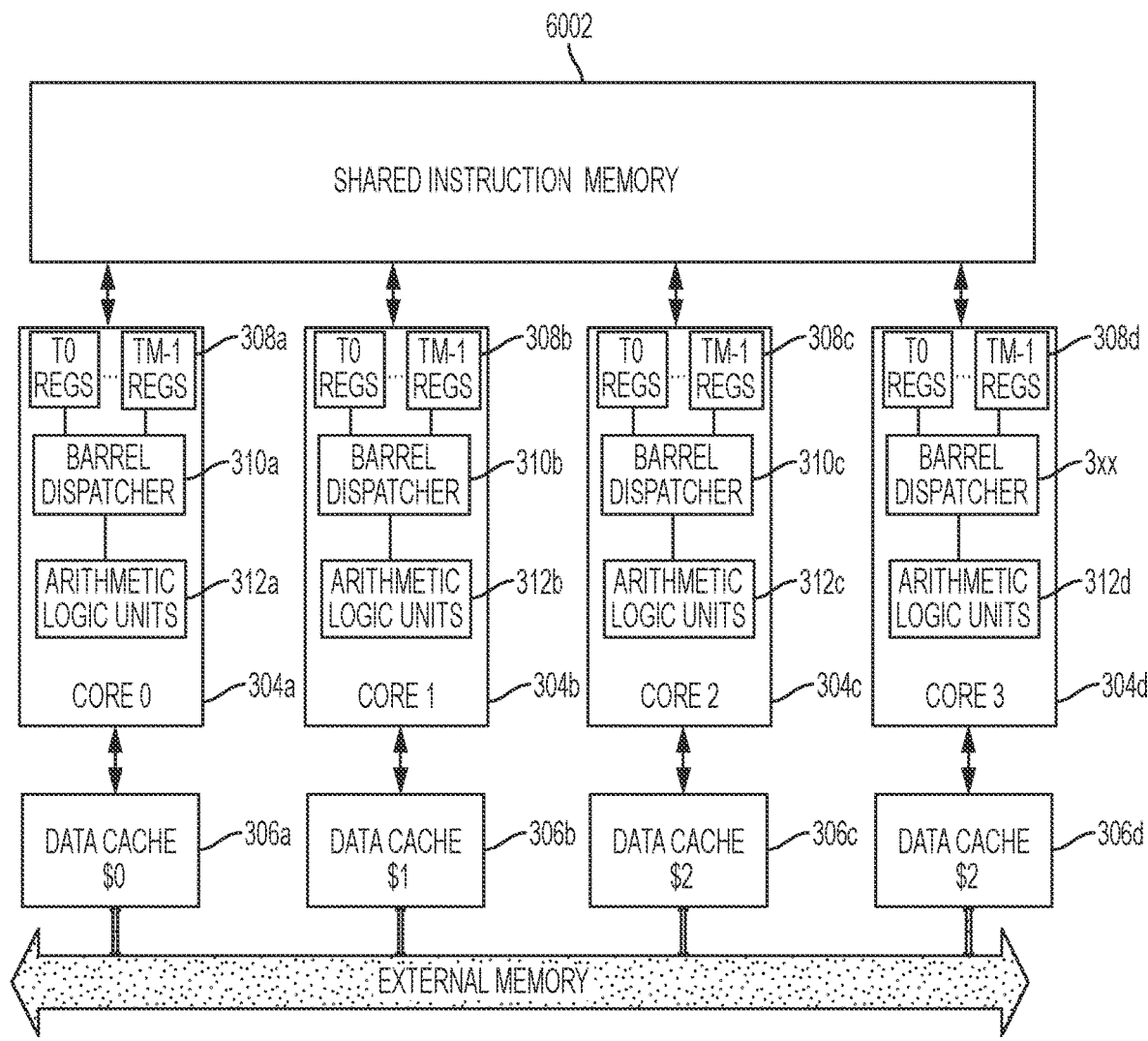
FIG. 3B illustrates an exemplary multi-core processor configured to perform barrel threading according to examples of the disclosure.

FIGS. 3A-3B illustrates an exemplary multi-core processor configured to perform barrel threading according to examples of the disclosure. In the example provided in FIG. 3A, the cores 304a-d are configured to execute the threads of the program using barrel threading. The concept of barrel threading can be illustrated by examining the timing of instruction execution within a single core.

Figure 4:
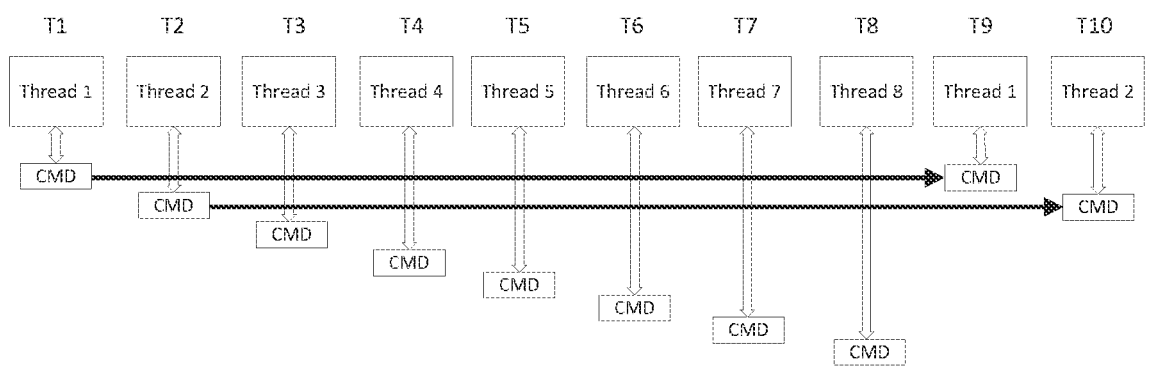
FIG. 4 illustrates an exemplary timing diagram for the execution of instructions threads in a barrel threaded processor according to examples of the disclosure.

FIG. 4 illustrates an exemplary timing diagram for the execution of instruction threads in a barrel threaded processor according to examples of the disclosure. The timing diagram illustrated in FIG. 4 illustrates the timing of the execution of threads within a single core of the multi-core processor illustrated in FIG. 3 that is configured to multiplex eight threads (Thread 1-8). A multi-core processor core can be configured to multiplex more or less instruction threads, and eight threads should be understood to serve as merely an example.

The diagram includes 10 time periods T1-T10. Each time period represent a single clock cycle of the processor core. At time T1 a first instruction (alternatively called a command "cmd") of a first thread (Thread 1) can be executed by the core. At time T2 a first instruction of a second thread (Thread 2) can be executed by the core. At time T3 a first instruction of a third thread can be executed by the core. At times T4-T8, a first instruction of Threads 4-8 can be executed. At time T9, every thread has had their first instruction executed. The core of the processor can then return to the first thread and execute a second instruction of the first thread. At time T10, the core of the process can return to the second thread and execute a second instruction of a second thread. This process can be repeated until all instructions of each and every thread have been completed.

Barrel threading, as shown in FIG. 4, can improve processing efficiency by eliminating wasted clock cycles. Processing many commands in parallel can decrease the effect of latency on processing speed. For example, any one of the instructions ("cmd") in FIG. 4 may cause a pause or delay in processing ("latency") resulting from, for example, cache misses, branches, floating-point operations, and division operations. Barrel threading does not eliminate the pause or delay, but it does greatly increase the likelihood that the pause or delay does not cause the core to remain idle. Instead of being idle, the core simply remains idle for one clock cycle, and then at the subsequent cycle will process the command from the next thread during the delay, as shown in FIG. 4. A single threaded processor (i.e., a processor in which the instructions of a single thread are processed sequentially), in contrast, would remain idle for the duration of the pause or delay. This can result in many wasted clock cycles (i.e., clock cycles in which no execution of instructions is taking place). During a wasted clock cycle the processor must stall its execution of the program thread to wait for a single instruction to be completed before it is able to move on to the next instruction in the sequence. This can lead to a delay in the processing time for a particular thread and a delay in the overall execution of a program or algorithm.

Even in the instance where the latency lasts many more cycles then there are threads, a barrel threaded processor can help to mask the effects of the latency. In one example, if a cache miss causes 100 cycle latency, but there are only eight hardware threads in a given core, the latency may only cause 100/8 cycles to be missed rather than the 100 that would have been missed in a non-barrel threaded process.

More specifically, barrel threading can work to mitigate wasted clock cycles by switching to another thread while a first thread is waiting or idle. Using the example of FIG. 4, while thread 1 is running an instruction, thread 2 can execute an instruction so long as the instruction of thread 2 does not depend on the result of thread 1)

However, any subsequent instructions must wait until the instruction before it has been executed. As an example, at time T9, if the instruction executed at T1 has not finished executing the instruction at T9 cannot be executed, it must wait until the instruction executed at T1 is executed. Therefore, during T9 the processor can do nothing, and then at T10 will move on to execute the second instruction of the second thread.

In some examples, rather than doing nothing at T9, the processor can fill any stalled cycles with the next instruction to be executed. Referring back to the example above, at T9 rather than do nothing, the processor can execute the second instruction of the second thread. In this way, the effects of stalled threads on throughput can be minimized. This method of handling can be known as simultaneous multithreading (SMT).

In SMT, instructions from more than one thread can be executed in any given time interval. Thus, if a particular thread is stalled at a particular time interval, rather than do nothing, SMT can allow for an instruction from another thread to be executed during the stalled cycle.

In this way, if a particular instruction of a thread takes less than eight cycles to execute, by the time the core processor returns to the thread, the instruction will have been executed and the thread can move on to the next instruction. In one example, if a cache miss takes 80 cycles to be resolved, a thread will lose 10 turns. This is because the barrel threaded core would have returned to the thread every 8 cycles. In a serial threaded processor, in contrast, the core would have to wait the 80 cycles before being able to execute the next instruction and remain idle. In a barrel threading scenario, the processor would not be idle. A barrel threaded system would execute other instructions of other threads while the cache miss is being resolved.

Barrel threading is advantageous in a computing environment in which there are many active threads. Returning to the example of FIG. 4, in certain circumstances there could be only four active threads out of the eight total threads. In that case, during times T5-T8, the processor core would be idle. This would lead to only a 50% efficiency (i.e., 4/8 cycles active). This subpar performance would be even worse if there was a single active thread. In that situation, the processor will only be 12.5% efficient. Barrel threading can avoid many of the costs associated with operating a processor with a serial CPU. Thus, barrel threading is most appropriate in a computing environment in which there are many active threads.

The example program code described above (Example 1), a loop with independent iteration with embedded conditional statements, can be distributed to run in several threads where different threads execute different iterations and thus barrel threading can improve the performance of a processor in such a computing environment.

In a computing environment in which the iterations of a for loop are independent, then different threads of instructions can execute different iterations of that loop. This type of processing environment can be efficiently executed by the system depicted in FIG. 3A.

Returning to FIG. 3A, each core 304*a-d* can implement barrel threaded processing. Using the first core 304*a* as an example, the core can implement barrel threading by utilizing a barrel dispatcher 310*a*. Barrel dispatcher 310*a* can be connected to multiple thread registers 308*a*, labeled T0-TM-1 where M represents the number of threads that are being cycled through in the barrel threading process described with respect to FIG. 4.

Each thread register file 308*a* includes multiple registers that may store information related to the thread corresponding to the thread register file. The registers within each thread register file may contain the data processed by the processor as per the instructions that are run by the thread and the register file also contains a program counter register that keeps track of what instruction in the thread is to be performed next. In FIG. 3A the program counter points to instructions stored in the instruction memory of the core. In FIG. 3B the program counters in the thread registers point to instructions that are stored in the common instruction memory 6002.

Data from components external to the multi-core processor can be loaded into the thread register via the private data cache 306*a*.

Barrel dispatcher 310*a* can begin the process by first accessing the thread register file 308*a* that corresponds to the first thread of the multiple threads to be processed. In the example of FIG. 3, the first thread register is labeled T0. A program counter located in the memory of thread register file T0 can signal to the barrel dispatcher 310*a* which instruction to pull from instruction memory 302*a* for execution. Based on the instruction received from instruction memory 302*a*, the barrel dispatcher can load the appropriate data from thread register file T0 and pass the information along to the arithmetic logic units 312*a* which will then execute the instruction.

On the next clock cycle, the barrel dispatcher can initiate the same process on thread register file T1 and on each subsequent cycle can initiate the process for thread register files T2 through TM-1, where M equals the number of threads that the core can process. Once an instruction from each thread has been processed, the barrel dispatcher 302*a* can return to the first thread by accessing thread register file T0 and determining if the first instruction has been completed. If it has been completed, the barrel dispatcher can then process the second instruction of the first thread. If it has not been completed, the barrel dispatcher can move on to the second thread, having executed nothing at this cycle.

This process can be repeated until all the instructions in each thread have been executed by the core 304*a*. In parallel, the other cores 304*b-d* can also perform the same barrel threading process on the respective program threads assigned to them. Thus, as an example in a four core processor that each contain 8 thread registers, cores 304*a-d* can operate on 32 individual threads in parallel (4 cores×8 threads/core). In this way, the processing of program code that contains conditional statements embedded within loops with largely independent iterations can be processed faster than with a single core processor that can only operate on one thread in a serial manner.

Figure 5:
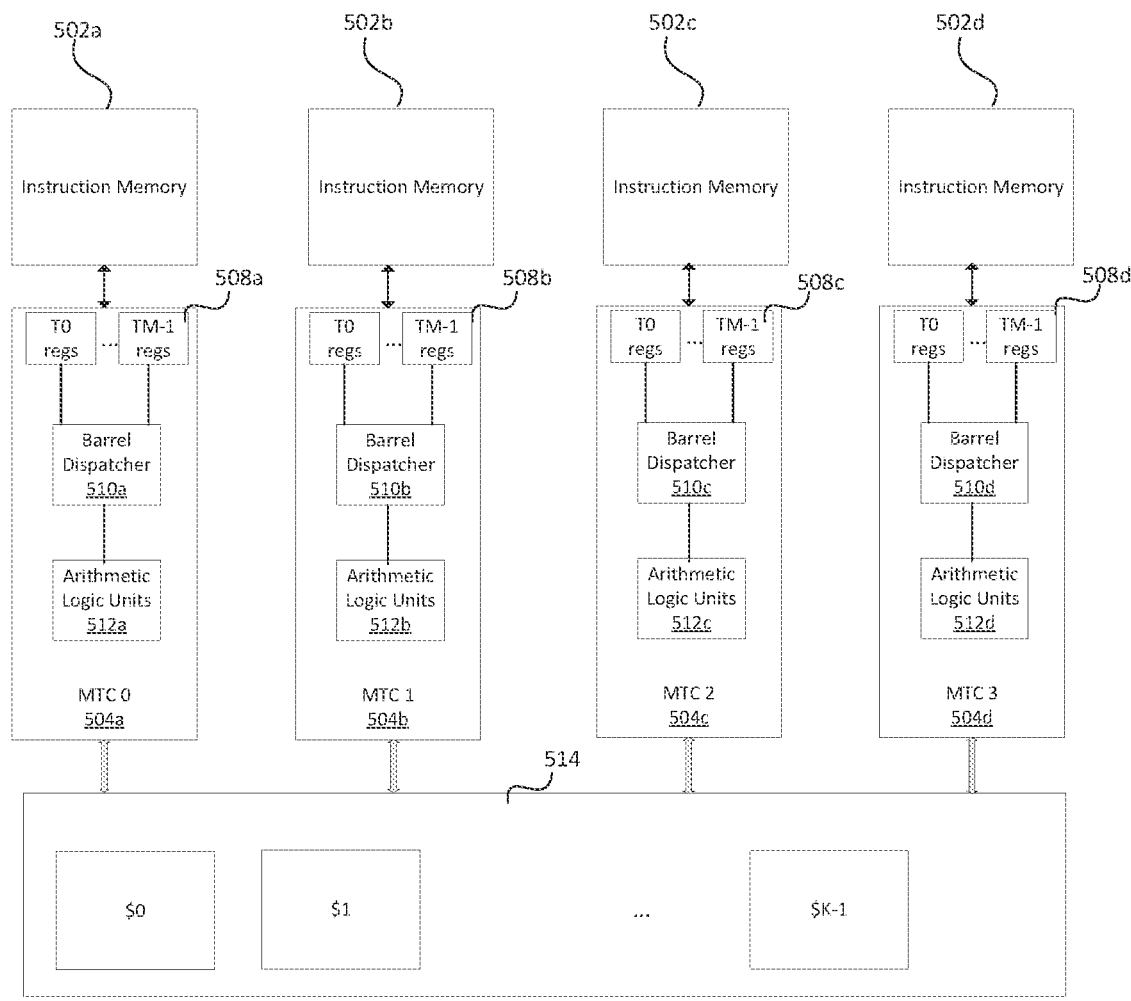
FIG. 5 illustrates an exemplary multi-core processor configured to perform barrel threading and utilize a shared data cache according to examples of the disclosure.

In addition to utilizing barrel threading, the operation of a multi-core processor can be further improved by employing a shared data cache. The shared data cache is accessed by each of the cores of the multi-core processor. FIG. 5 illustrates an exemplary multi-core processor configured to perform barrel threading and utilize a shared data cache according to examples of the disclosure. The multi-core processor illustrated in FIG. 5 is similar to the multi-core processor of FIG. 3A. Specifically, the cores 504a-d are similarly configured to the cores 304a-d of FIG. 3A. The instruction memory 502a-d, the thread register files 508a-d, the barrel dispatcher 510a-d, arithmetic logic units 512a-d may be identical to their counterparts in FIG. 3A and thus a discussion of their functionality can be found above in the discussion with respect to FIG. 3A.

In contrast to the private data caches 306a-d, wherein each core has a private data cache associated with it, the multi-core processor of FIG. 5 includes a shared data cache 514. Generally, private data caches can be implemented without the overhead necessary to make a memory accessible to several processors, therefore allowing each core of a multi-core processor to access the data cache with minimal memory latency. However, private data caches can lead to inter-core cache coherence issues when the private data caches may contain versions of data that are not reconciled (are out of sync) with one another. Resolving these cache coherence issues can cost additional chip space, power and clock cycles and, therefore, degrade efficiency.

When the multi-core processor performs image processing the pixels of the processed image are stored in the shared cache memory according to a predefined scheme that is known to all of the cores. This enables different cores to easily access the same pixel and reduced cache misses. A non-limiting example of the predefined scheme is to serially store within the shared memory cache pixels that belong to the image.

As an example, in a vision processing computing environment like that discussed above, each core of the multi-core processor can be processing a different portion of an image simultaneously and saving the processed portion of the image on its own private data cache. If the external memory requires the most up-to-date image however, then each and every data cache must be accessed to see which private data cache has the most up-to-data portion of the image. Procedures must be put in to place to ensure that the copy of data that each private data cache possesses is the most up-to-date. This process of ensuring inter-cache coherence can be costly from a power and latency standpoint since extra power and time must be spent on inter-cache coherency.

With a shared data cache, however, these inter-cache coherency requirements are avoided. As illustrated in FIG. 5, each core 504a-d can be connected to a shared data cache 514. Shared data cache 514 can contain multiple banks $0-$K-1. Each core 504a-d can write and load data to and from the multiple banks $0-$K-1. As each core now shares the data contained within shared data cache 514, rather than maintaining its own individual copy of the data in a private data cache, the complexity associated with resolving inter-cache coherency issues are eliminated.

While a shared data cache can remove the complexity associate with inter-cache coherence engendered by private data caches, they can also lead to longer memory latencies. In other words, the time it takes for a core to read and write to a shared data cache can take longer than the time to read and write to a private data cache.

In a hardware accelerator that utilizes a multi-core architecture employing barrel threading, the added memory latency created by the addition of a shared data cache might not significantly degrade performance. As discussed above with respect to FIGS. 3 and 4, in a barrel threaded processor, after one instruction has been executed from a thread that thread must wait a pre-determined number of clock cycles before the barrel dispatcher returns to the thread to execute the next instruction in the sequence of instructions. The pre-determined amount of time depends on the number of threads that can be handled by a core. In the example of FIGS. 3A and 4, a core that contains eight thread registers, thus handling eight threads, will not return execute an instruction from a thread once every eight clock cycles.

The fact that there is a pre-determined amount of time between the execution of subsequent instructions between threads can render the added memory latency associated with a shared data cache moot from a performance standpoint. This can be due to the fact that the amount of time between execution of subsequent instructions in a thread can be more than the amount of time required to access the shared data cache. Therefore, the fact that the shared data cache takes a longer amount of time to access with respect to a private data cache is inconsequential since by the time the next instruction in a thread is ready to be executed, enough time has passed to allow for the core to access the shared data cache.

Another possible advantage to employing a shared data cache is that its use can minimize the number of cache misses. A cache miss occurs when a core of the processor is unable to find needed data on its data cache and must retrieve the needed data from another level of cache or the external memory. Since a private data cache is smaller in terms of capacity than a shared data cache, the chances that needed data may not be present on the private data cache is higher than if a larger shared data cache were employed. Additionally, if the different threads process related data items, then one thread bringing data into the cache might help another thread needing data in the same cache line. With private data caches, 2 or more physical copies of the data would exist, one in the cache of each core that needs it, thus wasting cache memory space, as well time necessary to fetch data into several caches instead of just one.

While barrel-threaded multi-core processors with inter-core shared data caches can yield greater processing efficiency in terms of power and speed, as discussed above, they may not be ideal for a serial computing environment. If a program or code has a mixture of tasks that can be parallelized and tasks that must be processed serially, than the barrel-threaded multi-core processor may oscillate between periods of optimal efficiency and sub-par efficiency. When threads that can be run in parallel are being operated on, the advantages of a barrel-threaded processor can be realized. However, when serial code is being operated on, the processor may become relatively inefficient. Thus, it may be advantageous to include a separate serial processor that is optimized to operate on code that must be run serially.

Figure 6A:
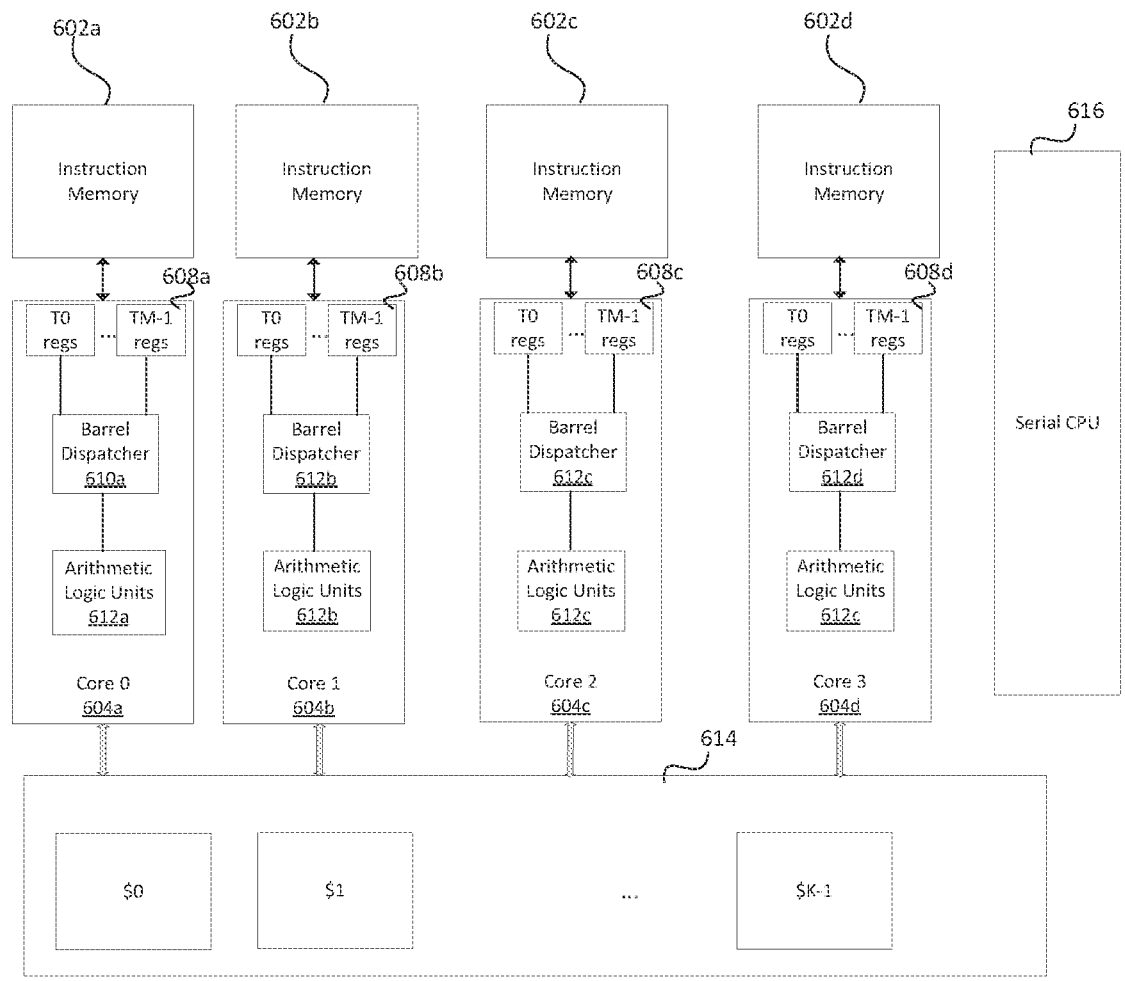
FIG. 6A illustrates an exemplary barrel threaded multi-core processor with a serial computer processing unit according to examples of the disclosure.

FIG. 6A illustrates an exemplary barrel threaded multi-core processor with a serial computer processing unit according to examples of the disclosure. The example of FIG. 6A is identical to the example multi-core processor discussed with respect to FIG. 5 with the addition of a serial processor 616. Therefore, a discussion of the various units not described below can be found with respect to the discussion of their counterparts in FIG. 5 discussed above.

The multi-core processor example of FIG. 6A includes a serial processor 616 that can be used to process single threaded programming code. The serial processor will need to communicate with all of the other cores in order to being able to exchange data. For instance in one example, the serial processor 616 can receive data prepared by the cores 604a-d, process it serially, and compute a result that the cores 604a-d can then subsequently access.

Figure 6B:
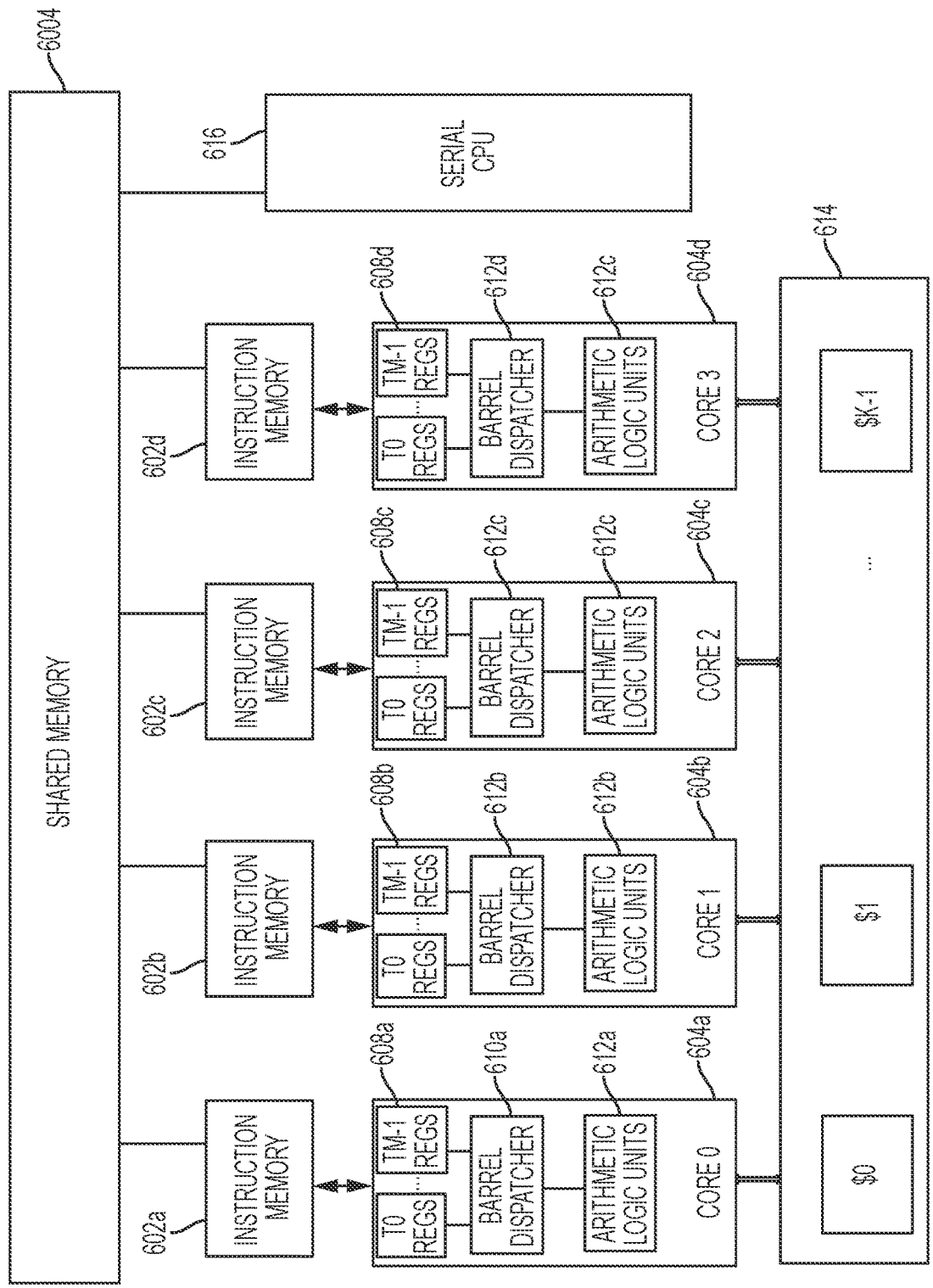
FIG. 6B illustrates an exemplary barrel threaded multi-core processor with a serial computer processing unit according to examples of the disclosure.
Figure 6C:
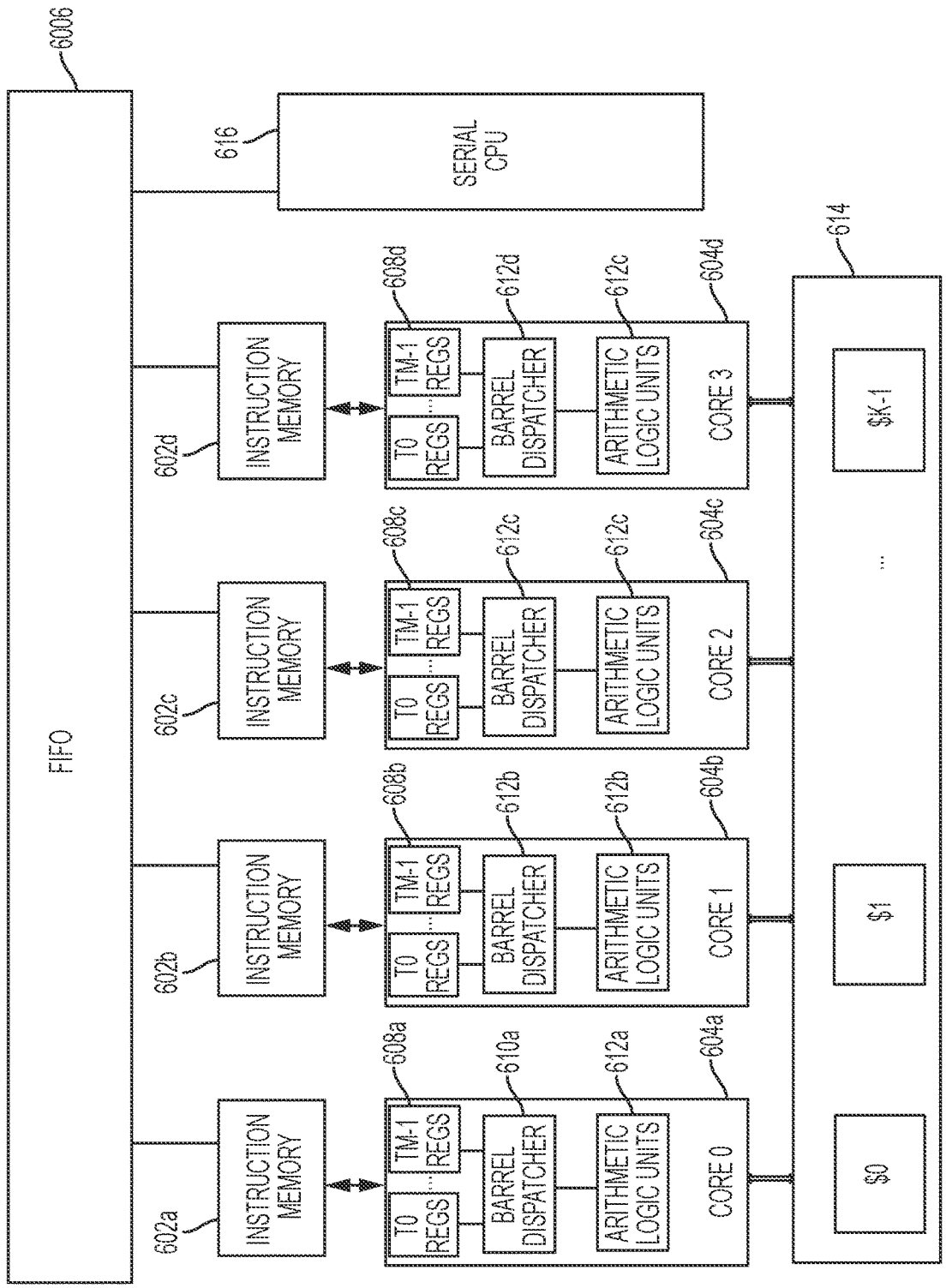
FIG. 6C illustrates an exemplary barrel threaded multi-core processor with a serial computer processing unit according to examples of the disclosure.

This data exchange between the serial processor 616 and the cores 604*a-d* can be implemented in various ways. For example, the cores 604*a-d* and the serial processor 616 may both share a local memory (6004 in FIG. 6B). In another example, the cores 604*a-d* can write data into a first in first out (FIFO) queue (6006 in FIG. 6C). The serial processor 616 can then read the data from the FIFO queue and write the results of its computations to another FIFO queue (not shown). In another example the cores 604*a-d* and the serial processor 616 can read and write their data directly to an external by the use of a direct memory access controller (DMA) or its own data cache (not shown).

A serial processor can increase the efficiency of the SoC by preventing the multi-core processor from having to communicate with the main CPU of the SoC every time it needs to perform a serial computation or having to run the serial computation on a barrel-threaded processor in which such serial computation would run inefficiently.

Figure 6D:
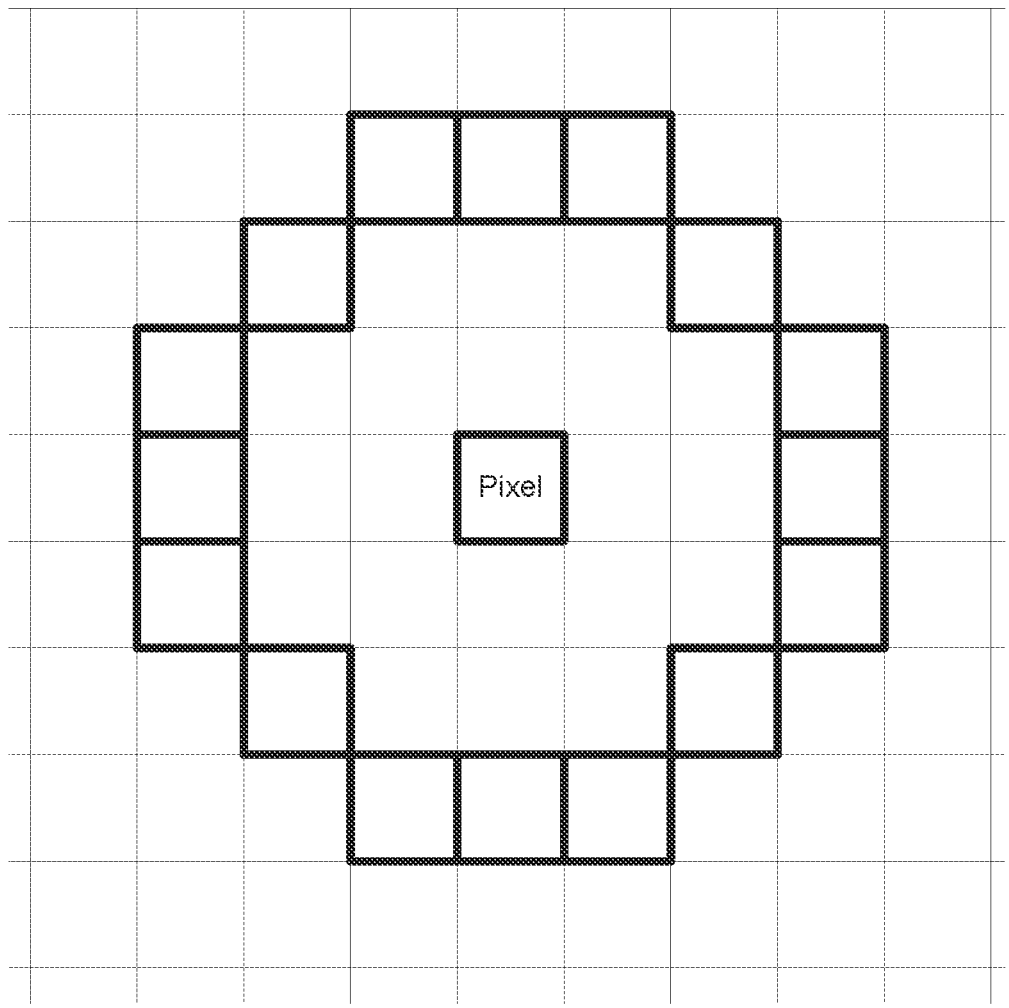
FIG. 6D illustrates a window.

Using a shared cache is highly beneficial when different threads apply image processing algorithms that process overlapping or partially overlapping pixels. For example, the FAST corner detector (see www.wikipedia.org; "Fusing points and lines for high performance tracking", Edward Rosten and Tom Drummond, IEEE International Conference on Computer Vision, pages 1508-1511, October 2005 and "Machine learning for high-speed corner detection", Edward Rosten and Tom Drummond, European Conference on Computer Vision, pages 430-443, May 2006) uses a circle of 16 pixels (a Bresenham circle of radius 3—see FIG. 6D) to classify whether a candidate point p is actually a corner. Each pixel in the circle is labeled from integer number 1 to 16 clockwise. If a set of N contiguous pixels in the circle are all brighter than the intensity of candidate pixel p (denoted by $I_p$) plus a threshold value t or all darker than the intensity of candidate pixel p minus threshold value t, then p is classified as corner.

The conditions can be written as:
  a. Condition 1: A set of N contiguous pixels S, $\forall \, x \in S$, the intensity of x $(I_x)>I_p$+threshold t
  b. Condition 2: A set of N contiguous pixels S, $\forall \, x \in S$, $I_x<I_p-t$ So when either of the two conditions is met, candidate p can be classified as a corner. There is a tradeoff of choosing N, the number of contiguous pixels and the threshold value t. On one hand the number of detected corner points should not be too many, on the other hand, the high performance should not be achieved by sacrificing computational efficiency. Without the improvement of machine learning, N is usually chosen as 12. A high-speed test method could be applied to exclude non-corner points.

The high-speed test for rejecting non-corner points is operated by examining 4 example pixels, namely pixel 1, 9, 5 and 13. Because there should be at least 12 contiguous pixels that are whether all brighter or darker than the candidate corner, so there should be at least 3 pixels out of these 4 example pixels that are all brighter or darker than the candidate corner.

Firstly pixels 1 and 9 are examined, if both $I_1$ and $I_9$ are within $[I_p-t, I_p+t]$, then candidate p is not a corner.

Otherwise pixels 5 and 13 are further examined to check whether three of them are brighter than $I_p$+t or darker than $I_p$−t. If there exists 3 of them that are either brighter or darker, the rest pixels are then examined for final conclusion.

And according to the inventor in his first paper, on average 3.8 pixels are needed to check for candidate corner pixel. Compared with 8.5 pixels for each candidate corner, 3.8 is really a great reduction which could highly improve the performance.

However, there are several weaknesses for this test method:
  a. The high-speed test cannot be generalized well for N<12. If N<12, it would be possible that a candidate p is a corner and only 2 out of 4 example test pixels are both brighter $I_p$+t or darker than $I_p$−t.
  b. The efficiency of the detector depends on the choice and ordering of these selected test pixels. However it is unlikely that the chosen pixels are optimal which take concerns about the distribution of corner appearances.
  c. Multiple features are detected adjacent to one another Improvement with Machine Learning In order to address the first two weakness points of high-speed test, a machine learning approach is introduced to help improve the detecting algorithm. This machine learning approach operates in two stages. Firstly, corner detection with a given N is processed on a set of training images which are preferable from the target application domain. Corners are detected through the simplest implementation which literally extracts a ring of 16 pixels and compares the intensity values with an appropriate threshold.

For candidate p, each location on the circle $x \in \{1, 2, 3, \ldots, 16\}$ can be denoted by p→x. The state of each pixel, $S_{p \to x}$ must be in one of the following three states:

$$d, I_{p \to x} \leq I_p - t \, (\text{darker})$$

$$s, I_p - t \leq I_{p \to x} \leq I_p + t \, (\text{similar})$$

$$b, I_{p \to x} \geq I_p + t \, (\text{brighter})$$

Then choosing an x (same for all p) partitions P (the set of all pixels of all training images) into 3 different subsets, $P_d$, $P_s$, $P_b$ where:

$$P_d = \{p \in P : S_{p \to x} = d\}$$

$$P_s = \{p \in P : S_{p \to x} = s\}$$

$$P_b = \{p \in P : S_{p \to x} = b\}$$

Secondly, a decision tree algorithm, the ID3 algorithm is applied to the 16 locations in order to achieve the maximum information gain. Let $K_p$ be a boolean variable which indicates whether p is a corner, then the entropy of $K_p$ is used to measure the information of p being a corner. For a set of pixels Q, the total entropy of $K_Q$ (not normalized) is:

$$H(Q) = (c+n) \log_2(c+n) - c \log_2 c - n \log_2 n;$$

where $c = |\{i \in Q : K_i \text{ is true}\}|$ (number of corners);
where $n = |\{i \in Q : K_i \text{ is false}\}|$ (number of non-corners)

The information gain can then be represented as: $H_g = H(P) - H(P_b) - H(P_s) - H(P_d)$.

A recursive process is applied to each subsets in order to select each x that could maximize the information gain. For example, at first an x is selected to partition P into $P_d$, $P_s$, $P_b$ with the most information; then for each subset $P_d$, $P_s$, $P_b$, another y is selected to yield the most information gain (notice that the y could be the same as x). This recursive process ends when the entropy is zero so that either all pixels in that subset are corners or non-corners.

This generated decision tree can then be converted into programming code, such as C and C++, which is just a bunch of nested if-else statements. For optimization purpose, profile-guided optimization is used to compile the code. The complied code is used as corner detector later for other images.

Notice that the corners detected using this decision tree algorithm should be slightly different from the results using segment test detector. This is because that decision tree model depends on the training data, which could not cover all possible corners.

The multi-core processor may have each thread (regardless of which core this thread is on) process a subset of the image rows:

```
parallel_for (y=0:height)
{for(x=0:width)
{corner[x,y] = evaluate_decision_tree(x,y); //evaluate_decision_tree
is the if/else nested thing. }
}
```

It should be noted that the inner "for" loop as well as the "if/else" inside the inner loop are standard C compiling to standard kind of assembly instructions.

Using the parallel for is a less widespread kind of construct, though standards exist for this kind of thing (for example, OpenMP.)

Two interesting alternatives regarding parallel for are static vs dynamic work partitioning.

Static partitioning works by implementing parallel for as "for(y=my_thread_i( ); y<height; y+=total_num_threads)" . . . . This way, with a total of 32 threads (on MPC this is the result of 4 cores×8 threads per core), thread 0 processes rows 0, 32, 64 . . . ; thread 1 processes rows 1, 33, 65, . . . etc.

Dynamic partitioning works by implementing parallel_for as "for(y=atomic_add(counter,1); y<height; y=atomic_add(counter, 1)".

When applying dynamic partitioning the SoC is not aware until runtime which thread processes which row (hence the name "dynamic partitioning")—they all share an atomic counter, and every time a thread finishes a row, it increments the counter.

The advantage of dynamic partitioning is, if in some parts of the image there's much less work than others, then the threads who get the "easy" rows will simply process more rows overall, and the threads who get more of the "hard" rows will process less rows overall, but they all will be done at about the same time, without fast threads idly waiting for laggards. So dynamic partitioning is better for dynamic workload.

Static partitioning however has the advantage that the SoC does not have an atomic counter but use thread-local simple counters, these are much cheap (1-2 cycles to increment a counter vs potentially dozens or a hundred cycles.)

Each processor supports atomic counters somewhat differently.

The multi-core processor may have a fixed number of atomic counters in special-purpose hardware. According to another embodiment of the invention the atomic counter may be implemented by storing counters in a shared memory.

You might prefer, instead of producing a width x height Boolean matrix corner[x,y], to have a list of corners—x,y coordinates. This is the better choice in terms of memory usage in the common case where most pixels are not corners, so a list of coordinates is a more compact representation than a Boolean matrix. Then you want to have something like "if(evaluate_decision_tree(x,y)) {corner_list[index++]=(x, y);}" For this to work, again you need an atomic counter—so atomic_add(index,1) instead of index++, because you have multiple threads updating the index.

Figure 6E:
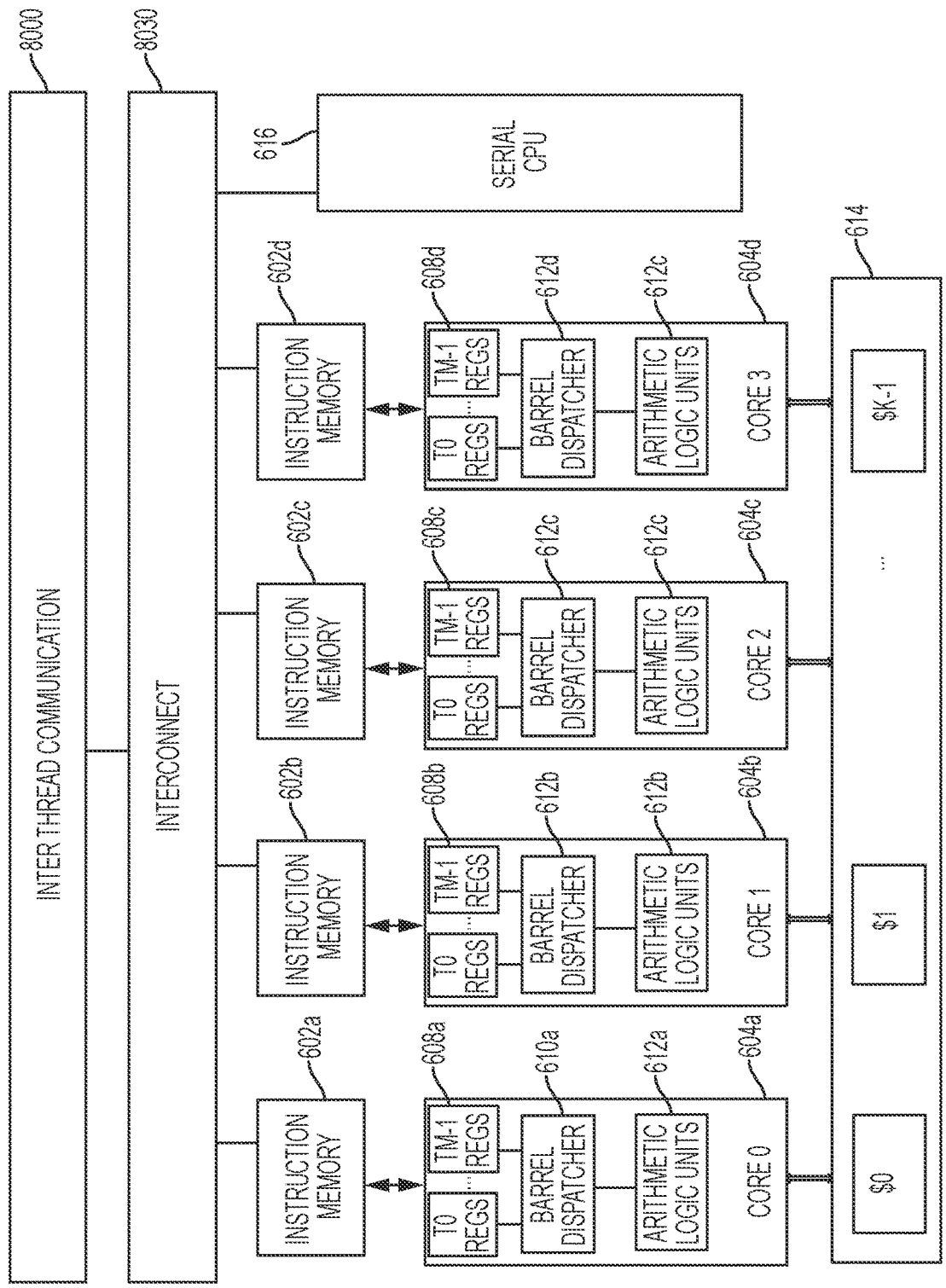
FIG. 6E illustrates an exemplary barrel threaded multi-core processor with a serial computer processing unit according to examples of the disclosure.

FIG. 6E illustrates multi-core processor that differs from the multi-core processor of FIG. 6A by including an inter thread communication (ITC) 8000 for facilitating a synchronization between the different threads executed by the multiple cores (when applied on the multi-core processor of FIG. 6A) or (as illustrated in FIG. 6E—when facilitating a synchronization between the different threads executed by the multiple cores and the serial processor.

ITC 8000 may store atomic counters and/or data locks.

ITC 8000 may be coupled to processor cores 606*a-d* and serial processor 616 (and especially to FIFOs 698*a-e*) via interconnect 8030 or in any other manner.

Each atomic counter update request may include an opcode (increment, decrement or reset), an atomic counter identifier for identifying the atomic counter that should be updated and a requester identifier for identifying the requesting component (processor core or serial processor) and even the thread.

Figure 6F:
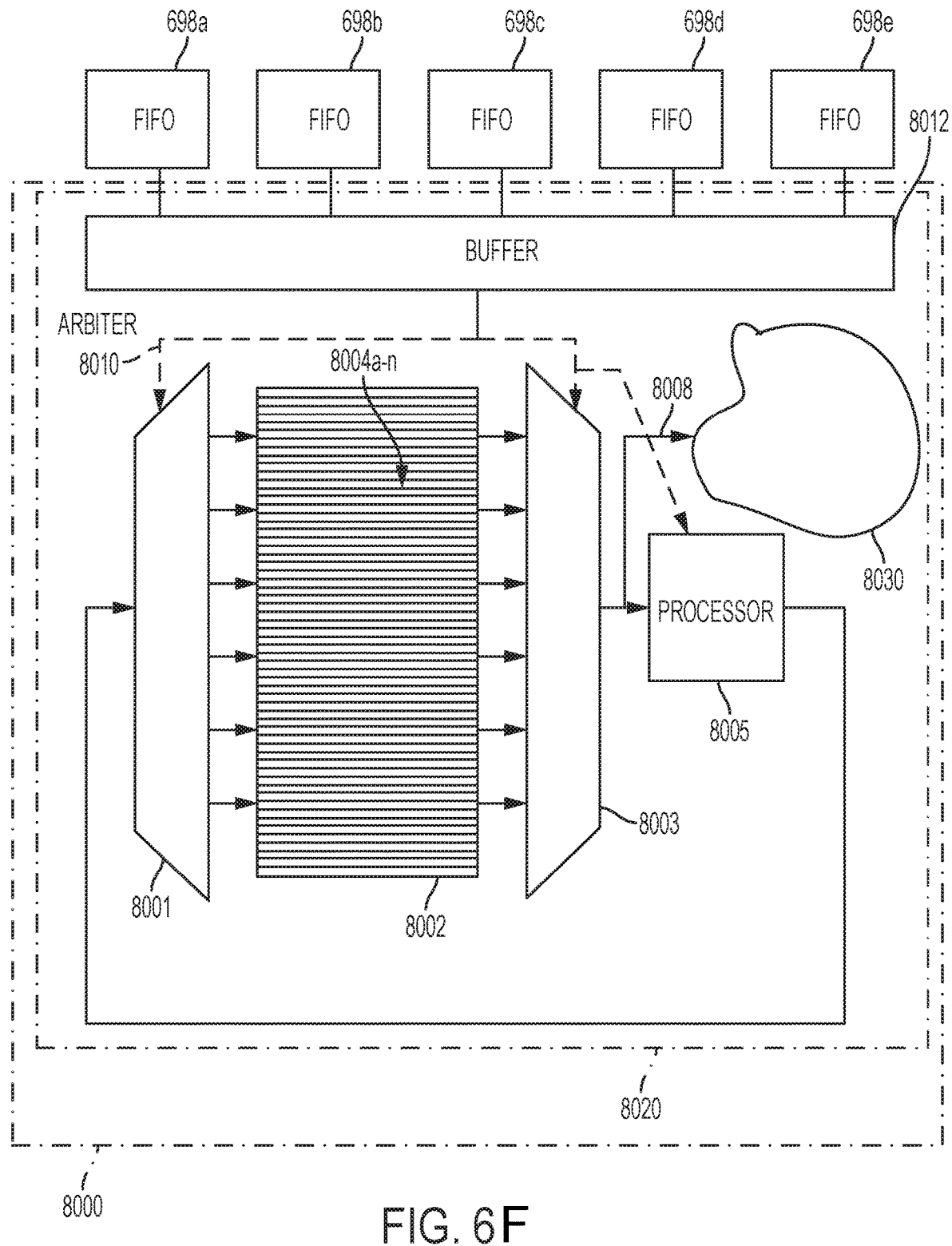
FIG. 6F illustrates a multi thread communication according to examples of the disclosure.

FIG. 6F illustrates various FIFOs 698*a-e* of processor cores 606*a-d* and serial processor 616. These FIFOs store requests for updating (increment, decrement or reset) atomic counters.

The FIFOs 698*a-e* are read by an arbiter 8010 that determines which request to send an input buffer 8012 of the atomic counter region 8020 of ITC 8000. If two atomic counter requests for updating the same atomic counter are received at the same cycle then the arbiter 8010 selects one of the atomic counter requests and sends the selected request to input buffer 8012 before sending the other atomic counter request to the input buffer 8012.

The atomic counter region 8020 includes a memory module 8002 that includes multiple entries 8004*a-n* for storing multiple atomic counter values.

Memory module address 8004*a-n* are positioned between a demultiplexer 8001 and a multiplexer 8003. Multiplexer 8003 is followed by a processor 8005 that is capable of incrementing, decrement and resetting the value of an atomic counter that is outputted by multiplexer 8003. The value of the atomic counter that is outputted by multiplexer 8003 may also serve as an output (sent via output 8008) to the core (or serial processor) that requested to update or read the atomic counter. The output of the atomic counter may be the value before the update (As illustrated in the figure) of after the update.

The atomic counter of the selected value is used to control multiplexer 8003—to determine which atomic counter should be fed to processor 8005. The opcode of the atomic counter update request is fed to processor 8005 and controls the operation executed by processor 8005. The atomic counter of the selected value is also used to control demultiplexer 8001—to determine where to store (which memory entry of memory module 8002) the updated atomic counter. The requester identifier is used to determine the destiny of the updated atomic counter that is outputted via output 8008 and may propagate through interconnect 8030. The demultiplexer 8001 can be a row encoder.

While FIG. 6F illustrates a single processor 8005 for updating up to one atomic counter per cycle ITC 8000 may include multiple processors 8005 and/or any other circuitry for updating multiple different atomic counters per cycle.

According to an embodiment of the invention the atomic counters represent different threads. By guaranteeing that only a single component can update a certain atomic counter at a time—a collision free thread allocation process is provided.

The atomic counter can point to an address in an instruction memory (that may represent a beginning of a thread), can point to a data unit, and the like.

Using a dedicated unit (ITC) for storing the atomic counters prevents collision and bottlenecks associated with accessing memory units that store data that is processed during the execution of threads.

The implementation of the atomic counters by a dedicate hardware has been found to be ten times faster than implementing atomic counters by a general purpose processor.

It has been found that updating a single atomic counter per cycle provides adequate system performance while using a simple single-processor hardware.

The atomic counter may be also used for calculating histograms. An atomic counter may store the count (frequency) of a bin and/or may point to a destination of a data unit within a memory region allocated to data units of a bin.

When multiple data units that belong to the same bin are received at the same cycle—an atomic counter may be used for updating the count and/or calculating the destination addresses of the multiple data units without an error—so that the counter will be updated by the number of the multiple data units and each of the multiple data units receives a different destination address.

Therefore, according to the above, some examples of the disclosure are directed to a multiple-core processor device comprising: multiple processing cores configured to execute multiple instruction threads of a software program using barrel thread processing, and a shared data cache configured to send and receive data to at least two of the multiple processing cores, the shared data cache storing data associated with an execution of a first instruction in at least one of the multiple instruction threads. Additionally or alternatively to one or more of the examples disclosed above, in some examples the multiple processing cores comprise: multiple thread registers, wherein at least one of the multiple thread registers is associated with an instruction thread of the multiple instruction threads, an instruction memory, wherein the instruction memory stores one or more instructions associated with the multiple instruction threads, one or more arithmetic logic units, and a barrel dispatcher, wherein the barrel dispatcher, receives a first clock signal, loads a first instruction of the one or more instructions from the instruction memory, and executes the first instruction by: retrieving data from a first thread register, wherein the first thread register is associated with the instruction thread that is associated with the first instruction, and sending the received data to the one or more arithmetic logic units for processing. Additionally or alternatively to one or more of the examples disclosed above, in some examples the barrel dispatcher, receives a second clock signal, loads a second instruction of the one or more instructions from the instruction memory, and executes the second instruction by: retrieving data from a second thread register, wherein the second thread register is associated with the instruction thread that is associated with the second instruction, and sending the received data to the one or more arithmetic logic units for processing. Additionally or alternatively to one or more of the examples disclosed above, in some examples each thread register of the multiple thread registers is configured to load data associated with the instruction thread to which the thread register is associated. Additionally or alternatively to one or more of the examples disclosed above, in some examples, the multiple processing cores execute the multiple instructions threads simultaneously. Additionally or alternatively to one or more of the examples disclosed above, in some examples, one or more of the multiple cores transmit to and receive data from the shared data cache, and wherein the shared data cache is configured to store data resulting from an execution of the multiple instruction threads. Additionally or alternatively to one or more of the examples disclosed above, in some examples, the device comprises a serial processor that is configured to execute single threaded programming code.

Some examples of the disclosure are directed to a method or processing multiple instruction threads of a software program, the method comprising: executing the multiple instructions threads using multiple processing cores, wherein the multiple processing cores use barrel thread processing to execute the multiple instruction threads, and sending and receiving data to a least two of the multiple processing cores using a shared data cache, wherein the shared data cache stores data associated with an execution of a first instruction in at least one of the multiple instruction threads. Additionally or alternatively to one or more of the examples disclosed above, in some examples, the method comprises: receiving a first clock signal at a barrel dispatcher of the multiple processing cores, loading a first instruction from an instruction memory, wherein the instruction memory stores one or more instructions associated with the multiple instruction threads, executing the first instruction by: retrieving data from a first thread register, wherein the first thread register is associated with the instruction thread that is associated with the first instruction, and sending the received data to one or more arithmetic logic units for processing. Additionally or alternatively to one or more of the examples disclosed above, in some examples, the barrel dispatcher, receives a second clock signal, loads a second instruction of the one or more instructions from the instruction memory, and executes the second instruction by: retrieving data from a second thread register, wherein the second thread register is associated with the instruction thread that is associated with the second instruction, and sending the received data to the one or more arithmetic logic units for processing. Additionally or alternatively to one or more of the examples disclosed above, in some examples, each thread register of the multiple thread registers loads data associated with the instruction thread to which the thread register is associated. Additionally or alternatively to one or more of the examples disclosed above, in some examples, the multiple processing cores execute the multiple instructions threads simultaneously. Additionally or alternatively to one or more of the examples disclosed above, in some examples, one or more of the multiple cores transmit to and receive data from the shared data cache, and wherein the shared data cache is configured to store data resulting from an execution of the multiple instruction threads. Additionally or alternatively to one or more of the examples disclosed above, in some examples, the method comprises: executing one or more single threaded programming codes using a serial processor.

Some examples of the disclosure are directed to a non-transitory computer readable storage medium having stored thereon a set of instructions for processing multiple instruction threads of a software program that when executed by a computing device, cause the computing device to: execute the multiple instructions threads using multiple processing cores, wherein the multiple processing cores use barrel thread processing to execute the multiple instruction threads, and send and receive data to a least two of the multiple processing cores using a shared data cache, wherein the shared data cache stores data associated with an execution of a first instruction in at least one of the multiple instruction threads. Additionally or alternatively to one or more of the examples disclosed above, the computing device is caused to: receive a first clock signal at a barrel dispatcher of the multiple processing cores, load a first instruction from an instruction memory, wherein the instruction memory stores one or more instructions associated with the multiple instruction threads, execute the first instruction by: retrieving data from a first thread register, wherein the first thread register is associated with the instruction thread that is associated with the first instruction, and sending the received data to one or more arithmetic logic units for processing. Additionally or alternatively to one or more of the examples disclosed above, the barrel dispatcher, receives a second clock signal, loads a second instruction of the one or more instructions from the instruction memory, and executes the second instruction by: retrieving data from a second thread register, wherein the second thread register is associated with the instruction thread that is associated with the second instruction, and sending the received data to the one or more arithmetic logic units for processing. Additionally or alternatively to one or more of the examples disclosed above, in some examples, each thread register of the multiple thread registers loads data associated with the instruction thread to which the thread register is associated. Additionally or alternatively to one or more of the examples disclosed above, in some examples, the multiple processing cores execute the multiple instructions threads simultaneously. Additionally or alternatively to one or more of the examples disclosed above, in some examples, one or more of the multiple cores transmit to and receive data from the shared data cache, and wherein the shared data cache is configured to store data resulting from an execution of the multiple instruction threads. Additionally or alternatively to one or more of the examples disclosed above, in some examples, the computing device is caused to execute one or more single threaded programming codes using a serial processor.

Using the processor architecture described above, in a four core processor utilizing barrel-threading, the processor as a whole can run four instructions during a single clock cycle. In other words, during a clock cycle each core of the processor is running a single instruction. One way to increase the number of instructions run during a single clock cycle would be to increase the number of cores within the processor. However adding more cores within each processor in order to increase the number of instructions executed during a single clock cycle can also lead to increased power consumption and a larger footprint for the processor.

One way to increase the processing throughput during a single clock cycle without increasing the amount of hardware within each processor is to increase the number of instructions that a single core of the processor can run in parallel during a single clock cycle. By taking advantage of common or shared characteristics of certain instructions encountered by the processor, a single core can execute multiple instructions during a single clock cycle.

Take the following pseudo-code example ("Example 2"):
i. a=OP2(OP1(b, c), d)

The above example nests an instruction within an instruction, herein referred to as an "instruction chain." The result of the first instruction OP1 (b, c) is used as an input to the instruction OP2. In a conventional processor, the above coding example could be executed as two separate instructions. In the first instruction, operation 1 (OP1) would be executed upon inputs b and c. The result would then be written to memory. In the second instruction, operation 2 (OP2) can be executed upon input d and the result of OP1 stored in memory.

Writing the result of operation 1 to external memory can be wasteful because that result is not required by the user or program, but instead is only needed as an input to the second operation. In other words, the user or program has no use for this "intermediate result," the output produced by OP2. As the output of OP2 is not required by the user or program, reducing the number of instructions required to implement a chained instruction can be useful.

Figure 7:
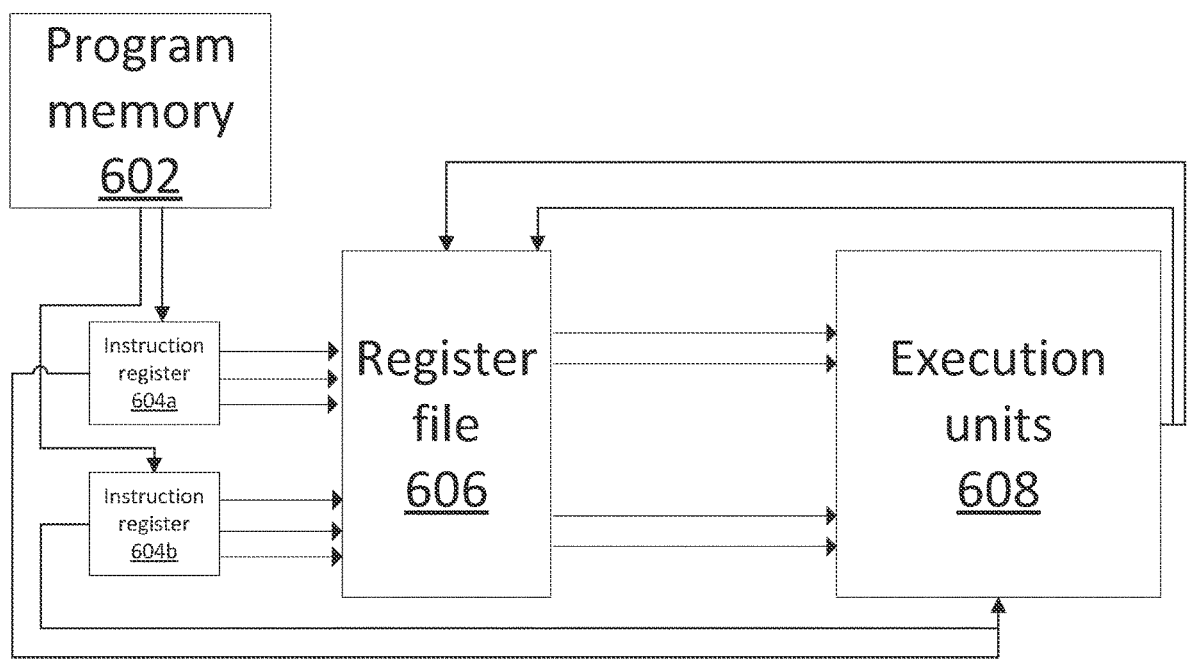
FIG. 7 illustrates an exemplary dual issue processor according to examples of the disclosure.

FIG. 7 illustrates an exemplary conventional dual issue processor according to examples of the disclosure. The example of FIG. 7 can show how such a conventional processor may handle a chained instruction. The dual issue processor of FIG. 7 can include a program memory/instruction memory 602 that can be coupled to multiple instruction registers 604a-b. The instruction registers 604a-b can each be further coupled to a register file 606.

Two independent instructions can be read from program memory 602 into instruction registers 604a and 604b. One instruction can be loaded into instruction register 604a and the other can be loaded into instruction register 604b. Once the instruction registers 604a and 604b are loaded, they can pass the operands of the instruction they are to execute to a register file 606.

Using instruction register 604a as an example, once the instruction from program memory 602 is loaded into instruction register 604a, the register can pass the operands to be operated upon to register file 606, while also passing the instruction to be executed to execution units 608.

Execution units 608 can include, in one example, one or more arithmetic logic units, load store units, etc. that can execute the instructions provided to it by the instruction registers 604a-b. The execution units 608 can have symmetric or asymmetric capabilities, along with logic to determine which unit amongst the execution units 608 will perform a given operation.

Register file 708 can load operands to be executed into the execution units 608. In the example of FIG. 7, the execution units 608 can have four read ports (e.g., two for each instruction register) to read in the input operands of an instruction, and two write ports (one for each instruction) to write the results of the instructions to the register file 606.

In the example of a chained instruction, the instruction registers 604a and 604b can each receive an operation code. Using the nomenclature of Example 2 above, the first instruction register 604a can receive OP1 and the second instruction register 604b can receive OP2. The execution units 608 can receive two separate operation codes, one from each instruction register. Therefore, in total, in a conventional processor, a chained instruction can require six register file ports (four inputs and two outputs) and the program memory can require that two instructions are read per cycle.

However, if a chained instruction can be coded such that it only uses one operation code, and any non-used results (e.g., intermediate results) are not written to the register, an overall overhead of the dual issue processor can be reduced in so far as register file ports and program memory bandwidth can be conserved.

Figure 8:
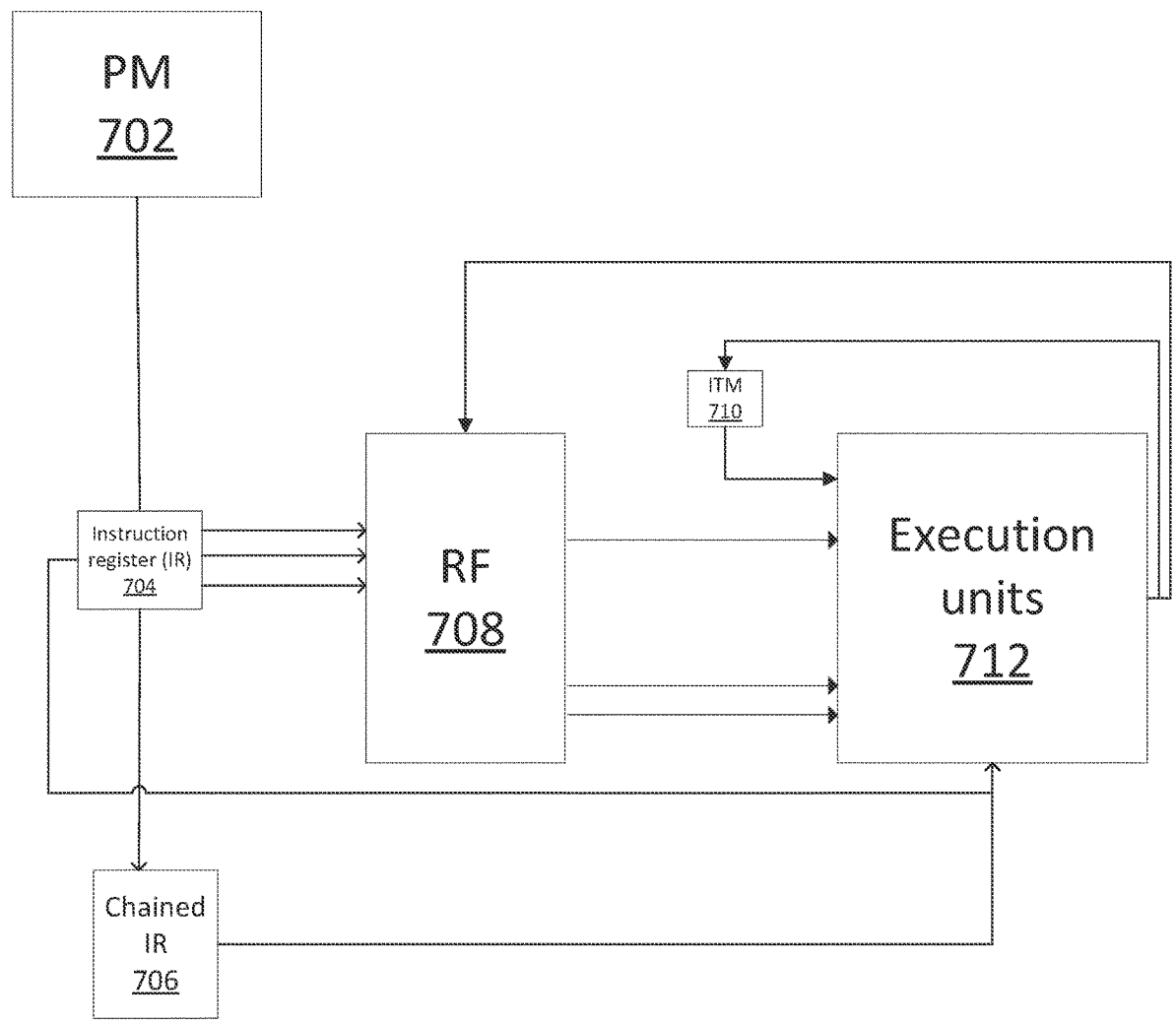
FIG. 8 illustrates an exemplary dual issue core processor configured to accept chained instructions according to examples of the disclosure.

FIG. 8 illustrates an exemplary dual issue core processor configured to accept chained instructions according to examples of the disclosure. The processor illustrated in FIG. 8 is configured to process one thread at a time, and thus has only one instruction register 704.

Take the following example operation ("Example 3"):
i. a=b*c+d

Conventionally, the above equation can be encoded in two separate instructions. The first instruction (i.e., the first instruction to execute) could be tmp=b*c, wherein "tmp"

represents a temporary memory or variable. The second instruction could be a=tmp+d. In the configuration shown in FIG. 7, these instructions would be operated consecutively/serially. Running them simultaneously would not be possible due to the fact that the second instruction depends on a result of the first instruction. In contrast, a processor utilizing chaining could encode the two instructions associated with the above equation as one instruction.

In the example of FIG. 8, the processor utilizing compact chained instruction coding (herein "compact chained instruction coding" and "instruction chaining" will be used interchangeably), could encode the equation a=b*c+d as a single instruction. In a first cycle, instruction register 704 can contain the chained encoded instruction of Example 3 above. The operands associated with the first independent instruction (i.e., b*c) can be sent to register file 708, and the multiply instruction can be sent from the instruction register 704 to execution units 712. In parallel to the above actions, instruction register 704 can send the operands and instructions associated with the second dependent instruction (i.e., a, d, and +) to a chained instruction register 706. Chained instruction register 706 can receive the dependent portion of chain encoded instruction and send the instruction to the appropriate execution units for processing once the independent portion of the chained instruction has been executed. Still within the first cycle, one of the units of the execution units 712 computes b*c and saves the result in intermediate register 710.

At the next cycle, an execution unit of execution units 712 can take the operand from intermediate register 710 (which in the example above contains b*c) and from the chained instruction register 706 (which in the example above contains a, d, and +) and execute the + instruction at one of the execution units 712.

Also during the same cycle, the instruction register 704 can load a new instruction which is then sent to the execution units 712 for execution. Thus, in one cycle, two operations can be occurring in parallel, the dependent portion of the chained instruction and a new instruction. In this way even though a chained instruction was presented to the execution units 712, at any given cycle two operations can still be occurring in parallel, thus maintaining an increased throughput for the processor.

As demonstrated in the above example, encoding a chained operation as one operation rather than two separate operations can decrease the use of instruction register space and memory bandwidth, while at the same time reducing the number of read and write ports required to execute the chained instruction.

Certain advantages conferred upon a processor by chained instruction encoding can be amplified in a barrel threaded processor. For example, the reduction in input ports and output ports to a register file due to the compact encoding can be amplified in a barrel threaded processor in which the cost of having an additional read port would be multiplied by the number of register files in the barrel threaded processor. As discussed above with respect to FIG. 5, a barrel threaded processor with eight threads would have eight register files. Therefore, the fact that output and input ports can be saved by using chained instruction encoding can mean that in a barrel threaded processor with eight threads the port savings incurred by one register file can be multiplied to the multiple register files utilized by barrel threaded processor.

Figure 9:
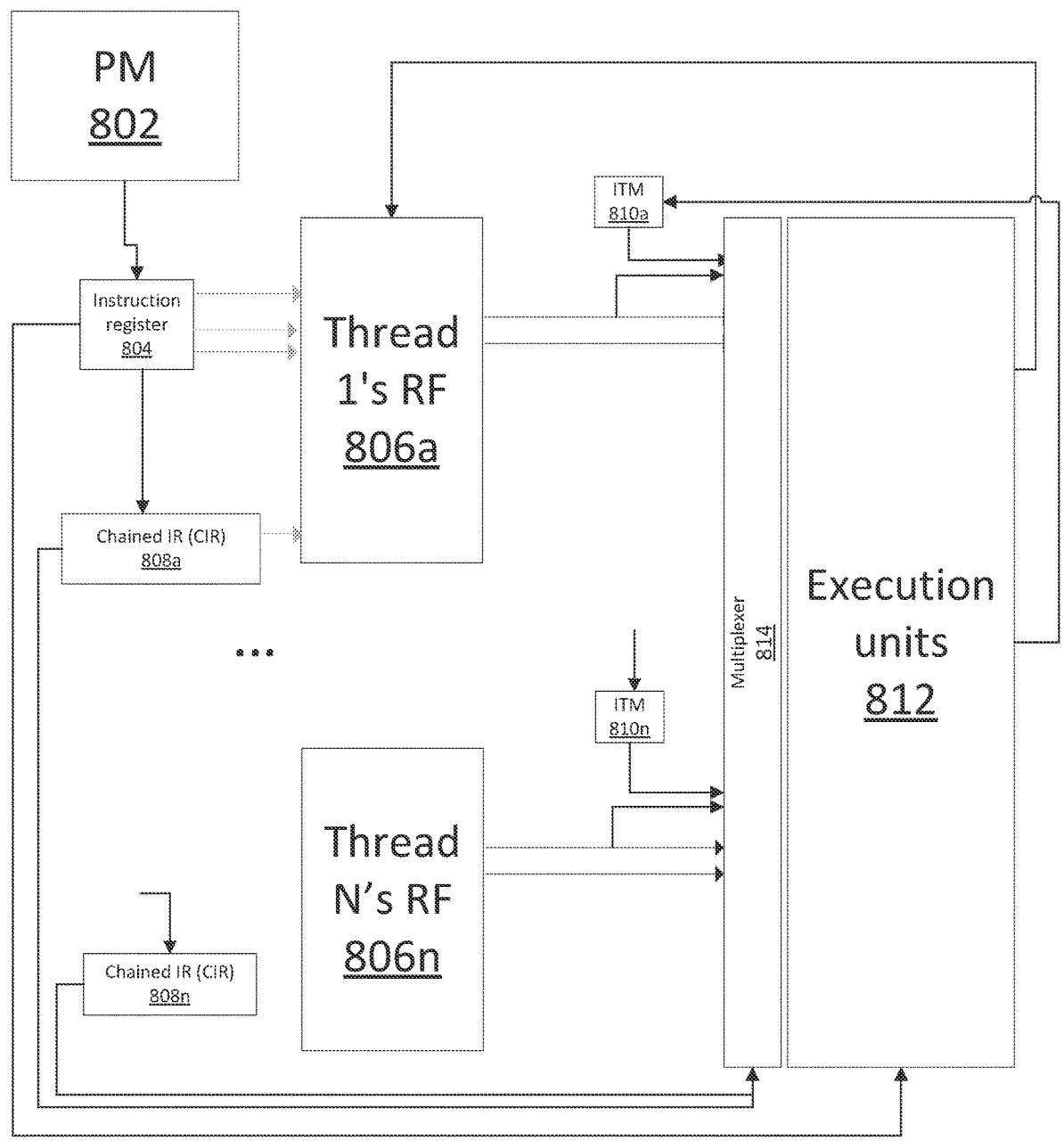
FIG. 9 illustrates an exemplary dual issue core configured for barrel threading and accepting chained instructions according to examples of the disclosure.

FIG. 9 illustrates an exemplary dual issue core configured for barrel threading and accepting chained instructions according to examples of the disclosure. The example of FIG. 9 can operate in substantially the same manner as the example disclosed in FIG. 8. One difference can be that an additional input port of the register file can be conserved due to the fact that each thread is only operating every N cycles, wherein N equals the number of threads that are handled by the barrel threaded processor (i.e., eight in the example of FIG. 5). Due to this fact, during the cycles in which a particular thread is idle the operands associated with a chained operation (e.g., a dependent instruction) can be read in.

Turning to FIG. 9, and utilizing the example instruction a=b*c+d (Example 3) as was used in the example of FIG. 7, at a first cycle a chained instruction containing the command to execute a=b*c+d can be loaded from program memory 802 to instruction register 804. Instruction register 804 can then send operands b and c to register file 806a which can correspond to the instruction register used by the first thread of the N threads to be executed by the processor, and send the addition instruction (+) to the execution units 812. Simultaneously, instruction register 804 can also send the operands and instructions for the chained command (d and +) to a chained instruction register 808a.

During cycle 1, the multiplication of b*c can be executed by the execution units 812 and the result can be stored in an intermediate register 810a. Intermediate register 810a can be dedicated to storing the intermediate results (e.g., the results that are not needed by the program or user) of the first thread. In this way, each thread can have its own intermediate register (i.e., thread N can have an intermediate register 810n as illustrated).

At the next cycle, the contents of chained instruction register 808a corresponding to a, d can be sent to register file 806a, while the + operand can be sent to execution units 812. By the time cycle 2 begins, as discussed above, the result of b*c can be stored in intermediate register 810a. Thus at cycle 2, the processor can begin processing the second portion of the chained command.

Simultaneously, a new instruction from a second thread can be processed by the processor in the same way that b*c was processed in cycle 1. Thus at the second cycle, two operations can be occurring simultaneously. The chained operation of the first thread can be completed by adding b*c, stored in intermediate register 810a, to operand d which was loaded by the register file 806a from chained instruction register 808a.

In this way, rather than having to wait until the first thread's turn come up again (at cycle N+1) to execute the second portion of the chained instruction, the second portion of the chained instruction can be executed simultaneously during the time that an instruction associated with another thread is being executed.

The processor of FIG. 9 can also include a multiplexer 814. Multiplexer 814 can contain the logic that decides which individual execution units of the execution units 812 will operate on the operands.

Figure 10A:
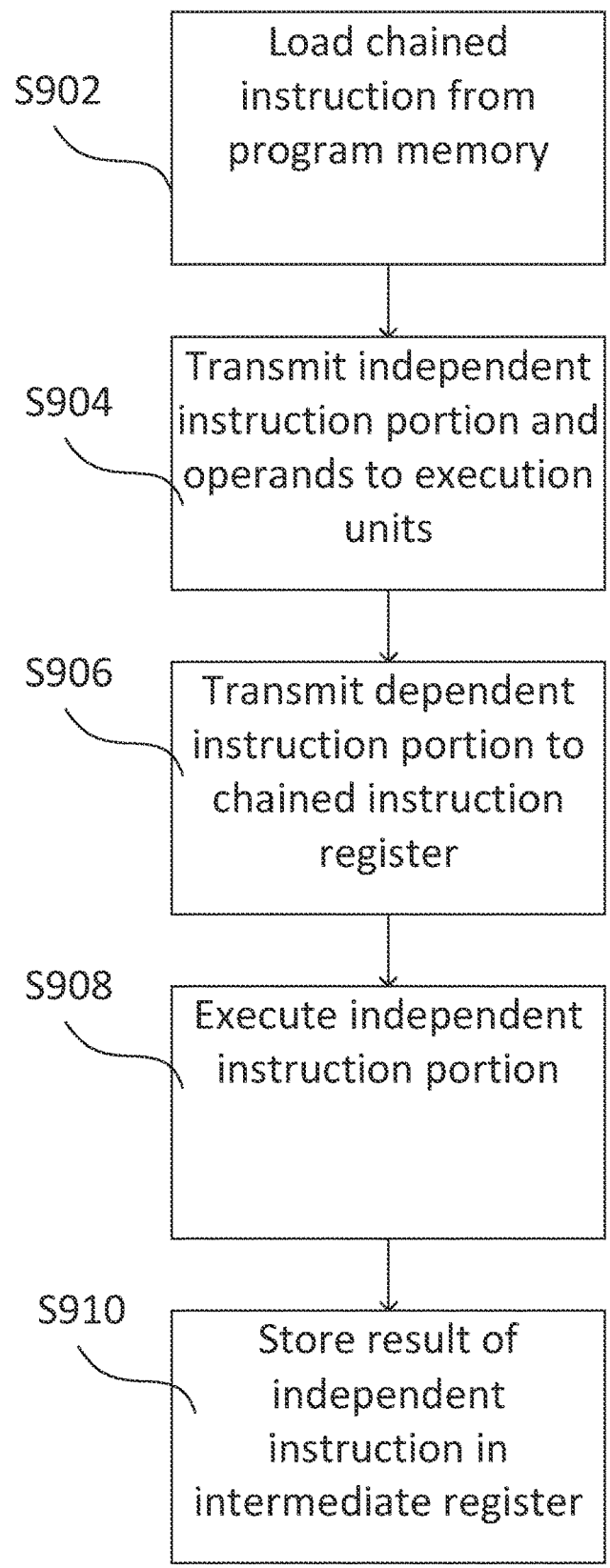
FIG. 10A illustrates an exemplary chained instruction processing flow during a first clock cycle according to examples of the disclosure.
Figure 10B:
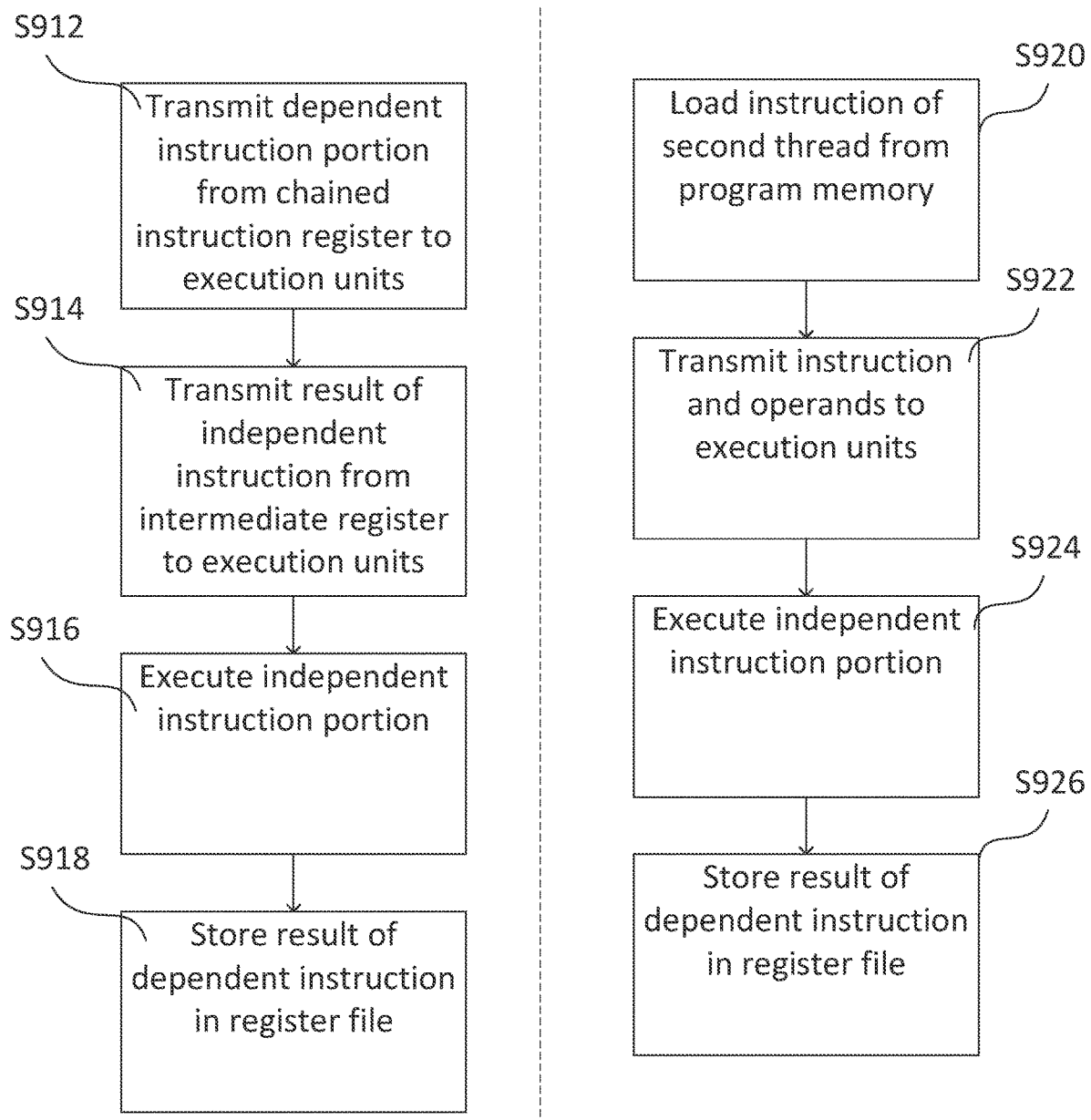
FIG. 10B illustrates an exemplary chained instruction processing flow during a second clock cycle according to examples.

FIGS. 10A and 10B illustrate the operations that are occurring during a first time period and a second time period respectively when the processor is handling a chained instruction. The processor described in FIG. 9 can be "clocked" meaning that a clock signal is fed to some or all the components. The clock signal can help to synchronize the various components of the processor. When the components of the processor are clocked, functions performed by the processor can be described as occurring within clock cycles or time periods. As an example, a first time period can describe the period of time between the components receiving a first clock signal and a second clock signal. The second time period can describe the time period between receipt of the second clock signal and a third clock signal, and so on and so forth.

FIG. 10A illustrates an exemplary chained instruction processing flow during a first clock cycle according to examples of the disclosure. The processing flow of FIG. 10A will be described with respect to the hardware diagram provided in FIG. 9. At step S902 a chained instruction can be loaded from the program memory 802 into an instruction register 804. The chained instruction can contain two portions an independent instruction portion and a dependent instruction portion. The independent instruction portion can refer to the portion of the chained instruction that can be executed without having to first wait for an intermediate result. In the example of a=b*c+d (Example 3), b*c can be referred to as the "independent portion." The dependent instruction portion can refer to the portion of the chained instruction that must wait for an intermediate result to be produced before it can be executed. In the above equation, operands a and d, as well as the [+] operation can represent the dependent portion. It should be noted that a chained instruction could have more than one independent and dependent instruction portions.

At step S904 the independent instruction portion and its associated operands can be transmitted to the executing units 812 for processing. The operands of the independent instruction portion can be transmitted from the instruction register 804 to the register file 806a, while the instruction itself can be transmitted from the instruction register 804 to the execution units 812. The execution units 812 can load the appropriate operands of the independent instruction portion from the register file 806a to execute the independent instruction portion.

At step S906, the dependent instruction portion can be transmitted to chained instruction register 808a and stored there while execution of the independent instruction portion is occurring. At step S908, the independent instruction portion is executed and at step S910 the result is stored in intermediate register 810a.

FIG. 10B illustrates an exemplary chained instruction processing flow during a second clock cycle according to examples. In the process flow of FIG. 9b, two processes can occur in parallel: 1) the processing of the dependent portion of the chained instruction in steps S912-S918 (left side of FIG. 10B) and 2) the processing of an instruction from a second thread in steps S920-S926 (right side of FIG. 9B). As discussed above, in a barrel threaded processor a single processor can process an instruction from another thread each clock cycle. In an eight threaded barrel processor, an instruction from the first thread can be processed at the first clock cycle; an instruction from the second thread can be processed at the second clock cycle, and so on. At the ninth clock cycle, the first thread can "receive a turn" again and execute the next instruction in the thread or do nothing if the prior instruction is stalled for whatever reason.

Returning to FIG. 10B, processing of the dependent portion of the chained instruction discussed in FIG. 10A begins at step S912. At step S912, the dependent portion can be transmitted to the execution units 812 via the register file 806a, while the operands associated with the dependent instruction portion can be transmitted to the register file 806a. At step S914 the result of the independent instruction portion can be transmitted from the intermediate register 810a, to the execution units 812. At step S916 the dependent instruction portion can be executed on the execution units and at step S918 the result can be stored in the register file 806a.

As previously discussed, in a barrel threaded processor, each individual thread can receive a turn during a clock cycle. Thus in a second clock cycle, a second thread's instruction can be executed in parallel with execution of the dependent instruction portion of the first thread's chained instruction.

At step S920, an instruction from the second thread can be loaded to a register file 806b (not pictured). Register file 806b can represent a register file that is dedicated to operands originating from the second thread. At step S922 the instruction and operands associated with the second thread can be transmitted to the execution units 812 for execution which can occur at step S924. Finally, at step S926 the result of the second thread's instruction can be stored in register file 806b.

Having the dependent instruction portion from a first thread executed in parallel with an instruction from a second thread can lead to an improved throughput of the processor. Rather than having to consume two "turns" of a thread to execute chained instructions, a chained instruction can be executed in one turn.

Instruction chaining can also be applied instances in which there are more than two instruction portions and multiple operands such as the pseudo-code example below ("Example 4"):

i. A=OP1(OP2(OP3(B,C)+d)+e)

In the above pseudo-code example, OP2 depends on the execution of OP3, and OP1 depends on the execution of OP2. The processor example of FIG. 8 can handle these types of chained operations as well by ensuring that each intermediate result is stored in an intermediate register and is operated on during a clock cycle associated with another thread of a program.

In some examples, the reading of operand d (the second portion of the chained instruction) can happen during cycle 2 rather than cycle 1. While this example may obviate the need for the chained instruction register to send operands to the register file, it may not change the amount of read ports required by the register file because three read ports is what can be maximally needed by the register file to perform all the necessary operations. Whether an operand associated with a chained instruction comes from a chained instruction register or an instruction register does not alter the number of read ports required by the register file.

In some examples, the amount of operands that sent to the register file 806a can be altered by employing implicit chaining. Implicit chaining can be utilized by overwriting an operand of a chained instruction with the result of a chained instruction. So, using Example 3 above, rather than coding the operation as a=b*c+d, the operation can instead be coded as a=b*c+a. In this example, the input operand a is overwritten after the chained instruction result is produced. In this way rather than having to send four operands to the register file (a, b, c, d) only three operands can be sent (a, b, c).

While barrel-threaded multi-core processors with inter-core shared data caches can yield greater processing efficiency in terms of power and speed, as discussed above, they may not be ideal for a serial computing environment. If a program or code has a mixture of tasks that can be parallelized and tasks that must be processed serially, than the barrel-threaded multi-core processor may oscillate between periods of optimal efficiency and sub-par efficiency. When threads that can be run in parallel are being operated on, the advantages of a barrel-threaded processor can be realized. However, when serial code is being operated on, the processor may become relatively inefficient. Thus, it may be advantageous to include a separate serial processor that is optimized to operate on code that must be run serially.

Figure 10C:
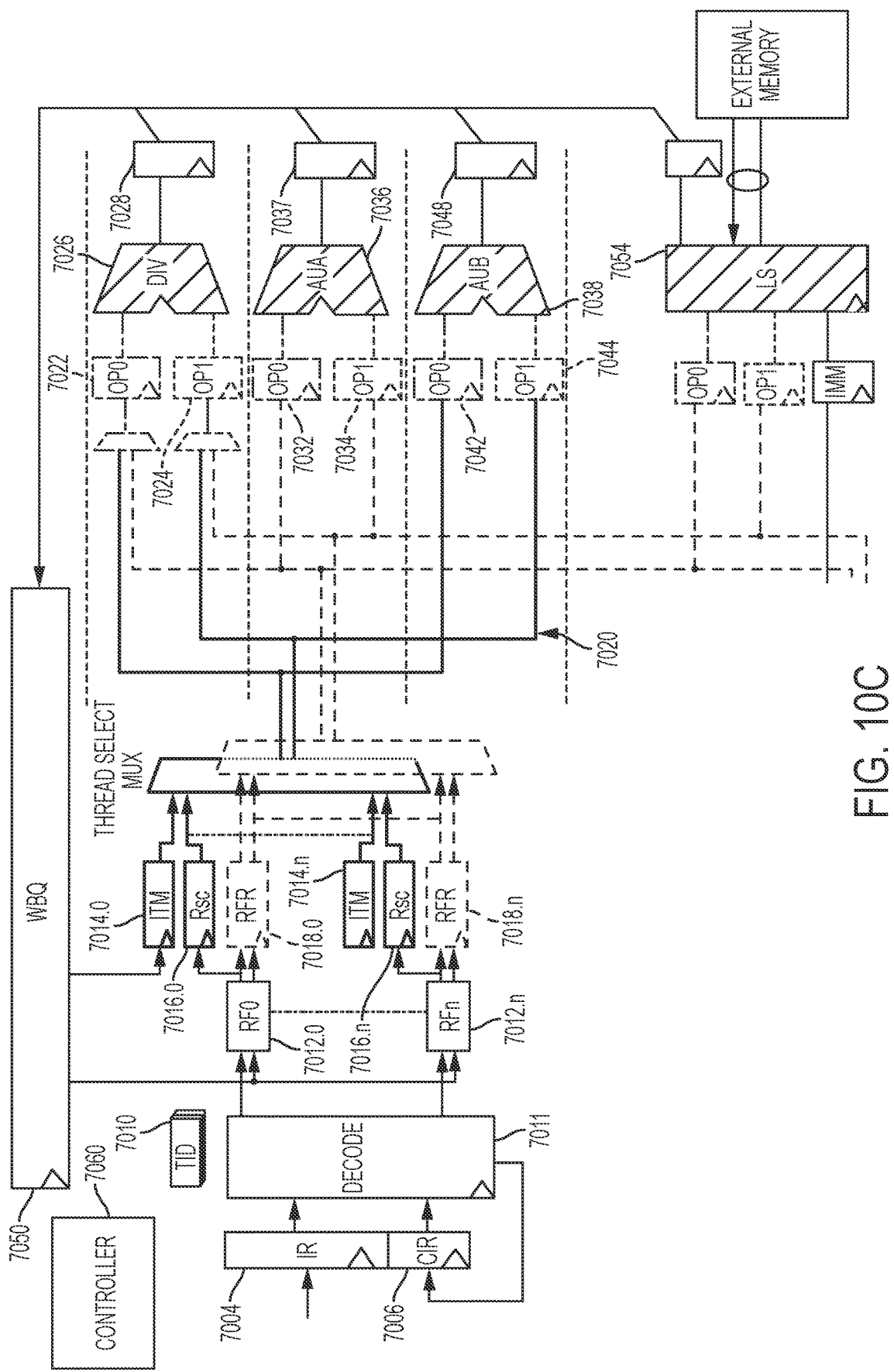
FIG. 10C illustrates an exemplary dual issue core configured for barrel threading and accepting chained instructions according to examples of the disclosure.

FIG. 10C illustrates an exemplary dual issue core configured for barrel threading and accepting chained instructions according to examples of the disclosure.

The dual issue core includes a divider DIV 7026, a first ALU (AUA) 7036, a second ALU (AUB) 7038, load store unit 7054, an instruction register (IR) 7004, a chained instruction register (CIR) 7006, thread registers TID 7010, includes multiple sets of register files RF0-*n* 7012.0-*n*, of intermediate registers ITM 7014.0-*n*, of first registers Rsc 7016.0-*n* and of second registers RFR 7018.0-*n*, first distribution logic 7020, first and second divider input buffers 7022 and 7024, divider output buffer 7028, first and second AUA input buffers 7032 and 7034, AUA output buffer 7037, first and second AUB input buffers 7042 and 7044, AUB output buffer 7046, output bus 7070, write back queue (WBQ) 7050, controller 7060 and inter thread communication 8000 for facilitating a synchronization between the different threads executed by the multiple cores and optionally also between the multiple cores and a serial processor.

Instructions are decoded by decoder 7011 and sent to IR and/or CIR—unless they cannot be temporarily executed (for example the divider is too busy) and they are sent to shadow IR and/or shadow CIR. There may be one shadow IR and CIR per thread.

Each thread (out of (n+1) threads) is associated with a set of components—the set of components includes an intermediate register, a register file (also referred to as thread register file), its own first register and its own second register.

Controller 7060 may implement the barrel dispatching by controlling the flow of information between (a) the sets of components associated with the different threads, and (b) either one of the divider DIV 7026, AUA 7036 and AUB 7038.

According to an embodiment of the invention AUA 7036 is allocated for executing independent instructions while AUB 7038 is allocated for executing chained (dependent) instructions.

AUA 7036 and AUB 7038 may operate in a pipelined manner during which AUA 7036 may executed, for each thread, one independent instruction after the other and AUB 7038 may execute, for the same thread, one dependent instruction after the other.

Assuming that (a) there are eight threads ((n+1)=8), (b) controller 7060 executes barrel dispatching of eight threads, (c) an independent instruction of a first thread associated with register file RF0 7012.0, ITM 7014.0, Rsc 7016.0 and RFR 708.0 is executed during a first cycle. Two operands related to the independent instruction are fed from RFR 7018.0 to first and second input buffers 7032 and 7034 of AUA 7036.

Under these assumptions:

AUA executed the independent instruction during the first cycle. The outcome of the execution of the independent instruction is outputted by AUA 7036, fed to AUA output buffer 7038, via bus 7070 to WBQ 7050 and eventually stored in ITM 7014.0 (after the completion of the first cycle).

The next time the core 7000 will execute any instruction of the first thread will be at the ninth cycle.

After the first cycle and before the ninth cycle another operand required for the execution of the dependent instruction is sent to Rsc 7016.6. Rsc 7016.0 and RFR 7018.0 may be fed by the same output port of RF0 7012.0—using time division multiplexing.

During the ninth cycle: (a) the content of ITM 7014.0 and of Rsc 7016.0 is fed (via logic 7020) to first and second input buffers 7042 and 7044 of AUB 7046; (b) AUB 7046 executes the dependent instruction. The outcome of the execution of the dependent instruction is outputted by AUB 7046, fed to AUB output buffer 7048, via bus 7070 to WBQ 7050 and eventually stored in RF0 7012.0.

During the ninth cycle AUA may execute a new independent command of the first thread.

Referring to FIG. 10B—instead of fetching an instruction from a second thread (S920) the method may include fetching a next instruction from the first thread and executing the next instruction from the first thread (should be an independent instruction) by AUA—while AUB executed (during the same cycle) the older dependent instruction.

It should be noted that the execution of one or more threads may involve calculating a division operation—which may involve accessing the divider DIV 7026.

Because the division operation is lengthy (it may, for example last tens of cycles—for example 30 cycles) the divider may include multiple independent divider modules—that may operate in parallel to each other and reduce the overall latency of the core.

FIG. 10D illustrates a divider 7026, first and second divider input buffers 7022 and 7024, and two divider output buffers 7028.1 and 7028.2 according to an embodiment of the invention.

DIV 7026 includes first and second dividers 7026.6 and 7026.9—but may include more than two dividers.

First and second divider input buffers 7022 and 7024 are followed by divider FIFO 7026.0 that may accumulate multiple pairs of operands. In FIG. 10D the divider FIFO 7026.0 has a depth of two—although divider FIFO 7026.0 may be deeper.

Divider FIFO 7026.0 is followed by a demultiplexer 7026.2 for distributing a pair of operands (from divider FIFO 7026.0) to one of the first and second dividers 7026.6 and 7026.9—and especially to one of the pair of input buffers (7026.3 and 7026.4, 7026.7 and 7026.8) that precede first and second dividers 7026.6 and 7026.9.

The output of first divider 7026.5 is fed to output buffer 7028.1 and to bus 7070. The output of second divider 7026.9 is fed to output buffer 7028.2 and to bus 7070.

Divider controller 7026.1 controls the operation of DIV 7026—for example by sending a selection signal to demux 7026.2, by controlling the propagation of the pair of operands through divider FIFO, by triggering first and second dividers 7026.6 and 7026.9 to perform division operations and the like.

Divider controller 7026.1 may receive status indications (such as busy signals and/or idle signals) from first and second dividers 7026.6 and 7026.9.

When both first and second dividers 7026.6 and 7026.9 are busy the divider controller 7026.1 may inform controller 7060 (of FIG. 10C) not to send any operands to the divider 7026 until one or more of first and second dividers 7026.6 and 7026.9 are not busy. Divider controller 7026.1 may prevent the sending of a new pair of operands to the divider 7026 by any other means—for example by sending a busy signal to logic 7020, to WBQ 7050, by sending an interrupt, and the like.

The divider controller 7026.1 may instruct the demux 7026.2 to send a pair of operands to a non-busy divider and prevent from sending a new pair of operands to an already busy divider.

Therefore, according to the above, some examples of the disclosure directed to A multiple-core processor device comprising: multiple processing cores configured to execute multiple instruction threads of a software program using barrel thread processing, wherein the multiple processing cores are configured to execute a chained instruction associated with a first thread of the multiple instruction threads by: loading the chained instruction to a first instruction memory during a first time period, wherein the chained instruction comprises an independent instruction portion and a dependent instruction portion, transmitting the independent instruction portion and one or more operands associated with the independent instruction portion to one or more execution units during the first time period, transmitting the dependent instruction portion to a chained instruction register during the first time period, executing the independent instruction portion by the one or more execution units during the first time period, writing a result of the independent instruction portion to a first intermediate register during the first time period, transmitting the dependent instruction portion, one or more operands associated with the dependent instruction portion, and the result of the independent instruction to the one or more execution units during a second time period, and executing the dependent instruction portion during the second time period. Additionally or alternatively to one or more of the examples disclosed above, in some examples the chained instruction is associated with a first thread of the multiple threads, and wherein the device processes an instruction associated with a second thread of the multiple threads in parallel with execution of the dependent instruction portion of the chained instruction during the second time period. Additionally or alternatively to one or more of the examples disclosed above, in some examples the one or more operands associated with the dependent instruction portion comprise an input operand and wherein executing the dependent instruction portion comprises overwriting the input operand with a result of the execution of the dependent instruction portion. Additionally or alternatively to one or more of the examples disclosed above, the device further comprises a multiplexer configured to determine which of the execution units will execute the dependent instruction portion of the chained instruction and which of the execution units will execute the instruction associated with the second thread. Additionally or alternatively to one or more of the examples disclosed above, the device further comprises a shared data cache configured to send data to and receive data from at least two of the multiple processing cores, the shared data cache storing data associated with an execution of an instruction in at least one of the multiple threads, the shared data cache and the multiple processing cores interacting without reliance on a private data cache. Additionally or alternatively to one or more of the examples disclosed above, the one or more operands associated with the dependent instruction portion are stored in a first register file during the second time period, and wherein the instruction associated with the second thread comprises one or more operands that are stored in a second register file during the second time period. Additionally or alternatively to one or more of the examples disclosed above, the device further comprises a register file, a chained instruction register and an intermediate register associated with each thread of the multiple instruction threads.

Additionally or alternatively, the device processes another independent instruction portion associated with the first thread in parallel with execution of the dependent instruction portion of the chained instruction during the second time period. Additionally or alternatively, each processing core comprises a first execution unit for executing independent instructions portions of the first thread and a second execution unit for executing dependent instructions portions of the first thread.

Some examples of the disclosure are directed to a method for executing a chained instruction in a barrel threaded processor configured to execute multiple instruction threads. There is provided a method, the method comprising: loading the chained instruction to a first instruction memory during a first time period, wherein the chained instruction comprises an independent instruction portion and a dependent instruction portion, transmitting the independent instruction portion and one or more operands associated with the independent instruction portion to one or more execution units during the first time period, transmitting the dependent instruction portion to a chained instruction register during the first time period, executing the independent instruction portion by the one or more execution units during the first time period, writing a result of the independent instruction portion to a first intermediate register during the first time period, transmitting the dependent instruction portion, one or more operands associated with the dependent instruction portion, and the result of the independent instruction to the one or more execution units during a second time period, and executing the dependent instruction portion during the second time period. Additionally or alternatively to one or more of the examples disclosed above, in some examples, the chained instruction is associated with a first thread of the multiple threads, and wherein the method comprises processing an instruction associated with a second thread of the multiple threads in parallel with the execution of the dependent instruction portion of the chained instruction during the second time period. Additionally or alternatively to one or more of the examples disclosed above, in some examples, the one or more operands associated with the dependent instruction portion comprise an input operand and wherein executing the dependent instruction portion comprises overwriting the input operand with a result of the execution of the dependent instruction portion. Additionally or alternatively to one or more of the examples disclosed above, in some examples, the method comprises determining which of the execution units will execute the dependent instruction portion of the chained instruction and the instruction associated with the second thread. Additionally or alternatively to one or more of the examples disclosed above, in some examples, the method comprises sending data to and receiving data from at least two of the multiple processing cores using a shared data cache, the shared data cache storing data associated with an execution of a first instruction in at least one of the multiple threads, the shared data cache and the multiple processing cores interacting without reliance on a private data cache. Additionally or alternatively to one or more of the examples disclosed above, in some examples, the one or more operands associated with the dependent instruction are stored in a first register file during the second time period, and wherein the instruction portion associated with the second thread comprises one or more operands that are stored in a second register file during the second time period. Additionally or alternatively to one or more of the examples disclosed above, in some examples, each thread of the multiple instruction threads has its own register file, chained instruction register, and intermediate register associated with it.

Some examples of the disclosure are directed to a non-transitory computer readable storage medium having stored thereon a set of instructions for processing chained instructions of a software program that when executed by a computing device, cause the computing device to: load the chained instruction to a first instruction memory during a first time period, wherein the chained instruction comprises an independent instruction portion and a dependent instruction portion, transmit the independent instruction portion and one or more operands associated with the independent instruction portion to one or more execution units for execution during the first time period, transmit the dependent instruction portion to a chained instruction register during the first time period, execute the independent instruction portion by the one or more execution units during the first time period, write a result of the independent instruction portion to a first intermediate register during the first time period, transmit the dependent instruction portion, one or more operands associated with the dependent instruction portion, and the result of the independent instruction to the one or more execution units during a second time period, and execute the dependent instruction portion during the second time period. Additionally or alternatively to one or more of the examples disclosed above, the chained instruction is associated with a first thread of the multiple threads, and wherein the computing device is caused to process an instruction associated with a second thread of the multiple threads in parallel with the execution of the dependent instruction portion of the chained instruction during the second time period. Additionally or alternatively to one or more of the examples disclosed above, the one or more operands associated with the dependent instruction portion comprise an input operand and wherein executing the dependent instruction portion comprises overwriting the input operand with a result of the execution of the dependent instruction portion. Additionally or alternatively to one or more of the examples disclosed above, the device is caused to determine which of the execution units will execute the dependent instruction portion of the chained instruction and the instruction associated with the second thread. Additionally or alternatively to one or more of the examples disclosed above, the device is caused to send data to and receive data from at least two of the multiple processing cores using a shared data cache, the shared data cache storing data associated with an execution of a first instruction in at least one of the multiple threads, the shared data cache and the multiple processing cores interacting without reliance on a private data cache. Additionally or alternatively to one or more of the examples disclosed above, the one or more operands associated with the dependent instruction portion are stored in a first register file during the second time period, and wherein the instruction associated with the second thread comprises one or more operands that are stored in a second register file during the second time period. Additionally or alternatively to one or more of the examples disclosed above, each thread of the multiple instruction threads has its own register file, chained instruction register, and intermediate register associated with it.

Multiple Accelerator Devices and Cache Use

As discussed above in the context of FIG. 1, SoC 100 may have more than one accelerator, such as accelerators 112 and 114. The hardware accelerators 112 and 114 may further include multi-core processors, such as the multi-core processors 204, 304, and 504 in multi-core accelerators 200, 300, and 500, respectively.

Figure 11:
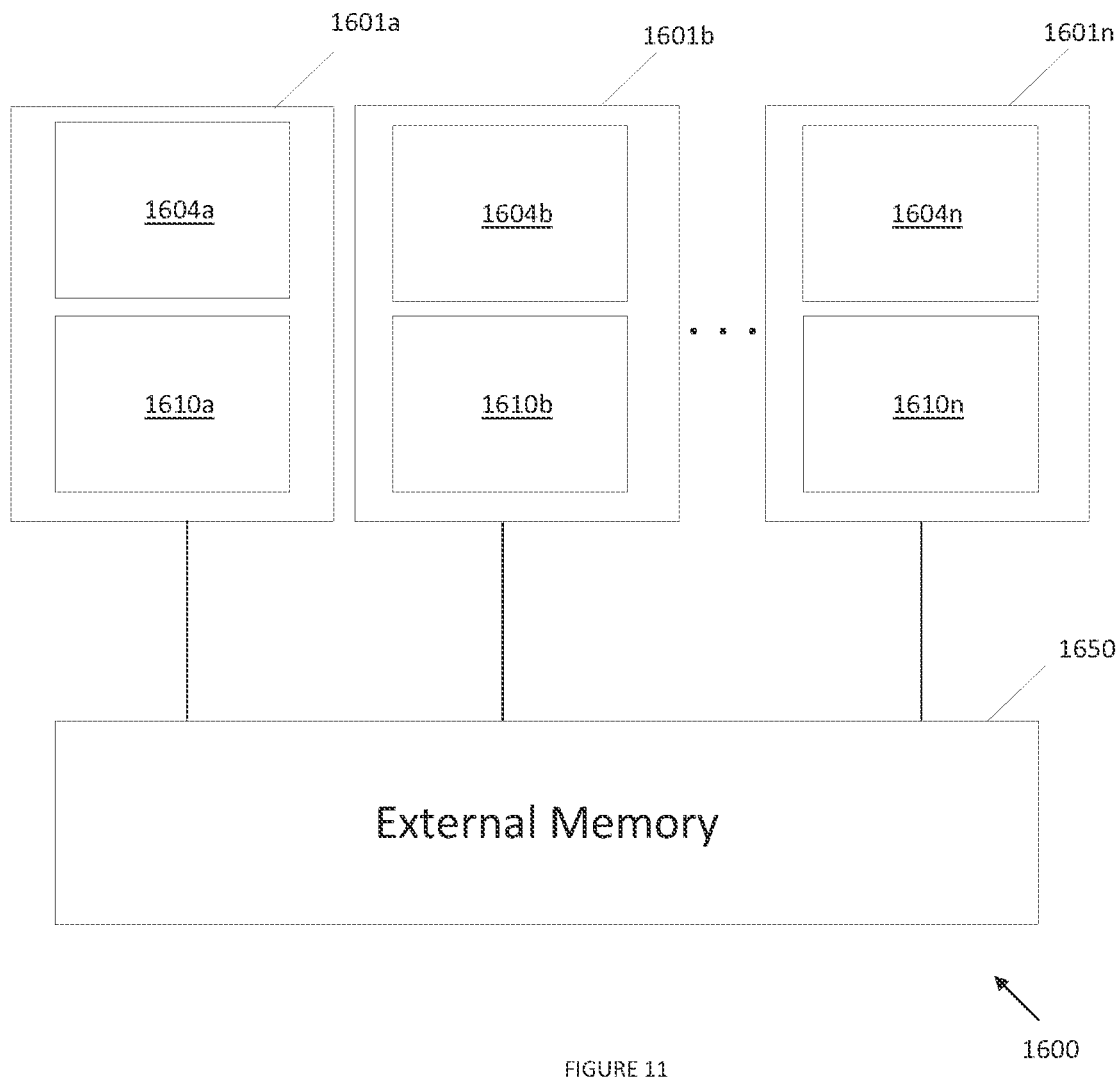
FIG. 11 illustrates an exemplary multi-processor system with local caches communicating with an external memory according to examples of the disclosure.

FIG. 11 is a generalized diagram showing a cache configuration 1600 for the case in which a system such as SoC 100 may have multiple accelerators 1601a-n, each including a processor 1604a-n. Note that FIG. 11 may omit certain components that can be included in an accelerator or other device using cache configuration 1600. The disclosure in FIG. 11 is not meant to be limiting. It should be noted, further, that SoC 100 is merely exemplary of the type of systems for which 1600 could provide a cache configuration. The processors 1604a-n may be, for example, multi-core processors such as multi-core processors 204, 304, or 504. Alternatively, multiple processors 1604a-n may be single core processors or some combination of single and multi-core processors.

Each accelerator 1601a-n may further include a cache 1610a-n associated with its respective processor 1604a-n. Although each cache 1610a-n is represented in FIG. 11 as a single element, in fact, each cache 1610a-n may include multiple, separate caches for each individual core in processors 1604a-n (e.g., like private or "local" caches 206a-d, FIG. 2). Alternatively, each cache 1610a-n may be a single cache shared among multiple cores, such as the core-shared cache 514 (FIG. 5). Each accelerator 1601a-n can access an external memory 1650, such as a main memory or a higher level cache. Typically, each accelerator 1601a-n will copy variables from the external memory 1650 to the caches 1610a-n for relatively quick access by processors 1604a-n.

In either case, the cache 1610a-n can keep a local copy of data corresponding to an address in the external memory. Local caches can be, for example, L1 or L2 caches with relatively limited capacity (e.g., 4-600 Mb), but may respond in far fewer clock cycles than external memory. This way, the associated processor (e.g., 1604a-n) can access the data faster than by sending a request to external memory. If the processor 1604a-n requests data not currently contained in the cache 1610a-n, it may fetch the data from external memory 1650 and save that data to the cache 1610a-n so that the next data access is faster. Since the cache 1610a-n may have a more limited capacity than the external memory 1650, the cache 1610a-n may evict some data to make room for newly fetched data. If the data to be evicted was modified (made "dirty") by the core, the modified data needs to be written to the external memory 1650 before eviction so that the work done to modify the cache data is not lost. This process is described in more detail below.

Exemplary Cache Structure

Figure 12:
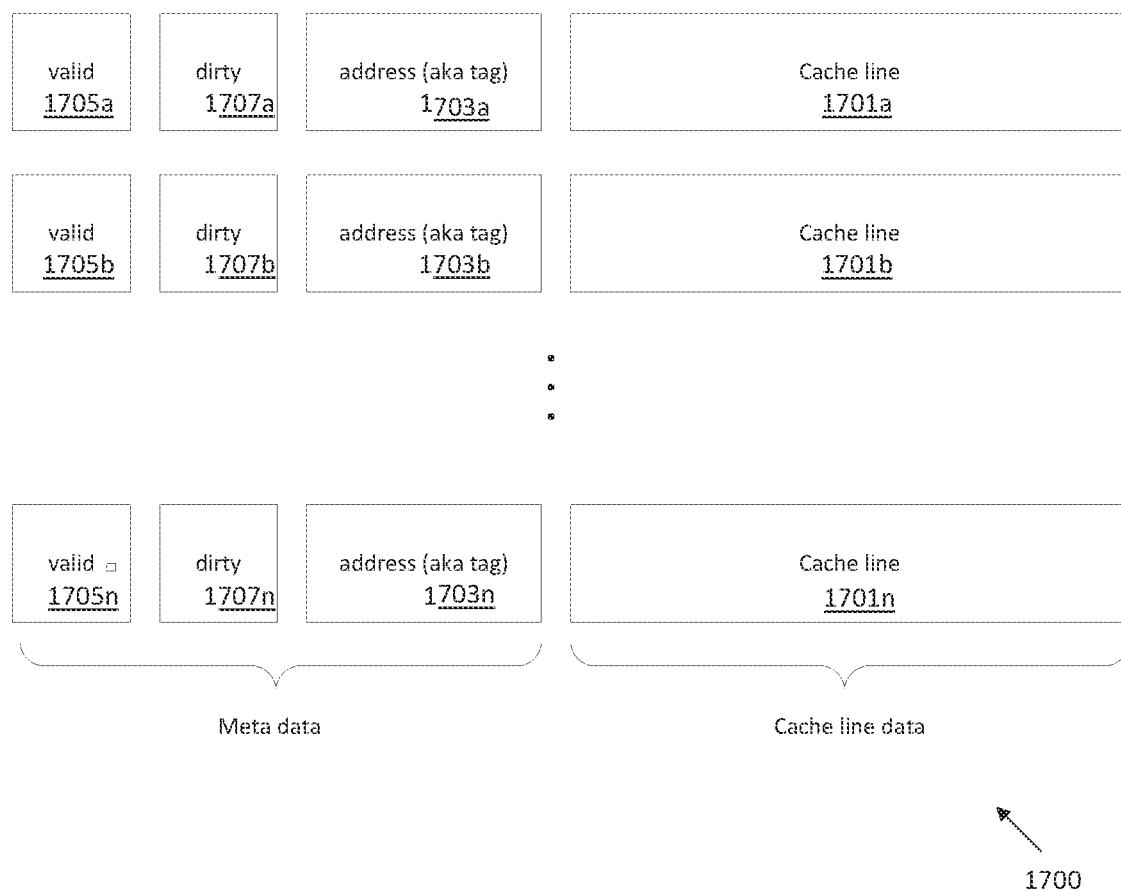
FIG. 12 illustrates an exemplary cache configuration or structure according to examples of the disclosure.

FIG. 12 illustrates an exemplary cache structure 1700 (or "cache"), in accordance with certain examples disclosed herein. The exemplary cache structure 1700 may represent, for example, the structure of any of caches 1610a-n in FIG. 11. In the exemplary cache structure 1700, cached data may be kept in cache lines 1701a-n. Metadata that corresponds to the cached data is also typically kept in the exemplary cache structure 1700. The nature of this metadata may vary, but it typically includes address data (also commonly referred to as "address bits" or "tags") 1703a-1703n. These address data 1703a-1703n can specify the address of their corresponding cache lines 1701a-n in external or main memory. Other examples of metadata may include valid bits 1703 a-n specifying read/write conditions of the data with respect to the external or main memory. The cache structure 1700 may further include dirty bits 1707a-n specifying whether or not there has been a local write. The use of the dirty bits 1707a-n, in particular, will be explored in more detail below.

The cache 1700 may manage data at cache line granularity. For example, a cache 1700 with a 64-byte line can fetch data in portions of 64 bytes. This may happen even when the processor requests less than 64 bytes of data (e.g., when the core requests only a single byte). Managing data at cache line granularity can be efficient since a processor is likely to access data proximate to data it has already accessed. For example, if a processor has requested the byte at address X, it is more likely to subsequently access bytes at addresses X+1 and X+2 in the external memory than bytes at X+n, where n>>2.

Fetching an entire cache line at once allows the processor local access to proximate data within 64 bytes of the requested data. As discussed above, since the data is stored in a faster, local cache 1700, this means that the processor (e.g., processors 1604*a-n*) then has faster access to any data proximate to the requested data. A similar effect can be achieved when the external memory is Dynamic Random Access Memory (DRAM), which only supports access to data in "bursts" of multiple bytes. Cache line 1701*a-n* size can be tuned to equal or exceed a DRAM burst, providing local access to proximate data. In addition, since it is typical for a cache 1700 to store metadata (e.g., address data 1703*a-n*, validity data 1705*a-n*, and/or data indicating whether a line is dirty 1607*a-n*) associated with each cache line 1701*a-n*, the larger size, the more efficient the metadata usage. For example, a cache 1700 operating at a byte granularity, instead of 64 byte granularity, must store an external memory address 1603*a-n* for every byte. Since the cache is smaller than the external memory, there can be no one-to-one mapping between locations in the cache memory and locations in the external memory. Similar considerations apply to validity data 1705*a-n* and dirty bit data 1707*a-n*.

Cache Coherence: Overview

"Cache coherence" is, among other things, related to the problem of maintaining, to the extent practical, data consistency among caches (e.g., caches 1610*a-n*, FIG. 11) and external memory. Cache coherence issues or problems may arise when two processors use copies of the same data from the external memory that have been changed or updated differently.

Cache coherence issues can be described in terms of the context in which they arise. "True sharing" of cache data results when two different processors access and/or modify the same variable. True sharing may be deliberate or accidental. "False sharing," in contrast, arises when two different processors access and/or modify two different variables that reside in or are stored in the same cache line 1601*a-n*. Each of these instances is described in more detail below.

True Sharing

Figure 13A:
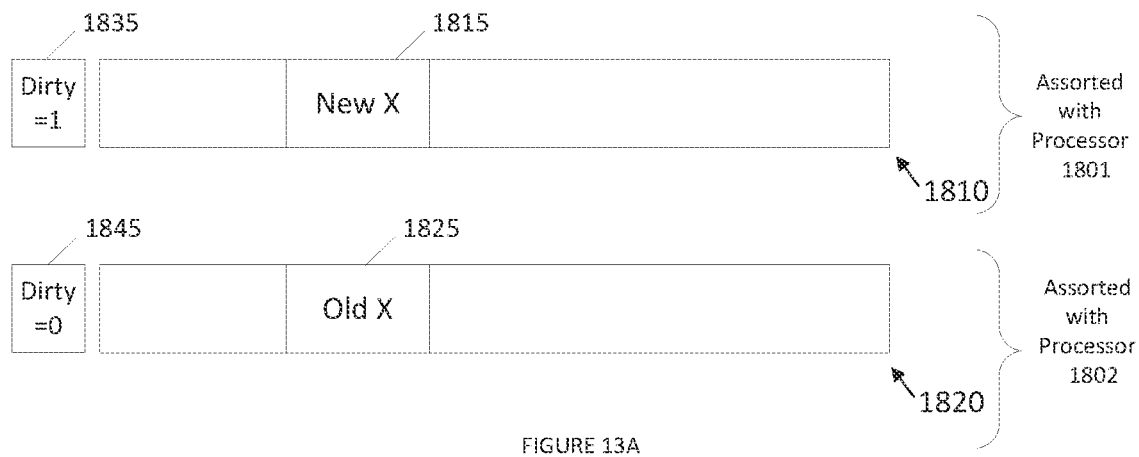
FIG. 13A illustrates true data sharing among multiple processors according to examples of the disclosure.

FIG. 13A shows the cache lines of two different processors that are engaged in true sharing. Cache line 1810 is the local cache for processor 1801 (not shown) and cache line 1820 is the local cache for processor 1802 (not shown). Both cache lines 1810 and 1820 store copies of variable "X" in segments 1815 and 1825, respectively. The copies of X saved in 815 and 825 were originally obtained from external memory, such as, for example, the external memory 1650 in FIG. 11. Segments 1815 and 1825 may be various sizes, but are usually multiple bytes of data.

Intentional true sharing occurs when a program running on processor 1801 is supposed to write to X and a program running on processor 1802 needs this modified/written value of X, not the value of X stored in its own cache 820 or in external memory. A potential problem may arise if processor 1802 needs to access the modified copy of X before processor 1801 has written that modified value to the external or main memory. In that case, the modified value of X exists only in segment 1815 in cache line 1810 (i.e., in processor 1801's cache), which is not directly accessible by processor 1802. The values of X in processor 802's own cache (i.e., the value of X in segment 1825 of cache 1820) and in external memory will not be up to date with respect to the latest modifications made by processor 1801. Instead, the only memory storing those latest modifications of X will likely be segment 1815 in cache 1810. Therefore, in order for this modified value of X to be shared between processors 1801 and 1802, a mechanism and/or protocol for transferring the modified value of X needs to be implemented.

"Accidental sharing" is another potential true sharing issue. In accidental sharing, a program running on processor 1802 may not be aware that it needs to or should use a version of X that has been modified by the program running on processor 801. Then, the program running on processor 1802 may access an outdated copy of X, and subsequently use that outdated value to make calculations or determinations. Errors based on using the outdated value of X could then be propagated to other programs and routines that interact with the program running on processor 1802.

The difference between accidental and intentional true sharing is in the intent of the programmer(s). In intentional true sharing, code for the processes running on two processors (e.g., processors 1801 and 1802) is written in such a way that the need for processors 1801 and 1802 to communicate through a variable (X in the example above) is known in advance of the sharing. In accidental true sharing, the programmer(s) did not realize that two programs running concurrently or in parallel would attempt to access the same data. In the case of accidental true sharing, the concurrent access happens as a result of a bug.

Figure 13B:
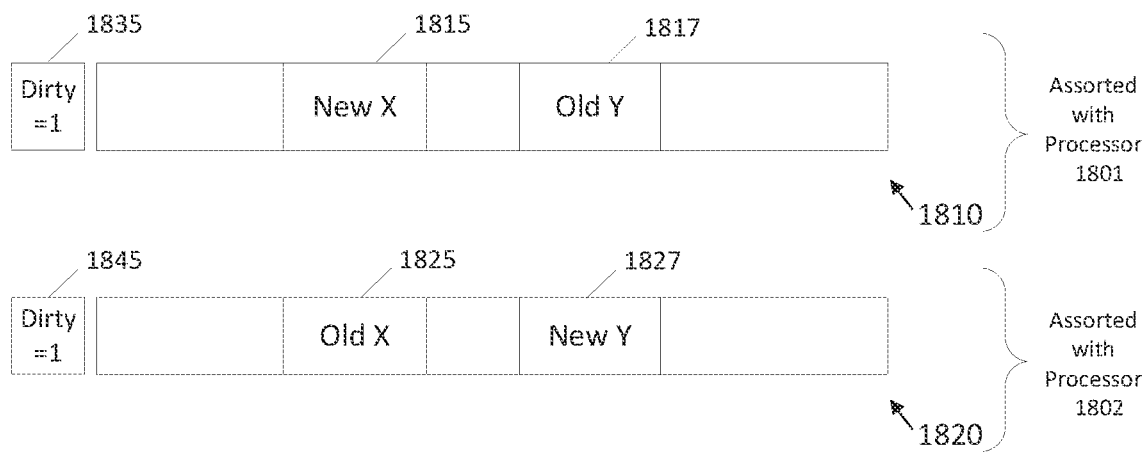
FIG. 13B illustrates false sharing among multiple processors.

In the context of both intentional and accidental true sharing, one way of keeping track of which data has been written and which data has not been written is by using "dirty" bits 1835 and 1845 (FIGS. 13A and 13B). Note that the reference to "bits" is not meant to be limiting. Dirty "bits" can be greater in size that one bit (in this case, "dirty bits" may be more appropriately referred to as "indicators") and can store information in addition to that described herein. Dirty bits generally store one of two values, a first value indicating that data has been written during a certain time period (e.g., the time period since the dirty bit was last reset) or under a certain condition, and the other indicating that the same data has not been written in the same time period. In the examples shown in FIGS. 13A and 183B, dirty bits 1835 and 1845 are actually "dirty line bits," meaning that the "variable" whose write status is specified by dirty bits 1835 and 1845 is actually the entire cache lines, 1810 and 1820, respectively. In other words, writing to any segment of cache line 1810 or 1820, not just 1815 or 1825, will set the respective dirty bit 1835 or 1845 to indicate a write has occurred. Alternatively, dirty bits can be assigned to specify the status of individual variables X stored at segments 1815 and 1825. In the examples shown in FIGS. 13A and 13B, the dirty bits 1835 and 1845 are used such that when they are set to "1" a write has occurred in the respective cache line. When they are set to "0," no write has occurred since the last reset of dirty bits 1835 and 1845.

As the example in FIG. 13A shows, writing a "New" value to the variable X at segment 1815 will set dirty bit 1835 to "1." This setting indicates that a write to cache line 1810 has occurred. Conversely, since no write to any segment of cache line 1820 (including variable X stored in segment 1825) has occurred since the last reset, dirty bit 1845 remains set to "0." In this situation, the dirty bits 1835 and 1845 indicate that the data in cache lines 1810 and 1820 are out of sync. However, they do not indicate which segment(s) (i.e., segments 1815 and 1825 representing variable X) are out of sync.

False Sharing

FIG. 13B shows the situation of "false sharing" that may arise, for example, in the configuration discussed in FIG. 13A when two different variables in copies of the same external memory cache line are written by processors 1801 and 1802. Specifically, "false sharing" occurs when processor 1801 modifies variable X and processor 1802 modifies another variable, Y, both stored in the same cache line in external or main memory. This can lead to the following consequences.

As shown in FIG. 13B, the local cache lines 1810 and 1820 keeping X and Y are both "dirty," as indicated by bits 1835 and 1845, respectively. However, they are dirty for different reasons. Cache line 1810 is dirty because it contains a new or updated value of X at 1815. Cache line 1820, on the other hand, is dirty because it contains a new or updated value of Y at 1827. Therefore, cache line 1810 contains an old or outdated copy of Y at 1817 and cache line 1820 contains an old or outdated copy of X at 1825. This means that processors 1801 and 1802 will eventually write the contents of cache lines 1810 and 1820 back to external memory. Since cache lines 1810 and 1820 are both local copies of the same cache line in external memory, they need to be written to that same cache line in external memory. Since the writes cannot be accomplished at the same time, one of the writes must overwrite the other. This leads to lost work and potential errors. If processor 1801 writes back its value of the cache line 1810 first, then processor 1802 will eventually overwrite New (or updated) X stored in 1815 with Old X stored in 1825. Conversely, if processor 1802 writes its data back first, then processor 1801 will overwrite New Y stored in 1827 with Old Y stored in 1817.

This overwriting and the resulting lost data is called "false sharing" because neither variables X or Y are "truly shared" between the processors 1801 and 1802. Instead, X is only accessed by processor 1801, not 1802, and Y is only accessed by processor 1802, not 1801. This "false sharing" may cause problems similar to those described in the context of true sharing above.

Addressing Data Coherence Issues in True or False Sharing

As discussed in the Background section above, both hardware and software systems are available to address cache coherence issues. These systems, such as those implementing "full cache coherence," often introduce additional complexity in terms of hardware, software, or both dedicated to sharing data between processes. In embodiments described herein, additional hardware for addressing false sharing may be implemented along with a software scheme for addressing true sharing. The software scheme may reduce the potential for problems relating to shared data by curtailing or eliminating data sharing of concurrent processes. Because of this, the hardware and software described herein may potentially avoid or reduce many issues in cache coherence even while running on systems without the additional hardware and other complexities needed to be introduced in order to accomplish data sharing under "full cache coherence."

Hardware for Addressing False Sharing

Figure 14:
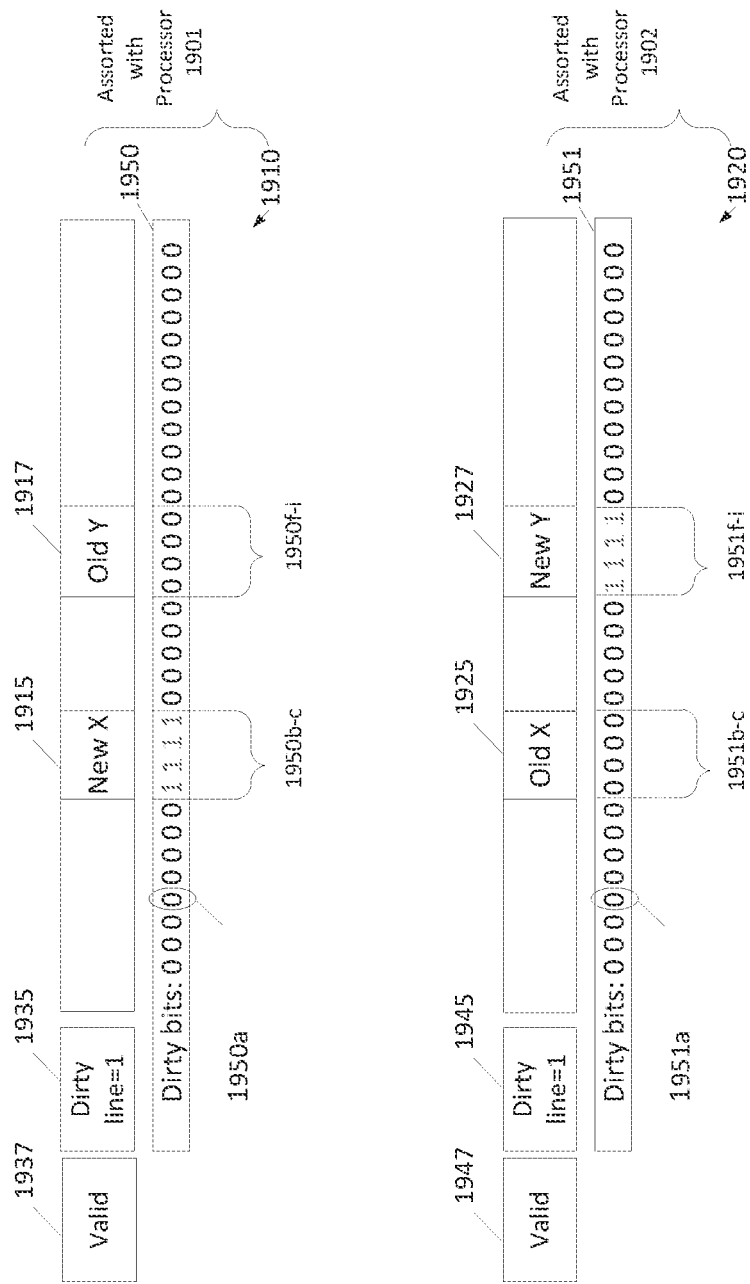
FIG. 14 illustrates hardware addressing false sharing according to examples of the disclosure.

FIG. 14 shows one way to address false sharing in the context of the present disclosure. In FIG. 14, cache line 1910 is local to processor 1901, while cache line 1920 is local to processor 1902. Similarly, as in the context of FIGS. 13A and 13B, both cache lines 1910 and 1920 store a copy of the same external memory cache line (not shown), which contains two variables X and Y. Note that, although FIG. 14 shows only a single cache line 1910/1920 for each cache, each cache may include multiple cache lines. As shown in FIG. 14, both cache lines 1910 and 1920 are marked as "dirty" by bits 1935 and 1945, respectively, because both contain newly modified or updated data that needs to be written back to the external memory. This is because local caches 1910 and 1920 include different updates of the data for X and Y, respectively. Specifically, cache 1910 includes a new or updated value for X at segment 1915, while cache 1920 includes a new or updated value of Y at 1927. Cache 1910 also contains an outdated or unmodified copy of Y at 817 and cache 1920 contains an outdated or unmodified copy of X at 1925.

As shown in FIG. 14, caches 1910 and 1920 also each contain an additional array of bits at 1950 and 1951, respectively. Collectively, these are known as the "dirty bits" associated with various bytes of their respective cache line. In the example shown in FIG. 14, there is one dirty bit in 1950/1951 for every byte in cache 1910/1920. This particular arrangement, one dirty bit per cache byte, is helpful to track the write status of each bit, and therefore each variable, in the cache. However, it should be understood that other arrangements are possible and there may be bytes in caches 1910/1920 that do not have an associated dirty bit.

A dirty bit per cache line byte can be used to monitor the write status of cache line bytes as follows. The dirty bits 1950/1951 can all be initially set to "0," for example, when the cache line data is first fetched from external memory into cache lines 1910/1920. Subsequently, when a byte in local cache lines 1910/1920 is modified, its corresponding dirty bit can be set to "1." This arrangement is shown in FIG. 15.

The example in FIG. 14 shows this arrangement implemented for several bytes. For example, the bytes corresponding to dirty bits 1950a and 1951a have not yet been modified by either processor 1910 or 1920. Therefore, they remain set to "0." In contrast, each of the four bytes corresponding to the variable X in cache line 1910 have been updated or modified by processor 1910. Therefore, the four dirty bits 1950b-c corresponding to these bytes have all been set to "1." Since processor 1920 has not modified or updated the variable X, the corresponding dirty bits 1951b-c in cache line 1920 remain set to "0." Since each of the four bytes corresponding to variable Y in cache line 1920 have been modified by processor 1920, the four dirty bits 1951f-i corresponding to these bytes have all been set to "1." Since processor 1901 has not modified Y, the corresponding dirty bits 1950f-i remain set to "0."

The dirty bits taken together logically may make the "dirty line" bits 1935/1945 redundant. This is because the dirty line bits 1935/1945 indicate that the cache line 1910/1920 is dirty if and only if at least one byte is dirty. Despite this redundancy, it may still be desirable to still maintain dirty line bits 1935/1945. Since they are single bits, the dirty line bits 1935/1945 can generally be read more quickly and easily than all of the dirty bits 1950/1951 together. Moreover, examining the dirty line bits 1935/1945 to determine whether or not a value in caches 1910/1920 has been updated does not require performing any logical operations. Therefore, maintaining the dirty line bits 1935/1945 may allow the efficient assessment of the state of data in caches 1910/1920, despite any redundancy. The dirty line bits 1935/1945 may be maintained (i.e., written to explicitly) or computed from dirty bits 1950/1951.

As shown in FIG. 14, each cache line 1910/1920 may also include a "valid" (or "validity") bit 1937/1947. These valid bits 1937/1947 correspond to valid bits 1705a-n shown in the exemplary cache structure of FIG. 12.

As discussed in the context of FIG. 12, valid bits can be used to specify whether or not the associated cache line should be refreshed with data from the external memory. For example, setting valid bit 1937 to "0" indicates the data in cache line 1910 is invalid and needs to be refreshed. Accordingly, during the next read of data from external memory, processor 1901 will overwrite cache line 1910 with the current data stored in the corresponding cache line of the external memory. Setting valid bit 1937 to "1" indicates that the data in cache line 1910 is valid (i.e., that there is no need to overwrite the cache line 1910 with data from external memory). In this way, the valid bit 1937 can be used to refresh relevant cache lines whenever a new process is launched or initiated. Note that, as discussed herein, "launching" a process can generally mean beginning execution of that process either remotely or locally. Once a process is launched, it may initiate by, for example, copying values to local memory. For example, a process initiation may automatically set all valid bits (e.g., 1937 and 1947) equal to "0" so that all cache lines will be updated with values stored in external memory as soon as possible. This process is referred to as "invalidating" the cache data. A process may also invalidate the cache after it has written data to the external memory. As discussed in more detail below, setting valid bits 1937 and 1947 to an invalid state (e.g., to "0"), may be performed subsequent to a write-back when the cache lines 1910/1920 have been written to external or main memory. Invalidating the caches 1910/1920 upon write-back at the end of a process, for example, can allow the caches 1910/1920 to be updated with fresh data from external memory (e.g., validated) before the next process begins. Caches 1910/1920 may also be validated by setting the valid bits 1937 and 1947 to an invalid state upon initiation of the cache 1910/1920 and in still other situations.

Processors 1901/1902 can use dirty bits 1950/1951 to determine when and how to write to external memory to reduce or eliminate the problem of false sharing. For example, processors 1901/1902 may generate a single memory request to write their entire cache lines 1950/1951 to external memory. When writing the cache line, processors 1901/1902 may use the dirty bits 1950/1951 to only write those bytes which are dirty (e.g., have a value of "1" in the example shown in FIG. 14). In the example, processor 1901 will only write the new or modified value of X stored in 1915*b-c*, and will not change any other value in the cache line of the external memory. This means that in the case in which processor 1902 has previously written an updated value of Y (i.e., the updated value stored in 1927) to the external memory, processor 1901 will not overwrite that updated value of Y. If the writes occur in the opposite order (i.e., with processor 1901 using dirty bits 1950*b-c* to write the updated value of X first, followed by processor 1902 using dirty bits 1951*f-i* to write an updated value of Y), the second write will not overwrite the updated value of X. This is because processor 1902 will use dirty bits 1951*f-i* to write only the new value of Y in 1927 to the external memory. It will not change the value of X in external memory because the dirty bits corresponding to the value of X in cache line 1920 (i.e., dirty bits 1951*b-c*) are set to "0." Therefore, regardless of the order in which the writes occur, overwriting of newly updated data can be avoided.

Writing cache lines 1910/1920 to external memory using the dirty bits 1950/1951, as described above, can be accomplished using standard bus protocols. For example, a single memory request for an entire cache line write can be made, as described above. In this case, the write can take advantage of I/O Coherence protocols, such as the software I/O coherence protocols described in "Maintaining I/O Data Coherence in Embedded Multicore Systems," T. B. Berg, Micro, IEEE 29(3): pp. 10-19 (2009). Such standard cache coherence protocols provide hardware mechanisms used by the caches 1910/1920 to request and give up ownership of shared data. More specifically, "I/O coherence" involves a protocol in which a first processor 1901 (if 1901 is an "I/O coherent device") can read data from second processor (e.g., processor 1902, where 1902 is a CPU providing support for I/O coherent devices). In I/O coherence protocol, processor 1901 is guaranteed to get the most up-to-date copy of shared data from processor 1902. Processor 1901 can also perform a write such that processor 1902 can retrieve the latest copy of shared data. As discussed in more detail below, those protocols may be used in conjunction with any of the solutions or embodiments described herein.

According to an embodiment of the invention each core is configured to outputs (during one or more cycles) a content to be written to a cache line as well as the associated validity bits to the external memory 1650. The external memory 1650 is capable of processing the validity bits and to update the line of the cache only by the updated cache line byte. The external memory may, for example, be byte enable configured—and be able of updating a cache line only with selected bytes.

Referring to the example of FIG. 13B—the external memory 1650 may receive cache line content 1810 from processor 1801 (includes modified variable X 1815) and receive cache line content 1820 from processor 1802 (includes modified variable Y 1817)—both related to the same line—during one or more cycle (simultaneously and/or serially)—and may modify only variable Y and X accordingly—using a byte enable protocol.

In another exemplary approach, a memory request can be generated per "dirty byte" (i.e., per byte of cache data corresponding to a dirty bit), or per group of adjacent dirty bytes. This method would require a separate write for each dirty byte.

Alternatively, "byte enable bits" may be used to govern which data in the case lines 1950/1951 will be written to external memory in a single write. Setting byte enable bits equal to "1" indicates that the data corresponding to these bits is to be written to external memory. Setting the byte enable bits to "0" indicates that the data corresponding to the bits will not be written. Therefore, the byte enable bits could be set according to the dirty bits 1950/1951. More specifically, byte enable bits corresponding to the single memory cache line write can be set to "1" when the corresponding dirty bits 1950/1951 indicate that the data have been modified by processor 1901/1902. Byte enable bits for all other data in the write may be set to "0." Setting the byte enable bits this way results in only the modified or updated data being written to external memory.

This type of write is supported by I/O coherence protocols discussed above. More specifically, I/O coherence supports the writing of less than a full cache line, typically by employing byte enable bits in the bus requests. In other words, if processor 1901 is an "I/O coherent device," it automatically uses byte enable bits as described above.

The single write approach is relatively efficient at least because it requires fewer writes operations to write multiple updated variables to external memory. For example, in the case in which cache line 1910 had two updated variables each 1 byte in size (e.g., variables A and B), employing byte enable bits would allow both variables to be written to external memory with a single write operation. This advantage is particularly significant when the external memory writes in data bursts (e.g., DRAM). In that case, if the cache line 1910 size and the DRAM burst size are equal (e.g., 64 bytes), writing both A and B would require issuing only a single 64-byte burst with the byte enable bits corresponding to variables and B set to "1." This write would be twice as efficient than the alternative (i.e., using a burst to write each dirty byte of A and B separately). This is because writing A and B separately requires two single-byte bursts. However, even though on-chip bus protocols may support single-byte bursts, DRAM memory does not. Then, the 2 single-byte bursts will require two bursts from DRAM. For DRAM with a 64-byte burst size, this will require two 64-byte bursts to write A and B to external memory.

Software for Addressing True Sharing

FIG. 11 illustrates a diagram illustrating an arrangement between processes according to examples of the disclosure. The arrangement in FIG. 11 can address the true sharing problems described above, both accidental and intentional. As will be described in more detail below, one feature of the system represented in FIG. 11 is that all processes are coded such that two concurrently running processes do not access writeable (or "mutable") variables.

FIGS. 16A and 16B illustrates a non-limiting example of two processes that are executed by two processors whereas these two processes are designed (programmed) not to access the same segment (for example the same byte) of the same memory line (even different version of the content of the same memory line) at the same time. One process may be prevented from accessing the same segment of the same memory line during any predefined period of time. The period of time may be lengthy (for example—thousands and even tens of thousands of cycles). It should be noted that the two processes may not be related to each other and one process does not necessarily trigger or control the other process.

The combination of the prevention of true collision and the management of false collision provides a robust coherent memory management scheme.

In the example shown in FIGS. 16A and 16B, two processors 1901 and 1902 run two different processes, A and B, respectively. FIG. 16B shows the duration of processes A and B over the course of a timeline. Note that, although only two processes A and B are shown in the timelines of FIGS. 16A and 16B, this is not meant to be limiting. In fact, many more processes may be launched in sequence than are shown in FIGS. 16A and 16B. The timeline begins at "0" and shows six stages (11105-11130). The structure of the caches 1910/1920 associated with processors 1901/1902 is shown in FIG. 14.

As indicated in FIG. 16B, processes A and B are run concurrently in the sense that process A runs from the duration of the entire timeline (0 to 11130) and process B runs for only a portion of the timeline (11110 to 11125). When process A is launched at 0 on processor 901, its first task may be initiate by "writ[ing] inputs" (i.e., copy the variables it needs from external memory (not shown) to processor 901's local cache 1910). Examples may include variables X and Y represented in FIG. 14. Process A may set all the valid bits 1937 for each line in cache 1910 equal to "0," so that the next read from external memory will overwrite the cache lines 1910. It can be advantageous to set the valid bits 1937 this way so that every cache line 1910 is assumed invalid. Then, new inputs can be read freely from external memory with assurance that the cache 1910 will not contain any outdated values written by previous processes as new processes execute. After inputs are read into cache 1910 and process A executes, process A may perform operations that modify variables in cache line 1910 (e.g., X and/or Y). When this happens, process A can write the modified values of the variables to local cache 1910, setting the dirty bits 1950 corresponding to the newly written variables equal to "1."

11105-11110 Launching Process B

Process A may be running on processor 1901 such that 1901 is a "consumer" processor, while processor 1902 is a "producer" processor. In this case, process A may launch process B on processor 1902, as shown in FIG. 16A at 11110. Process B may be, for example, a computational process that takes a relatively long time to complete.

At launch of process B (11110), the valid bits 1947 in cache 1920 may be invalid, e.g., equal to "0" (i.e., indicating that the data in cache 1920 needs to be refreshed with values from external memory). In this way, new inputs can be read freely from external memory with assurance that the cache 1920 will not contain any outdated values written by previous processes as the new process executes. For example, process B may read variables X and Y (FIG. 8).

11110-11115 Process B Executes without Sharing Variables

During this period process B executes. As it does so, it may read additional variables into its cache 1920 and/or modify variables in the cache 1920. For example, it may modify variables X and Y. When this happens, it will store the modified variables in its local cache 1920, setting the corresponding dirty bits 1951 equal to "1" to indicate modified data, as shown in FIG. 14. When data is modified, process B may further set the valid bit 1947 to "0," indicating that the cache line 1920 is no longer valid.

During the period in which process B executes, as shown in FIG. 16A, process A may still be executing, so long as its execution does not require variables that may be accessed by process B. In the example, if process B is accessing mutable variables X and Y, process A will not be allowed to access X and Y until process B terminates at 11125. Moreover, processor 1901 may also run other processes provided those processes also do not access variables being accessed by processor B. That is, no other process running on processor 1901 will be allowed to access variables X and Y while process B is executing. In this sense, while process B executes on processor 1902, processor 1901 is still free to run "independent work" (e.g., work that does not depend on variables potentially modified by process B). Restricting processor 1901 to "independent" work prevents sharing of mutable data. If processes running on processor 1901 concurrently with process B running on processor 1902 do not access the same mutable data or variables as process B, there can be no "true sharing" problems, as discussed above in the context of FIG. 8 above. Simply put, while process B is executing, no process can share any mutable data with process B.

11115-11125 Process B Terminates by Sharing all Mutable Variables

Process B's computations are complete at 11115. At this time, process B may initiate "write back," or the process of updating external memory with any changes it has made to variables in processor 1902's local cache 1920. Write back can be performed as described above in the context of FIG. 14 (e.g., by using dirty bits 1951 to set byte enable bits in order to write all modified data to external memory in a single write). Write back is generally iterated over all cache lines. As shown in FIG. 16A at 115-11120, this process may also set all of the valid bits 1947 for each cache line equal to "0" (i.e., invalidate each cache line). Invalidation and write back may be done simultaneously or separately.

As shown in FIG. 16A, from 11120 to 11125, process B may signal that it has completed execution. Signaling completion of process B, after write back, allows other processes access to any mutable variables used by process B. Because process B has already performed write back, the updated values of variables used by process B are now stored in external memory. In the example case, process B will have written back variables X and Y to external memory and, after the signal is received, process A (or any other process running on processor 1901) will then be able to access the newly modified copies of X and Y that processor B has just written to external memory.

11130 Process A Reads Outputs

After process B has terminated and signaled completion (11120-11125), process A (and any other process running on the system) may access the variables process B has just written to external memory. As shown in FIG. 16A, process A is free to read the outputs generated by process B from external memory. Those outputs can include any variables written to process B (e.g., variables X and Y in the example).

Model is Consistent With I/O Coherence

The true data sharing model described above, and in the context of FIG. 11, is supported by the I/O coherence protocol. More specifically, I/O coherence supports sharing data only at process "boundaries" (i.e., process launch 1105-11110 and termination 11115-11125). In fact, I/O coherence accommodates this type of data sharing because it is generally designed for the case where processor 1901 (the "I/O coherent device") has no cache. Because the protocol assumes no cache for processor 1901, processor 1902 is not aware of the state of processor 1901's cache. Therefore, processor 1902 supplies up-to-date copies of inputs to process A running on processor 1901, and, upon termination, writes out its data to external memory as it would if it were a cache-less I/O device (11115-11120).

Increased Consistency of Results

As discussed above, the software for addressing true sharing (FIG. 11) essentially prohibits or reduces sharing of data among concurrently executing processes. Because data sharing is reduced or eliminated during execution, the order that processes write to shared variables in external memory is more consistent. In fact, where this restricted sharing is rigorously or strictly applied, the order of processes writing to external memory can be considered fixed or unchanged, leading to more consistent or even deterministic results.

This is best shown by example. In the example shown in FIG. 11, process B will write/update any variables it modifies to external memory at 11115. This is, by deliberately imposed constraint, before process A will update any data or variables it shares with process B. In other words, because process A cannot access any mutable data being used by process B until process B terminates execution by writing its data to external memory (11115) and signaling completion (11125), process B will always write any mutually shared data before process A does. This means that, in certain embodiments represented by the example shown in FIG. 11, any mutually shared data (e.g., variables X and Y) will always be updated first by process B and second by process A. So long as processes A and B are both themselves deterministic (i.e., do not produce random data), the result produced by the system in FIG. 11 should also be deterministic.

In contrast, systems facilitating sharing of mutable data by concurrent processes will result in non-deterministic and, sometimes, unpredictable updating of shared data/variables. This is because such systems do not fix the order in which processes update variables in external memory. One example is a system employing data locks to prevent coherence issues while allowing concurrent processes to share data. A data lock is a variable that must be checked out by a process before the process can alter data protected by the lock. When only one process can check out the lock at a time, only one process can modify the data at a time.

Therefore, implementing the lock can reduce coherence issues by preventing simultaneous access/updating of the data. However, even if they may not access the lock simultaneously, two processes (e.g., processes A and B in FIG. 11) may still access the lock and data during concurrent execution. In this situation, the order in which the two processes write to external memory can be determined by a variety of factors, including the specifics of data input to the system. Even the ordering of the input data (e.g., sorting the input data by different criteria) could potentially change the order in which the two processes write to external memory. Since certain results may depend on the order in which the processes update the data in the external memory, this system may have considerable variability of results or outcome.

Figure 16C:
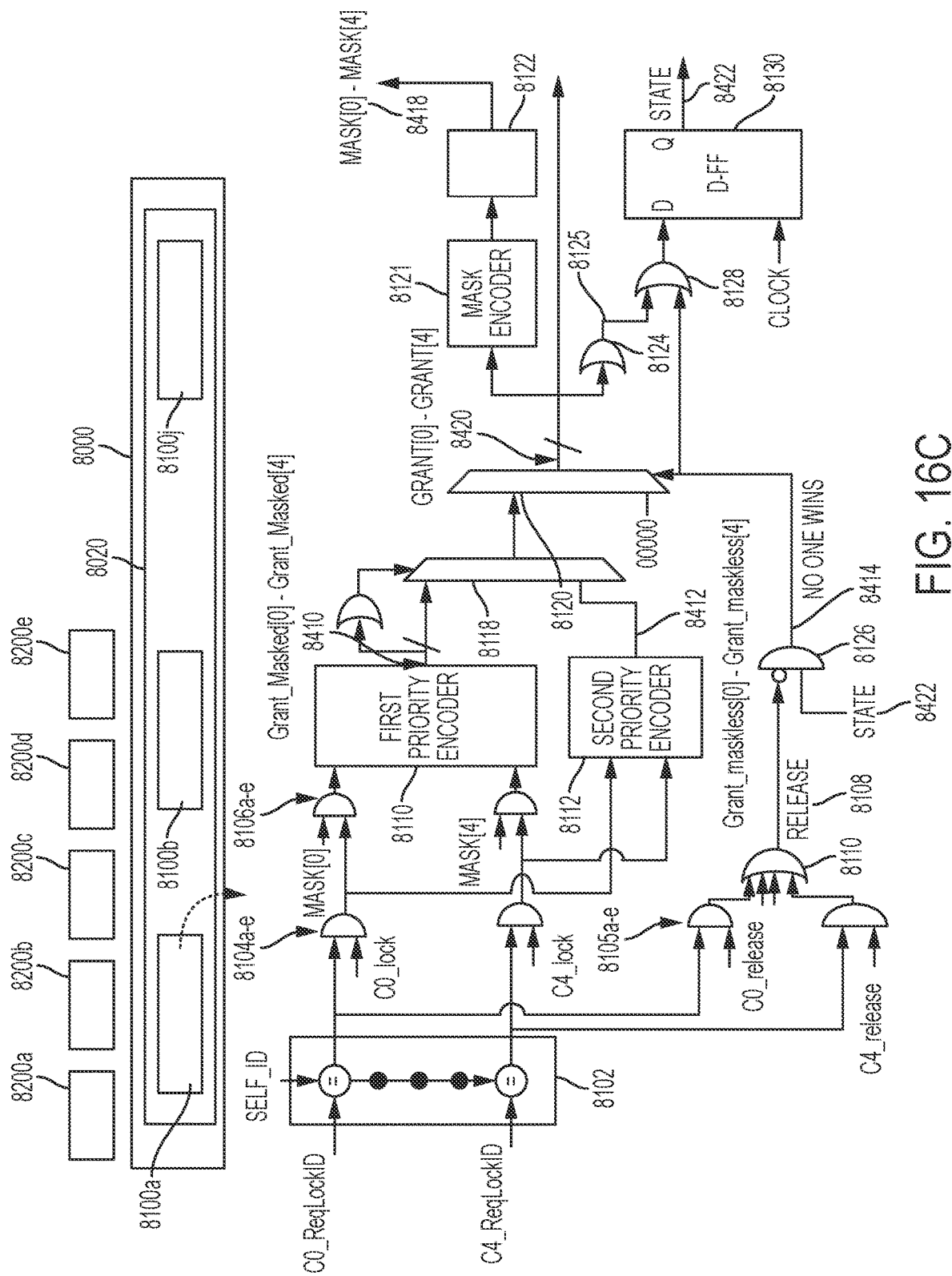
FIG. 16C illustrates data locks according to examples of the disclosure.

FIG. 16C illustrates data locks 8100*a-j* and data lock requestors 8200*a-e* according to an embodiment of the invention.

It is assumed that requests to lock a data lock may be generated by data lock requestors 8200*a-e* that belong to processors 1604*a-n* of FIG. 11 or to processor cores 604*a-d* and serial processor 616 of FIG. 6A. It is assumed that there are five processors. Any number of processors/requestors may be provided.

Data locks 8100*a-j* may belong to a data lock section 8020 of ITC 8000 but may be located elsewhere.

The number of data locks may be 256—but this is not necessarily so. There may be provided a tradeoff between the number of data locks and the function the data locks may serve. For example, when data locks are used to protect a content of a histogram bit there may be 256 data locks per 1024 bins—although any relationship between the number of bins and data locks may be provided.

Requests to lock a data lock include an identifier of the data lock that should be locked and a lock command. In FIG. 16C the identifiers are denoted C0.ReqLockID-C4.ReqLockID and the lock opcodes are denoted C0.lock-C4.lock.

Requests to unlock a data lock include an identifier of the data lock that should be unlocked and an unlock opcode. In FIG. 16C the identifiers are denoted C0.ReqLockID-C4.ReqLockID and the unlock opcodes are denoted C0.release-C4.release.

Data lock 8100*a* includes a comparator 8102 (for comparing the identifier of data lock 8100*a*—"Self-ID" to each one of C0.ReqLockID-C4.ReqLockID) and logic gates (such as AND gates 8104*a-e* and AND gates 8105*a-e*) that form a request filter that noes not propagate data lock requests (lock or release) that are not related to data lock 8100*a*.

Requests for unlocking data lock 8100*a* send to AND gates 8105*a-e* to be logically AND with the outputs of comparator 8102 and the output of AND gates 8105*a-e* are fed to OR gate 8010 to generate a RELEASE signal 8108 that is indicative of a reception of one or more requests to release data lock 810*a*.

The output signals of AND gates 8104*a-e* are sent, along with mask bits (mask[0]-mask[5] of mask 8418) to AND gates 8106*a-e* that send to first priority encoder 8110 only requests that are masked by mask 8418. As will be explained with greater details below—mask 8418 is changed overtime in order to provide a dynamic arbitration scheme. A mask may allow the processing of masked requests to lock data lock 8100*a*.

First priority encoder 8110 receives only masked requests to lock data lock 8100*a*, selects up to a single masked request and outputs a masked grant vector 8410 (including bits grant_masked[0]—grant_masked[4]) that is indicative of the selection. It is assumed that once a selection is made only one bit of the masked grant vector 8410 is set.

OR gate 8114 applies an OR operation on the bits of the masked grant vector 8410 to determine whether first priority encoder selected a single masked request.

While first priority encoder 8110 arbitrates between masked requests only—second priority encoder 8112 arbitrates between all requests regardless of the mask.

The first and second priority encoders 8110 and 8112 may apply any arbitration scheme. For example—the first and second priority encoder may select the request that has the lowest index. Any other arbitration scheme may be applied. The first and second priority encoders 8110 and 8112 may apply the same arbitration scheme or may apply different arbitration schemes.

The output signals of AND gates 8104*a-e* are also sent to second priority encoder 8112. The second priority encoder 8112 receives requests to lock data lock 8100*a*, selects up to a single request (regardless of the mask) and outputs a mask ignorant grant vector 8412 (including bits grant_maskless[0]—grant_maskless[4]) that is indicative of the selection. It is assumed that once a selection is made only one bit of the mask ignorant grant vector is set.

The masked grant vector 8410 and the mask ignorant grant vector 8412 are fed to first multiplexer 8118 and the selection between these two vectors is determine by a control bit that is outputted from OR gate 8114. If the first priority encoder 8110 selected a single masked request then masked grant vector 8410 is outputted from the first multiplexer 8118. If the first priority encoder 8110 did not select any masked request then the mask ignorant grant vector 8412 is outputted from the first multiplexer.

The value of the data lock 8100*a* is stored in a D type Flip flop 8130 and is denoted STATE 8422.

An AND operation is applied (gate 8116) between STATE 8422 and an inverted RELEASE 8108 to provide a "no one wins" signal 8414 that indicates that the data lock is locked and there is no request to unlock the data lock.

The "no one win" signal 8414 is fed to a second multiplexer 8120 so that when data lock is locked and there is no request to unlock the data lock the second multiplexer 8120 output a reset grant vector (such as 00000). Else—the second multiplexer 8120 will output the signals outputted from first multiplexer 8118—to provide a grant vector that is indicative of the selected request to lock data lock 1800*a*.

The grant vector 8420 is outputted to the processors that may (based on the content of the grant vector) be informed which processor succeeded to lock data lock 1800*a*.

The grant vector 8420 is sent to OR gate 8124 that outputs an output signal 8125. Output signal 8125 and "no one win" signal 8414 are fed to OR gate 8128 that resets flip flop 8130 only when both output signal 8125 and "no one win" signal 8414 are reset.

The grant vector 8420 is also fed to mask encoder 8121 that changes the mask 8414 and feeds the updated mask to buffer 8122. Buffer 8122 may be a FIFO.

The mask encoder may apply any mask change scheme. For example the mask encoder may generate a mask that identifies the selected request, rest the corresponding selected bit of the mask and all the lower significant bits of the mask (if such exist) and set all the bits of higher significance in the mask.

This hardware structure is compact, fast and easy to access and allows only a single processor to lock a single data lock per cycle.

Figure 16D:
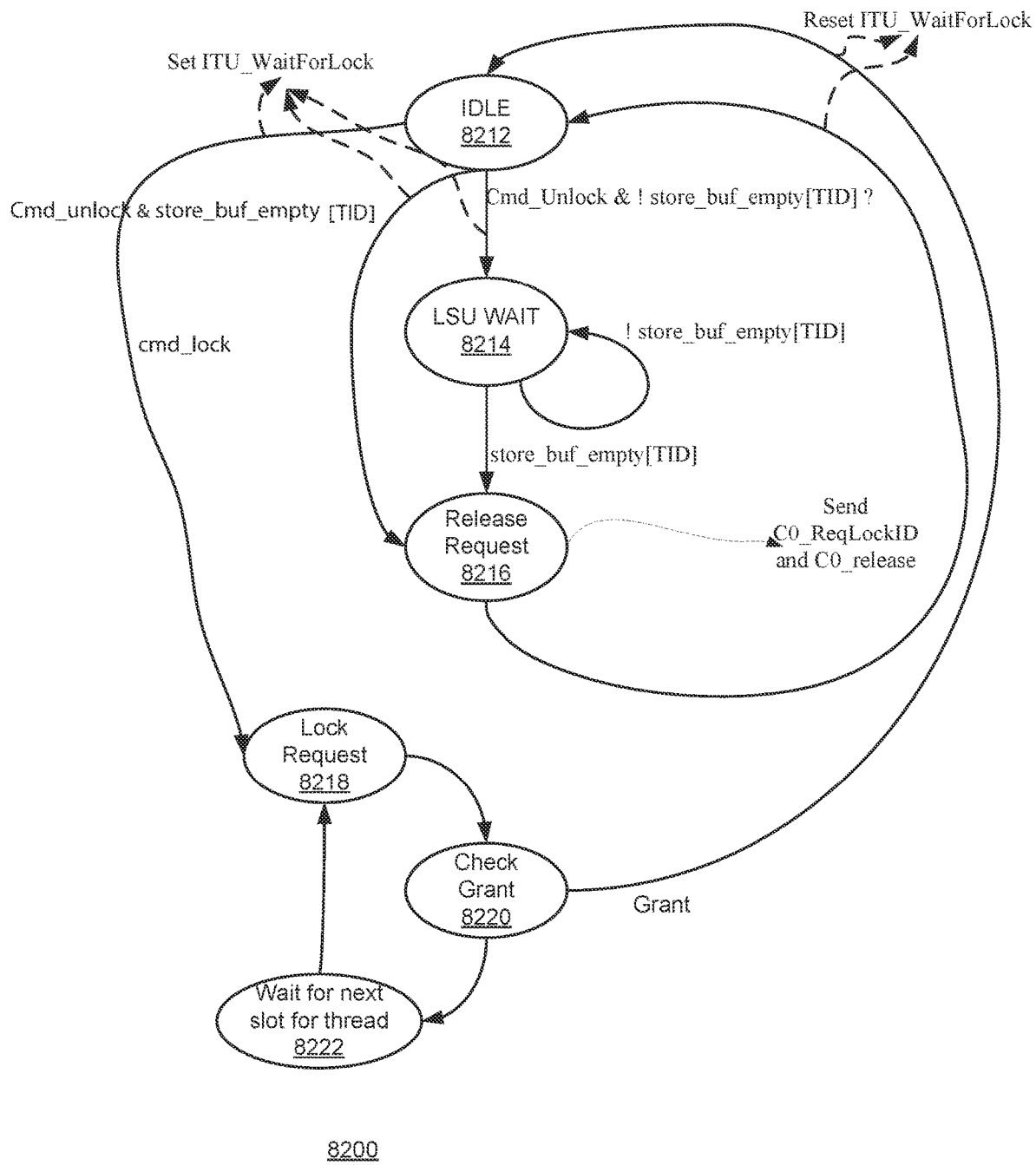
FIG. 16D illustrates a state machine according to examples of the disclosure.

FIG. 16D illustrates a state machine 8210 of a data lock update request according to an embodiment of the invention.

The state machine is executed by each one of data lock requestors 8200*a-e*.

The state machine 8210 starts by IDLE state 8212.

IDLE 8212 may be followed by state 8218 of determining to send a lock data lock request (cmd_lock).

IDLE 8212 may also be followed (if not determining to send a lock data lock request) by checking whether an unlock criterion was fulfilled—whether (a) the data lock requestor generated a data lock unlock command (cmd_unlock) and (b) a thread (or process) for which the data lock was locked by the data lock requestors ended. The completion of the thread or process may be detected in various manners—for example—detecting whether a write queue of the processor that was allocated for the thread or process is empty (store_but_empty[TID]).

Exiting IDLE also involves sending to the processor a request to stop fetching instructions from an instruction memory (set itu_WaitFor Lock)—preventing from executing a thread that is dependent upon the unlocking of a data lock.

If the an unlock criterion was fulfilled then jumping to state 8216 of else-jumping to state 8214 of waiting till the an unlock criterion is fulfilled.

State 8216 includes sending to ITU 8200 a request to unlock a data lock with the identifier of the data lock that should be unlocked (for example—C0.ReqLockID and C0.release).

State 8216 is followed by state IDLE 8212. The exit from state 8216 includes sending to the processor a request to resume fetching instructions from the instruction memory (set itu_WaitFor Lock)—allowing the execution of a thread that is dependent upon the unlocking of a data lock.

State 8218 is followed by step 8220 of checking a grant (to the lock data lock request). If the request has been granted state 8220 is followed by stage IDLE 8218. Else-state 8220 is followed by state 8222 of waiting to the next slot (allocated to the thread that is prevented from being executed until the lock data lock is granted) and step 8222 is followed by state 8218 (or by state 8220).

The state machine integrates data lock management as well as the barrel dispatching and provides a compact, fast and low real estate solution for thread management.

Increased Testing Reliability

Increased consistency of outcomes in the system of FIG. 11 can facilitate debugging. In this system, as discussed above, the order of updates to external memory is fixed by the constraint that no concurrent processes can access mutable data. This means that any code adhering to this constraint should be deterministic, at least in terms of the order it updates data to external memory. Therefore, one method of debugging such a program is to test for inconsistent or nondeterministic results based on, for example, the ordering or sorting of input data. If any such inputs yield inconsistent results then either 1) some processes in the system violate the constraint against concurrent processes accessing mutable data, 2) some processes are not themselves deterministic, or 3) both 1) and 2) apply.

Moreover, a debugging tool that addresses potential bug 1) can relatively easily be constructed by monitoring process dependencies and the reading/writing of data to external memory. In the model disclosed in FIG. 11, process A launching process B means the processes are interdependent. The restrictive sharing model allows only interdependent processes to share data. Specifically, process A launching B means that B can read memory written by A (1110).

It also means that once process B has terminated execution by writing its data to external memory (1125), process A can read memory written by process B (1130). Therefore, a simple debugging tool could be constructed as follows. The tool could a) store an ID of the last process writing to a particular variable and b) compare that ID against the IDs of processes reading from the variable since the last write. If the ID comparison indicates that the variable is read by a process not depending on the process that last wrote the data, it indicates that concurrent processes have shared mutable data. Similarly, if the ID comparison indicates that the data was last written by a process that does not depend on any processes that read the data since the write, it also indicates that concurrent processes have shared mutable data. Both instances would be bugs under the regime discussed in the context of FIG. 11.

Such testing could not be reliably implemented in systems that do not adhere to the constraint that concurrent processes cannot access mutable data. This is because such systems would be expected to have results that at least depend, to some extent, on the order of input data.

Therefore, according to the above, some examples of the disclosure are directed to a device comprising multiple processors that execute multiple processes, multiple caches associated with the multiple processors is provided. The device may comprise multiple caches comprising at least a first cache associated with a first processor. The device may further comprise a memory accessed by the multiple processors and storing multiple variables, wherein the multiple processors execute at least one of the multiple processes by initiating a first process of the multiple processes on the first processor by storing a subset of the multiple variables to the first cache, terminating the first process by writing an updated copy of the subset to the memory, and restricting access to the subset by the multiple processes other than the first process during execution of the first process. The multiple processes may comprise a second process, the execution of the first process on the first processor is launched by the second process executing on a second processor, terminating the execution comprises the first process invalidating the first cache and signaling completion to the second process, and upon receiving the signal, the second process accesses the subset. The device may include an indicator providing indication of at least a first state wherein the first processor has not written to a byte of data in the first cache, and a second state wherein the first processor has written to the byte of data in the first cache. The indicator may comprise a single bit. The indicator may be stored in the first cache. Terminating execution of the first process by writing an updated copy of the subset may comprise generating a request for a line of the first cache including the byte of data in the first cache, during the first state, writing the line to the memory such that a byte of cache data in the memory corresponding to the byte of cache data in the first cache is substantially unchanged, and during the second state, writing the line to the memory to overwrite the byte of data in the memory corresponding to the byte of data in the first cache. The multiple processors may comprise multiple cores, and the multiple cores share the multiple caches. An I/O Coherence protocol may enable the device to interface with another device.

Figure 16E:
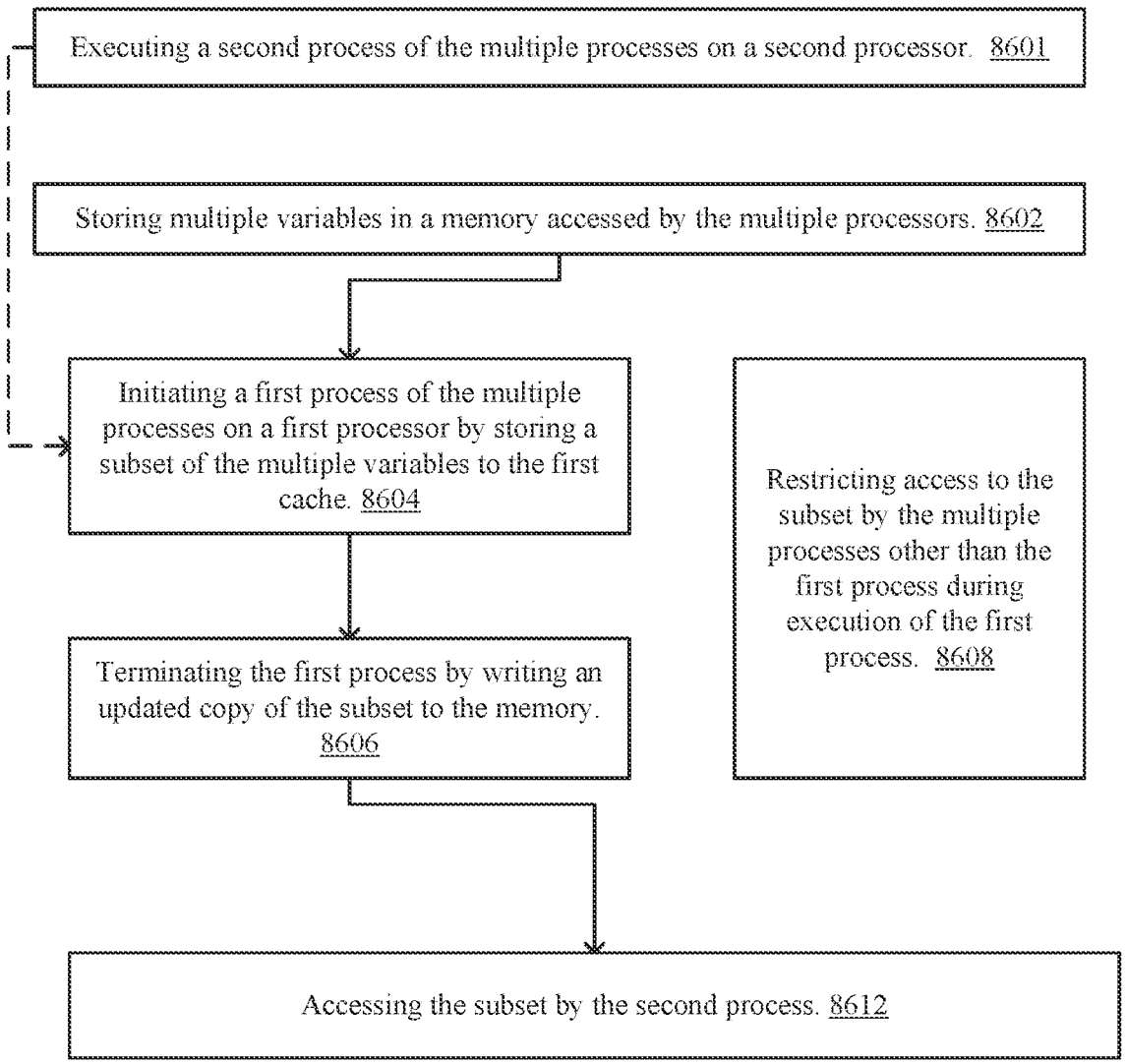
FIG. 16E illustrates a method according to an embodiment of the invention.

Some examples of the disclosure are directed to a method for executing multiple processes in a device with multiple processors and multiple caches, the multiple caches comprising at least a first cache. Referring to FIG. 16E, method 8600 comprising storing (8602) multiple variables in a memory accessed by the multiple processors, initiating (8604) a first process of the multiple processes on a first processor by storing a subset of the multiple variables to the first cache, terminating (8606) the first process by writing an updated copy of the subset to the memory, and restricting (8608) access to the subset by the multiple processes other than the first process during execution of the first process. The processes are designed such that during the execution of the multiple processes only up to a single process accesses the memory subset (for example a part of a memory line) at the same time.

The method may comprise executing (8601) a second process of the multiple processes on a second processor, step 8604 may include launching the first process by the second process, step 8606 may include terminating the first process by invalidating the first cache, and signaling completion to the process, and upon receiving (8610) the signal, accessing (8612) the subset by the second process. The method may comprise providing (8614) an indicator, the indicator providing an indication of at least a first state wherein the first processor has not written to a byte of data in the first cache, and a second state wherein the first processor has written to the byte of data in the first cache. The indicator may comprise a single bit. Step 8606 of terminating execution of the first process by writing an updated copy of the subset may include generating a request for a line of the first cache including the byte of data in the first cache, during the first state, writing the line to the external memory such that a byte of cache data in the memory corresponding to the byte of cache data in the first cache is substantially unchanged, and during the second state, writing the line to the memory to overwrite the byte of data in the memory corresponding to the byte of data in the first cache. The method may comprise sharing the multiple caches among multiple cores of the multiple processors. The method may comprise causing the device to interface with another device via an I/O Coherence protocol or by any other protocol such as a byte enable supporting protocol. The method may include outputting the indicator with the content to a memory that is capable of performing updates based on the indicator thereby managing false contention.

Some examples of the disclosure are directed to a non-transitory computer readable storage medium having stored thereon a set of instructions for processing instructions of a software program that when executed by a device with multiple processors and multiple caches, cause the device to store multiple variables in a memory accessed by the multiple processors, initiate a first process of the multiple processes on a first processor by storing a subset of the multiple variables to a first cache, the first cache being one of multiple caches in the device, terminate the first process by writing an updated copy of the subset to the memory, and restrict access to the subset by the multiple processes other than the first process during execution of the first process. The instructions may cause the device to execute a second process of the multiple processes on a second processor, launch the first process by the second process, terminate the first process by invalidating the first cache and signaling completion to the second process, and upon receiving the signal, access the subset by the second process. The instructions may cause the device to store an indicator, the indicator providing an indication of at least a first state wherein the first processor has not written to a byte of data in the first cache, and a second state wherein the first processor has written to the byte of data in the first cache. The indicator may comprise a single bit. The indicator may be stored in the first cache. Terminating execution of the first process by writing an updated copy of the subset may comprise generating a request for a line of the first cache including the byte of data in the first cache, during the first state, writing the line to the memory such that a byte of cache data in the memory corresponding to the byte of cache data in the first cache is substantially unchanged, and during the second state, writing the line to the memory to overwrite the byte of data in the external memory corresponding to the byte of data in the first cache. The instructions may cause the device to share the multiple caches among multiple cores of the multiple processors. The instructions may cause the device to interface with another device via an I/O Coherence protocol.

There may be provided a multiple-core processor device that may include multiple processing cores configured to execute multiple threads of a software program using barrel thread processing, one or more data caches, one or more instruction memories and an inter thread communication module that may include an atomic counters portion and a data locks portion for synchronizing between the multiple threads.

The inter thread communication module may or may not belong to the multiple processing cores the one or more data caches and the one or more instruction memories.

The data lock portion may include multiple data locks, wherein each data lock may include a mask for masking requests for locking the data lock, a mask encoder for changing the mask over time, a first priority encoder for selecting a selected masked request to lock the data lock and a second priority encoder for selecting a request to lock the data lock regardless of the mask.

The first and second priority encoders may apply a same arbitration scheme.

The first and second priority encoders may apply different arbitration schemes.

The multiple processing cores may include data lock requestors; wherein each data lock requestor is configured to execute a state machine for controlling a sending of requests to lock a data lock, of sending requests to unlock the data lock and for selectively preventing an execution of a thread.

The different data locks are binary variables and different threads may be executed only when the data locks are of a predefined value.

The atomic counter portion may include a memory module that may include multiple entries for storing multiple atomic counter values, an arbiter for selecting up to a single request for updating a given atomic counter at a cycle and a processor for updating the given atomic counter.

The number of the multiple entries may be smaller than a number of data locks of the data lock portion.

There may be provided a method (see method 6600 of FIG. 48) that may include executing (6610) by multiple processing cores, multiple threads of a software program using barrel thread processing, wherein the executing by the multiple threads may include synchronizing (6620) between the execution of threads by utilizing data locks and atomic counters of an inter thread communication module.

The inter thread communication module may or may not belong to the multiple processing cores the one or more data caches and the one or more instruction memories.

The synchronizing between the execution of threads may include managing (6622) multiple data locks, wherein a managing of a data lock may include masking by a mask requests for locking the data lock, changing by a mask encoder the mask over time, selecting by a first priority encoder a selected masked request to lock the data lock and selecting by a second priority encoder a request to lock the data lock regardless of the mask.

The method may include may apply ing, by the first and second priority encoders, a same arbitration scheme.

The method may include may apply ing, by the first and second priority encoders, different arbitration schemes.

The multiple processing cores may include data lock requestors; wherein the method may include executing (6630), by each data lock requestor, a state machine for controlling a sending of requests to lock a data lock, of sending requests to unlock the data lock and for selectively preventing an execution of a thread.

The method may include storing (6640) at multiple entries of a memory module multiple atomic counter values, selecting, by an arbiter, up to a single request for updating a given atomic counter at a cycle and updating, by a processor, the given atomic counter.

The number of the multiple entries may be smaller than a number of data locks of the data lock portion.

There may be provided a non-transitory computer readable storage medium having stored thereon a set of instructions for executing by multiple processing cores, multiple threads of a software program using barrel thread processing, wherein the executing by the multiple threads may include synchronizing between the execution of threads by utilizing data locks and atomic counters of an inter thread communication module.

Data Acquisition

Figure 17:
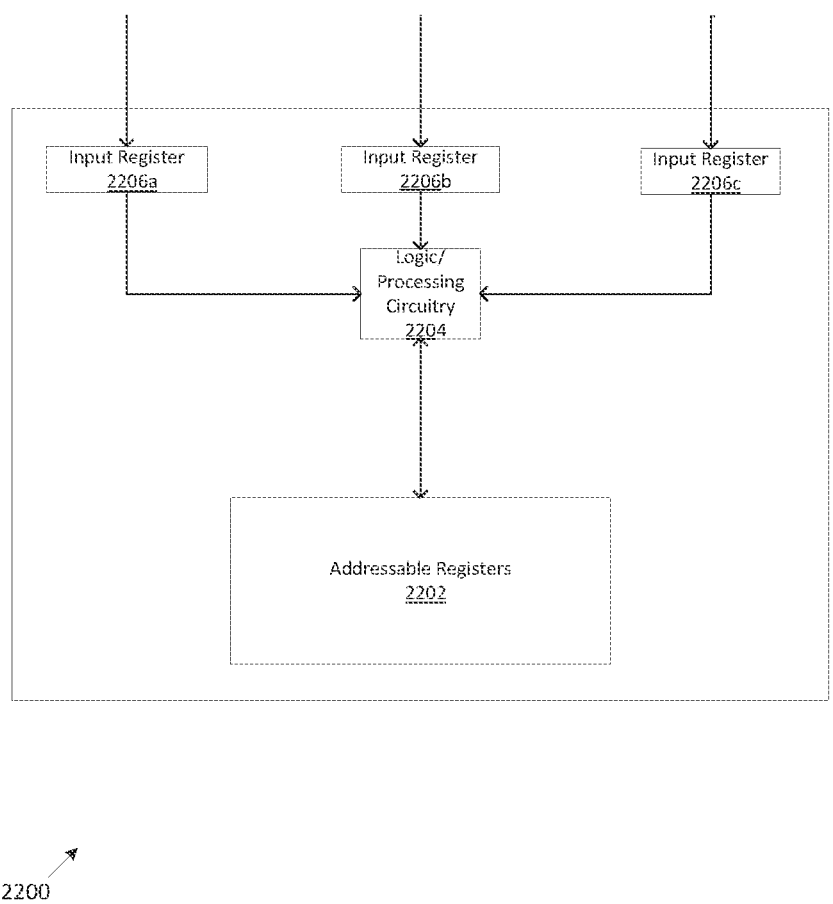
FIG. 17 illustrates an exemplary vector processor according to examples of the disclosure.

FIG. 17 illustrates an exemplary vector processor according to examples of the disclosure. The vector processor 2200 can include an array of addressable registers 2202 that store data. The vector processor 2200 can take in data from external sources at a plurality of input registers 2206a-2206c and store the data in specific memory locations within the addressable registers 2202. In one example, the input registers can input command parameters (e.g., an opcode of a command) and its associated operands. The operands may include either data or address operands that can reference at least one register of the array. Based on the input command parameter, logic/processing circuitry 2204 can process the data stored in the addressable registers. A complete discussion of an exemplary vector processor is provided in U.S. Pat. No. 8,300,058, which is herein incorporated by reference in its entirety.

Memory banks may be employed in conjunction with the systems 100 and 2200 described above in order to provide requested data. One example of a type of memory read is called a "scalar" read. A scalar read is generally reading a single value from a single memory address. Another type of memory read is a single "vector" read that reads multiple vector values using a single address of the vector in memory as a starting point. In other words, a vector reads would read all values of a vector V(v0, v1, v2, ... ) by using the vector address "A" to extract the particular values using that address. A typical vector read relies on the data for the vector being read to be proximate in memory. The vector read would be able to load the values of the vector V by using the understanding that, if the address for the vector is A, then component v1 is located in memory at A+1, component v2 is located at A+2 in memory, component A3 is located at A+3 in memory, etc. In the eight-byte example discussed above, the single vector read would use a single access to retrieve eight bytes of contiguous data, where each of the 8 bytes corresponds to a different component of a vector. The data in a single vector read would most likely be stored in a single memory. However, vector reads to multiple memories may be possible in some implementations.

Figure 18:
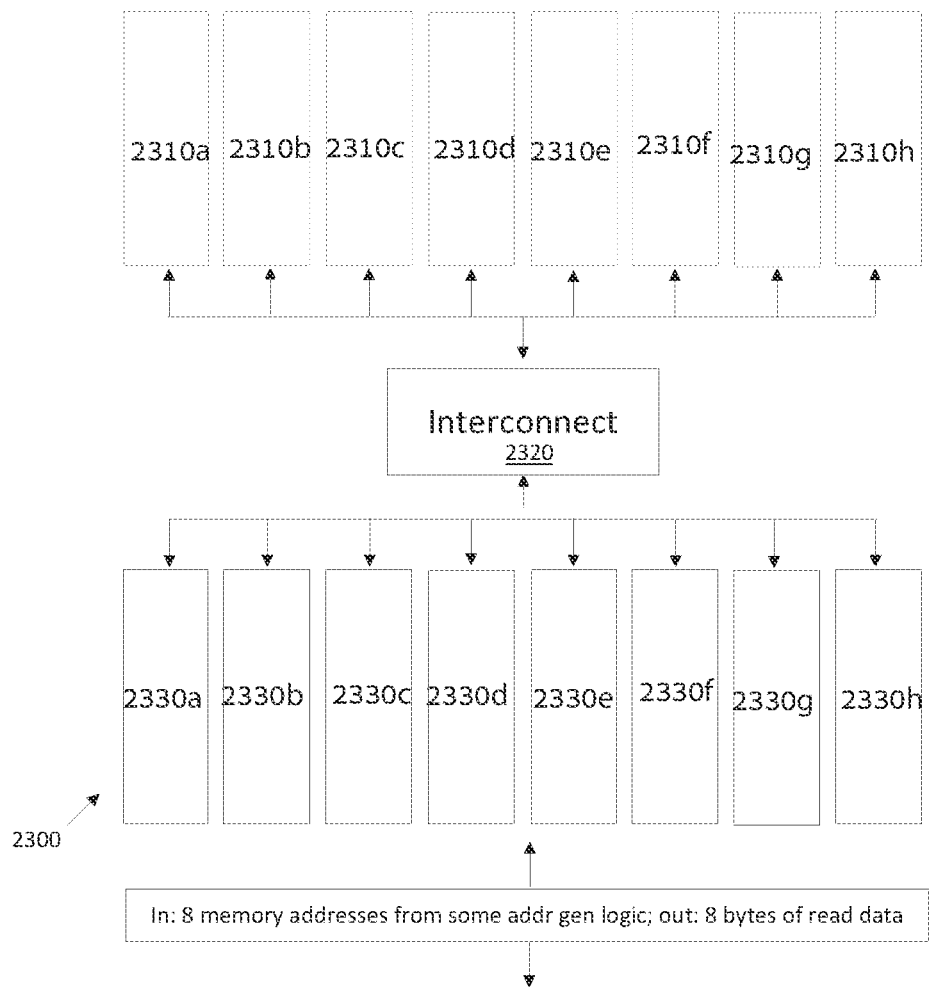
FIG. 18 illustrates exemplary memory bank and interconnect architecture according to examples of the disclosure.

FIG. 18 shows an alternative to the single memory access "single vector" read described above. Specifically FIG. 18 shows an architecture 1300 that can enable a "gather" data read from multiple memory banks. Gather is also a vector read of data, in the sense that, in some implementations, it can retrieve vector data. Again an 8-byte read is chosen as an example to illustrate implementation of the architecture 2300 shown in FIG. 18. However, it is to be understood that a read of any suitable number of bytes is possible with architectures like architecture 2300 within the context of the present disclosure.

As shown in FIG. 18, architecture 2300 can replace a single memory bank with eight separate memory banks 2310*a-h*. Architecture 2300 may further include a number of memory initiators 2330*a-h* (eight memory initiators in the example) connected to the memory banks 2310*a-h* via an interconnect 2320. Each initiator 2330*a-h* can forward an address corresponding to requested data to one of the memory banks 2310*a-h* via interconnect 2330. The interconnect 2320 can route that address to the appropriate bank 2310*a-h* so that the bank 2310*a-h* can provide the requested data. Generally, each initiator 2330*a-h* is capable of routing an address to access data in each of the banks 2310*a-h*. However, in some embodiments, initiators 2330*a-h* may be pre-assigned to a specific bank or subset of banks 2310*a-h*.

Interconnect 2320 can be implemented by any suitable architecture, including using crossbars, switches, arbitration, or other interconnect hardware. Interconnect 2320 may further include multiple instances of these components and various arrangements of these and other components. In certain implementations, it may be advantageous for the interconnect 2320 to handle "contentions" that might occur when multiple addresses are directed to the same one of the memory banks 2310*a-h*. Relatively complex interconnects 2320 that can be used in the context of the present disclosure may offer additional advantages with respect to handling contentions and in accommodating increased scalability (e.g., by increasing the number of available memory banks and/or initiators). However, less complicated interconnect 2320 designs may also offer advantages in terms of lower power consumption, complexity, and/or throughput.

Accessing each of the eight banks 2310*a-h* in the same cycle via a "gather" memory operation may present advantages over accessing a single memory bank, especially via a scalar or single vector memory read. This potential advantage is best shown by example. Each bank 2310*a-h* may have an access width of, for example, one byte per bank. In this case, if an operation requires eight bytes of data, each byte stored on a different bank, the architecture 2300 could conceivably provide all eight required bytes of data in the same cycle. Doing so, however, would require implementing a scheme to map addresses of the required bytes to the bank 2310*a-h* corresponding to the required data and the proper addresses are provided by initiators 2310*a-h*. Many such schemes are possible, including by simply iterating through banks 2310*a-h* to sequentially access each bank.

In some instances, a single data request for eight bytes of data may map to eight different addresses in memory that are not part of a contiguous data block and/or are not stored proximately in memory. As an example, it is possible that a single request for eight bytes of vector data may include single byte vector components that are each stored on different banks 2310*a-h*. This can occur in image correction operations, such as fisheye corrections. In fisheye corrections, the affected data (i.e., data that needs to be requested for a correction) is likely located around the periphery of an image. Such data has relatively high potential for being stored at different locations in memory, e.g., on the same memory bank with different addresses or on entirely different memory banks. In this case, a single vector read, as described above, may not be optimized for handling such a request. For example, a single vector read to a single memory bank may take eight cycles to read such a data set, taking one cycle to read from each of the different addresses.

The architecture 2300 shown in FIG. 18, however, has the potential to handle such a request in a single cycle. In 2300, each bank 2310*a-h* can provide a byte of data per cycle. This results in a throughput of 8 bytes per cycle, even though the data stored on the different banks are not contiguous or proximate in memory. This type of data acquisition, combining data from different memory locations in response to one request, as a "gather" operation, is usually considered as distinct from a single vector memory read.

Although this disclosure primarily concerns the exemplary case in which each of the indicators 2330*a-h* (FIG. 18) requests one byte of memory, other cases are possible. For example, each initiator 2330*a-h* may request two bytes of memory. In that case, the initiator 2330*a-h* needs one byte and can use the lowest address bits to select the right byte in the response data. This works even if the response data were returned to several initiators that accessed different bytes within the response word.

In some instances, addresses corresponding to components or other data in a single data request will map to the same bank. Since architecture 2300, in the example, can only provide one byte from each bank 2310*a-h* per cycle, this condition will result in lower throughput. Simply put, without a mechanism for dealing with this particular situation, the architecture 2300 will require two cycles to read data for the two different addresses mapping to the same bank. If, for example, two of the eight addresses generated by initiators 2330*a-h* map to the same bank, that bank will need two cycles to provide both bytes of data (i.e., one cycle for the two bytes of data represented by each of the two addresses in the bank). In that case, the throughput will be cut in half to an average of four bytes per cycle (eight bytes in two cycles). Similarly, if three addresses map to the same bank, three cycles will be required to retrieve all eight bytes of data. Then, the throughput is decreased to eight bytes/three cycles=2.67 bytes/cycle. If all addresses map to the same bank, there will be no efficiency gain for implementing multiple banks 2310*a-h*, as it will take eight cycles to obtain all eight bytes of data (i.e., throughput of one byte per cycle).

Modified Implementation for Near-Identical Address Handling

As discussed above, a gather operation accessing two different addresses on the same memory bank can result in degraded throughput. More specifically, the different addresses on the same bank must be accessed in different cycles, thus decreasing the average amount of memory returned per cycle. The situation in which two or more different addresses on the same bank are accessed over two or more cycles is referred to herein as a "bank contention."

A related problem may occur when two or more addresses input to gather are not strictly identical, but are directed to the same word on the same memory bank. In that case, the addresses are said to be "near-identical." Unless the gather operation has a mechanism for handling near-identical addresses, they are typically handled as different addresses on the same bank. Such handling can result in a "bank contention" and corresponding lowering of throughput, as discussed above.

Figure 19A:
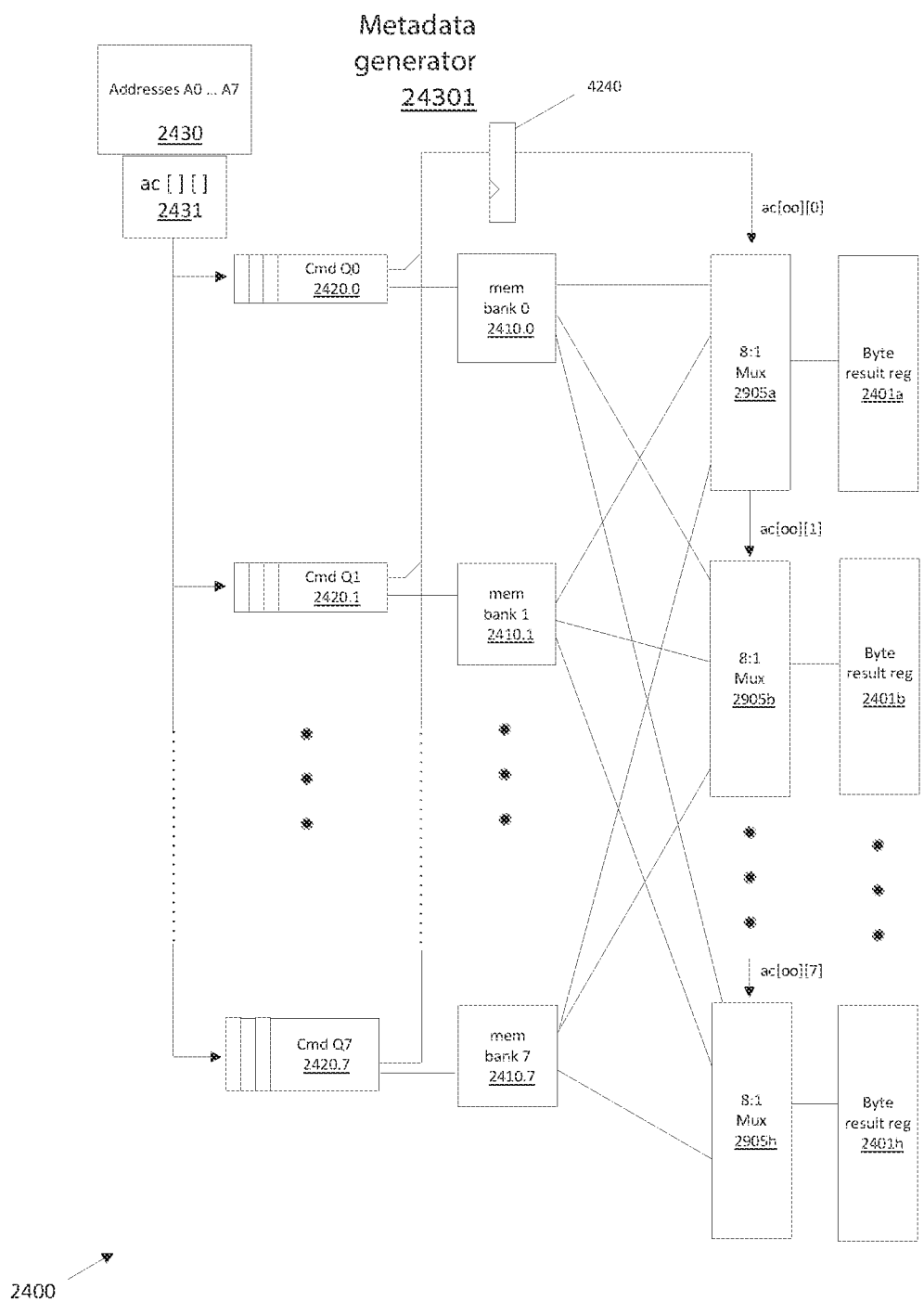
FIG. 19A illustrates an exemplary architecture according to examples of the disclosure.

FIG. 19A shows an implementation of an architecture 2400 including a modified interconnect that may be used in place of interconnect 2320 (FIG. 18) in order to add same address handling to a gather operation. In addition to the various components of the architecture 2400, FIG. 19A also shows memory banks 2410.0-2410.7 at the center of the diagram. As shown in FIG. 19A, there are 8 banks 2410.0-2410.7. However, the number eight is merely exemplary and it is to be understood that the architecture 2400 can be implemented to accommodate more than eight banks, as needed, in the context of the present disclosure. Architecture 2400 can also accommodate fewer than eight banks, depending on the application.

It is assumed that each "gather" data read command includes eight addresses—of eight bytes to be fetched. The number of addresses (eight) and the length of the data units (byte) are only non-limiting examples. Interconnect 2400 includes a metadata calculator 24301 that generates metadata (such as indicator ac[ ][ ] 2431) according to a predefined rule so that only up to a single memory initiator accesses the same line at the same time. The metadata calculator 24301 may calculate the metadata per each "gather" read command. Alternatively, a buffer may be used to store consecutive gather read commands and the metadata calculator 24301 may calculate the metadata for one gather read command after the other. The calculation of the metadata may include comparing addresses of the data units (or rather only a parts of the addresses that points to the memory line) to find near-identical addresses, flagging the near identical addresses and then generating the metadata according to a predefined scheme.

As shown in FIG. 19A, architecture 2400 includes eight command queues 2420.0-2420.7. Each command queue may correspond to one of the memory banks 2410.1-2410.7. A series of addresses 2430 (A0 ... A7) is fed to each of the queues 2420.0-2420.7. In addition to the addresses 2430, the architecture 2400 also may use an indicator ac[ ][ ] 2431 that may be used to help determine which bank receives which address and, as discussed in more detail in the next section, whether contentions can be avoided through the exploitation of near-identical addresses.

Each queue 2420.0-2420.7 may receive all eight addresses 2430 (A0 ... A7) even though any one queue may only use one of the addresses 2430. This is because the bank corresponding to any given address may not be known at the time the addresses 2430 are provided to command queues 2420.0-2420.7. Note that the fact that, in the example, the number of addresses happens to be equal to the number of memory banks 2420.0-2420.7 (i.e., eight) is for merely for illustrative purposes and not meant to be limiting. The number of addresses 2430 does not have to be equal the number of banks 2420.0-2420.7. In certain implementations of the present disclosure, the number of addresses 2430 may be greater or less than the number of banks 2420.0-2420.7.

As discussed in more detail in the following section, each command queue 2420.0-2420.7 can determine which of the addresses (A0 ... A7) 2430 to queue (and, therefore, which data to be collected from their associated bank) by using the indicator ac[ ][ ] 2431 and/or "address bits" in the addresses 2430. There are many schemes for using the indicator ac[ ][ ] 2431 or addresses 2430 to determine which address is processed by which bank 2410.1-2410.7. Discussions of particular schemes in this disclosure are meant to be merely exemplary. Any suitable scheme is within the context of this disclosure.

One example scheme for determining addresses 2430 to queue is for each command queue 2420.1-2420.7 to collect addresses for which ac[i][i] has the value "1," where "i" is the index of the queue 2420.1-2420.7 and its associated bank 2410.1-2410.7. In addition, or in alternative to this scheme, it is also possible to assign "address bits" or "bank select bits" to certain values of Ai[ ] 2430. In one convention, address bits 1:3 may be the bank select bits such that, if Ai[1:3]=5, then the command queue 2420 with an index of 5 (i.e., 2420.5) will process Ai. However, it is to be understood that these schemes/conventions are merely exemplary and any other convention/scheme suitable for the application may be used in the context of this disclosure.

Although not shown explicitly in FIG. 19A, a pipeline stage may precede the use of each queue 2420.0-2420.7. For each queue 2420.0-2420.7, the pipeline stage may determine which of the addresses 2430 (A0 ... A7) corresponds to the bank 2410.0-2410.7 associated with the queue. Note that the pipeline stage may be a single pipeline stage or may, itself, include several pipeline stages. The pipeline stage may be performed based on "address bits" or "bank select bits," as discussed above.

The command queues 2420.0-2420.7 can be used to handle "bank contentions" (i.e., multiple, different addresses mapping to the bank 2410.0-2410.7 associated with the queue 2420.0-2420.7). In some embodiments, the queues 2420.0-2420.7 handle the contentions by sequencing the different addresses such that they are handled during different cycles, one address per cycle.

Since the handling of command contentions by command queues 2420.0-2420.7 can be costly in terms of throughput, it may be advantageous to avoid putting addresses in the command queues 2420.0-2420.7 unless necessary. For example, it may be advantageous to handle cases in which the addresses are different, but point to data within the same word ("near-identical" addresses), without using command queues 2420.0-2420.7.

As shown in FIG. 19A, the architecture may include a series of multiplexers ("mux" or "muxes") 405a-h. The muxes 405a-h can receive requested data from the banks 2401.0-2401.7. FIG. 19A shows the muxes 405a-h receiving data from each bank 2401.0-2401.7. Although this is typical, it is to be understood that this configuration is merely exemplary and other configurations are consistent with this disclosure. For example, any of muxes 405a-h may receive data from only a subset of the banks 2401.0-2401.7. The muxes 405a-h also receive the indicator matrix ac[ ][ ] 2431. The muxes 405a-h may receive the matrix ac[ ][ ] 2431 or elements of matrix 2431 via buffer 440 that can help select which data elements to provide. Buffer 440 may also introduce latency, if desired, and other functions not explicitly described herein. As shown in FIG. 19A, each mux 405a-h may receive a different row of matrix ac[ ][ ] 2431. In other configurations (not shown) consistent with the present disclosure, each mux 405a-h may receive the entirety of the matrix ac[ ] [ ] 2431. In the latter case, the muxes 405a-h may select portions of the matrix ac[ ][ ] 2431 to use in order to determine which data to select.

The muxes 405a-h can use elements of the matrix ac[ ][ ] 2431 to determine which data (i.e., data from which of the banks 2410.0-2410.7) to provide to the byte result register 2401a-h associated with the muxes 405a-h. The particular methods and conventions for determining which data to supply to which register 2401a-h may vary, although a few examples will be discussed in the following section. It is to be understood that the methods for determining datasets from ac[ ][ ] 2431 discussed herein are merely exemplary and that any suitable method is consistent with the present disclosure.

Figure 19B:
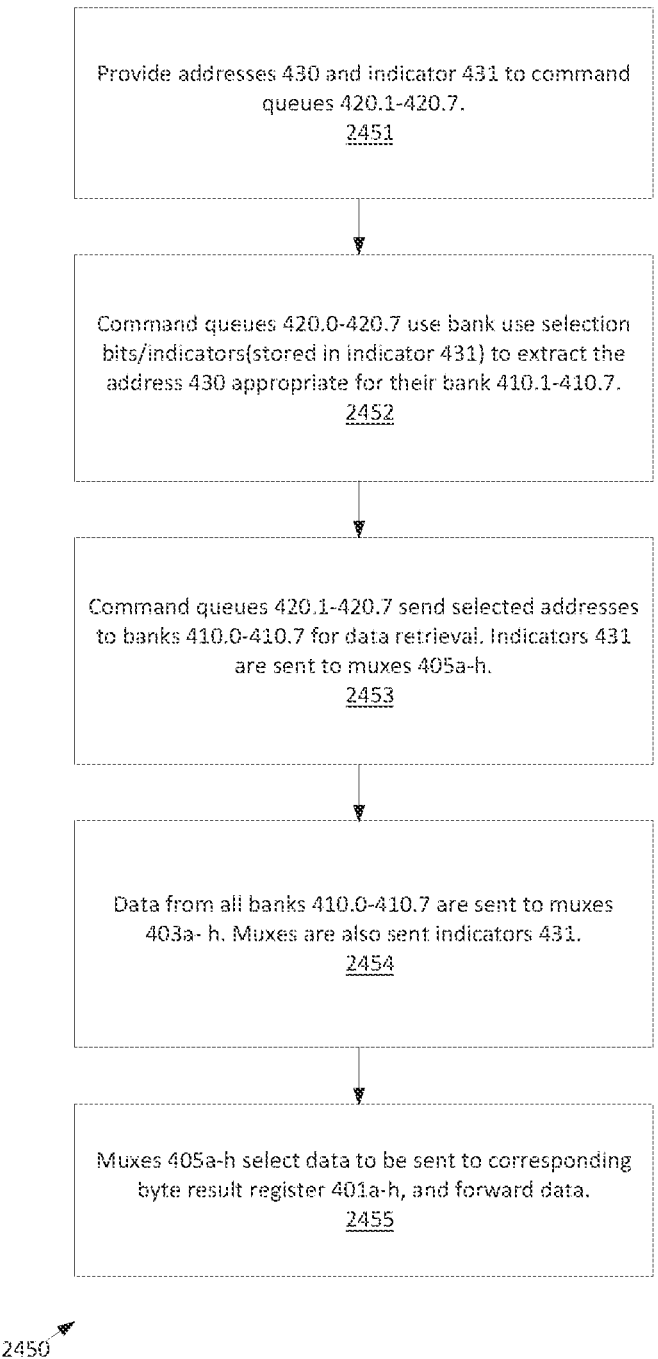
FIG. 19B is a flowchart for utilizing the architecture of FIG. 4A according to examples of the disclosure.

FIG. 19B is a flowchart 450 that shows an exemplary implementation of the architecture in FIG. 19A. As shown in FIG. 19B, in step 2451, addresses (A0 ... A7) 2430 and indicator ac[ ][ ] 2431 are provided to each command queue 2420.0-2420.7. At step 2452, command queues 2420.0-2420.7 use the indicator ac[ ][ ] 2431 to select the appropriate address (A0 . . . A7) 2430 that corresponds to the memory bank 405.0-405.7 associated with the queue 2420.0-2420.7. At this stage, the command queues 2410.0-2420.7 also use the indicator ac[ ][ ] 2431 to determine whether the requested address is near-identical with another of the A0 . . . A7 2420 addresses in its queue.

The near-identical determination can take a number of forms, consistent with this disclosure, as discussed in more detail in the following section. Continuing with step 2452, if the address provided is near-identical to another address for which data has been previously provided, the queue 2420.0-2420.7 will not forward the address to the memory bank for retrieval 2410.0-2410.7 in step 2453. In step 2453, each bank 2410.1-2410.7 receives an address of data to be retrieved from its corresponding queue 2420.0-2420.7. Also in step 2453, the indicator matrix ac[ ][ ] 2431 (or some portion of the matrix, for example, the portion selected by buffer 440) is forwarded to muxes 405a-h. Each of the muxes 404a-h receives data from each of the banks 2410.1-2410.7 in step 2454. In step 455, the muxes 404a-h use the indicator matrix ac[ ][ ] 2431 to determine which data from the banks 2410.0-2410.7 to forward to the byte result register 2401a-h associated with the muxes. The flowchart 2450 (and the gather operation) terminates when each of the queues 2420.0-2420.7 is empty.

Carrying out the method shown in FIG. 19B may be done in two operations. First, two or more near-identical addresses can be identified and separated from other addresses pointing to the same bank that are not near-identical. When this is done, a single read of the memory bank in a single cycle can be used to provide the data requested by the near-identical addresses. Second, when the memory bank returns a multi-byte word, the byte corresponding to each of the near-identical addresses can be returned. The following section discusses the first step in more detail.

Differentiating Near-Identical Addresses

One of the ways to differentiate near-identical addresses is to apply a pipeline stage (in addition to or in conjunction with the pipeline described above) to sort addresses that do not necessitate a separate memory access. Such addresses could be, for example, addresses that are near-identical to other addresses somewhere in the command queue 2420.0-2420.7. The sorting can be facilitated by creating an indicator (e.g., a bit, or other indicator) indicating whether each address 2430 (A0 . . . A7) necessitates a memory address. The indicator can take many different forms, but one form is a two-dimensional array of bits "ac[ ][ ]" 2431.

The first element of the two-dimensional indicator ac[ ] [ ] 2431 can be used to indicate whether a given address requires a data read. This will be referred to herein as the "access" indicator. For each address A0 . . . A7 in the series 2430, the access indicator will be the element in ac[ ][ ] 2431 that has both indices equal to the index of the address. In other words, the access indicator for A0 is a[0][0], the access indicator for A1 is a[1][1], the access indicator for A2 is a[2][2], etc. It is to be understood this is a mere convention for the purposes of illustration. Other conventions are possible and within the scope of this disclosure. As a shorthand we will refer to the access indicator generally herein as "ac[x][x]."

In the exemplary convention, ac[x][x] can be assigned such that, when ac[x][x] is set to "1," the address 2430 associated with ac[x][x] requires a separate memory read. Examples where ac[x][x] would be set to "1" in this configuration, would include where ac[x][x] corresponds to an address 2430 that has no near-identical addresses or where ac[x] [x] corresponds to an address 2430 that is the lowest index address of a series of near-identical addresses. ac[x][x] can be set to "0" if the address associated with it is near-identical to another address 2430 in the queue 2420.0-2420.7 that has a lower index. In this case, the address associated with ac[x][x] does not need a separate memory read and, instead, can rely on the memory read for the lower index near-identical address. This convention will be used in the following description. However, it is to be understood that the convention is merely illustrative and that any other suitable convention may be employed (e.g., using "1" or another indicator when the address 2430 requires a separate memory read, etc.).

In implementing the convention described above, memory reads can be performed among near-identical addresses by using the lowest index near-identical address. In other words, if there is a series of addresses 2430 (A0 . . . A7) and addresses A1 and A3 are nearly identical, the address for A1 is used in the memory read to obtain data for both A1 and A3. Conforming to the convention above, a[x][x] for A1 would then be set to "F" (requires a separate memory read) and "0" for A3 (does not require a separate memory read).

Figure 20:
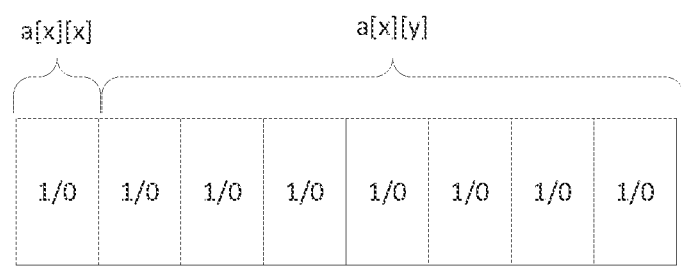
FIG. 20 illustrates a portion of an indicator array for one of a series of addresses according to examples of the disclosure.

The indicator ac[ ][ ] 2431 preferably includes other bits that designate a relationship between each address and the other addresses in the series 2430. This second "relationship" indicator will be referred to herein as "a[x][y]." Note that each address A0 . . . A7 in the series 2430 will have 1 a[x][x] bit and 7 a[x][y] bits, each a[x][y] bit corresponding to another one of the addresses in the series. This convention is shown for a generic address Ax in FIG. 20.

Following the exemplary convention, the relationship indicator ac[y] may be used to indicate whether the data read for the associated address should be delivered to another address. For example, if ac[x][y] is set to "1" for another address in the series of addresses 2430 (A0 . . . A7), data obtained from a read of the address Ax associated with ac[x][1] should be provided to the address Ay in the series 2430. In that case, the access indicator for Ay (a[y][y]) can be set to "0," since there is no need to read from Ay. In other words, ac[x][y] indicates the higher index near-identical addresses that should receive data from the data read of Ax.

Figure 21A:
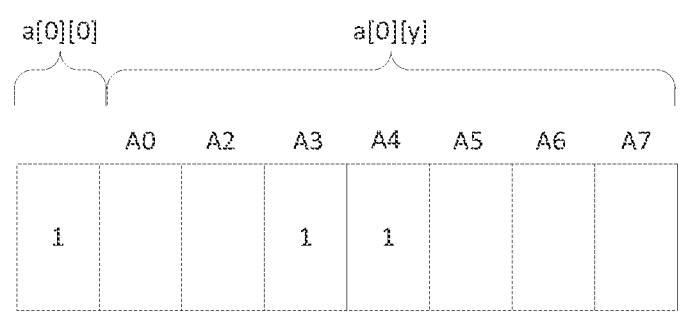
FIG. 21A illustrates a portion of an indicator array for one of a series of near-identical addresses according to examples of the disclosure.
Figure 21B:
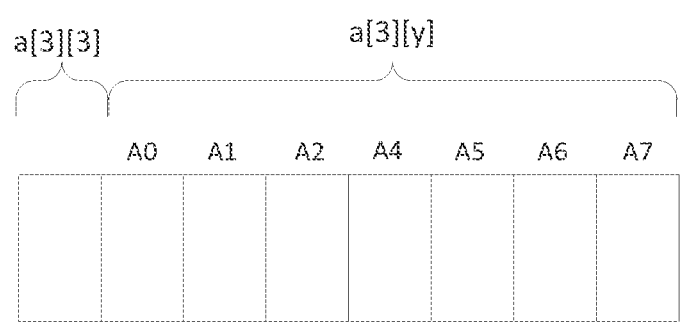
FIG. 21B illustrates a portion of an indicator array for one of a series of near-identical addresses according to examples of the disclosure.
Figure 21C:
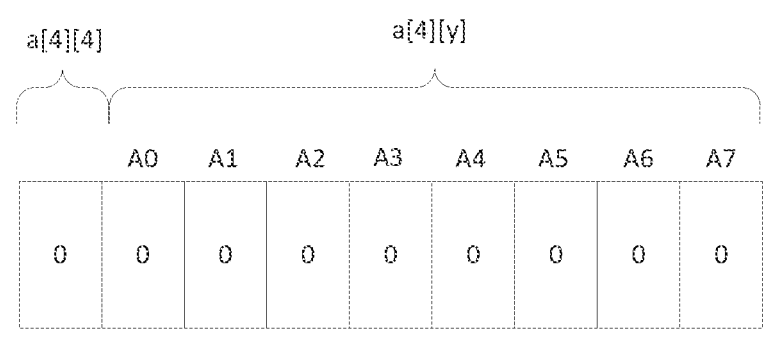

FIGS. 21A-21C present portions of the ac[x][y] 2431 matrix for the individual addresses A1, A3, and A4, respectively, in an exemplary case when all three addresses A1, A3, and A4 are all near-identical. As shown in FIG. 19A, a[x][x] indicator for A1, the lowest index near-identical address, a[1][1] would be set to "F" so that data are read from A1. The ac[x][x] indicator for A3 and A4, a[3][3] and a[4][4], respectively, would both be set to "0," since A3 and A4 are higher index near-identical addresses of A1. This is represented in FIGS. 19B and 19C, which represent ac[x][x] 2431 for A3 and A4, respectively.

In the same example, the relationship indicator, ac[x][y], for A1 can be set to "F" at the A3 and A4 positions in order to indicate that data read from A1 should also be delivered to A3 and A4. This is shown schematically in FIG. 19A. As also shown in FIG. 19A, ac[1][y] is set to "F" at positions designated for addresses "A3" and "A4" because the data associated with A1 need to be delivered to satisfy the request associated with A3 and A4. This is again because A3, in the example, is a higher order near-identical address to A1. In FIG. 19A, the remaining values of ac[1][y] all have the value "0," assuming that A3 and A4 are the only near-identical addresses to A1 in the series of addresses 2430 (A0 . . . A7).

FIGS. 19B and 19C show the corresponding indicator ac[x][y] 2430 for A3 and A4, a[3][y] and a[4][y], respectively. As shown in FIGS. 19B and 19C, the indicators ac[x][y] for both A3 and A4 are "0" because both are higher index near-identical neighbors with A1. FIGS. 19B and 19C also show that the indicators ac[y] are "0" for both A3 and A4 because, as higher index near-identical neighbors of A1, data associated with A3 and A4 do not need to be supplied to any other address in the series of addresses 2430 (A0 . . . A7).

Figure 22:
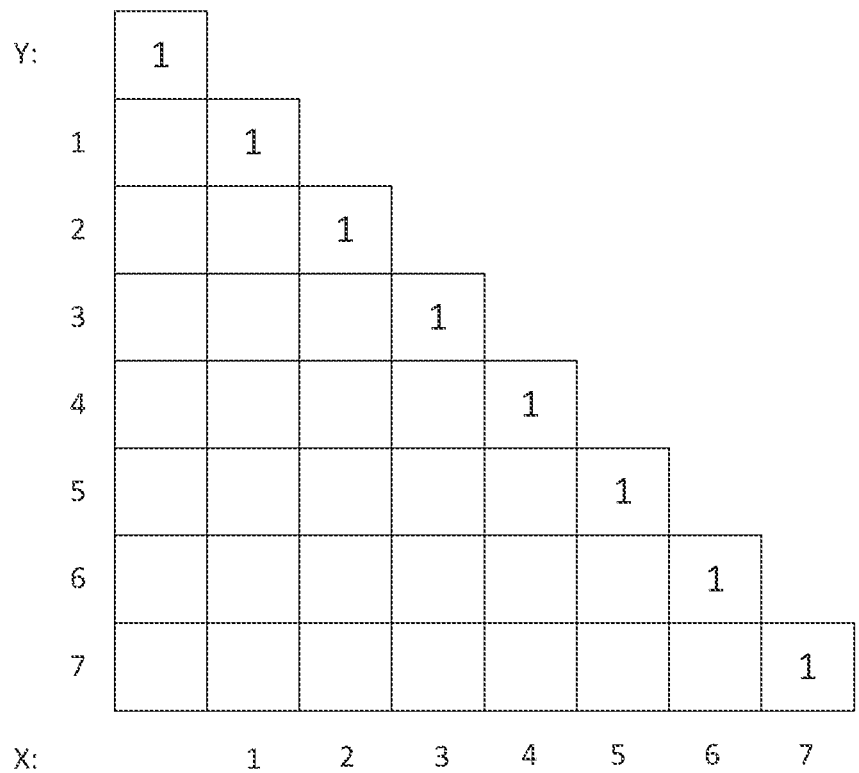
FIG. 22 illustrates an indicator array representing eight unique addresses according to examples of the disclosure.
Figure 23:
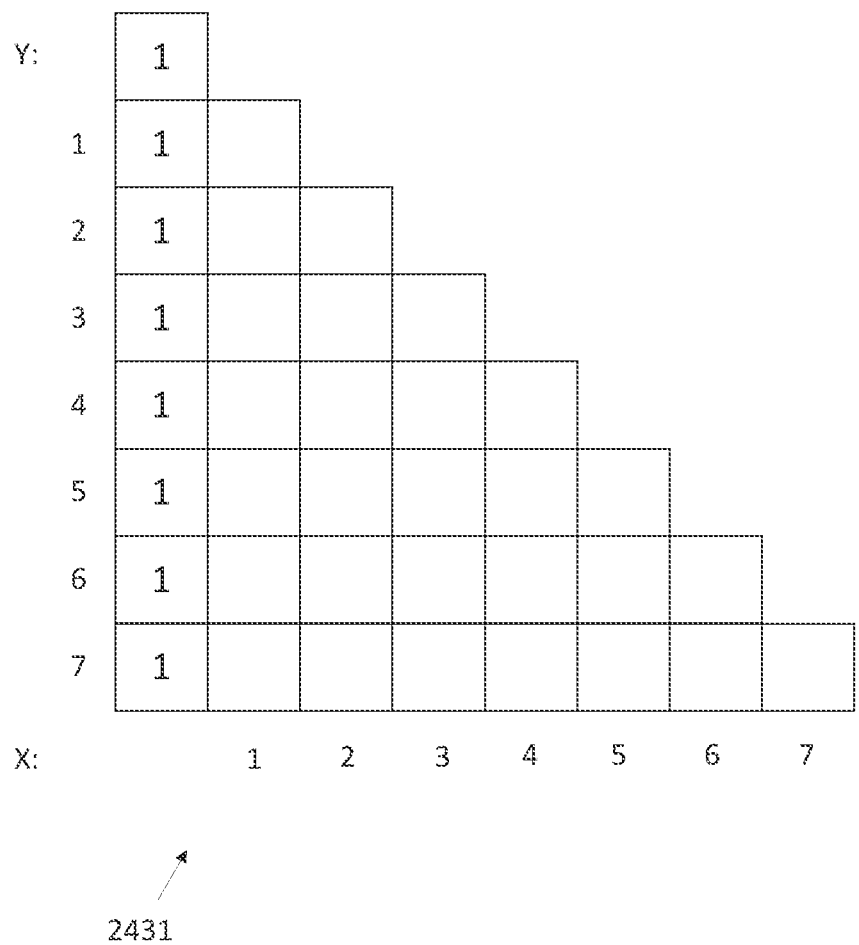
FIG. 23 illustrates an indicator array representing eight near-identical addresses according to examples of the disclosure.
Figure 24:
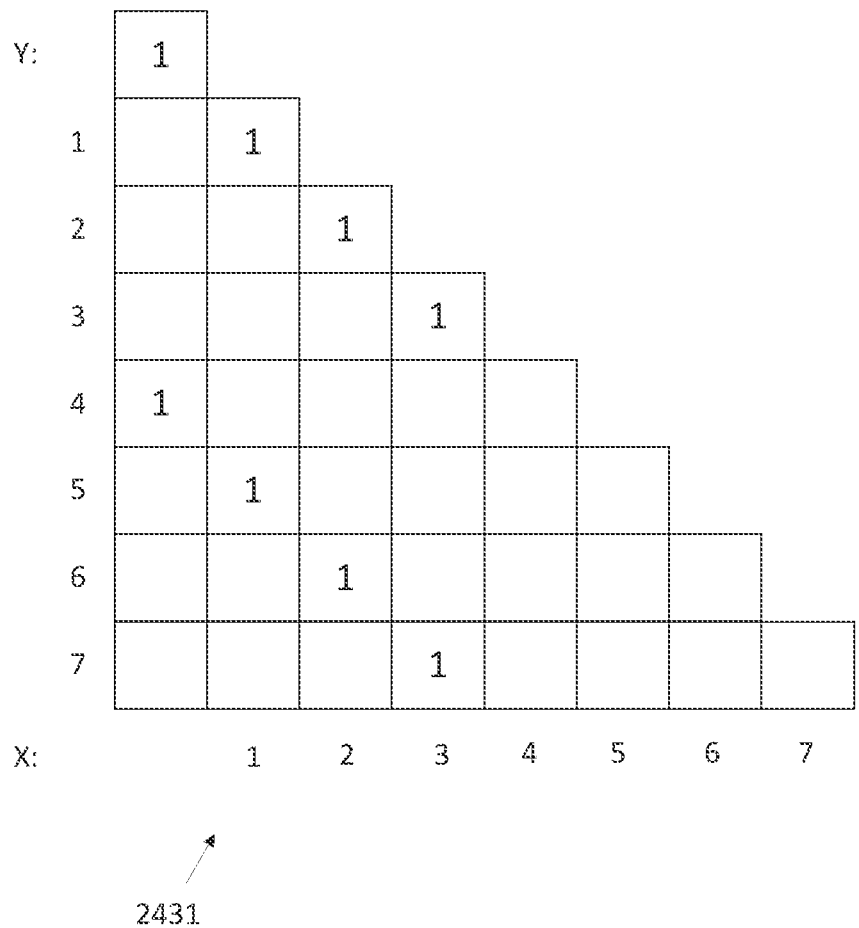
FIG. 24 illustrates an indicator array representing four pairs of near-identical addresses according to examples of the disclosure.

FIGS. 22-24 show an entire ac[ ][ ] 2431 matrix for the series of addresses 2430 (A0 . . . A7) in three exemplary circumstances. Since, according to the exemplary convention described above, lower indexed addresses are actually accessed, ac[x][y] is set to "0" for x>y. Since every element would be zero in the upper left portion of the matrices in FIGS. 22-24, the upper left portion of the matrix is omitted from each of these figures.

FIG. 22 presents an entire indicator matrix (minus upper left portion) ac[x][y] 2431 for the exemplary case in which none of the addresses in the series of addresses 2430 (A0 . . . A7) is near-identical with another. In other words, FIG. 6 shows ac[x][y] 2431 in the case in which each address 2430 points to data that are not in the same word in memory banks 2310a-2310h as the data pointed to by any of the other addresses 2430. In that case, all diagonal elements of the indicator matrix ac[x][y] 2431 (i.e., all elements that have x=y=index of the address) are set to "1." This indicates that each of the addresses in the series 2430 are accessed and the data corresponding to those addresses will be provided by muxes 2905a-h to registers 2401a-h. All non-diagonal elements in ac[x] [y] are set to "0" because the data returned from accessing each of the addresses 2430 are only returned to that particular address, not any other in the series 2430. In other words, since none of the addresses 2430 (A0 . . . A7) is near-identical to any other, data read using each address 2430 will only be returned once, in response to the initiator that used that particular address to request data. The data for each addresses 2430 will not be returned in response to any initiator that did not specifically request data from that address. In order to reflect this condition, all non-diagonal elements of ac[x][y] 2431 are set to "0."

FIG. 23 presents ac[x][y] 2431 for the case in which all addresses 2420 (A1 . . . A7) are near-identical to A0. Since A0 is the lowest index near-identical address, a[x][x] for A0 is set to "F" (i.e., a[0][0]=1). Since all other addresses A1 . . . A7 are higher order near-identical addresses to A0, the data requests they represent can be fulfilled by accessing A0 alone. Correspondingly, the "access" indicator elements (ac[x][x]) for each of the other addresses A1 . . . A7 are all set to "0." Instead, the first column (ac[0][y]), the column that indicates the relationship between data accessed via A0 and the other addresses, is entirely set to "1." This signals that data from the A0 access should be used to provide data for each of the other addresses A1 . . . A7 in the series 2430.

FIG. 24 presents ac[x][y] 2431 for a third example in which each of A0-A3 are near-identical with addresses A4-A7, respectively. In this case, since A0-A3 are the lowest index addresses of their near-identical address pairs. Each of A0-A3 has the value "1" in a[x][x]. In other words: a[0][0]=a[1][1]=a[2][2]=a[3][3]=1. Since A4-A7 are higher index addresses that are near-identical with lower index addresses (A0-A3), each of them has the value "0" in its a[x][x] (i.e., ac[4][4]=ac[5][5]=ac[6][6]=ac[7][7]=0). Since the data read from A0 provides sufficient data for the data read represented by A4, the relationship indicator for A0 with respect to A4 (i.e., a[0][4]) is set to "1." Again, this indicates that the data request represented by A4 will be satisfied by the memory read performed for A0 and the appropriate data will be routed to satisfy the A4 data request. Similarly, the relationship indicators for A1, A2, and A3 for their respective near-identical pair A5, A6, and A7 are each set to "1" (i.e., ac[1][5]=ac[2][6]=ac[3][7]=1). This indicates that the data read from A1, A2, and A3 provides sufficient data for the data read represented by A5, A6, and A7, respectively. As shown in FIG. 24, all other elements of ac[x][y] 2431 are set to "0."

Actual coding of the above convention/scheme may be done in a variety of ways consistent with the present disclosure. Several exemplary methods of coding the scheme will now be presented. However, it is to be understood that these coding methods are merely examples of employing some of the more general concepts, conventions, and schemes discussed above. It is to be understood that the presentation of this code is not limiting and that the concepts, conventions, and schemes disclosed herein are merely exemplary.

One way to code the above convention and example cases is by implementing the following general algorithm that is expressed below in pseudo-code. The general algorithm is used to calculate ac[x][y] based on a series of n addresses An, where n is any integer (including, but not limited to "8," as used in the examples above). Note that the symbol "~=" in the pseudo-code below indicates a Boolean expression that returns a "F" if its operands are near-identical, and returns a "0" otherwise. Where the identifiers "x" or "y" are used in the formulae below to represent an index in either An or ac[x][y], it is to be understood that "x" refers to columns in the ac matrix and "y" to rows, as shown in FIGS. 22-24.

For all addresses 2430 An (e.g., n=1 . . . 7, in the 8 byte example):

1. Set ax[n][n] equal to "1" (i.e., to indicate the data requested by An must be accessed) if and only if the data corresponding to An have not already been accessed by a lower indexed address (i.e., an index x from n-1 to 0):
a. ac[n][n]=product(!ac[x][n] for x from n-1 to 0)
2. (Note that ac[0][0], in this implementation is always "1" indicating that the data corresponding to A0 is always accessed. This is because A0 is the lowest index address and, therefore, cannot be near-identical with another address having a lower index.)
2. For all rows y corresponding to An in ac[n][y], set a[n][y] equal to "1" (i.e., return the data associated with An to Ay's indictor) if An is near-identical to Ay:
a. For all y>n:
i. ac[n][y]=(ac[n][n]) && (An~=Ay)
b. (Note that this computation must be performed in a particular sequence. Specifically, ac[n][y] must be computed after a[n][n], and a[n][n] must be computed after a[x][n] for all values of x<n.)

According to the above, if the access element (ac[x][x]) for an address is "0," indicating that the element is not accessed, then the data corresponding to that access element will not be provided in response to data requests made using any other addresses. Therefore, in this case, if ac[x][x]=0, then a[x][y]=0 for the address.

Figure 25A:
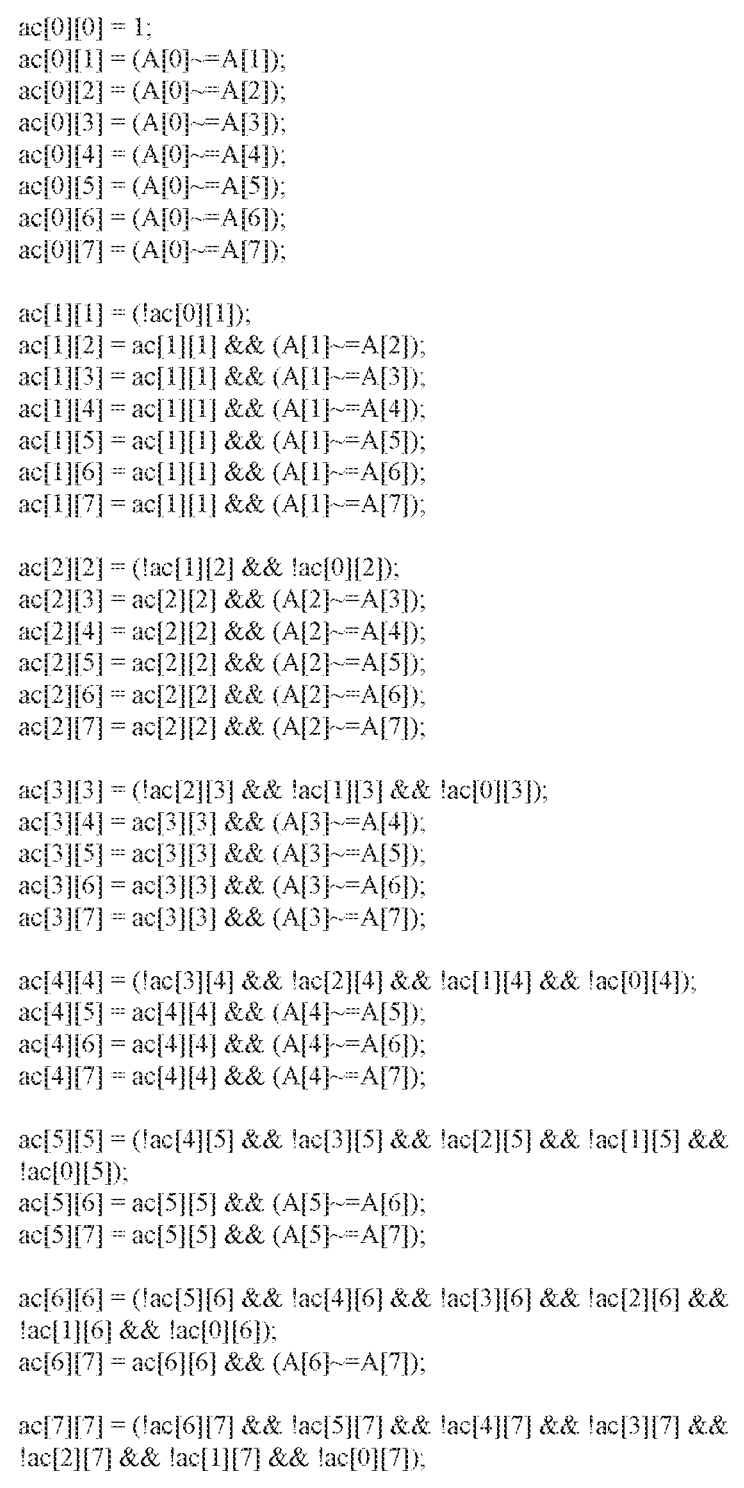
Figure 25B:
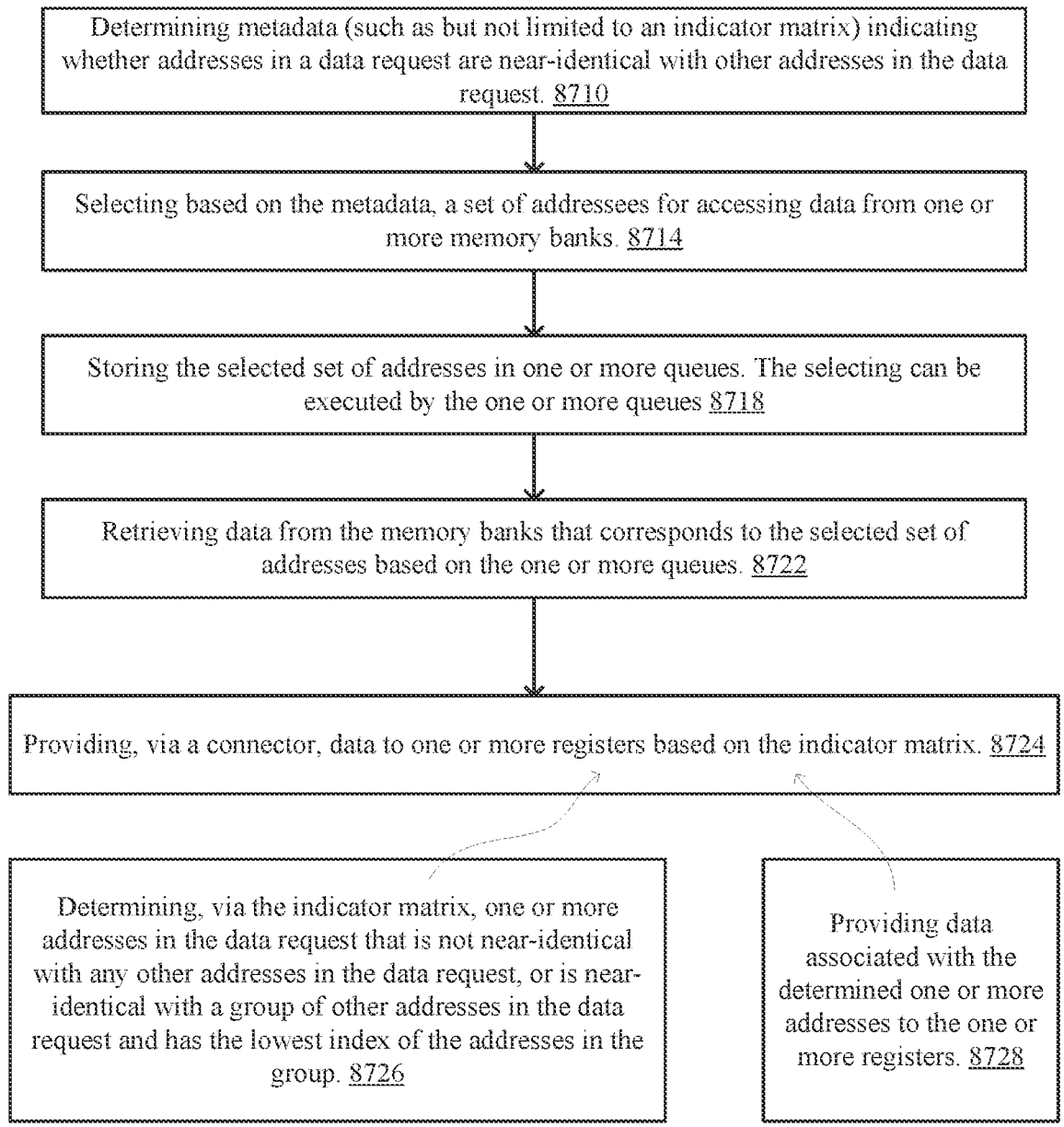
FIG. 25B illustrates a method according to an embodiment of the invention.

FIG. 25A shows an implementation of the above general algorithm in actual code. As described above, the code in FIG. 25A corresponds to the exemplary case of eight addresses (A0 . . . A7) 2430 and their corresponding 8×8 indicator matrix ac[ ][ ] 2431. The code in FIG. 25A is written to conform to the sequential requirements described above. For example, in the first step, a[0][0] is set to "F" because the data corresponding to address A0 must be accessed. As shown in FIG. 25A, a[x][y] 2431 is calculated in a column by column fashion (i.e., first for the column ac[x=0][y], then for the column ac[x=1][y], then ac[x=2][y], . . . and finally for column a[x=7][y]). As discussed above, the code presented in FIG. 25A is meant to be exemplary and non-limiting. It is to be understood that variations of this code may depart from the example shown in FIG. 25A while still implementing the architecture and methods disclosed herein.

The code in FIG. 25A describes setting ac[ ][ ] 2431 such that it can be used both for determining which data to retrieve and also to return to registers 2401a-h. Specifically, once the read data are returned by the banks 2310a-h according to ac[ ][ ] 2431 (FIG. 19B, step 2454), the data must be returned to the correct initiator (i.e., to the correct byte result register 2401a-h corresponding to the initiator) (FIG. 19B, step 2455). In order to do this, the column of bits ac[i] may have the bit ac[i][j] set to 1 if and only if the read data corresponding to Ai must be returned to the initiator j. One potential implementation using the code in FIG. 25A relies on the fact that for any j, there will be at most one instance where ac[i][j] is "1." In the exemplary implementation, a simple logical "OR" can be performed between the eight read responses returned by the eight banks, where the read response for bank i is logically "AND"ed with ac[i][j]. In this case, the read response i will enter the OR expression (and be returned to the register 2401a-h), unless ac[i][j]==0. In that case, 0 will enter the OR expression.

Therefore, according to the above, some examples of the disclosure are directed to a device comprising one or more memory banks, one or more registers, and a connector that connects the one or more memory banks with the one or more registers. The device may also include one or more queues that stores a set of addresses for accessing data from the one or more memory banks, the set of addresses selected from a data request based on whether the selected addresses are near-identical with other addresses in the data request. The selecting may be based on an indicator matrix that may comprise a two dimensional matrix having diagonal elements indicating whether the addresses in the data request are lowest index near-neighbors or have no near-neighbors. The selecting may select the set of addresses based on the diagonal elements. The selecting may comprise at least one of addresses that are not near-identical with any other addresses in the data request, or addresses that are near-identical with a group of addresses in the data request and have the lowest index of the addresses in the group. The selecting may comprise determining whether any of the addresses in the request correspond to the same word stored in the same one of the one or more memory banks. The connector may provide data to the one or more registers based on the indicator matrix. Providing data to the one or more registers based on the indicator matrix may comprise determining, via the indicator matrix, one or more addresses in the data request that is not near-identical with any other addresses in the data request, or is near-identical with a group of other addresses in the data request and has the lowest index of the addresses in the group, and providing data associated with the determined one or more addresses to the one or more registers. The device may comprise one or more multiplexers and wherein the determining is performed by the one or more multiplexers.

Some examples (see for example FIG. 25B) of the disclosure are directed to a method 8700 for processing data comprising determining (8710) metadata (such as an indicator matrix) indicating whether addresses in a data request are near-identical with other addresses in the data request, selecting (8714), based on the metadata, a set of addressees for accessing data from one or more memory banks, storing 8718 the selected set of addresses in one or more queues, and retrieving 8722 data from the memory banks that corresponds to the selected set of addresses based on the one or more queues. The indicator matrix may comprise a two dimensional matrix having diagonal elements indicating whether the addresses in the data request are lowest index near-neighbors or have no near-neighbors, and the selecting 8714 may select the set of addresses based on the diagonal elements. The selecting 8714 may comprise selecting at least one of addresses that are not near-identical with any other addresses in the data request, or addresses that are near-identical with a group of addresses in the data request and have the lowest index of the addresses in the group. The selecting 8714 may comprise determining whether any of the addresses in the request correspond to the same word stored in the same one of the one or more memory banks. The method may comprise providing 8724, via a connector, data to one or more registers based on the indicator matrix. Providing 8724 data to the one or more registers based on the indicator matrix may comprise determining 8726, via the indicator matrix, one or more addresses in the data request that is not near-identical with any other addresses in the data request, or is near-identical with a group of other addresses in the data request and has the lowest index of the addresses in the group, and providing 8728 data associated with the determined one or more addresses to the one or more registers. The determining may be performed by one or more multiplexers. According to an embodiment of the invention there is one queue per memory bank and the method include distributing the addresses to all the queues and selecting by the queues which addresses to store—based on the metadata.

Some examples of the disclosure are directed to a non-transitory computer-readable storage medium having stored thereon a set of instructions of a software program that when executed by a computing device, causes the computing device to determine an indicator matrix indicating whether addresses in a data request are near-identical with other addresses in the data request, select, based on the indicator matrix, a set of addressees for accessing data from one or more memory banks, store the selected set of addresses in one or more queues, and retrieve data from the memory banks that corresponds to the selected set of addresses based on the one or more queues. The indicator matrix may comprise a two dimensional matrix having diagonal elements indicating whether the addresses in the data request are lowest index near-neighbors or have no near-neighbors, and the selecting may select the set of addresses based on the diagonal elements. The selecting may comprise selecting at least one of addresses that are not near-identical with any other addresses in the data request, or addresses that are near-identical with a group of addresses in the data request and have the lowest index of the addresses in the group. The selecting may comprise determining whether any of the addresses in the request correspond to the same word stored in the same one of the one or more memory banks. The instructions may cause the computing device to provide, via a connector, data to one or more registers based on the indicator matrix. The providing may comprise determining, via the indicator matrix, one or more addresses in the data request that is not near-identical with any other addresses in the data request, or is near-identical with a group of other addresses in the data request and has the lowest index of the addresses in the group, and providing data associated with the determined one or more addresses to the one or more registers. The determining may be performed by one or more multiplexers.

The previous text discussed preventing multiple accesses to near-identical addresses that belong to the same memory line by requesting only the lowest index memory initiator to fetch the memory line that the prevention of the multiple accesses may follow another scheme for selecting which memory initiator will fetch the memory line. A non-limiting example of such a scheme may involve requesting only the highest index memory initiator to fetch the memory line. Any other predefined scheme may be used as long as only one memory initiator requests the memory line and any other memory initiator that requests a near neighbor does not access the memory bank.

The selecting may be based on an indicator matrix that may comprise a two dimensional matrix having diagonal elements indicating whether the addresses in the data request are lowest index near-neighbors or have no near-neighbors.

Address Generator Programming

Figure 26:
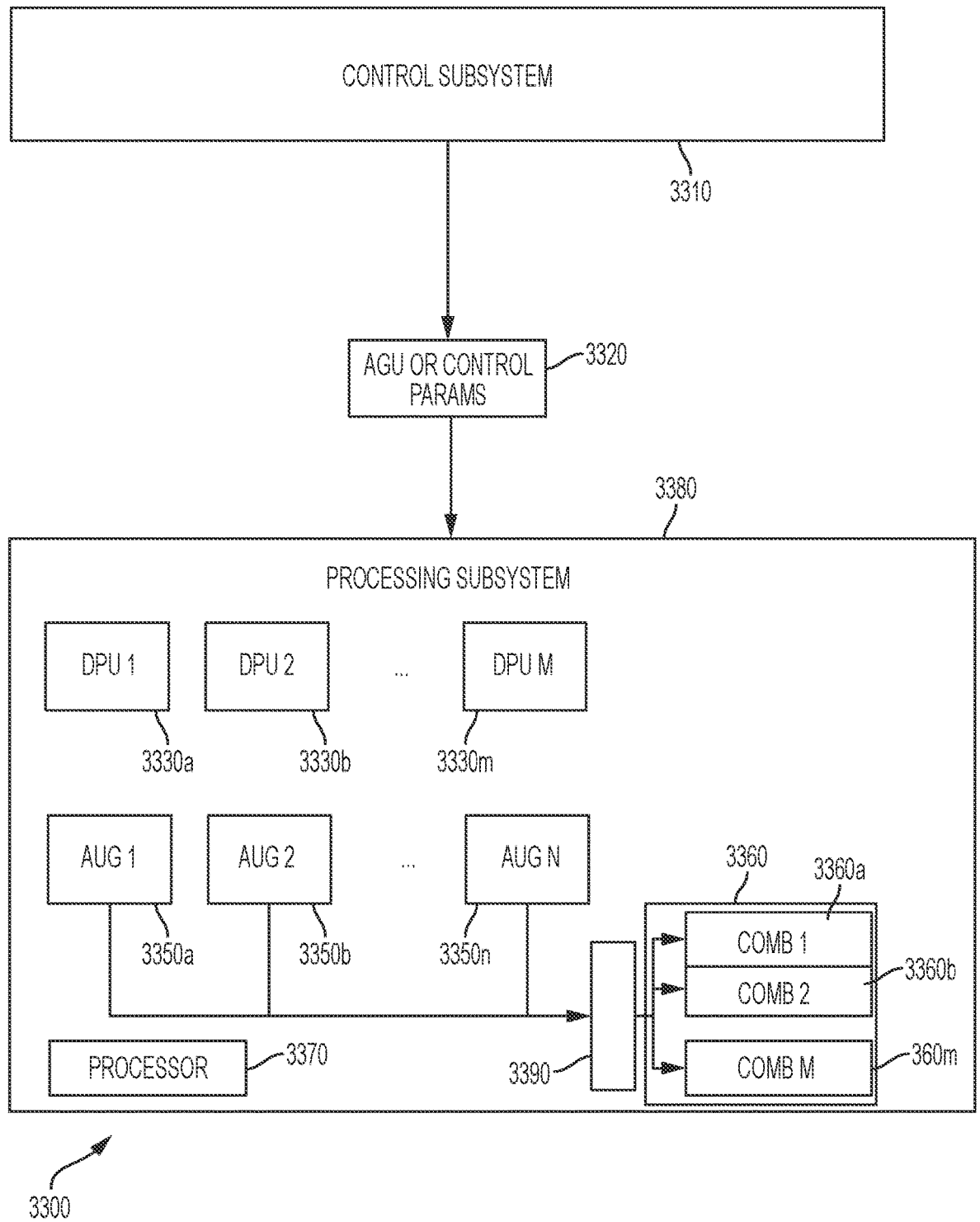
FIG. 26 illustrates exemplary control and processing subsystems that may be part of the logic and/or processing circuitry of the vector processor shown in FIG. 17 according to examples of the disclosure.

FIG. 26 shows a system 300, which is an exemplary implementation of the vector processor 200 in FIG. 17 including address generation in the context of the present disclosure. The system 300 may include a control subsystem 3310 and a processing subsystem 3380 may correspond to the logic/processing circuitry 204 in FIG. 17. The control subsystem 3310 may provide parameters 3320 to the processing subsystem 3380. Processing subsystem 3380 may include one or more address generation units (AGUs) 3350a-n, as shown in FIG. 26. In addition, processing subsystem 3380 may include one or more vector units or data processing units (DPUs) 3330a-m that process data, such as image data, often in an iterative or looping fashion. Processing subsystem 3380 may further include a scalar processor, such as 3370, that may assist the processing subsystem 3380 in the processing of data such as image data.

AGUs 3350a-n may aid memory access by the DPUs 3330a-m, such as in loading and storing data to and from memories. The memories may be, for example, the addressable registers 202 (FIG. 17), other local memories, external or remote memories, and/or main memory. Generally, using DPUs 3330a-m for input and output operations can limit speed and/or efficiency of the data processing subsystem 3380, especially when the data processing involves iterative or looping calculation involving reading and writing large amounts of data. In such a situation, as discussed above, accessing the data in its various locations in memory may require the generation and use of a large number of memory addresses.

Typically, the subsystem 3380 determines or calculates these addresses based on the type of data being processed by the DPUs 3330a-m. For example, iterating over image data often begins with a location in memory defined or identified by a first address determined by an image base pointer. Other addresses in the image data can be calculated from the base pointer address using known image dimensions (e.g., width, height, and stride). If the subsystem 3380 relies solely or primarily on the bandwidth of the DPUs 3330a-m to process the data and calculate these addresses, throughput of process execution in the DPUs 3330a-m may be limited by these address calculations. Instead, the address calculation can be offloaded to AGUs 3350a-n in order to, for example, increase the efficiency of the DPUs 3330a-m. In that case, addresses may be computed by the AGUs 3350a-n based on configuration registers (not shown) written by a processor 3370 (e.g., a scalar unit) before vector commands (e.g., a loop) are entered. In the loop, AGUs 3350a-n can be used to increment pointers or counters and/or to check for end of flow conditions. Moreover, zeroing counters can be also handled by AGUs 3350a-n.

As shown in FIG. 26, DPUs 3330a-m with AGUs 3350a-n typically execute code by accepting control instructions in the form of AGU parameters (e.g., 3320) from control subsystem 3310. The AGUs 3350a-n may use these parameters 3320a-k to generate addresses for the DPUs 3330a-m to write to and from external or other memory. This approach may be more efficient for processing certain types of data than others. For example, address calculation may cause delays in processing large quantities of data that include portions requiring more intensive processing, such as image data spread across a large number of distinct regions requiring special and/or intensive analysis (e.g., image "feature points" discussed in more detail below). In that case, the step of calculating addresses from the AGU parameters 3320a may be time-consuming and cause delays in the overall operation of the processing subsystem 3380. This is particularly true when the locations of these portions of data requiring intense computation are not known in advance.

One example of a type of image region that, in computer vision applications, may require extensive address calculations for processing is the instance of "feature points" in the image, necessitating computationally intensive evaluation/analysis. "Feature points" can include, for example, "corner pixels" in an image near corners of an imaged object. Such corner pixels may require increased analysis to determine the spatial extent of the object and/or other information, such as the trajectory of the object or the relative proximity of other objects to the object. These feature points may require separate address calculations by AGUs 3350a-n and cause stalling, delays, and less efficient processing. Ways of dealing with delays will be explored in more detail below.

Figure 27:
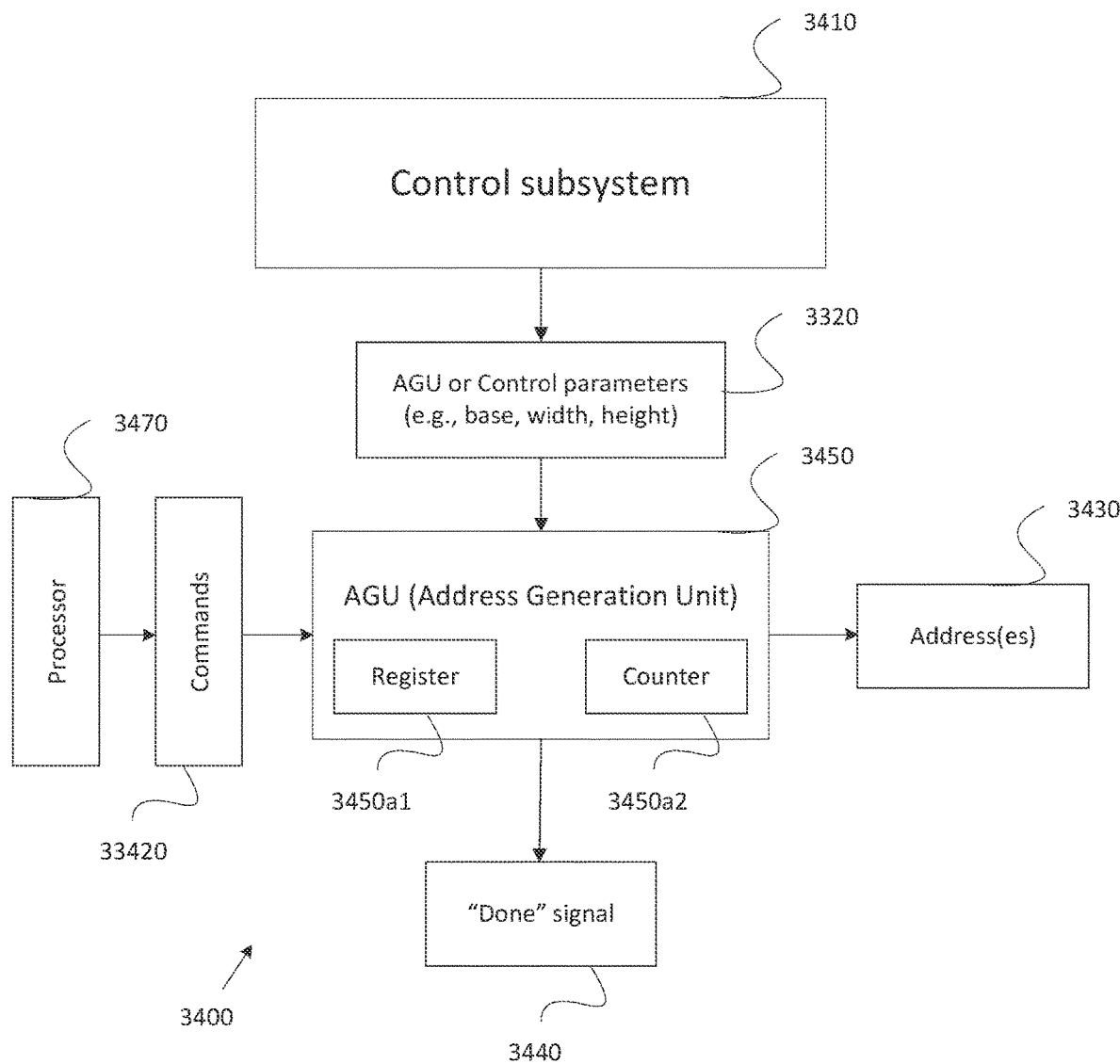
FIG. 27 is illustrates exemplary inputs to and outputs from an address generation unit according to examples of the disclosure.

FIG. 27 is a generalized schematic showing information flow through an exemplary AGU 3450, such as AGUs 3350a-n shown in FIG. 26. Although not shown in FIG. 27, exemplary AGU 3450 may include more than one of AGUs 3350a-n. Control subsystem 3410 shown in FIG. 4 may, for example, correspond to control system 3310 in FIG. 26.

As shown in FIG. 27, control subsystem 3410, AGU parameters (equivalently referred to herein as "control parameters") 3320 can be provided to the AGU 3450. The control parameters 3320 may include image data, such as, for example, the base address of an array of image data, the width (or stride) of the image, and the height of the image. These parameters may, together, specify the image to be processed by the DPUs 3330a-m (FIG. 26). In addition, AGU 3450 may receive commands 3420 from processor 3470. Processor 3470 may correspond to serial processor 3370 (FIG. 26) and be part of data processing subsystem 3380. AGU 3450 may further include a register 3450a1, which may store control parameters 3320, for example. As shown in FIG. 27, the AGU 3450 may generate addresses 3430 based on the control parameters 3320. The addresses generally point to locations in memory corresponding to data being processed by system 3400. They may, for example, correspond to the locations in memory of image data or other types of data that can be processed iteratively or in a computation loop.

Figure 28:
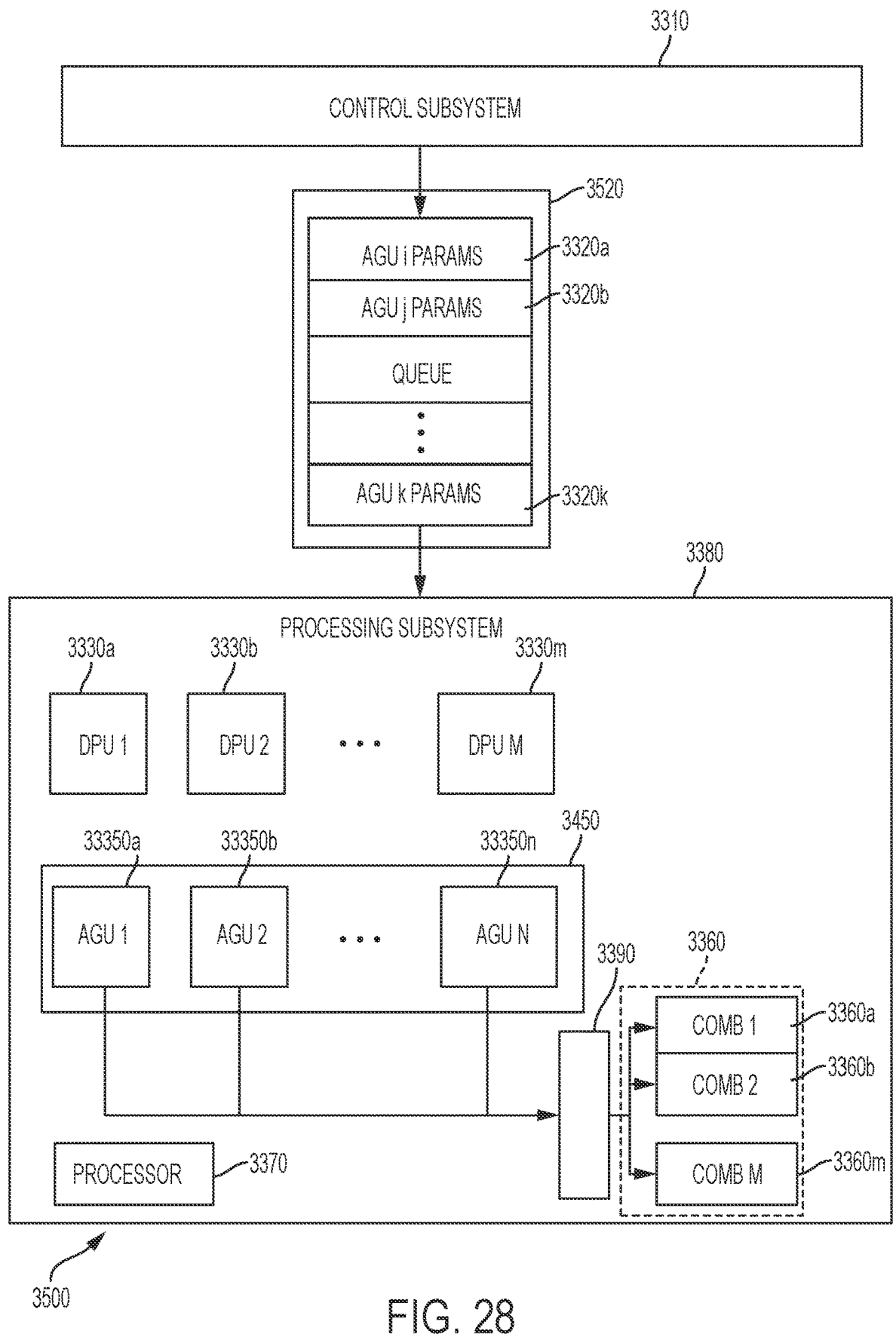
FIG. 28 illustrates exemplary control and processing subsystems with a parameter queue according to examples of the disclosure.

FIG. 28 shows a system 3500 that is similar to system 300 shown in FIG. 26, but with a queue 3520 providing sets of control parameters 3320a-k to processing subsystem 3380. As shown in FIG. 28, and as explored in more detail below, queue 3520 enables system 3500 to feed control parameters 3320a-k to AGU 3450 sequentially. Queue 3520 further enables system 3500 to use the control subsystem 3310 to generate control parameters 3320a-k while AGU 3450 is generating addresses 3430 using a different set of control parameters 3320a-k. For example, system 3500 may provide control parameter set 3320k to AGU 3450 for generation of addresses 3430.

Figure 29:
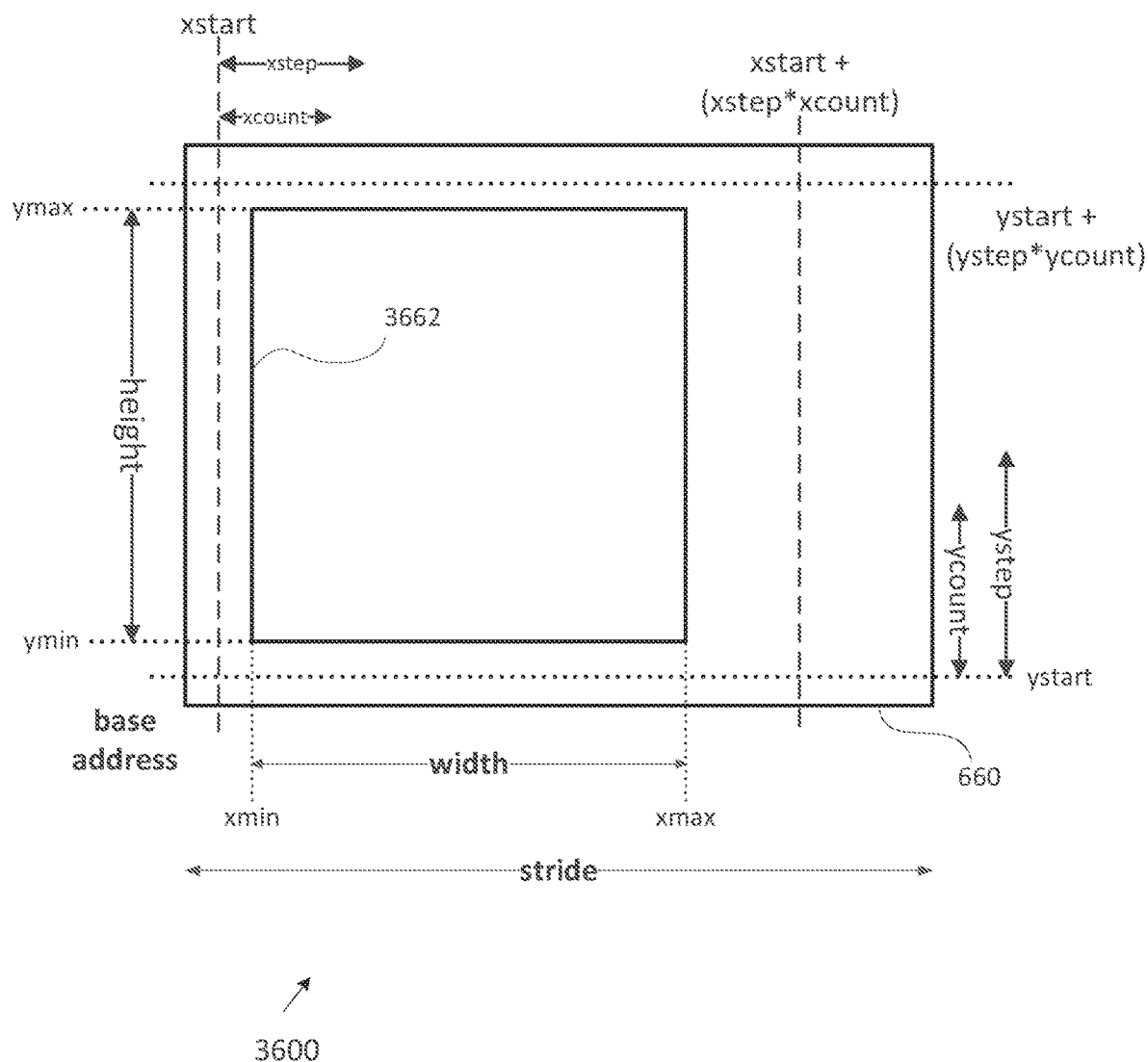
FIG. 29 illustrates an exemplary image according to examples of the disclosure.

This process can be explored in more detail using FIG. 29, which shows an exemplary image frame 3660 that can be processed by the systems of FIG. 26 and FIG. 28. FIG. 29 also shows an image window 3662 in memory within the image frame 3660. Although only one image window 3662 is shown in FIG. 29, it is to be understood that there may be multiple image windows (e.g., windows 664 and 666, etc.) that, together, may cover the entirety of image frame 3660.

A process of scanning the image window 3662 or part of the image window may start by receiving a start point (having a base address) that may be within the image frame 3660. The start point may be aligned with a border of the image frame 3660 or be non-aligned (As illustrated in FIG. 29).

Image window 3662 defines an area of interest within frame 3660. Note that the depiction in FIG. 29 is not necessarily drawn to scale. Image window 3662 is typically smaller than image frame 3660, and there are typically multiple image windows (e.g., 3662a-n.) defining different areas of interest with the same image frame 3660. FIG. 29 also illustrates various dimensions: width and height of the image window 3662 (width is delimited between Xmin and Xman, and height is delimited between Ymin and Ymax). The width of the image frame is denoted stride.

The scanning of the image window 3662 may also include retrieving information outside the image window 3662 but within the image frame 3660. For example a scanning may span between x-axis coordinates Xstart and Xstart+(Xstep*Xcount) and between y-axis coordinates Ystart and Ystart+(Ystep*Ycount). Xstep is the step along the x-axis, Xcount defines the number of steps along the x-axis. Ystep is the step along the y-axis, Ycount defines the number of steps along the y-axis.

Image frame 3660 may be traversed vertically and horizontally. For example, traversing the image vertically may begin at "ystart" in increments of "ystep," as shown in FIG. 29. Each step along the vertical could be an increment counted by the variable "ycount." Similarly, the horizontal portion of the image can be traversed starting from "xmin" to "xmax" in increments of "xstep" as counted by "xcount."

By way of example only, the following equation may be used by AGU 3450 to iteratively map image coordinates X, Y of one or more image frames 3660 or windows 3662 into memory addresses:

$$\text{Next Address} = \text{Base} + X + Y * \text{Width} \quad (Eq. 1)$$

In Eq. 1, "Base" is a pointer or memory address for the first portion of image frame 3660 or image window 3662. Iterating over X and Y added to "Base" generates all the addresses in memory for the data representing image frame 3660 or image window 3662. "Base" is a constant term for each image frame 3660 or window 3662. In the case in which there are multiple image frames 3660 or windows 3662, there can be multiple "Base" values associated with each of the multiple frames or windows. In either case, iterating over X and Y provides all the addresses relevant to the image frames or windows.

Iterating X and Y is accomplished as follows. X is defined as X=xstart+(xstep*xcount). In words, X is a pixel number per row related to a horizontal coordinate in image coordinates of an image frame 3660 or window 3662. Y=ystart+(ystep*ycount). Therefore, Y is the number of rows related to a vertical coordinate in image coordinates of the image frame 3660 or window 3662. X and Y may be alternatively defined in terms of the memory addresses storing the image frame 3660 or window 3662 with certain assumptions (e.g., one byte per pixel intensity datum). "Width," as shown FIG. 29, can represent the number of memory addresses storing a row in an image frame 3660 or window 3662 or the difference between the respective first addresses storing consecutive rows.

Referring again to FIG. 28, control parameter set 3320k may correspond to a first window 3662 of image frame 3660. As discussed above, in the context of FIG. 29, there may be multiple windows (e.g., 3662, 664, 666, etc.) associated with a single image frame 3660. In other words, the first window 3662 may be one in a series of windows corresponding to the same image frame 3660 for which system 3500 needs to perform image processing. Sets of control parameters 3320a-k may, for example, correspond to each of the multiple windows 3662, 664, 666, etc. In the example, control parameters 3320k may correspond to the first window 3662, while other control parameters 3320a-j may correspond to subsequent windows (664, 666, etc.) of the same image frame 3660.

AGU 3450 may calculate a first address set, for example, 3430k, based on control parameters 3320k. During this calculation, control subsystem 3410 may be generating a second set of control parameters 3320j. The second set of control parameters 3320j may be, for example, for window 624 of image frame 3660. If the generation of control parameters 3320a-k is faster than the AGU 3450 can generate addresses 3430a-k based on any one set of control parameters 3320a-k, the queue 3520 may fill with different sets of control parameters 3320a-k as the address calculation in AGU 3450 calculates addresses. Using queue 3520 in this way can provide a continuous or near continuous supply of control parameters 3320a-k to AGU 3450. As will be explored in more detail below, ensuring a near continuous supply of address parameters 3320a-k to AGU 3450 can enable AGU 3450 to operate continuously or nearly continuously at high throughput in order to avoid "bottlenecks" in the calculation of addresses by AGU 3450. Since calculation of addresses by AGU 3450 can be time-consuming and relatively slow, ensuring that the AGU 3450 runs in near continuous operation can allow processing subsystem 3380 to avoid having to wait for new addresses 3430 and, therefore, to operate at higher throughput levels. This relationship will be explored in more detail in FIGS. 9-11 below.

Figure 30:
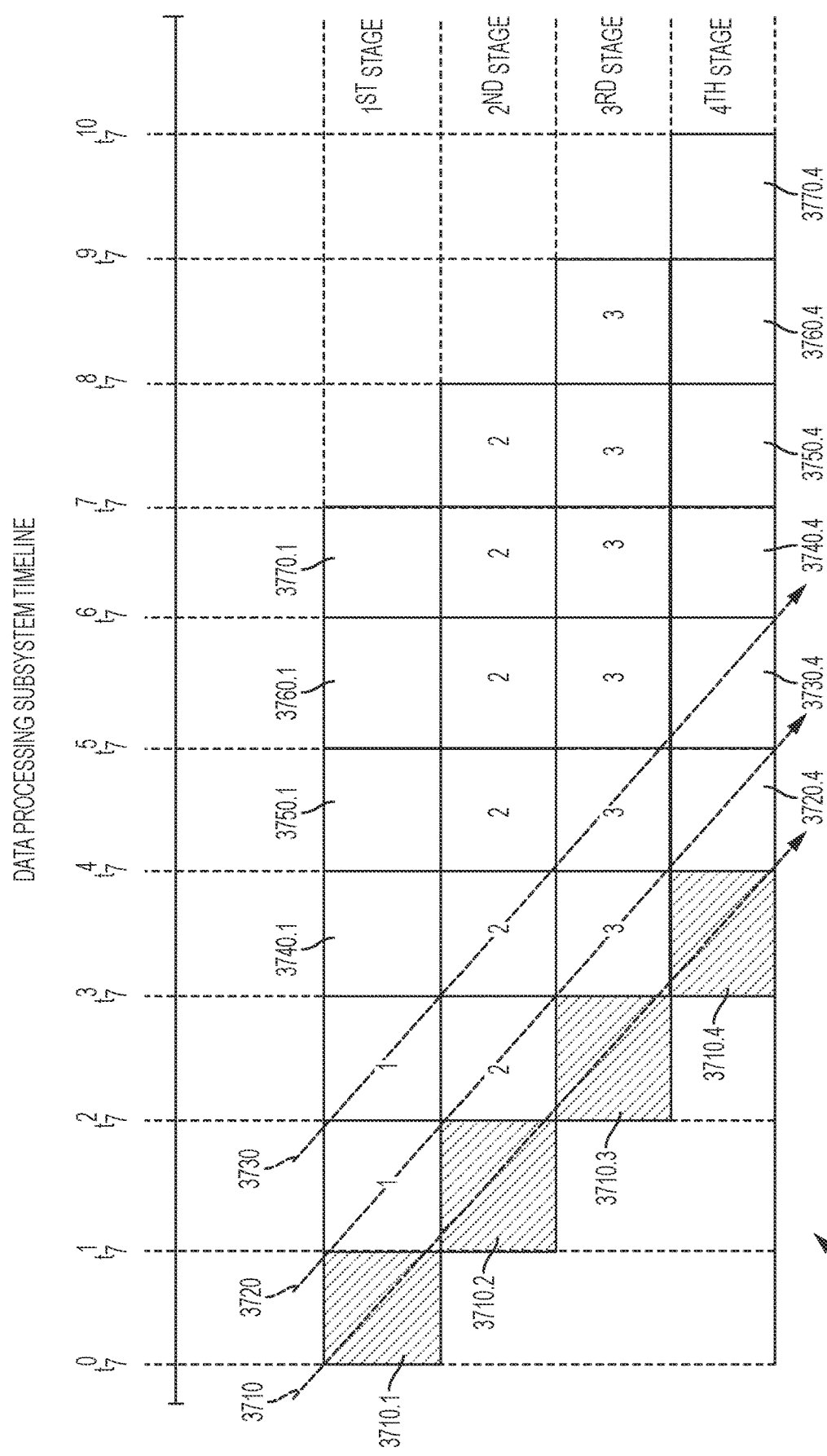
FIG. 30 illustrates an execution timeline for a data processing subsystem according to examples of the disclosure.

FIG. 30 shows a schematic of a four-stage pipeline of instructions evaluated by data processing subsystem 3380. Specifically, FIG. 30 shows an exemplary pipeline 700 execution of several instructions, including instruction 3710 having four stages 3710.1-3710.4. Similarly, FIG. 30 shows instructions 3720 having four stages 3720.1-3720.4 (not labeled), instruction 3730 having four stages 3730.1-3730.4 (not labeled), etc. As shown in FIG. 30, a stage may be evaluated each cycle $t_7^0$-$t_7^{10}$. For example, execution of instruction 3710 begins at $t_7^0$ with the evaluation of stage 3710.1 (first stage) and ends at $t_7^4$ with the evaluation of stage 3710.4 (fourth stage).

A maximal or "full" throughput of the instruction pipeline is achieved when one instruction terminates or is fully evaluated through stage 4 every cycle. As shown in FIG. 30, full throughput is achieved in the exemplary pipeline 700 at $t_7^4$. In other words, at $t_7^4$, each of the four stages is being evaluated for a different instruction (i.e., stage 4 (3710.4) of instruction 3710, stage 3 (3720.3) of instruction 3720, stage 2 (3730.2) of instruction 3730, and stage 1 (3740.1) of instruction 3740). Therefore, $t_7^4$ is the cycle at which all four stages in the pipeline are busy. As shown in FIG. 30, full throughput continues until cycle $t_7^7$. After $t_7^7$, all first stages of instructions 3710.1-3770.1 have been processed and stage 1 is no longer full. Then, the pipeline operates at full throughput from cycle $t_7^4$-$t_7^7$. From $t_7^1$-$t_7^4$, when the pipeline is not yet full, the pipeline is referred to as the "header" portion of execution. From $t_7^8$-$t_7^{10}$, when the pipeline is no longer full, the portion is referred to as the "trailer" of the pipeline. Generally, it is advantageous to keep the pipeline at full or at maximal throughput as much as possible so that, among other things, data processing subsystem 3380 is put to maximum use.

Figure 31:
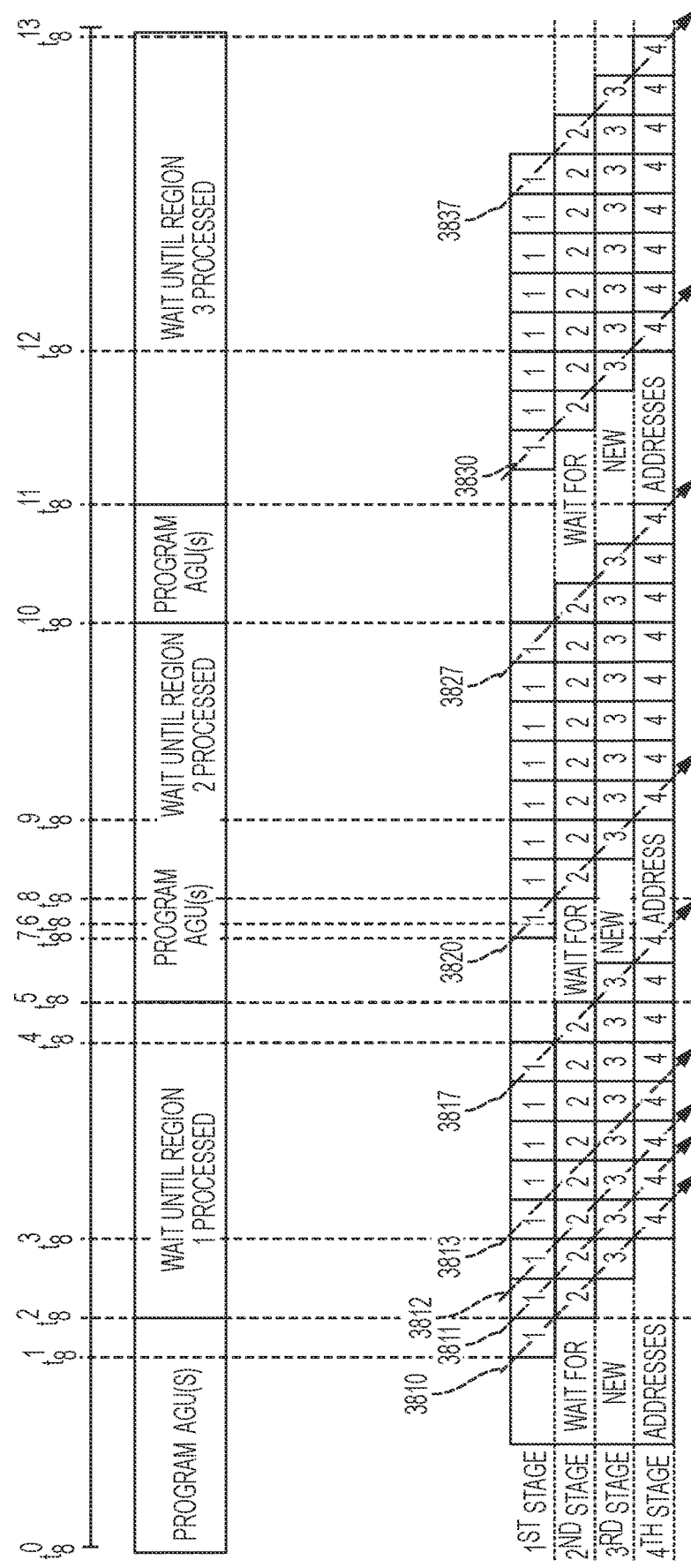
FIG. 31 illustrates an execution timeline for a data processing subsystem in FIG. 28 according to examples of the disclosure.

FIG. 31 shows a control subsystem timeline for a typical pipelined execution of instructions by system 300. As shown in FIG. 31, initially at $t_8^0$, the AGU 3450 is being programmed with control parameters 3320 in order to generate addresses 3430 for DPUs 3330a-m (FIG. 3). During the period from $t_8^0$-$t_8^1$, AGU 3450 may be fully devoted to generating addresses 3430. DPUs 3330a-m (FIG. 3) may be idle, waiting to receive the addresses 3430 in order to begin their computations (e.g., processing of image data, as discussed above in the context of FIGS. 6 and 7). The DPUs 3330a-m receive the addresses 3430 from the AGU 3450 just before $t_8^1$, and stage 1 of the DPUs 3330a-m begins evaluating stage 1 (3810.1) of instruction 3810. At $t_8^2$, AGU 3450 is finished calculating addresses 3430 for the first loop of data representing, for example, a region in an image such as window 3662 shown in FIG. 29. After this, as shown in FIG. 31, AGU 3450 remains idle from $t_8^2$-$t_8^5$ while each of instructions 3810-817 is being processed by DPUs 3330a-m. As shown in FIG. 31, the DPUs 3330a-m pipeline reaches full throughput at time $t_8^3$. Full throughput for the first region (e.g., image window 3662) lasts until $t_8^4$, after which the "trailer" ($t_8^4$-$t_8^6$) begins because there is no more first stage to be evaluated by the DPUs 3330a-m. After $t_8^6$, the last stage (817.4) of the last instruction (817) of the first set of instructions (3810-817) has been evaluated. After this, as shown in FIG. 31, the DPUs 3330a-m must wait for new addresses 3430 from the AGU 3450 before proceeding with any further data processing.

The cycle begins again for a second image region ("region 2," e.g., image window 664) at $t_8^5$ when the AGU 3450 is programmed with control parameters 3320 for the second region. The AGU 3450 begins to generate new addresses 3430 for that new region from $t_8^5$-$t_8^8$. Accordingly, the new addresses are provided to the DPUs 3330a-m before $t_8^7$ when computation begins again, this time on instruction 820. Again the AGU 3450 waits to process new control parameters 3320, this time for a third region, "region 3" (e.g., image window 666), until $t^8_8$. This creates another period in which the DPUs 3330a-m remain idle, specifically after the fourth step of 827.4 is finished processing at $t_8^{11}$ while waiting for the AGU 3450 to generate new addresses. Similarly, a new idle period for the DPUs 3330a-m begins after $t_8^{13}$ when the DPUs 3330a-m process stage 4 of instruction 837.4.

In the example shown in FIG. 31, the DPUs 3330a-m undergo an idle period each time the AGU 3450 is re-programmed with new control parameters 3320. Even when the DPUs 3330a-m are not fully idle, the delay caused by AGU 3450 address generation results in their periodically operating at less than full throughput, specifically during the periods $t_8^0$-$t_8^3$, $t_8^4$-$t_8^9$, and $t_8^{10}$-$t_8^{12}$ shown in FIG. 31. While a period of less than full throughput for the DPU pipeline 800 is to be expected at the beginning of execution (e.g., during "header" $t_8^0$-$t_8^3$), the periods of less than full throughput at $t_8^4$-$t_8^9$ and $t_8^{10}$-$t_8^{12}$ are caused by an avoidable delay in computation of addresses 3430 by the AGU 3450.

In particular, use of queue 3520, as shown in FIG. 28, can mediate or decrease these latter periods of less than full throughput.

Figure 32:
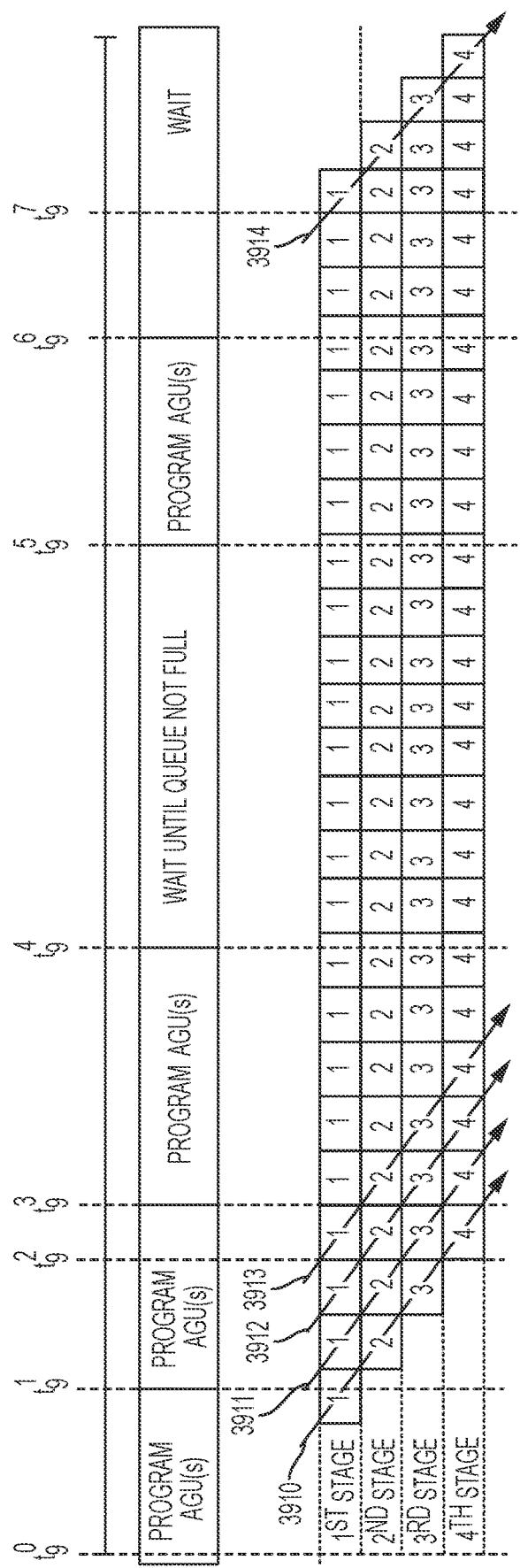
FIG. 32 illustrates an execution timeline for a data processing subsystem in FIG. 28 according to examples of the disclosure.
Figure 33A:
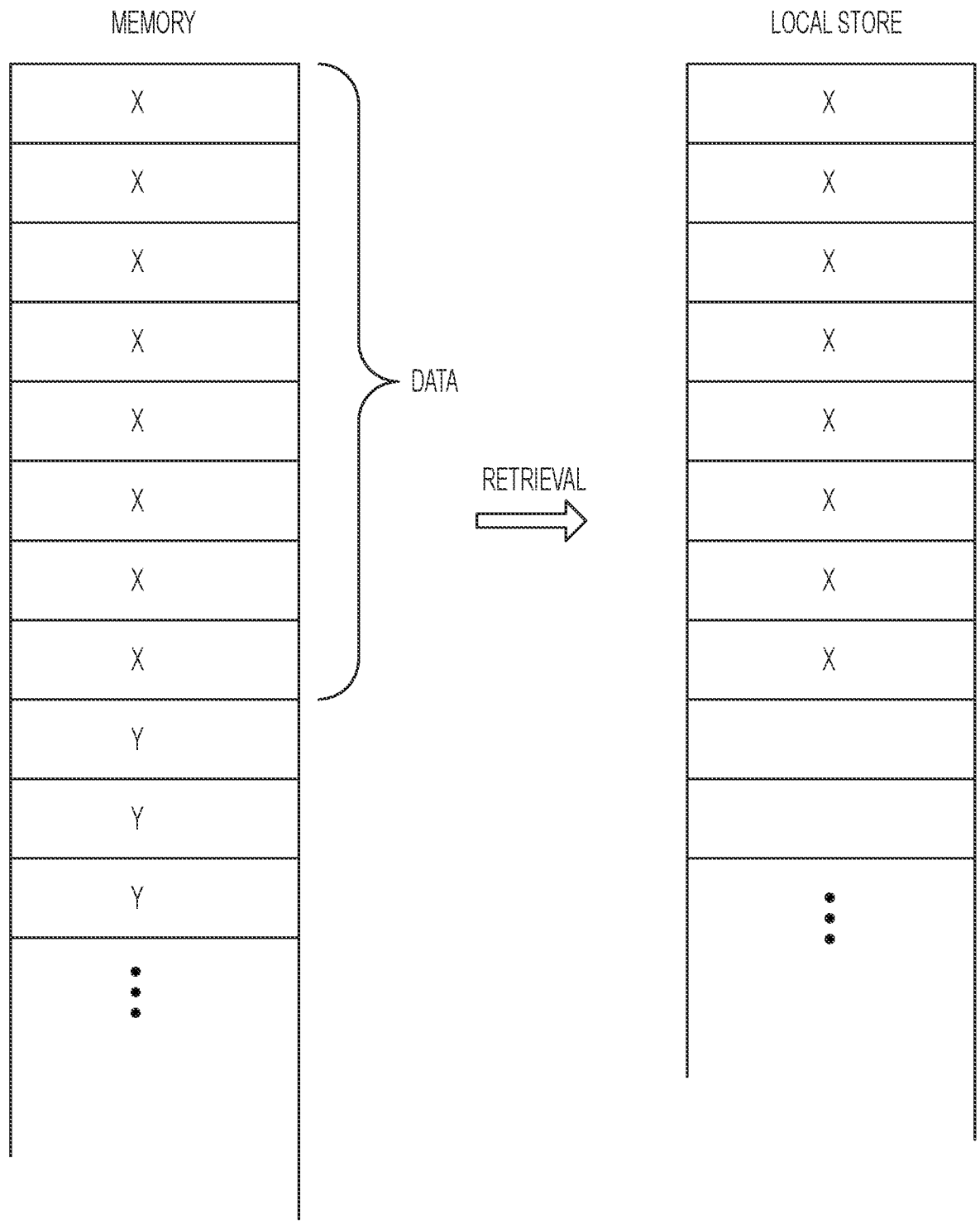
FIG. 33A illustrates an exemplary 8-byte access for aligned data according to examples of the disclosure.
Figure 33B:
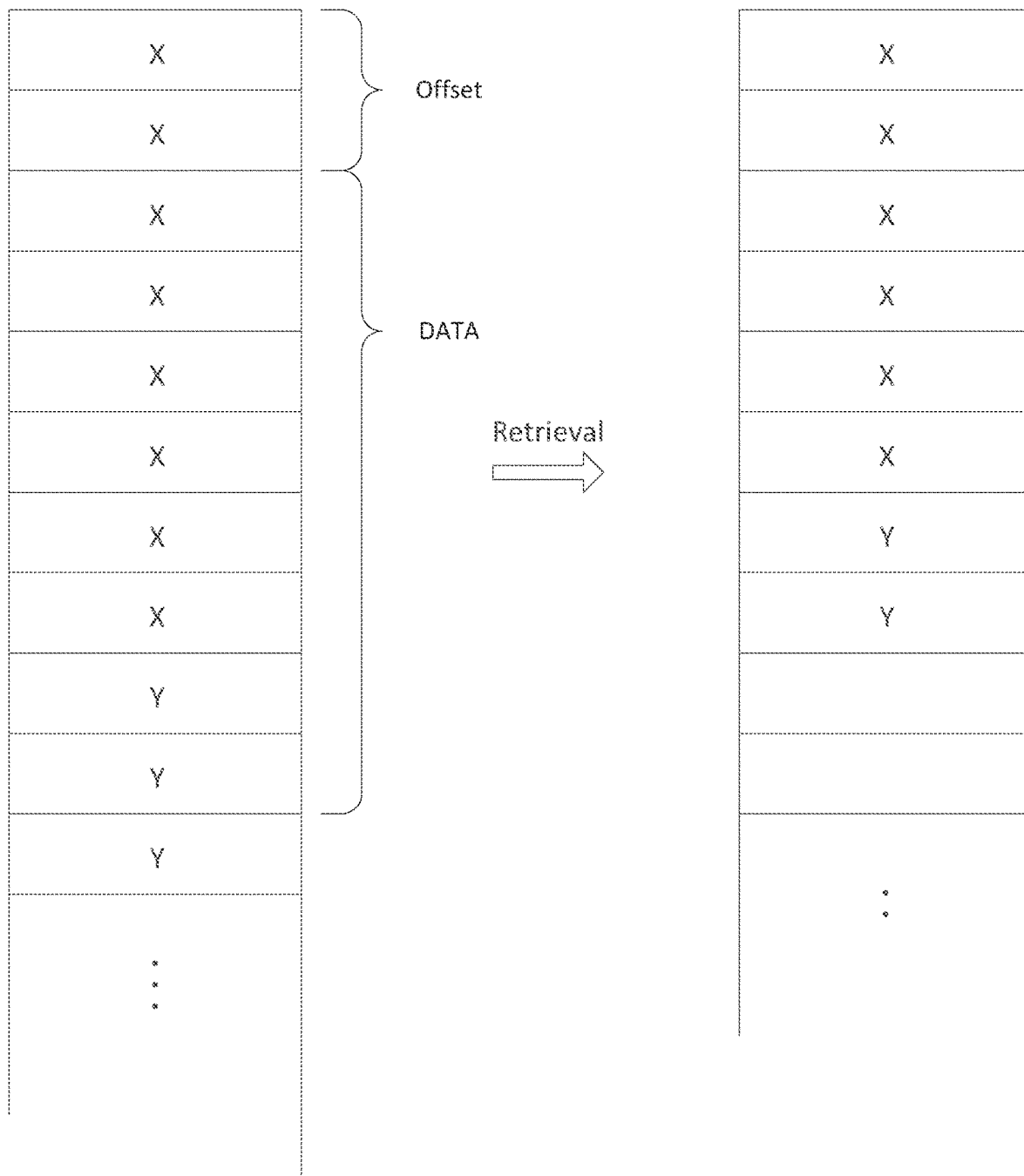
FIG. 33B illustrates an exemplary 8-byte access for misaligned data according to examples of the disclosure.

FIG. 32 shows the application of queue 3520 to AGU 3450 in DPU pipeline 900. As in FIG. 31, there are four stages of each instruction in the pipeline (stages 1-4). It is to be understood that the use of four stages is merely exemplary. Pipeline 900 may include any suitable number of stages. FIG. 34A shows a header period from $t_9^0$-$t_9^2$ as the AGU 3450 is programmed with control parameters 3320 when DPUs 3330a-m are waiting for the AGU 3450 to generate addresses 3430. As shown in FIG. 32, full throughput is achieved at $t_9^2$ and continues until the trailer at $t_9^7$.

Queue 3520, as shown in FIG. 28, may accommodate multiple sets of AGU parameters 3320a-k (or control parameters 3320). For example, control parameters 3320 for region 1 are provided to AGU 3450 during the header period $t_9^0$-$t_9^1$. Addresses 3450 have been generated from the region 1 control parameters 3320 at $t_9^1$, at which point queue 3520 provides control parameters 3320 for region 2 to AGU 3450. Substantially simultaneously, the addresses 3430 generated by AGU 3450 based on control parameters 3320 for the first image region are provided to the DPU pipeline 900. This initiates evaluation of instructions 910-913 by DPUs 3330a-m, reaching full throughput at $t_9^2$. As discussed above, while full throughput is achieved by DPU pipeline 900, AGU 3450 is already processing control parameters 3320 for the next image region, i.e., region 2. In other words, control subsystem 3310 will keep pushing control parameters 3320 (or AGU parameters 3320a-k) in the queue 3520 until the queue 3520 becomes full to capacity with control parameters 3320. Queues 3520 of various capacities may be used, as indicated by FIG. 28 showing queue 3520 having a variable capacity of k.

As shown in FIG. 32, control parameters 3320 are supplied to AGU 3450 for region 3 by $t_9^3$. In the example shown in FIG. 32, the queue 3520 becomes full at $t_9^4$. This means that control parameters 3320 for several regions have been added to the queue 3520 such that no more control parameters 3320 can be added. In this situation, AGU 3450 can continue to process control parameters 3320 in the queue 3520 to generate additional addresses 3450 for DPUs 3330a-m, even though no new control parameters are added to the queue 3520. When the AGU 3450 generates a new set of addresses 3430 and is ready to accept a new set of control parameters 3320, a spot opens in the queue 3520 and new control parameters 3320 can be added. This opening up of the queue 3520 is indicated in FIG. 32 at $t_9^5$. At $t_9^5$, more control parameters 3320 are added to queue 3520. More or less at the same time, the AGU 3450 can be programmed with a new set of control parameters 3320 in order to generate a new set of addresses 3430 for another region. In the simplified example shown in FIG. 32, the control parameters 3320 for four image regions are provided to the AGU 3450. It is to be understood that this is merely exemplary, and any suitable number of regions may be processed in queues 3520 that may accommodate any suitable capacity for sets of control parameters 3320.

It is to be understood that the above process will proceed with the DPU pipeline 900 fully occupied until the last instruction begins to process. This is represented in FIG. 32 by instruction 914, which begins to process at $t_9^7$. Accordingly, $t_9^7$ begins the trailer period, as discussed in more detail above. Prior to the execution of the last process, it is understood that the DPU pipeline 900 will be occupied at full throughput (as shown in FIG. 32 between $t_9^2$ and $t_9^7$.), unless the control subsystem 3310 cannot supply the queue 3520 with control parameters 3320 fast enough to keep with the pace at which AGU 3450 processes the control parameters 3320 to produce addresses 3430. In that case, the queue 3520 will become empty and the data processing subsystem 3380 will stall until the control subsystem 3310 can push more control parameters 3320 in the queue 3520.

As shown in FIGS. 26 and 28, the processing subsystem 3380 may include an optional combining element or feature ("comb") 3360. The combining element 3360 can be used to address the following problem that may arise when the processing subsystem 3380 needs to access "misaligned data." Note that the combine feature 3360 is shown in FIGS. 3 and 5 as having multiple components 3360a-m. Each of these multiple components 3360a-m may separately process data as described below. A routing component 3390 may provide different sets of data to combine components 3360a-m for this purpose.

Commonly, hardware memory modules provide a limited, fixed number of bytes per cycle. In other words, hardware memory may only access and provide memory in increments or chunks having a certain number of bytes. A typical hardware memory module may provide, for example, only 8 bytes per cycle. In that case, the memory module provides bytes located at addresses that are multiples of 8 (8 bytes). Desired or sought data for computation or processing may be stored in memory such that the data does not align with these "chunks." This results in a "misalignment of data" acquired from the hardware memory in that required data may be present in retrieved data, but not at a convenient location. In this case, the misaligned data needs to be retrieved and processed before it can be used. The combining element 3360 can assist AGUs 3350a-n with this procedure.

FIGS. 10A and 10B illustrate an 8-byte access for aligned (FIG. 10A) and misaligned (FIG. 10B) data. In both cases, bytes of desired data are identified by "X." Ideally, every data retrieval or read would be "aligned," as shown in FIG. 10A. In that case, the data retrieval will provide exactly 8 bytes of desired data to the local store. This is represented in FIG. 10A as showing all of the desired 8 bytes of data (i.e., the data identified as "X"). That is, in the case of aligned data, a single read would provide all of the desired data. Often, however, as shown in FIG. 10B, reads may be misaligned with data storage by an "Offset." In this case, only a 6-byte portion of the desired data ("X") is provided by the retrieval/read. In addition, two bytes of unwanted data ("Y") are provided in place of the remaining bytes of desired data ("X"). In this case, multiple memory accesses are necessary to extract all of the desired data ("DATA," at left). Subsequent processing is then necessary to extract the desired data from the retrieved data sets.

The problem in a vector processor context is best shown by example. One common operation in image processing is to obtain a derivative. The derivative (f'(x)) of a function (f(x)) is often defined by taking the difference in vector values at two different cycles defined with respect to x=0 as follows:

$$f'(x) = \frac{f(x+1) - f(x-1)}{2} \quad \text{(Eq. 2)}$$

Where "x+1" is the later clock cycle and "x-1" is the earlier cycle. In order to evaluate this expression using a vector processor (e.g., the processor shown in FIG. 2), the processing subsystem 3380 needs to obtain f(0+1) [or f(1, 2, 3, ..., 8)] and f(0-1) [or f(-1, 0, ..., 6)]. These quantities would both be unaligned with a hardware memory providing 8 bytes per cycle.

FIG. 34A presents a schematic showing how the combining element 3360 operates to solve this problem. Specifically, comb 3360 provides two unaligned 8-byte vectors 1101 and 1102 and an offset 1103 to provide aligned data. In the derivative example of Eq. 2 discussed above, the 8-byte vector f(-1, 0, ..., 6) is sought in order to evaluate the expression. However, the current vector provided by the hardware may have a significant offset. For example, the memory hardware might fetch a previous 1102 and a current 1101 vector, as shown in FIG. 34A. The sought vector may be embedded in the previous 1102 and current 1101 vectors, such that the sought vector needs to be extracted from the 16-byte vector that represents the concatenation of previous 1102 and current 1101. The combine function provides the sought vector, provided the offset 1103 is known.

As shown in FIG. 34A, combine operation will concatenate previous 1102 with current 1101 vectors to form a 16-byte vector, with the desired data 1105. Therefore, the operation comb(prev, curr, 7) will provide the sought vector f(-1, 0, ..., 6) by 1) first concatenating 1102 and 1101, then applying the requested offset to extract the correct data.

In the example case, the sought vector is f(-1, 0, ... 6), while the current vector 1101 may be f(0, ..., 7). The previous vector 1102 may be f(-8, ..., -1). This means that combining the current vector 1101 with the previous vector 1102 at an offset of 7 will provide the sought after vector (-1, 0, ... 6). In other words, comb(prev, curr,7). Although the example in FIG. 34A shows comb operation concatenating two vectors, it is not limited to that case. More specifically, any suitable number of vectors (e.g., 2, 3, or more) may be concatenated to extract data. Moreover, the number of vectors necessary for concatenation using "comb" may depend or relate to the amount of memory provided by the hardware memory per cycle. For example, comb 3360 may include obtaining three vectors 1102, 1101, and 1104 shown in FIG. 34A and extracting a data set (not shown) common to the vectors. In addition, combinations of still more vectors (e.g., 4, 5, or more) are possible using a modified version of comb 3360 shown in FIG. 34A. Alternatively, data from more than two vectors can be combined using comb 3360 multiple times in succession on the more than two vectors.

In the example above, the offset "7" (e.g., offset 1103 in FIG. 34A) has no particular relationship to the data being processed. However, in the context of image processing, the offset can, and often does, correspond to the region of the image being processed. For example, the offset may be associated with the location in memory of data corresponding to image window 3662 (FIG. 29). In that sense, each image window 3662 may have its own corresponding offset that is read and understood by AGUs 3350a-n because the window has a specific location in memory. Other image windows (not shown) may have their own, different offsets in memory corresponding to their position. In this and other cases, AGUs 3350a-n can program the offset 1103 based on the control parameters 3320 provided to them by the control subsystem 3410. In one example, AGUs 3350a-n may compute the offset 1103 based on the control parameters 3320.

In the case where the iteration proceeds through an image window 3662, previous 1102 and current 1101 vectors in FIG. 34A will change as AGUs 3350a-n and the rest of the data processing subsystem 3380 iterate through the image window. However, the offset 1103 will likely remain the same, e.g., will be "loop invariant" or "iteration invariant."

As discussed above, the AGUs 3350*a-n* can program comb 3360 with such a loop invariant offset 1103. AGUs 3350*a-n* calculate addressees for a new image window 3662 and/or set of control parameters 3320. In the example above concerning the evaluation of Eq. 2, the offset 1103 would be "7." In other examples, where an image window 3662 starts at an address which is a multiple of 8 (8-byte memory retrieval, as shown in FIG. 10) plus the offset (e.g., 3), AGUs 3350*a-n* may ascertain this offset and provide it to comb 3360. In this variation, it is possible for each AGU 3350*a-n* to program comb 3360. On the other hand, it is possible for only a subset of AGUs 3350*a-n* to program comb 3360 at a time, depending on need.

As shown in FIG. 32, use of queue 3520 to queue control parameters 3320 may increase throughput of the overall data processing subsystem 3380. Although not explicitly shown in FIG. 32, this increase in throughput may include decreasing or minimizing stalls or delays in calculating parameters input to the comb 3360 feature. For example, when control parameters 3320 are queued in queue 3520, as shown in FIG. 28, this can also provide input parameters comb 3360 in a way that allows it to maximize possible throughput.

Therefore, according to the above, some examples of the disclosure are directed to a device comprising a memory and a data processing subsystem. The data processing subsystem may comprise at least one data processing unit, and at least one address generation unit that generates a first set of addresses in the memory based on a first set of parameters. The device may include a control subsystem that supplies the first set of parameters and a second set of parameters to the data processing subsystem, and a queue that stores the first set of parameters and the second set of parameters and that provides the second set of parameters to the address generation unit while the data processing unit processes data using the first set of addresses. The data may be processed by the data processing unit comprising at least one image window. At least one of the first set of addresses may correspond to a location in the memory storing a first portion of the least one image window. The address generation unit may generate the first set of addresses by iterating over the at least one image window using an image parameter, the image parameter comprising an address in the memory storing a second portion of the image window. The data processing subsystem may comprise a scalar processor that provides the image parameter to the address generation unit. The data processing unit may comprise at least one vector processor and the data processed by the data processing unit comprises vector data. The data processing subsystem may retrieve data from the memory in increments, and the data processing unit may concatenate a misaligned vector data in the retrieved data using an offset, the offset indicative of how the misaligned vector data is misaligned with respect to the increments in the memory. The address generation unit may calculate the offset used by the data processing unit in the concatenation. The address generation unit may generate the first set of addresses by iterating over portions of the at least one image window, and the offset may comprise an iteration invariant parameter.

Figure 34B:
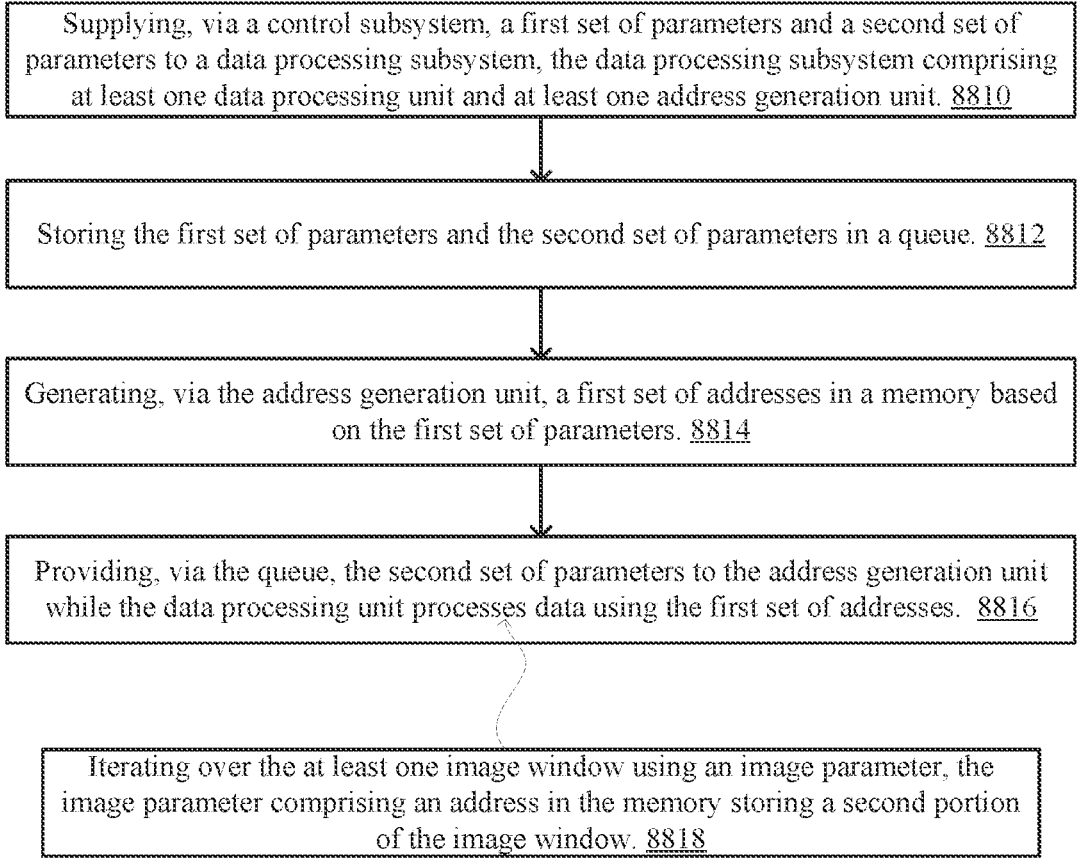
FIG. 34B illustrates an exemplary method for processing data according to examples of the disclosure.

Some examples of the disclosure are directed to a method for processing data. Referring to FIG. 34B, the method 8800 comprising supplying (8810), via a control subsystem, a first set of parameters and a second set of parameters to a data processing subsystem, the data processing subsystem comprising at least one data processing unit and at least one address generation unit, storing (8812) the first set of parameters and the second set of parameters in a queue, generating (8814), via the address generation unit, a first set of addresses in a memory based on the first set of parameters, and providing (8816), via the queue, the second set of parameters to the address generation unit while the data processing unit processes data using the first set of addresses. The data processed by the data processing unit may comprise at least one image window, at least one of the first set of addresses may correspond to a location in the memory storing a first portion of the least one image window, and step 8814 of generating, via the address generation unit, the first set of addresses may include iterating (8816) over the at least one image window using an image parameter, the image parameter comprising an address in the memory storing a second portion of the image window. The data processing subsystem may comprise a scalar processor that provides the image parameter to the address generation unit. The data processing unit may comprise at least one vector processor and the data processed by the data processing unit comprises vector data. The method may comprise retrieving, via the data processing subsystem, data from the memory in increments, and concatenating, via the data processing unit, misaligned vector data in the retrieved data using an offset, the offset indicative of how the misaligned vector data is misaligned with respect to the increments in the memory. The method may comprise calculating, via the address generation unit, the offset used by the data processing unit in the concatenation. The method may comprise generating, via the address generation unit, the first set of addresses by iterating over portions of the at least one image window, and the offset may comprise an iteration invariant parameter.

Some examples of the disclosure are directed to a non-transitory computer-readable storage medium having stored thereon a set of instructions of a software program that when executed by a computing device, cause the computing device to supply, via a control subsystem, a first set of parameters and a second set of parameters to a data processing subsystem, the data processing subsystem comprising at least one data processing unit and at least one address generation unit, store the first set of parameters and the second set of parameters in a queue, generate, via the address generation unit, a first set of addresses in a memory based on the first set of parameters, and provide, via the queue, the second set of parameters to the address generation unit while the data processing unit processes data using the first set of addresses. The data processed by the data processing unit may comprise at least one image window, at least one of the first set of addresses corresponds to a location in the memory storing a first portion of the least one image window, and the set of instructions may cause the computing device to generate, via the address generation unit, the first set of addresses by iterating over the at least one image window using an image parameter, the image parameter comprising an address in the memory storing a second portion of the image window. The data processing subsystem may comprise a scalar processor that provides the image parameter to the address generation unit. The data processing unit may comprise at least one vector processor and the data processed by the data processing unit comprises vector data. The set of instructions may cause the computing device to retrieve, via the data processing subsystem, data from the memory in increments, and concatenate, via the data processing unit, misaligned vector data in the retrieved data using an offset, the offset indicative of how the misaligned vector data is misaligned with respect to the increments in the memory. The set of instructions may cause the computing device to calculate, via the address generation unit, the offset used by the data processing unit in the concatenation. The set of instructions may cause the computing device to generate, via the address generation unit, the first set of addresses by iterating over portions of the at least one image window, and the offset may comprise an iteration invariant parameter.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims Single Thread Vectorization with Bucket Sorting In the following the terms data point and data unit are used in an interchangeable manner An example capability of the vector processor 3200 of FIG. 17 can include the ability to generate and store histograms. A histogram can include a data structure or table in which the frequency of occurrence of data belonging to a particular category is tabulated. The possible data values are divided into several categories or bins and the frequency of occurrence is tabulated for each bin.

Figure 35:
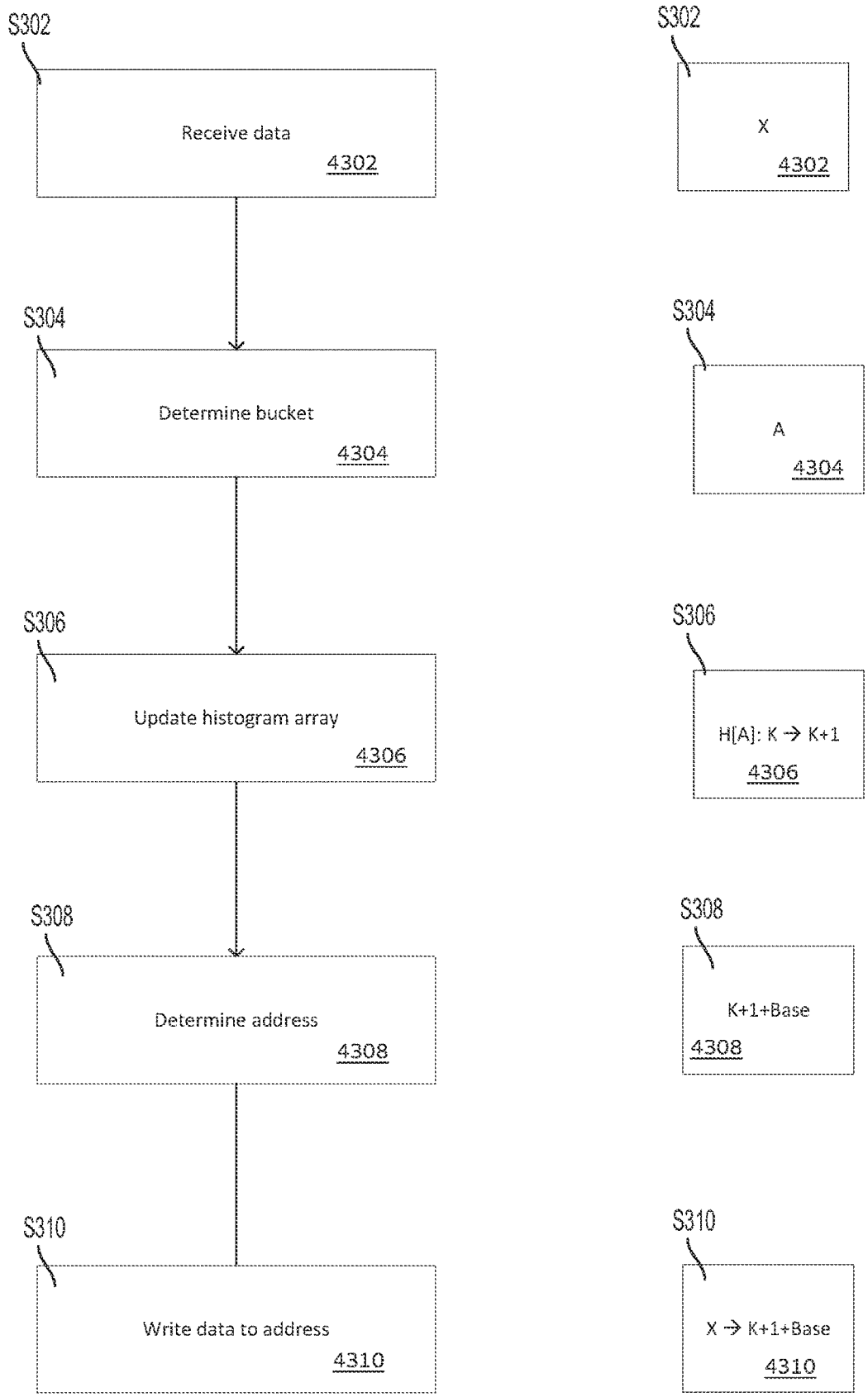
FIG. 35 illustrates an exemplary method for serialized bucket sorting according to examples of the disclosure.

Storing a histogram can include sorting data into bins, counting the number of members within a bin and then ensuring that data belonging to a particular bin is stored together in memory. FIG. 35 illustrates an exemplary method for bucket sorting according to examples of the disclosure. The method illustrated in FIG. 35 can be implemented by the vector processor illustrated in FIG. 17.

At step S4302, data is received by the vector processor to be sorted into a bin. The data can be input from an external source via the input registers 206a-c, or in another example can already exist in the addressable memory register 202. In the example illustrated in FIG. 35, each step is shown as well as a corresponding example on an example data labeled x. In step 4302 the data received is labeled "x."

At step S4304, the bucket to which the received data will be categorized into is determined. That determination can be made by the processing circuitry 208. In an image processing context, the determination of which bin in the histogram a datum is to be stored in can depend on the "tone" represented by the data. In other examples, the bin can represent a brightness level of an individual pixel. As illustrated in S4304, and for the purposes of illustration, the bucket in which datum "x" is to be stored is represented by "A."

At step S4306, a histogram array of the vector processor can be updated. A histogram array can be stored within the addressable registers 202 and represent the total number of members (i.e., the number of data points) that have been categorized into a particular bin. In the example of FIG. 35, at step S4306, H[A] can contain K elements prior to the determination that datum "x" is to be also part of bin A. Histogram H[A], corresponding to the number of data points within bin "A" can be updated. In the example of S4306, H[A] has been updated to show that there are now K+1 elements (thus adding datum "x") within the bin.

Once the histogram array is updated, based on the updated value contained within the histogram array, an address location within the addressable register 202 can be determined at step S4308. As discussed above, each data point belonging to a particular data point can be stored together within the addressable register 202. Thus in the example of FIG. 35, all data points (including x) can be stored together in memory. Once a data point has been assigned to a histogram bin at step S4304, that data point can then be stored together with all data points that also belong to the histogram bin. In order to facilitate such a sorting of data points within the addressable register 202, the histogram array can be utilized to determine where in the addressable register the data point is to be stored.

In the example of S4308, the histogram array of bin A (H[A]) can be used to determine where in memory the data point x is to be stored, as x has been determined at step S4304 to be a part of bin A. As shown in S4308, the determined address can be determined to be K+1+Base, wherein K+1 represents the updated value of the histogram as discussed in the discussion with respect to step S4306, and the Base address represents an initial offset value that signifies the beginning memory location for the data points of the A bin. Thus, in one example, the first data point to be classified in the A bin, can be stored at the Base+1 memory location. The second data point (which in the example of FIG. 3, will cause H[A] to update to 2) can be stored at memory location Base+2. Thus, using the example of FIG. 3, as "x" represents the K+1th data point of the histogram bin A, it can be stored at the memory location K+1+Base at step S4310.

The example of FIG. 35 illustrates an example of a serialized histogram sorting process. Each data point is sorted into a bin, and then stored in a memory location based on the bin determination one at a time. The process illustrated in FIG. 35 can also be vectorized meaning that multiple data points can be sorted simultaneous, such that a vector of data (i.e., a single data object with multiple data points) can be sorted in one operation.

Vectorizing a bucket sort algorithm can lead to a speed-up in the time it takes to generate a histogram. This speed-up can prove beneficial in applications that require real-time processing and or applications in which large amounts of data are processed. Rather than having to wait for each individual data point has to be sorted one at a time, blocks of data can be simultaneously sorted. In one example, if a vector of data contained four data points, and those four data points are simultaneously sorted into bins, the amount of time needed to sort those data points can be greatly reduced versus a sorting algorithm in which each data point is sorted one at a time.

Figure 36:
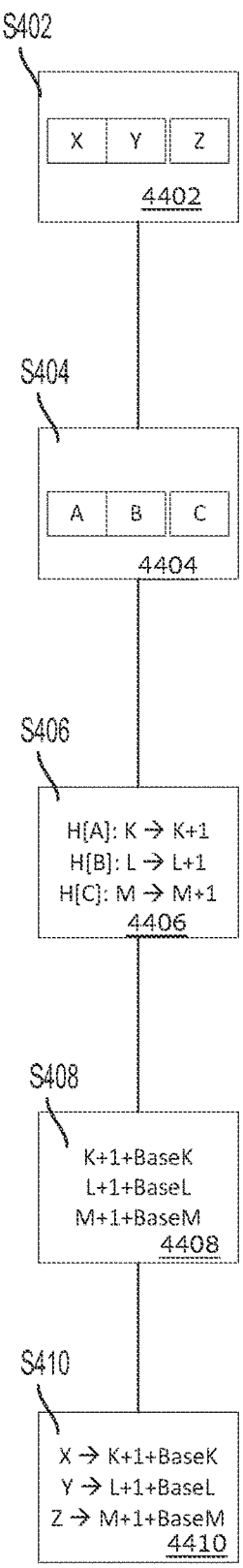
FIG. 36 illustrates an exemplary method for vectorized bucket sorting according to example of the disclosure.

FIG. 36 illustrates an exemplary vectorized bucket sort algorithm according to examples of the disclosure. The algorithm of FIG. 4 is similar to the example of FIG. 35 discussed above, but rather than operating on one data point at a time, a vector of 3 data points can be sorted simultaneously.

At step S4402, a vector of data can be received. In the example of FIG. 36, the vector of data can contain three data points labeled x, y, and z. At step S4404, each data point of the vector can be assigned a bucket in substantially the same manner as discussed with respect to step S4304 of FIG. 35 In the example of S4404, data points x, y, and z can be sorted into buckets A, B, and C respectively.

Once each data point within a vector has been matched to a bin within a histogram, the process can move to S4406, wherein each histogram array associated with the matched bins is updated similar to step S4306 of FIG. 35. In the example of FIG. 36 at step S405, each histogram bin A, B, C can have a histogram array H[A], H[B], and H[C] respectively associated with it. At step S4406, each histogram array can be simultaneously updated Similar to the discussion in FIG. 35, the histogram arrays can keep a count of the number of data points contained within a particular histogram bin. The arrays can be updated each time a new data point is added to a particular histogram array. At step S4406, as bins A, B, and C are receiving new data points, each of their associated histogram arrays can be incremented by one to account for the new data point. Thus, as an example, H[A] can be updated from K to K+1, H[B] can be updated from L to L+1, and H[C] can be updated from M to M+1.

At step S4408, the addresses for which each data point is to be written to can be determined in substantially the same manner as described in FIG. 35 at step S4308. Each histogram bin can have a corresponding base address in which the addresses that each data point within the bin are to be written to are based on. The address can be determined by adding the current histogram array value of the bin to a base address of the bin. In the example of FIG. 36, at step S4408, data point x can be written to address K+1+BaseK, wherein BaseK can represent the base address of bin K's data points. Similarly, data point y can be written to memory location L+1+Base L, wherein BaseL can represent the base address of bin L's data points. Finally, data point z can be writing to memory location M+1+BaseM, wherein BaseM can represent the base address of bin M's data points. Instead of producing a single address as was discussed with respect to step S4308 of FIG. 35, the method can produce a vector of addresses, wherein each element of the vector of addresses can correspond to the address of a corresponding data point contained within the vector of data originally received. At step s4410, the data can be written to the memory locations determined in step S4408.

The algorithm described with respect to FIG. 36 can operate effectively if each data point within a vector is to be sorted into different bins. When each data point within a vector is to be sorted to different bins, than an algorithm that relies solely on the updated histogram array can be effective, because the updated histogram array value can be added to the base memory address of the bin to generate an accurate address at which the data point can be stored. If however, the vector contains two data points that are to be sorted into the same bin, the algorithm described above can produce errors.

Figure 37:
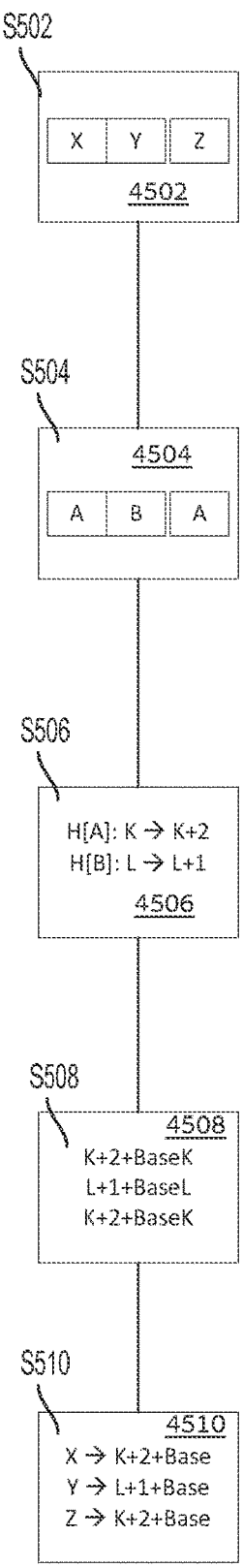
FIG. 37 illustrates another exemplary vectorized histogram bin sorting algorithm according to examples of the disclosure.

FIG. 37 illustrates another exemplary vectorized histogram bin sorting algorithm according to examples of the disclosure. The algorithm of FIG. 37 is similar to the example of FIG. 36 discussed above, but rather than have each data point within a vector sorted into different bins, multiple data points within the same vector can be sorted into the same bin.

At step S4502, a vector of data can be received. In the example of FIG. 37, the vector of data can contain three data points labeled x, y, and z. At step S4504, each data point of the vector can be assigned a bucket in substantially the same manner as discussed with respect to step S4304 of FIG. 35 In the example of S4404, data points x, y, and z can be sorted into buckets A, B, and A respectively. In contrast to the example of FIG. 36, in the example of FIG. 37, two data points within the same vector have been determined to belong to the same bucket (i.e., both data points x and z are determined to belong to bucket A).

At step S4506, in a manner similar to step S4406 of FIG. 36, the histogram array of each bin is updated to reflect the addition of the added data points. As illustrated, H[A] is updated to K+2 from K to reflect the fact that two data points are being added to bin A. H[B] is updated to K+1 from K to reflect the fact that one data point is being added.

At step s4508, similar to step S4408 of FIG. 36, the addresses to which each data point is to be written is determined and a vector of addresses can be generated based in part on the value of the histogram array associated with the bin that each data point is to be sorted into. As shown at step S4508, since the algorithm uses the histogram array value to generate an address, both data points x and z are assigned to address K+2+BaseK, since the value of H[A] equals K+2.

At step s4510, the data points can be stored in the address locations determined at step S4508. However, as step S4508 uses the histogram array to determine addresses, both data points x and z can be written to the same address location at K+2+BaseK. Writing both data points to the same location in memory can lead to errors and loss of data.

In a serialized vector bucket sorting algorithm as discussed with respect to FIG. 35, as each data point is sorted one at a time, the histogram array can be updated point by point incrementally, such that each data point within a particular bin can be written to a unique memory address. However, in a vectorized sorting algorithm, as discussed in FIGS. 4 and 37, in which data points are simultaneously sorted, the histogram array can be updated to account for multiple data points simultaneously. Therefore, an algorithm that solely relies on the updated histogram array to generate an address can cause memory contentions between data points to be stored in the same bin, as illustrated in the example of FIG. 37. Therefore, in a vectorized bucket sort algorithm, the algorithm can be modified to account for the instance in which multiple data points within a vector are to be sorted into the same bin.

Figure 38:
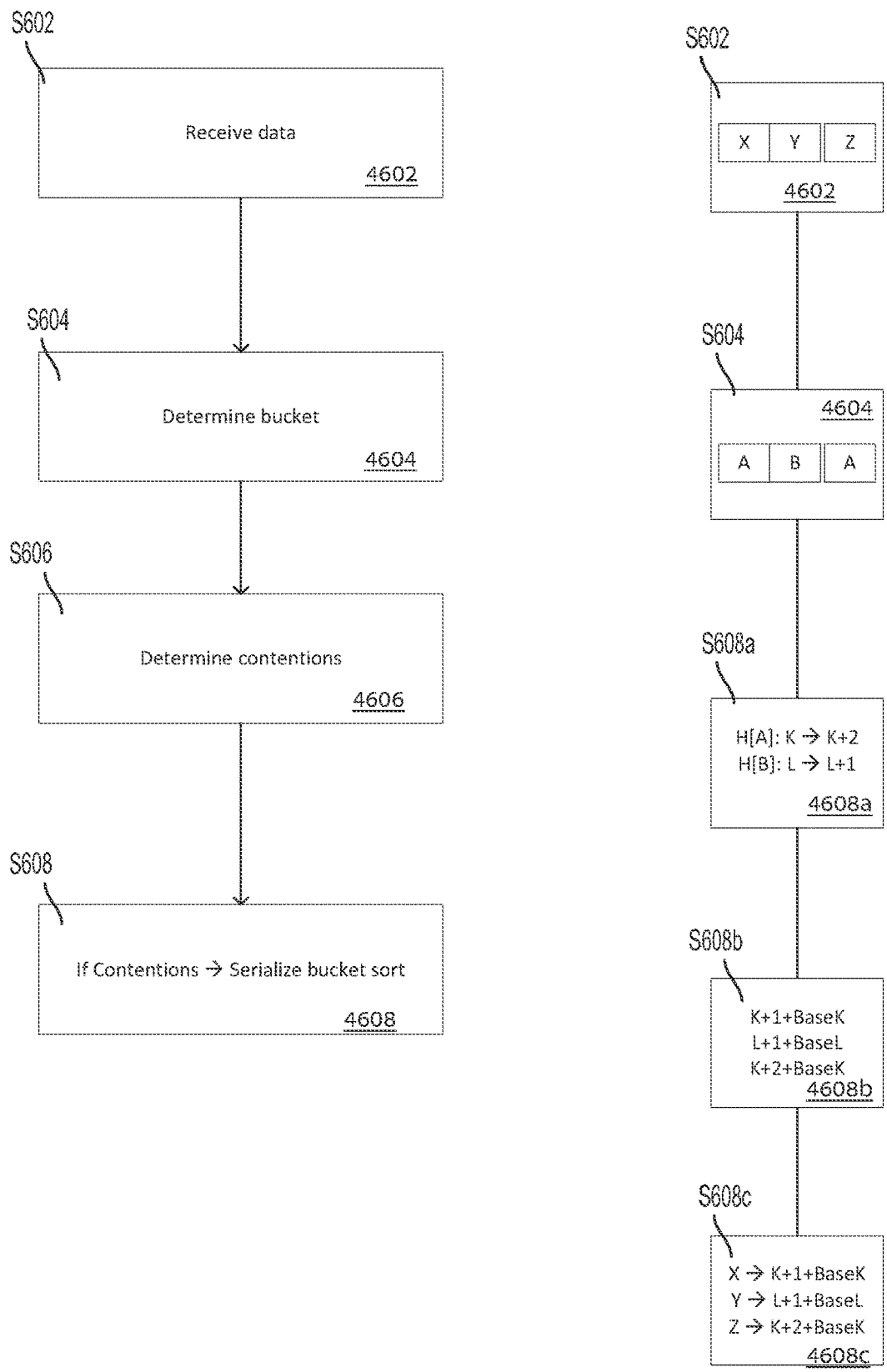
FIG. 38 illustrates an exemplary vectorized bucket sort algorithm capable of handling contentions according to examples of the disclosure.

FIG. 38 illustrates an exemplary vectorized bucket sort algorithm capable of handling contentions according to examples of the disclosure. Steps S4602 and S4604 are identical to their counterparts S4502 and S4504 of FIG. 37 and thus a discussion of those steps can be referenced above.

In order to handle instances in which multiple data points within a single vector are sorted into the same bin, at step S4606 the algorithm can determine if there are any contentions between the buckets in which the data points have been sorted into at step S4604. A contention can be defined as two or more data points that are to be classified into the same bin. As discussed with respect to FIG. 37, using the vectorized bucket sorting example of FIG. 36 in a scenario in which there is a contention between two or more data points, can lead to the data points being written into erroneous locations in the memory.

Once it has been determined that a contention exists, the vector sorting algorithm can be serialized at step 4608 to ensure that data points are accurately stored in memory according to the bucket they have been sorted into.

As shown at steps S4608a-c, the vector bucket sorting algorithm discussed with respect to FIGS. 3 and 4 can be employed but rather than operate on a vector of data, the process can be serialized such that each data point in the vector can be operated on sequentially. Thus, at step S4608a the histogram array associated with bucket A can be updated to from K to K+1. After the first update to H[A], an address for data point x can be generated as discussed above with respect to FIGS. 3 and 4. As shown in the example with respect to step S4608a the address can be represented by the formula K+1+BaseK wherein K+1 can represent the updated histogram array value and BaseK can represent an initial memory address where the histogram array is to be stored as discussed above.

At step S4608b, the same process described with respect to step S4608a can be applied to the Y data point, wherein the histogram array associated with bucket B is updated and an address is generated for the storage in memory of data point Y.

At step S4608c, the same process described with respect to steps S4608a and S4608b can be applied to the Z data point, wherein the histogram array associated with bucket A is updated (for a second time) and an address is generated for the storage in memory of data point Z.

Referring again to step S4608, if there are no memory contentions detected at step S4606 then the bucket sort can be vectorized according the examples discussed with respect to FIG. 36. Finally, at step S4608d, the individual data points X, Y, and Z can be written to their respective addresses. In one example, step S4608d can be done sequentially, meaning that each individual data point is written to memory sequentially. In another example, the data points can be written to memory in parallel in substantially the same manner as discussed with respect to FIG. 35.

By partially serializing the vector bucket sorting algorithm in the case of memory contentions as discussed above in the example of FIG. 38, the throughput of the bucket sorting algorithm can still produce a faster throughput in comparison to a bucket sorting algorithm that is purely serialized as discussed with respect to FIG. 35. When there are no contentions within a particular vector, the throughput is at its fastest as the whole algorithm can be operated on the vector. However, if there is a contention, while the throughput is reduced to deal with the contention, by only serializing the portion of the algorithm necessary to ensure no memory errors, a higher throughput is still maintained when compared to a pure serialized bucket sorting algorithm.

Therefore, according to the above, some examples of the disclosure directed to A device comprising: at least one input register, at least one addressable register, and at least one processing unit, the processing unit configured to generate a histogram by: receiving a data vector via the input register, the data vector comprising multiple data points, matching the multiple data points to multiple bins of the histogram, determining whether a contention exists in the matched multiple data points, sorting at least two of the data points of the data vector serially into multiple memory locations if a contention exists in the matched multiple data points, and sorting at least two of the data points of the data vector in parallel into multiple memory locations if a contention does not exist in the matched multiple data points. Additionally or alternatively to one or more of the examples disclosed above, in some examples sorting two or more of the data points of the data vector serially into multiple memory locations if a contention exists in the matched multiple data points comprises: updating during a first time period a histogram array associated with at least one bin of the histogram, generating a first address location, the first address location corresponding to a first data point of the data vector, the first address location being based on the updated histogram array updated during the first time period, writing the first data point to the addressable register based on the generated first address location, updating the histogram array during a second time period, generating a second address location, the second address location corresponding to a second data point of the data vector, the second address location being based on the update histogram array updated during the second time period, and writing the second data point to the addressable register based on the generated second address location. Additionally or alternatively to one or more of the examples disclosed above, in some examples sorting two or more of the data points of the data vector in parallel if a contention does not exist in the matched multiple data points comprises: updating a first histogram array associated with a first bin of the histogram array during a first time period, updating a second histogram array associated with a second bin of the histogram array during the first time period, generating a first address location, the first address location corresponding to a first data point of the data vector, the first address location being based on the updated first histogram array, generating a second address location, the second address location corresponding to a second data point of the data vector, the second address location being based on the updated second histogram array, writing the first data point to the addressable register based on the generated first address location during a second time period, and writing the second data point to the addressable register based on the generated second address location during the second time period. Additionally or alternatively to one or more of the examples disclosed above, in some examples determining whether an address contention exists within the matched multiple data points comprises determining whether two or more of the multiple data points matched to a common bin of the multiple bins of the histogram. Additionally or alternatively to one or more of the examples disclosed above, in some examples generating the first address location and generating the second address location comprise adding a value of the histogram array to a base address associated with at least one bin of the histogram. Additionally or alternatively to one or more of the examples disclosed above, in some examples generating the first address location comprises adding a value of the updated first histogram array to a base address associated with a first bin of the histogram, and wherein generating the second address location comprises adding a value of the updated second histogram array to a base address associated with a second bin of the histogram. Additionally or alternatively to one or more of the examples disclosed above, in some examples matching the multiple data points to multiple bins of the histogram comprises associating each data point of the multiple data points to a bin of the multiple bins of the histogram.

Some examples of the disclosure are directed to a method comprising: receiving a data vector via an input register, the data vector comprising multiple data points, matching the multiple data point to multiple bins of the histogram, determining whether a contention exists in the matched multiple data points, sorting at least two of the data points of the data vector serially into multiple memory locations if a contention exists in the match multiple data points, and sorting at least two of the data points of the data vector in parallel into multiple memory locations if a contention does not exists in the matched multiple data points. Additionally or alternatively to one or more of the examples disclosed above, in some examples, sorting two or more of the data points of the data vector serially into multiple memory locations if it is determine that a contention exists in the matched multiple data points comprises: updating during a first time period a histogram array associated with at least one bin of the histogram, generating a first address location, the first address location corresponding to a first data point of the data vector, the first address location being based on the updated histogram array updated during the first time period, writing the first data point to an addressable register based on the generated first address location, updating the histogram array during a second time period, generating a second address location, the second address location corresponding to a second data point of the data vector, the second address location being based on the update histogram array updated during the second time period, and writing the second data point to the addressable register based on the generated second address location. Additionally or alternatively to one or more of the examples disclosed above, in some examples, sorting two or more of the data points of the data vector in parallel if a contention does not exist in the matched multiple data points comprises: updating a first histogram array associated with a first bin of the histogram array during a first time period, updating a second histogram array associated with a second bin of the histogram array during the first time period, generating a first address location, the first address location corresponding to a first data point of the data vector, the first address location being based on the updated first histogram array, generating a second address location, the second address location corresponding to a second data point of the data vector, the second address location being based on the updated second histogram array, writing the first data point to an addressable register based on the generated first address location during a second time period, and writing the second data point to the addressable register based on the generated second address location during the second time period. Additionally or alternatively to one or more of the examples disclosed above, in some examples, determining whether an address contention exists within the matched multiple data points comprises determining whether two or more of the multiple data points matched to a common bin of the multiple bins of the histogram. Additionally or alternatively to one or more of the examples disclosed above, in some examples, generating the first address location and generating the second address location comprise adding a value of the histogram array to a base address associated with at least one bin of the histogram. Additionally or alternatively to one or more of the examples disclosed above, in some examples, generating the first address location comprises adding a value of the updated first histogram array to a base address associated with a first bin of the histogram, and wherein generating the second address location comprises adding a value of the updated second histogram array to a base address associated with a second bin of the histogram. Additionally or alternatively to one or more of the examples disclosed above, in some examples, matching the multiple data points to multiple bins of the histogram comprises associating each data point of the multiple data points to a bin of the multiple bins of the histogram.

Some examples of the disclosure are directed to a non-transitory computer readable storage medium having stored thereon a set of instructions for processing chained instructions of a software program that when executed by a computing device, cause the computing device to: receive a data vector via an input register, the data vector comprising multiple data points, match the multiple data point to multiple bins of the histogram, determine whether a contention exists in the matched multiple data points, sort at least two of the data points of the data vector serially into multiple memory locations if a contention exists in the match multiple data points, and sort at least two of the data points of the data vector in parallel into multiple memory locations if a contention does not exists in the matched multiple data points. Additionally or alternatively to one or more of the examples disclosed above, sorting two or more of the data points of the data vector serially into multiple memory locations if it is determine that a contention exists in the matched multiple data points comprises: updating during a first time period a histogram array associated with at least one bin of the histogram, generating a first address location, the first address location corresponding to a first data point of the data vector, the first address location being based on the updated histogram array updated during the first time period, writing the first data point to an addressable register based on the generated first address location, updating the histogram array during a second time period, generating a second address location, the second address location corresponding to a second data point of the data vector, the second address location being based on the update histogram array updated during the second time period, and writing the second data point to the addressable register based on the generated second address location. Additionally or alternatively to one or more of the examples disclosed above, sorting two or more of the data points of the data vector in parallel if a contention does not exist in the matched multiple data points comprises: updating a first histogram array associated with a first bin of the histogram array during a first time period, updating a second histogram array associated with a second bin of the histogram array during the first time period, generating a first address location, the first address location corresponding to a first data point of the data vector, the first address location being based on the updated first histogram array, generating a second address location, the second address location corresponding to a second data point of the data vector, the second address location being based on the updated second histogram array, writing the first data point to an addressable register based on the generated first address location during a second time period, and writing the second data point to the addressable register based on the generated second address location during the second time period. Additionally or alternatively to one or more of the examples disclosed above, determining whether an address contention exists within the matched multiple data points comprises determining whether two or more of the multiple data points matched to a common bin of the multiple bins of the histogram. Additionally or alternatively to one or more of the examples disclosed above, generating the first address location and generating the second address location comprise adding a value of the histogram array to a base address associated with at least one bin of the histogram. Additionally or alternatively to one or more of the examples disclosed above, generating the first address location comprises adding a value of the updated first histogram array to a base address associated with a first bin of the histogram, and wherein generating the second address location comprises adding a value of the updated second histogram array to a base address associated with a second bin of the histogram. Additionally or alternatively to one or more of the examples disclosed above, matching the multiple data points to multiple bins of the histogram comprises associating each data point of the multiple data points to a bin of the multiple bins of the histogram.

Combining Power Management with Hardware Memory Error Handling

The specification and drawings refer to a "soft error". It should be noted that the soft error is merely a non-limiting example of errors that may be detected using one or more parity bits and that the application is not limited to soft errors. For example—the detected error may be a "hard" error.

The specification and drawings refer to a word that is read from the memory. A word is merely a non-limiting example of a width of memory line and/or an amount of data that is read during a single read operation from a memory and/or an atomic read operation unit. Accordingly—the size of data that is read from the memory may exceed a word.

The specification and drawings refer to a byte that is written to the memory. A byte is merely a non-limiting example of a width of a part of a memory line and/or an amount of data that is written during a single write operation to a memory and/or an atomic write operation unit. Accordingly—the size of data that is written to the memory may include any number of bits and may exceed a byte while being smaller than a corresponding width of memory line and/or an amount of data that is read during a single read operation from a memory and/or an atomic read operation unit.

The specification and drawings refer to a parity bit and to a parity check. It is noted that a parity check is merely a non-limiting example of an error detection code and that any type of error detection code and/or error correction detection can be applied. Parity bits may be regarded as a non-limiting example of redundancy bits.

Figure 39:
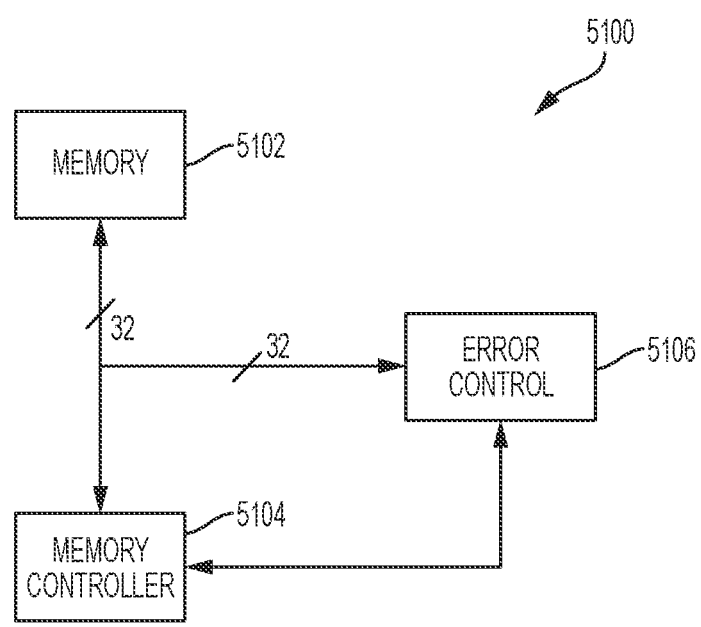
FIG. 39 illustrates an exemplary memory device according to examples of the disclosure.

FIG. 39 illustrates an exemplary memory device according to examples of the disclosure. The memory device 55100 can include a memory 55102. The memory 55102 can include the physical medium upon which data can be stored. In one example memory 55102 can be implemented as a volatile memory such as a synchronous dynamic random access memory (SDRAM) module or other type of dynamic random access memory (DRAM). A memory controller 55104 can be connected to the memory 55102. The memory controller 55104 can contain the logic that enables the memory 55102 to be read from and written to and can also contain the logic that allows for the memory 55102 to be refreshed.

Memory controller 55104 can also interface with error control circuitry 55106. Error control circuitry 55106 can include the logic necessary to check the memory 55102 for soft errors when the memory is read from by the memory controller 55104. One method by which the error control circuitry 55106 can check the memory for soft errors during a read cycle is to store parity bits that can be checked during a read cycle to determine if a soft error has occurred. Additionally or alternatively, the parity bits may be stored in memory 55102. The parity bits may be stored with the data that is protected by the parity bit—for example a data byte and one or more parity bits may be stored in consecutive memory and the one or more parity bits related to a data byte may precede or follow the data byte. Alternatively the one or more parity bits may be stored in a separate location than the data bytes or in any arrangement that is known to the memory controller 55104. A parity bit can refer to a bit that is inserted or added to the end of a string of binary code that indicates whether the number of bits in the string with the value one is even or odd.

As an example, for each byte of data stored in memory 55102, error control circuitry 55106 can store a parity bit indicating if the number of ones stored in the byte is even or odd. Alternatively—the parity bit is not stored in error control circuitry 55106 but is stored outside the error control circuitry—for example at memory 55102. The parity bit can be set when the byte is written to. When the byte of data from memory 55102 is read, the parity bit can be checked against the read value of the byte. If the parity bit does not correlate with the read data, then a soft error can be indicated. A soft error can refer to a bit stored within a byte that has changed values between the time it was written into memory and the time it was read from memory.

Conventionally, while memory can be written to on a byte-to-byte basis, it is read from in words. As an example, a word of memory may contain 32 bits of data or 4 bytes of data. During a write cycle, a single byte of memory can be written to, and the error control circuitry 55106 can determine the parity bit corresponding to the particular byte being written to. It is noted that the word of memory may include less than 32 bits or more than 32 bits. The buses of FIGS. 1 and 4 are marked as 32 bits buses are merely an example of buses widths.

However, during a read cycle, even though a program may only request to read a particular byte of data, the entire word in which the byte is contained can be read from. Once the entire word has been read from, error control circuitry 55106 calculates one or more new parity bits based on the read data and compares the one or more new parity bits to the one or more old parity bit that was previously calculated and stored (in memory 55102, in error control circuitry or elsewhere). The parity bits associated with the entire word can be checked against the entire word to determine if any soft errors have occurred. If the parity bits associated with the word do not match with the data found in the word, the memory controller 55104 can indicate that a soft error has occurred.

When memory 55102 is powered down, it may not be able to refresh or store the data it held prior to being powered down. Conventionally, when memory is powered on from an off or lower power state, the memory can be initialized, meaning data is written to each memory location so as to give it an initial state. Initializing the memory can help to ensure that the parity bits corresponding to each byte of data in the memory 55102 can be correct prior to any read or write cycles involving the memory take place.

Figure 40:
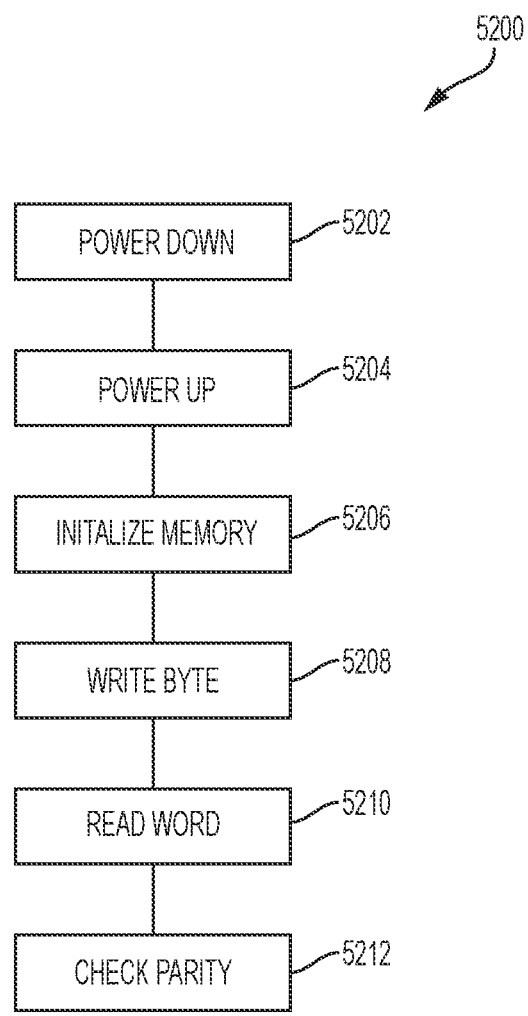
FIG. 40 illustrates an exemplary memory device power-gating method with memory initialization according to examples of the disclosure.

FIG. 40 illustrates an exemplary memory device power-gating method with memory initialization according to examples of the disclosure. The method 5200 of FIG. 40 can begin with step 5202 in which memory 55102 is powered down or put into a low-power state. A low power state (also referred to as a reduced mode) may be a state that once entered the data stored within memory 55102 is regarded as invalid. At step 5204, the memory 55102 can be powered up and returned to full functionality (may operate in a normal mode). At step 5206, the memory 55102 can be initialized. Initialization can refer to the process of writing data to each memory location of the memory. The data written to the memory 55102 can be arbitrary, and the process of initializing the memory can allow for the parity bits of each byte of memory to be initially established prior to any subsequent reading or writing of the memory.

Once the memory has been initialized at step 5206, a program utilizing the memory can perform a write command to a byte of the memory at step 5208. At step 5210, the program that wrote the byte of data to memory 55102 can subsequently read the same byte of data that was written to at step 5208. However, as discussed above, rather than only reading the byte of data that was previously written to, the memory controller 55104 can instead read the entire word of data in which the byte is stored.

At step 5212, the parity bits associated with the word of data in which the byte of data to be read is stored can be checked to determine if any soft errors have occurred between steps 5208 and step 5210. Even though only one byte of data has been written to out of the entire word, because the memory had been initialized at step 5206, the parity bits corresponding to the entire word should be indicative of whether a soft error has occurred.

By initializing the memory after a power on, the accuracy of the parity bits used to check for soft errors can be ensured. However, the process of writing data to each memory location so as to initialize the memory can be time consuming, and generally it can take many clock cycles for the each and every memory location to be initialized.

In devices that wish to use power-gating to minimize power leakage when a device is idle, the memory on the device may be powered on and off frequently (for example—multiple times per second). If the memory requires initialization each time it is powered on, the speed at which the device can process software instructions may be greatly reduced due to the fact that the memory must wait a substantial amount of time to initialize before any subsequent reading or writing of the memory can commence.

One way in which to minimize the amount of time that it takes to initialize memory, is to eliminate the process of memory initialization altogether. FIG. 3 illustrates an exemplary memory device power-gating method without memory initialization according to examples of the disclosure.

Figure 41:
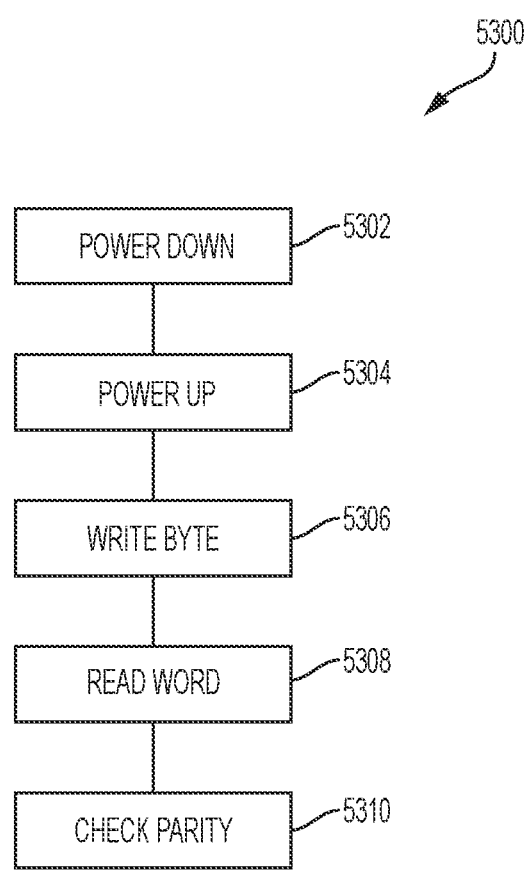
FIG. 41 illustrates an exemplary memory device power-gating method without memory initialization according to examples of the disclosure.
Figure 42:
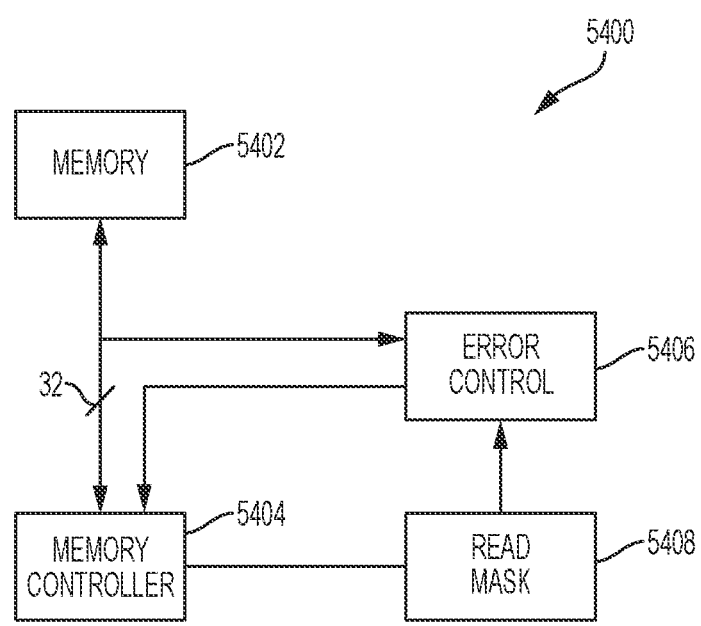
FIG. 42 illustrates an exemplary memory device with read mask functionality according to examples of the disclosure.

FIG. 41 illustrates an exemplary memory device power-gating method without memory initialization according to examples of the disclosure. The method 300 of FIG. 41 can begin in substantially the same way as described with respect to FIG. 40. At step 5302 the memory device can be powered down or placed into a low power state as is described above with respect to a power-gating operation. At a subsequent time period after powering down, the method can move to step 5304 in which the memory device is powered-up, however in contrast to the method described with respect to FIG. 40 the memory is not initialized upon powering up.

At step 5306, a program that is accessing the memory can write a byte of data to the memory device. At a later time period, at step 5308, the program can attempt to read the data that was written at step 5306. However, as discussed above, rather than only reading the byte of data from the memory, the memory controller can read the entire word in which the byte of data that is to be read in contained. At step 5310, the parity bits of the word read at step 5306 can be checked against the data stored within the word to determine if any soft errors have occurred.

As the memory has not been reinitialized, however, the bytes of the word that have not been written to may have data that has been corrupted due to the fact that the device was previously powered down. Therefore, the parity bits corresponding to the unwritten bytes of data within the word may not be reflective of the data that is actually stored within those bytes. Thus, at step 5310, the parity check may produce an indication of a soft error even though no soft error has occurred on the byte of data that was written to at step 5306 and read from at step 5310.

Thus, in a memory power-up procedure that does not involve a initialization process, while the time it takes to have the memory available to programs upon a power-up can be reduced, the likelihood of receiving false soft error indications can substantially increase.

One way to mitigate the likelihood of receiving false positive soft error indications in memory that has not been reinitialized is to only consider the parity bits associated with the byte of the word to be read from rather than all of the parity bits associated with the word. In this way, while the parity bits associated with uninitialized data may not reflect the state of the date in the uninitialized bytes, they can be ignored and thus not create a false positive indication for soft errors. Also, since the byte to be read has been previously written after the power on of the memory device, the parity bits associated with the byte of data to be read are more likely to accurately reflect the state of the data in the byte as the process of writing the byte of data also reset the parity bit.

Thus, in order to only consider the parity bits associated with the byte of word to be read, the error correction circuitry can have knowledge of the particular byte of data to be read, and only consider the parity bits associated with that byte. This knowledge can be imparted to the error correction circuitry via the use of a read mask.

FIG. 41 illustrates an exemplary memory device with read mask functionality according to examples of the disclosure. The memory device 5400 depicted in FIG. 41 can include a memory module 5402 that operates in substantially the same manner as the memory 55102 discussed above with respect to FIG. 39. A memory controller 5404 can be connected to the memory 5402. The memory controller 5404 can contain the logic that enables the memory 5402 to be read from and written to and can also contain the logic that allows for the memory 5402 to be refreshed.

Memory controller 5404 can also interface with error control circuitry 5406. Error control circuitry 5406 can include the logic necessary to check the memory 5402 for soft errors when the memory is read from by the memory controller 5404. One method by which the error control circuitry 5406 can check the memory for soft errors during a read cycle is to store parity bits that can be checked during a read cycle to determine if a soft error has occurred. A parity bit can refer to a bit that is inserted or added to the end of a string of binary code that indicates whether the number of bits in the string with the value one is even or odd.

As an example, for each byte of data stored in memory 5402, error control circuitry 5406 can store a parity bit indicating if the number of ones stored in the byte is even or odd. The parity bit can be set when the byte is written to. When the byte of data from memory 5402 is read, the parity bit can be checked against the read value of the byte. If the parity bit does not correlate with the read data, then a soft error can be indicated. A soft error can refer to a bit stored within a byte that has changed values between the time it was written into memory and the time it was read from memory.

The memory controller 5404 can also interface with a read mask module 5408. The read mask module 5408 can operate as a stand-alone module in one example, or can be included within memory 5402. For illustrative purposes, the read mask module 5408 is illustrated as separate from the memory controller 5404, but the disclosure should not be construed as being limiting.

The read mask module 5408 can determine which particular byte of data within a word is being read from and supply that information to the error control circuitry 5406. With that knowledge, error control circuitry can only consider the parity bits associated with the byte of data to be read from rather than the parity bits of the entire word of data that is read as discussed above. In this way, by receiving knowledge of which particular byte of data is to be read from, the error circuitry can only consider the parity bits associated with the byte of data to be read from and thus minimize the likelihood of generating a false positive indication of a soft error.

Figure 43:
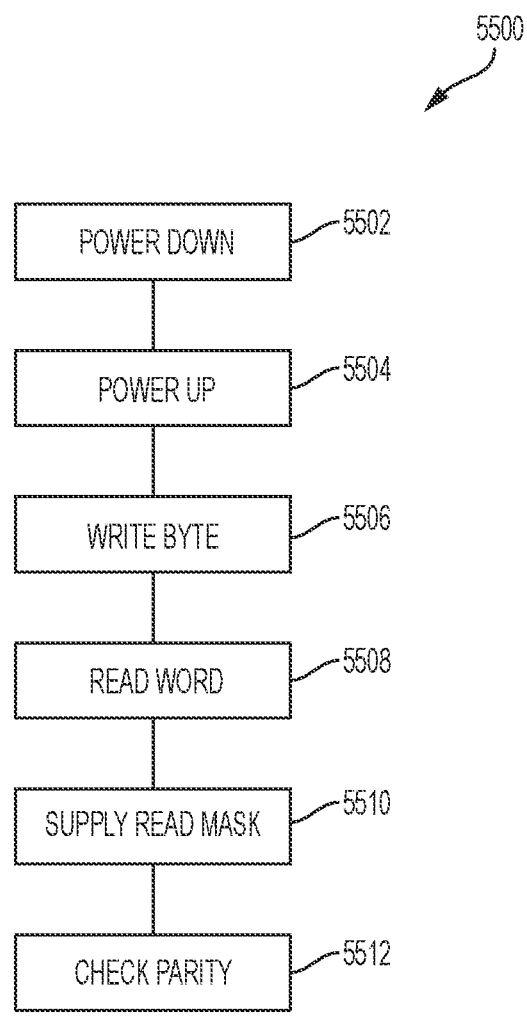
FIG. 43 illustrates an exemplary memory device power-gating method without memory initialization and with read mask functionality according to examples of the disclosure.

FIG. 43 illustrates an exemplary memory device power-gating method without memory initialization and with read mask functionality according to examples of the disclosure. Steps 5502, 5504, 5506, and 5508 can be substantially the same as their counterpart steps 5302, 5304, 5306, and 5308 of FIG. 41, and thus a discussion of those steps can be found above with respect to the discussion of FIG. 41.

Steps 5506, 5508, 5510 and 5512 may be executed for each data byte that is written to memory 55102 after step 5504 of powering up the memory, may be executed during a predefined period after the step 5504, may be executed based on the success or failure of previous iterations of steps 5506, 5508, 5510 and 5512 and/or may be executed based on the outcomes (mainly detected errors) of many iterations of method 5500. The success or failure may be determined per the entire memory, per a memory bank of multiple memory banks (if such exist) of a memory, per any other segment of memory, and the like. As a rule of thumb—a more reliable memory may reduce the number of data bytes that undergo method 5500.

At step 5510, the memory controller or a stand-alone read mask module as discussed above, can generate a read mask which can be transmitted to an error control circuitry.

At step 5512, the error control circuitry can utilize the read mask to determine which parity bits of the word should be used to determine if a soft error has occurred in the memory module. Using the read mask, which indicates which byte of the word is to be read, the error correction circuitry can examine the parity bits associated with the byte of data to be read to determine if a soft error rather than looking at all of the parity bits associated with the word as discussed above. Using the read mask to effectively mask the parity bits not associated with the byte of data to be read can allow for the minimization of false positive soft errors. By using a read mask, the memory may not be required to initialize during a power up of the memory device while at the same time minimizing the false positive soft errors associated with parity bits that correspond to data that has not been written to.

Figure 44:
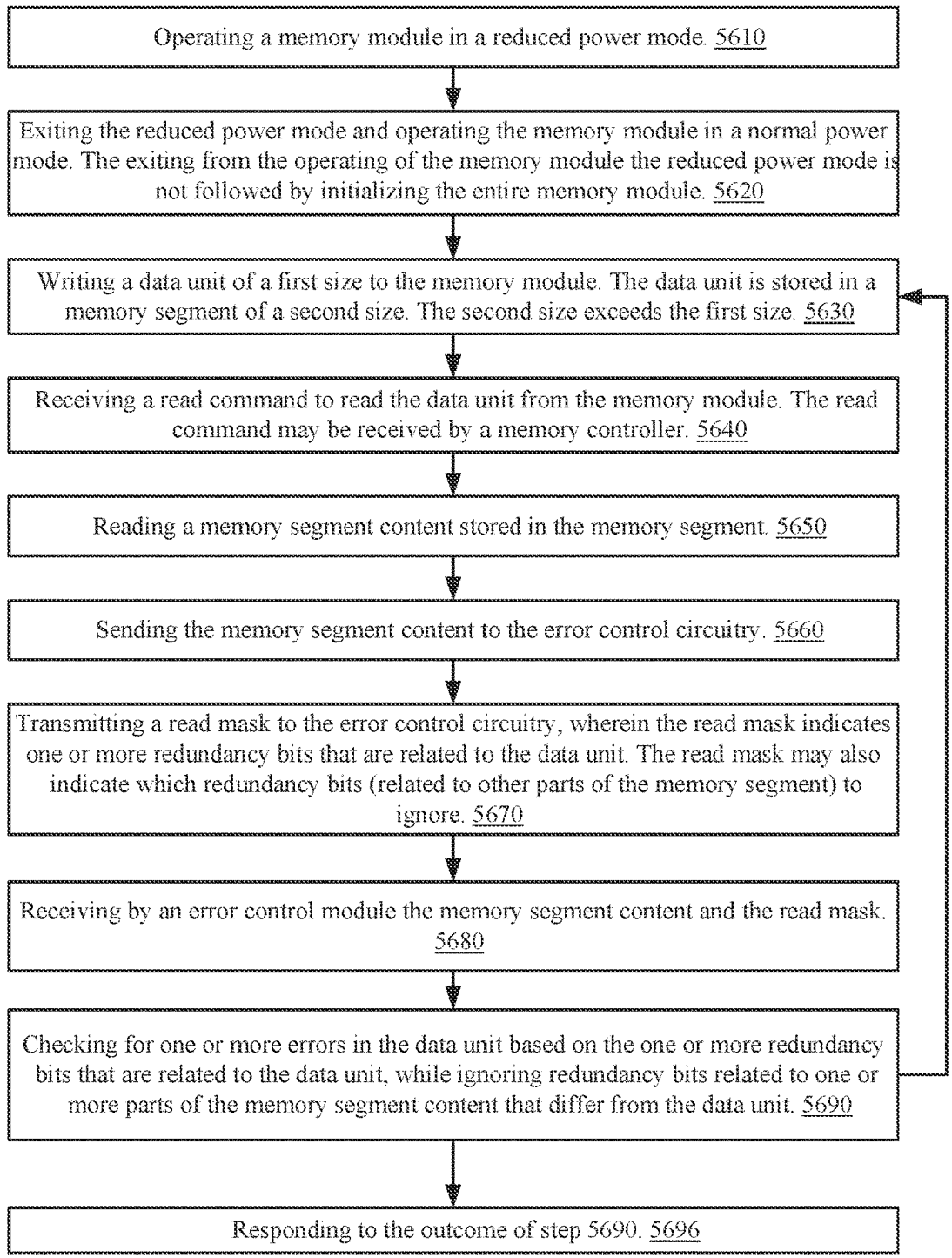
FIG. 44 illustrates a method according to an embodiment of the invention.

FIG. 44 illustrates method 5600 according to an embodiment of the invention.

Method 5600 may start by step 5610 of operating a memory module in a reduced power mode. The reduced power mode may be an idle mode, a shutdown mode or any mode that will cause the data in the memory module to be invalid.

Step 5610 may be followed by step 5620 of operating the memory module in a normal power mode, after exiting from the operating of the memory module in the reduced power mode.

The exiting from the operating the memory module in the reduced power mode may involve supplying power to the memory module or increasing the power supplied to the memory module to a level that will enable the memory module to store valid information.

The exiting from the operating of the memory module the reduced power mode is not followed by initializing the entire memory module.

Step 5620 may be followed by step 5630 of writing a data unit of a first size to the memory module. The data unit is stored in a memory segment of a second size. The memory segment may store the data unit and additional content. The additional content may be one or more data units, redundancy bits, and/or garbage.

The second size exceeds the first size.

Step 5630 may be followed by step 5640 of receiving a read command to read the data unit from the memory module. The read command may be received by a memory controller.

Step 5640 may be followed by step 5650 of reading a memory segment content stored in the memory segment.

Step 5650 may be followed by step 5660 of sending the memory segment content to the error control circuitry.

Step 5660 may be followed by step 5670 of transmitting a read mask to the error control circuitry, wherein the read mask indicates one or more redundancy bits that are related to the data unit. The read mask may also indicate which redundancy bits (related to other parts of the memory segment) to ignore.

Step 5670 may be followed by step 5680 of receiving by an error control module the memory segment content and the read mask.

Step 5680 may be followed by step 5690 of checking for one or more errors in the data unit based on the one or more redundancy bits that are related to the data unit, while ignoring redundancy bits related to one or more parts of the memory segment content that differ from the data unit.

Step 5690 may be followed by step 56956 of responding to the outcome of step 5690. For example—preforming an error correction step if an error is found in step 5690, updating error statistics, determining if future write operations will require the error detection and/or error correction, and the like.

Step 5690 may also be followed by step 5630

Figure 45:
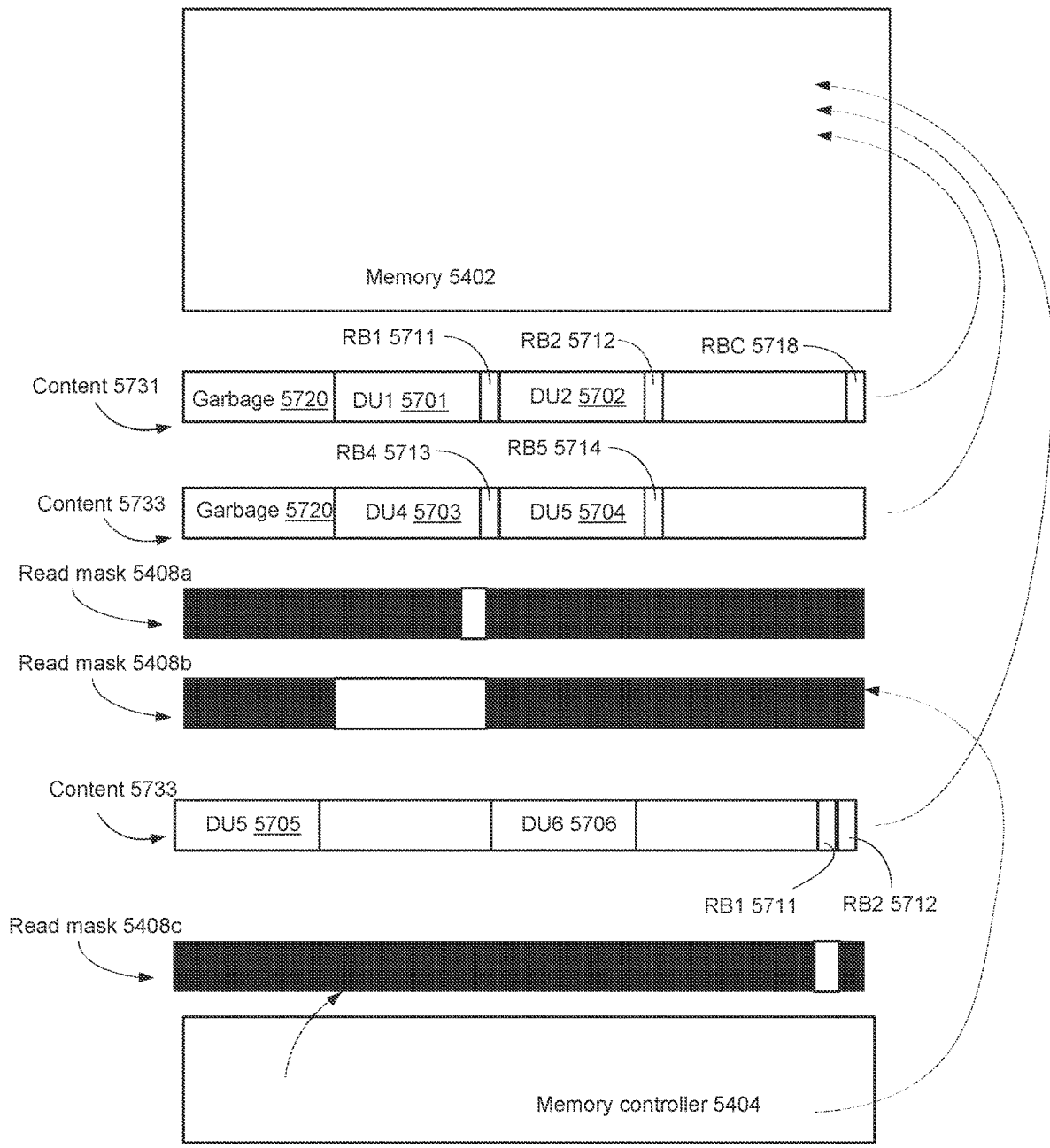
FIG. 45 illustrates a memory module, a memory controller and various data structures according to an embodiment of the invention.

FIG. 45 illustrates a memory module 5402*a* memory controller 5404 and various data structures according to an embodiment of the invention.

The memory controller 5404 and the memory module 5402 are coupled to error control module (not shown).

Memory module 5402 may include many memory segments (such as memory lines, parts of a memory line and the like).

The memory segments may store content that is referred to as memory segment content.

FIG. 45 illustrates first, second and third memory segments content (denoted "content") 5731, 5731 and 5732 that are stored in three memory segments of memory 5402.

FIG. 45 also illustrates read masks 5408*a*, 5408*b* and 5408*c* that may be stored in memory controller 5404. The black parts may represent bits of a first value while the white parts may represent bits of another value.

First memory segment content 5731 includes garbage (invalid bits) 5720, a first data unit (DU1) 5701 that is followed by a first redundancy bit RB1 5711 (associated with DU1), a second data unit (DU2) 5702 that is followed by a second redundancy bit RB2 5712 (associated with DU2), and invalid bits that may store an invalid memory segment content RBC 5718 that was supposed to protect the content of the entire memory segment.

Second memory segment content 5732 includes garbage (invalid bits) 5720, a third first data unit (DU3) 5703 that is followed by a third redundancy bit RB3 5713 (associated with DU3), a fourth data unit (DU4) 5704 that is followed by a fourth redundancy bit RB4 5714 (associated with DU4).

Third memory segment content 5733 includes garbage (invalid bits) 5720, a fifth first data unit (DU5) 5705 that is followed by a sixth data unit (DU6) 5706. Fifth redundancy bit RB5 5715 (associated with DU5) and sixth redundancy bit RB6 5716 (associated with DU6) are stored at the end of the memory segment.

When the first or fourth data units are being read then read mask 5408*a* can be used for unmasking RB1 5711 or RB4 5714 and for masking at least other redundancy bits stored in the first or third memory content.

When the first or fourth data units are being read then read mask 5408*b* can be used for unmasking RB1 5711 or RB4 5714 as well as unmasking DU1 or DU4 and for masking at least other redundancy bits stored in the first or third memory content.

When the fifth data unit is being read then read mask 5408*c* can be used for unmasking RB5 5715 and for masking at least other redundancy bits stored in the first or third memory content.

The read mask may be applied only on locations that may store redundancy bits.

Figure 46:
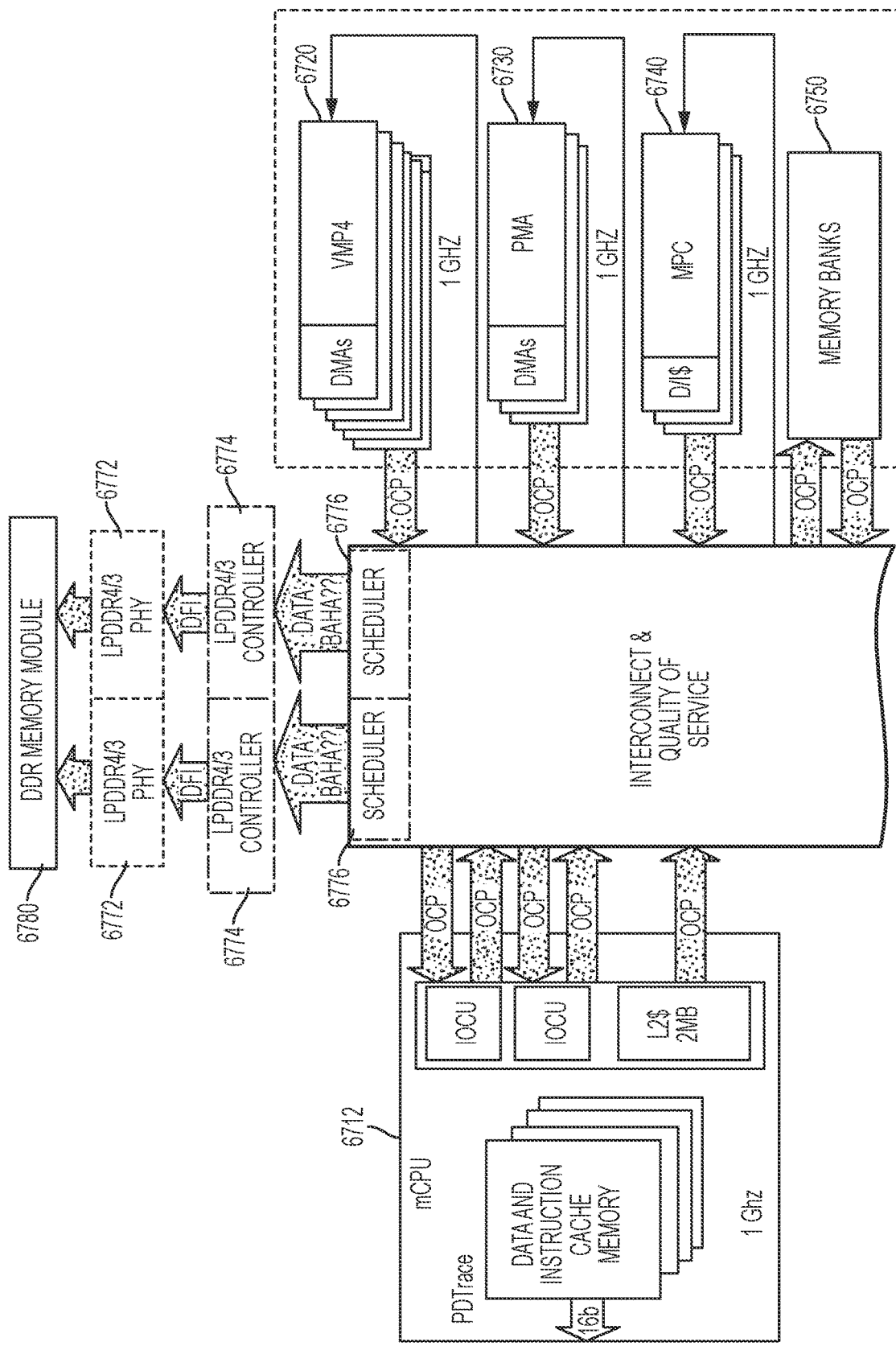
FIG. 46 illustrates an exemplary system-on-chip (SoC) according to examples of the disclosure.
Figure 46:
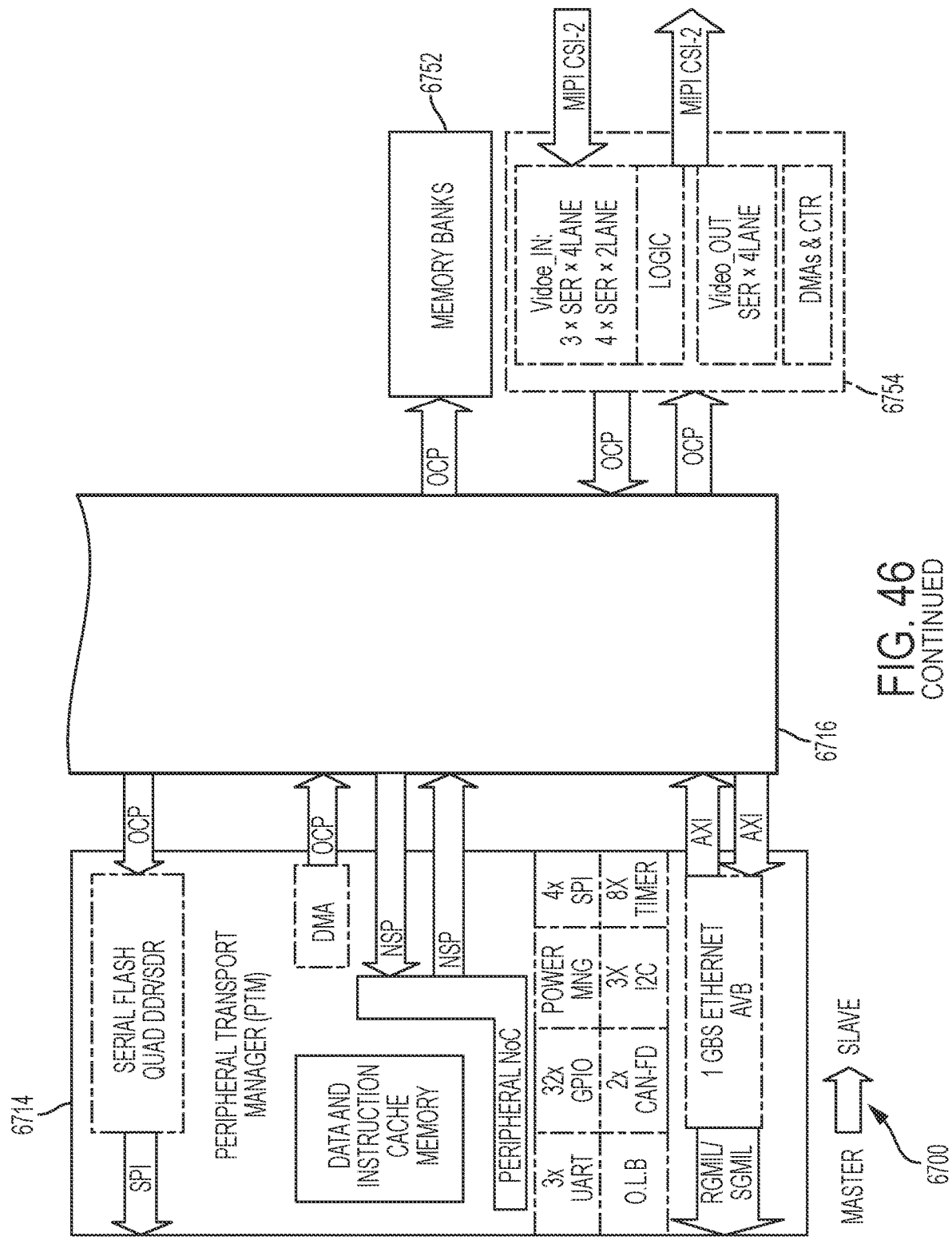

FIG. 46 illustrates a system on chip according to an embodiment of the invention.

The system on chip 6700 includes an interconnect and quality of service monitor 6716, a central processing unit (mCPU) 6712, a peripheral transport manager 6714 for managing the communication with peripheral devices, a plurality of VMP processors 6720, a PMA 6730, an MPC 6740, memory bank 6750, memory bank 6752 and media interface 6754, DDR memory module 6780 and memory interfaces 6776 and 6774 positioned between DDR memory module 6780 and interconnect and quality of service monitor 6716.

The plurality of VMP processors 6720, a PMA 6730, an MPC 6740 and non-limiting of accelerators that may belong to a system on Chip (or may be fabricated in one or more chips. The different types of processors may provide different tradeoffs between flexibility and efficiency. A non-limiting example of PMA 6730 is illustrated in U.S. provisional patent Ser. No. 62/293,147 filing date Feb. 9, 2016.

MPC 6740 may include multiple processing cores that use barrel thread processing as illustrates in multiple figures (such as 2, 3, 6, 7, 8, 9, 11, 41 and 43) of this application.

The VMP 6720 may be configured to process gather read commands, may include a floating point processor, may include a FIFO as described in FIG. 28.

Floating Point

Various calculations executed by any of the mentioned above cores, serial processor and or devices may require floating point calculations.

Performing floating point add and/or subtract operations while generating the listed below exceptions can greatly simplify and reduce hardware associated with add and/or subtract operations.

A floating point number N equals a mantissa M that is multiplied by a base B by the power of an exponent E: $N=1.M*B^E$.

Conversion between an integer and floating point representations of a number can be speeded by performing exponent bias. Exponent bias involves manipulating the bias instead of multiplying the mantissa ay a base by the power of the bias. The conversion of a floating point to integer will include adding, by an adder the bias to the exponent, and multiplying the mantissa by the base by the power of the biased exponent—all can be done in a single cycle.

Using exponent bias allows to produce, from a floating point number x, the integer y=convert_float_to_int(x*2^N) in a single operation that gets the floating point value x and the integer N (that integer includes a bias field) as its 2 inputs. Without exponent bias you need 2 operations: a multiplication z=x*2^N (where 2^N is represented as a floating point number) and then y=convert_float_to_int(z).

It should be noted that convert_float_to_int can do truncation, rounding, ceil or floor and in all of these cases having exponent bias saves you the multiplication.

Assuming that the base is two, the mantissa may start with a first set bit, a point and then a second set bit. The first set bit may a default bit and may be ignored during the calculations—added to the output mantissa after the calculation and removed from the input mantissa before the calculation.

In floating point representation a Denormalized number is a number has an absolute value that is too small—has an exponent that is below a predefined exponent value.

Figure 47:
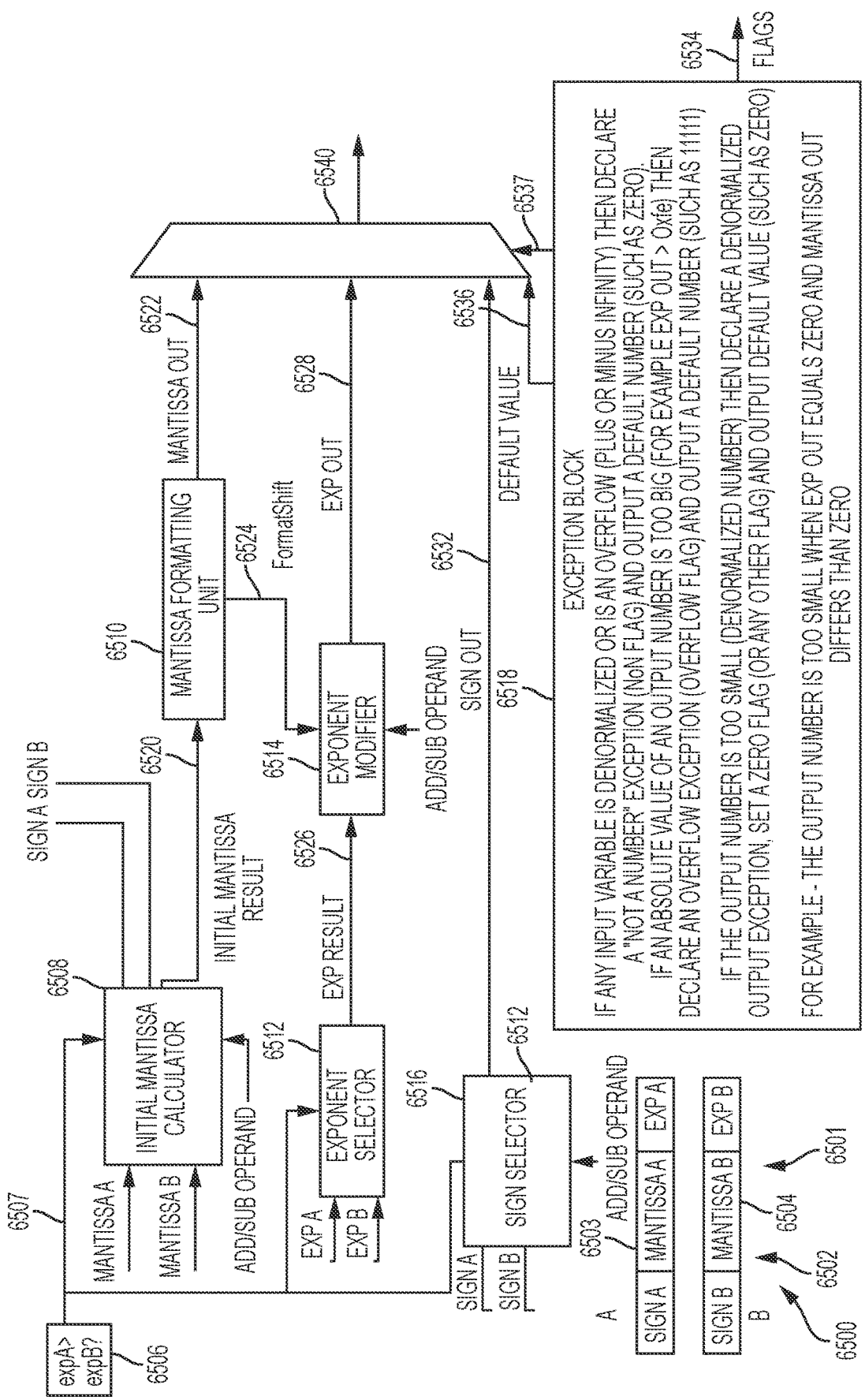
FIG. 47 illustrates a floating point processor that includes add and subtract unit and a format converter according to an embodiment of the invention.

FIG. 47 illustrates a floating point processor 6500 that includes add and subtract unit 6501 and format converter 6502 according to an embodiment of the invention.

The floating point processor may also include a multiplier and/or a divider that are not shown for simplicity of explanation.

The floating point processor 6500 may be configured to support the following instructions: addition, subtraction, multiplication, division, comparisons, minimum, maximum, absolute value, conversions between integer and floating point, floor, ceil, and round to nearest even.

The add and subtract unit 6501 receives two operands A 6503 and B 6504. A is represented by sign A, Mantissa A and EXP A. B is represented by sign B, Mantissa B and EXP B. It is noted that the order of fields may vary from the disclosed in this figures. For example—the order of fields may be sign, exponent and mantissa.

It is assumed that is Mantissa A and/or mantissa B start by the default set bit then this default set bit is removed or ignored from. The default set one may not be included in the Mantissa but may precede it.

The add and subtract unit 6501 includes exception block 6518, exponent comparator (expA>expB) 6506 for checking if the exponent of A exceeds B (and if so—what is the exponent difference), initial mantissa calculator 6508, mantissa formatting unit 6510, exponent selector 6512, sign selector 6516, exponent modifier 6514, and a multiplexer 6540.

The exponent comparator 6506 receives exp A and exp B and determines if exp A exceeds exp B and outputs an output signal 6507 that is fed to initial mantissa calculator 6508, exponent selector 6512 and sign selector 6516. The exponent comparator 8506 block may the exponent difference (ExpDiff—absolute value of ExpA—Exp B).

The initial mantissa calculator 6508 receives Mantissa A, Mantissa B, output signal 6507, Sign A, Sign B and ADD/SUB operand.

Before adding or subtracting (According to ADD/SUB operand) Mantissa A and Mantissa B the mantissas should be "aligned". For example and assuming a base of two the mantissa of the smaller exponent is shifted by ExpDiff.

After the shift the initial mantissa calculator 6508 performs the add or subtract operation to provide an initial mantissa result 6520.

The initial mantissa result 6520 may start with multiple zero bits or an overflow. The mantissa formatting unit 6510 has to find the "leading" one and then shift the mantissa add sub result 6520 to the right or left (if necessary) by FormatShift 6524 so that the first bit after the point is a set bit.

Exponent selector 6512 receives ExpA and ExpB, output signal 6507 and selects the bigger exponent out of Exp A and Exp B as Exp result 6526.

FormatShift 6524 is fed to exponent modifier—as the shifting of the mantissa (thereby increasing the mantissa) has to be countered by a reduction of the exponent. Exp result 6526 has to be reduced (shifted up or down) based on FormatShift to provide Exp Out 6528.

The sign selector receives Sign A, Sign B, ADD/SUB operand and output signal 6507 and determines Sign out 6532.

The exception block 6518 receives operands A and B (or parts of these operands) and generates the following exception.

a. If any input variable is denormalized or is an overflow (plus or minus infinity) then declare a "Not A Number" exception (NoN flag) and output a default number (such as a canonical NoN value of 0xffffffff).

b. If an absolute value of an output number is too big (for example exp out >0xfe) then declare an overflow exception (overflow flag) and output a default number (such as 0xffffffff)

c. If the output number is too small (denormalized number) then declare a denormalized output exception, set a zero flag (or any other flag) and output default value (such as zero). For example—the output number is too small when exp out equals zero and mantissa out differs than zero.

It should be noted that any of the mentioned above exceptions may be indicated by setting or resetting any flag or by outputting any other indicator. The default values may have any value. For example the default value may be zero or any other predefined number. Alternatively, the default number may be any part of A and/or B or any part of the number calculated by the add and subtract unit 6501.

Multiplexer 6540 is controlled by control signal 6537 (from exception block 6518) and outputs either a default value 6535 from exception block 6518 of a calculated output result that includes Mantissa Out 6522, Exp out 6528 and Sign out 6532.

By declaring denormalized numbers and too big input numbers as not a number—the add and subtract unit 6501 is greatly simplified as it does not include circuits that manage denormalized numbers (such as a complex and/or lengthy circuit for finding a leading one).

According to an embodiment of the invention an exception is generated when at least one of the pair of an input floating point number is denormalizer, when the input floating point number.

Format converter 6502 is configured to perform integer to floating point conversions and floating point to integer conversions.

When performing an integer to floating point conversion the format converter may be configured to:
  a. If the input variable is plus or minus infinity then they are converted to "Not A Number" and generate an overflow or NoN exception (NoN flag). Output a default number (such as a canonical NoN value of 0xffffffff).
  b. If the input variable is too small (denormalized number) then declare An underflow exception and output a default value such as zero.

When performing an integer to floating point conversion the format converter may be configured to:
  a. Treat an invalid input variable as Int_max regardless of the exponent bias and generate an invalid input exception.
  b. Infinity becomes INT_MAX and minus infinity becomes INT_MIN, and an overflow upon conversion to an integer exception is produced.
  c. Denormalized numbers do not trigger an exception.

The format converter uses exponent bias. An integer number may be accompanied by a bias field. When converting the integer number to a floating point, the bias is added to the exponent field of the floating point number—after the conversion. When converting the floating point to the bias is reduced from value of the exponent field and this reduction is followed by converting the floating point number (with the reduced exponent field) to an integer.

The exponent bias is equivalent to multiplying the number by 2 by the power of the exponent bias (the exponent bias default value is zero).

One example use case is converting numbers between 0 and 1 to integers between 0 and $2^8$ or $2^{16}$—that is, to 8-bit or 16-bit fixed point numbers.

The following special cases arise when adding the exponent bias to the exponent of the input floating point number:
  a. exponent overflow: if the IEEE representation of the exponent reaches or exceeds 255, the float becomes +inf or −inf.
  b. exponent underflow: if the IEEE representation of the exponent becomes negative or zero, the float becomes denormalized (but never a zero; note that a zero might have been produced by a naive implementation when the explicitly represented input mantissa bits are all 0.)
  c. zero inputs: +0 remains +0, and −0 remains −0 (a naive implementation could produce non-zero numbers.)

There may be provided a floating point processor that may include an add and subtract unit and a format converter, wherein the format converter is configured to convert an integer number to a floating point number using an exponent bias and wherein the add and subtract unit may include an exception block that may be configured to generate an invalid exception when receiving an input operand that is a denormalized number.

The exception block may be configured to treat an input variable that exceeds a size threshold as an invalid number.

The floating point processor that may be configured to calculate a result by applying an addition or subtraction operation; generate an exception when the result is a denormalized number; and output a zeroed number and an exception flag.

The floating point processor may include an exponent comparator that may be configured to compere exponents of two input operands; an initial mantissa calculator for adding or subtracting mantissas of the two input operands after aligning, based on the exponents of the two operands, between the mantissas of the two input operands to provide an initial mantissa result; a mantissa formatting unit for finding a leading set bit in the initial mantissa result and for shifting, when the leading set bit is not a most significant bit of the initial mantissa result, the initial mantissa result so that the leading set bit is a most significant bit of a mantissa of a result.

The floating point processor may include an exponent selector for selecting between exponents of the two input operands to provide a selected exponent; an exponent modifier for modifying the selected exponent in order to compensate for a shifting of the initial mantissa result to provide a result exponent; and a sign selector for determining a result sign.

The format converter may be configured to convert a floating point number to an integer number without generating an exception when the floating point number is a denormalized number.

There may be provided a method (method 6900 of FIG. 49) for performing floating point operations by a floating point processor, wherein the method may include adding or subtracting (6910) two input operands of a floating point format by an add and subtract unit; wherein the adding or subtracting may include generating (6920) an invalid number exception when at least one of the two input operands is a denormalized number; wherein the generating of the not a number exception may include outputting a default value and setting an exception flag; and converting (6930) an integer number to a floating point number using an exponent bias.

Step 6910 may include treating, by the exception block an input variable that exceeds a size threshold as an invalid number.

Step 6910 may include calculating a result by applying an addition or subtraction operation; generating an exception when the result is a denormalized number and outputting a zeroed number and an exception flag.

Step 6910 may include may include comparing, by an exponent comparator, exponents of two input operands; adding or subtracting, by an initial mantissa calculator, mantissas of the two input operands after aligning, based on the exponents of the two operands, between the mantissas of the two input operands to provide an initial mantissa result; mantissa formatting of the initial mantissa result, by a mantissa formatting, by finding a leading set bit in the initial mantissa result and shifting, when the leading set bit is not a most significant bit of the initial mantissa result, the initial mantissa result so that the leading set bit is a most significant bit of an output mantissa.

Step 6910 may include selecting, by an exponent selector for between exponents of the two input operands to provide a selected exponent; modifying, by an exponent modifier, the selected exponent in order to compensate for a shifting of the initial mantissa result to provide an output exponent; and determining, by a sign selector, a sign of an output signal.

Step 6940 may include converting, by the format converter, a floating point number to an integer number without generating an exception when the floating point number is a denormalized number.

There may be provided a non-transitory computer readable storage medium having stored thereon a set of instructions for performing floating point operations by a floating point processor that include adding or subtracting two input operands of a floating point format by an add and subtract unit; wherein the adding or subtracting may include generating an invalid number exception when at least one of the two input operands is a denormalized number; wherein the generating of the not a number exception may include outputting a default value and setting an exception flag; and converting an integer number to a floating point number using an exponent bias.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

Any combination of any steps of any method that is disclosed in the specification may be provided.

Any combination of any steps of any method that is disclosed in the claims may be provided.

Any combination of any component, element of any device, system, processor that is disclosed in the specification may be provided.

Any combination of any component, element of any device, system, processor that is disclosed in the claims may be provided.

Any combination of any steps of any instructions stored in any non-transitory computer readable storage medium that is disclosed in the specification may be provided.

Any reference to any of the terms "comprise", "comprises", "comprising" "including", "may include" and "includes" may be applied to any of the terms "consists", "consisting", "and consisting essentially of" For example— any of method describing steps may include more steps than those illustrated in the figure, only the steps illustrated in the figure or substantially only the steps illustrate in the figure. The same applies to components of a device, processor or system and to instructions stored in any non-transitory computer readable storage medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A multiple-core processor device comprising:
multiple processing cores that are all processing cores within a hardware accelerator, each processing core comprising a barrel dispatcher configured to retrieve and execute one or more instructions associated with multiple instruction threads of a software program using barrel thread processing; and
a shared data cache that is shared by all of the multiple processing cores and is a level one data cache and is configured to send and receive data to each processing core of the multiple processing cores, the shared data cache storing data associated with an execution of a first instruction in at least one of the multiple instruction threads, the shared data cache and the multiple processing cores interacting in a coherent manner without reliance on a data cache of any of the multiple processing cores;
wherein the multiple processing cores comprise:
a plurality of private instruction memory devices, each of the plurality of private instruction memory devices is associated with a corresponding processing core of the multiple processing cores, and is configured to store instructions associated with the corresponding processing core;

wherein each processing core further comprises multiple thread register files, wherein at least one of the multiple thread register files is associated with a thread of the multiple instruction threads; and one or more arithmetic logic units;

wherein the barrel dispatcher of each processing core receives a first clock signal, retrieves a first instruction of the one or more instructions from the plurality of private instruction memory devices, the first instruction selected based on a first program counter within a first thread register file, and executes the first instruction by:

retrieving first data from the first thread register file, wherein the first thread register file is associated with a first instruction thread that is associated with the first instruction; and sending the first data to the one or more arithmetic logic units for processing.

2. The multiple-core processor device of claim 1, wherein the barrel dispatcher receives a second clock signal, retrieves a second instruction of the one or more instructions from the plurality of private instruction memory devices, the second instruction selected based on a second program counter within a second thread register file, and executes the second instruction by:

retrieving second data from the second thread register file, wherein the second thread register file is associated with a second instruction thread that is associated with the second instruction; and sending the second data to the one or more arithmetic logic units for processing.

3. The multiple-core processor device of claim 2, wherein each thread register file of the multiple thread register files is configured to load data associated with an associated instruction thread.

4. The multiple-core processor device of claim 2, wherein the multiple processing cores execute the multiple instruction threads simultaneously.

5. The multiple-core processor device of claim 1, wherein one or more of the multiple processing cores transmit to and receive data from the shared data cache, and wherein the shared data cache is configured to store data used to execute the multiple instruction threads.

6. The multiple-core processor device of claim 1, comprising a serial processor that is configured to execute a single threaded programming code.

7. The multiple-core processor device according to claim 1 wherein the multiple processing cores are configured to execute the one or more instructions associated with the multiple instruction threads of the software program independently from each other.

8. The multiple-core processor device according to claim 1 wherein each processing core of the multiple processing cores is configured to execute a single instruction at a time.

9. The multiple-core processor device according to claim 1 wherein each respective barrel dispatcher is configured to retrieve, in a sequential manner, an instruction from each one of the multiple instruction threads of the software program.

10. The multiple-core processor device of claim 1, wherein:

the multiple processing cores include all processing cores within the hardware accelerator; and the multiple processing cores all share the shared data cache.

11. The multiple-core processor device of claim 1, comprising a central processing unit and an on-chip interconnect, wherein the hardware accelerator receives the one or more instructions from the central processing unit.

12. A method for processing multiple instruction threads, the method comprising:

executing the multiple instruction threads using multiple processing cores that are all processing cores within a hardware accelerator, wherein each processing core of the multiple processing cores includes a barrel dispatcher that uses barrel thread processing to execute one or more instructions associated with the multiple instruction threads;

sending and receiving data to each processing core of the multiple processing cores using a shared data cache that is shared by all of the multiple processing cores and is a level one shared data cache, the shared data cache storing data associated with an execution of a first instruction in at least one of the multiple instruction threads, the shared data cache and the multiple processing cores interacting in a coherent manner without reliance on a data cache of any of the multiple processing cores;

retrieving one or more instructions from a plurality of private instruction memory devices, each of the plurality of private instruction memory devices is associated with a corresponding processing core of the multiple processing cores, and is configured to store instructions associated with the corresponding processing core, wherein each processing core further comprises multiple thread register files;

receiving a first clock signal at a barrel dispatcher of the multiple processing cores;

retrieving a first instruction from the plurality of private instruction memory devices, wherein the first instruction is selected based on a first program counter within a first thread register file; and executing the first instruction by:

retrieving first data from the first thread register file, wherein the first thread register file is associated with a first instruction thread that is associated with the first instruction; and sending the first data to one or more arithmetic logic units for processing.

13. The method of claim 12, wherein the barrel dispatcher receives a second clock signal, retrieves a second instruction of the one or more instructions from the plurality of private instruction memory devices, wherein the second instruction is selected based on a second program counter within a second thread register file, and executes the second instruction by:

retrieving second data from the second thread register file, wherein the second thread register file is associated with a second instruction thread that is associated with the second instruction; and sending the second data to the one or more arithmetic logic units for processing.

14. The method of claim 13, wherein each thread register file of the multiple thread register files is configured to load data associated with an associated instruction thread.

15. The method of claim 13, wherein the multiple processing cores execute the multiple instruction threads simultaneously.

16. The method of claim 12, wherein one or more of the multiple processing cores transmit to and receive data from the shared data cache, and wherein the shared data cache is configured to store data necessary for the execution of the multiple instruction threads.

17. The method of claim 12 comprising: executing one or more single threaded programming codes using a serial processor.

18. A non-transitory computer readable storage medium having stored thereon a set of instructions for processing multiple instruction threads of a software program that when executed by a computing device, cause the computing device to:
- execute the multiple instruction threads using multiple processing cores that are all processing cores within a hardware accelerator of a hardware accelerator, wherein each of the multiple processing cores include a barrel dispatcher that uses barrel thread processing to execute one or more instructions associated with the multiple instruction threads;
- send and receive data to a least two of the multiple processing cores using a shared data cache that is shared by all of the multiple processing cores and is a level one shared data cache, the shared data cache storing data associated with an execution of a first instruction in at least one of the multiple instruction threads, the shared data cache and the multiple processing cores interacting in a coherent manner without reliance on a private data cache of any of the multiple processing cores;
- retrieve one or more instructions from a plurality of private instruction memory devices, the plurality of private instruction memory devices is associated with a corresponding processing core of the multiple processing cores, and is configured to store instructions associated with the corresponding processing core, wherein each processing core further comprises multiple thread register files;
- receive a first clock signal at a barrel dispatcher of the multiple processing cores;
- retrieve a first instruction from the plurality of private instruction memory devices, wherein the first instruction is selected based on a first program counter within a first thread register file; and
- execute the first instruction by:
  - retrieving first data from the first thread register file, wherein the first thread register file is associated with a first instruction thread that is associated with the first instruction; and
  - sending the first data to one or more arithmetic logic units for processing.

19. The non-transitory computer readable storage medium of claim 18, wherein the barrel dispatcher receives a second clock signal, retrieves a second instruction of the one or more instructions from the plurality of private instruction memory devices, wherein the second instruction is selected based on a second program counter within a second thread register file, and executes the second instruction by:
- retrieving second data from the second thread register file, wherein the second thread register file is associated with a second instruction thread that is associated with the second instruction; and
- sending the second data to the one or more arithmetic logic units for processing.

20. The non-transitory computer readable storage medium of claim 19, wherein each thread register file of the multiple thread register files is configured to load data associated with an associated instruction thread.

21. The non-transitory computer readable storage medium of claim 19, wherein the multiple processing cores execute the multiple instruction threads simultaneously.

22. The non-transitory computer readable storage medium of claim 18, wherein one or more of the multiple processing cores transmit to and receive data from the shared data cache, and wherein the shared data cache is configured to store data used to execute the multiple instruction threads.

23. The non-transitory computer readable storage medium of claim 18, wherein the computing device is caused to: execute one or more single threaded programming codes using a serial processor.

24. A multiple-core processor device comprising:
- multiple processing cores that are all processing cores within a hardware accelerator, each processing core including a barrel dispatcher configured to retrieve and execute one or more instructions associated with multiple instruction threads of a software program using simultaneous multiple threading; and
- a shared data cache that is shared by all of the multiple processing cores and is a level one shared data cache and is configured to send and receive data to all of the multiple processing cores, the shared data cache storing data associated with an execution of a first instruction in at least one of the multiple instruction threads, the shared data cache and the multiple processing cores interacting in a coherent manner without reliance on a private data cache of any of the multiple processing cores;
- wherein the multiple processing cores comprise:
  - a plurality of private instruction memory devices each of the plurality of private instruction memory devices is associated with a corresponding processing core of the multiple processing cores, and is configured to store instructions associated with the corresponding processing core;
  - wherein each processing core further comprises multiple thread register files, wherein at least one of the multiple thread register files is associated with a thread of the multiple instruction threads; and
  - one or more arithmetic logic units;
  - wherein the barrel dispatcher of each processing core receives a first clock signal, retrieves a first instruction of the one or more instructions from the plurality of private instruction memory devices, the first instruction selected based on a first program counter within a first thread register file, and executes the first instruction by:
    - retrieving first data from the first thread register file, wherein the first thread register file is associated with a first instruction thread that is associated with the first instruction; and sending the first data to the one or more arithmetic logic units for processing.

* * * * *